US009653754B2

(12) United States Patent
Kato

(10) Patent No.: US 9,653,754 B2
(45) Date of Patent: May 16, 2017

(54) NONAQUEOUS ELECTROLYTES AND NONAQUEOUS-ELECTROLYTE SECONDARY BATTERIES EMPLOYING THE SAME

(71) Applicant: MITSUBISHI CHEMICAL CORPORATION, Tokyo (JP)

(72) Inventor: Ryoichi Kato, Inashiki-gun (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 318 days.

(21) Appl. No.: 14/269,817

(22) Filed: May 5, 2014

(65) Prior Publication Data

US 2014/0335405 A1  Nov. 13, 2014

Related U.S. Application Data

(60) Division of application No. 13/536,254, filed on Jun. 28, 2012, now Pat. No. 9,231,277, which is a division of application No. 12/580,507, filed on Oct. 16, 2009, now Pat. No. 9,048,508, which is a continuation-in-part of application No. PCT/JP2008/057610, filed on Apr. 18, 2008.

(30) Foreign Application Priority Data

Apr. 20, 2007 (JP) ................. 2007-111918
Apr. 20, 2007 (JP) ................. 2007-111976
Apr. 26, 2007 (JP) ................. 2007-116444
Apr. 26, 2007 (JP) ................. 2007-116448
Oct. 19, 2007 (JP) ................. 2007-272163
Oct. 16, 2008 (JP) ................. 2008-267700

(51) Int. Cl.
| | | |
|---|---|---|
| *H01M 10/0567* | (2010.01) | |
| *H01M 4/583* | (2010.01) | |
| *H01M 4/587* | (2010.01) | |
| *H01M 4/133* | (2010.01) | |
| *H01M 10/052* | (2010.01) | |
| *H01M 10/0525* | (2010.01) | |
| *H01M 4/62* | (2006.01) | |
| *H01M 10/0569* | (2010.01) | |

(52) U.S. Cl.
CPC ....... *H01M 10/0567* (2013.01); *H01M 4/133* (2013.01); *H01M 4/583* (2013.01); *H01M 4/587* (2013.01); *H01M 10/052* (2013.01); *H01M 10/0525* (2013.01); *H01M 4/62* (2013.01); *H01M 10/0569* (2013.01); *H01M 2300/0022* (2013.01); *Y02E 60/122* (2013.01)

(58) Field of Classification Search
CPC ........ H01M 10/0567; H01M 10/0525; H01M 10/052; H01M 4/583; H01M 4/587; H01M 4/133; H01M 10/0569; H01M 2300/0022; Y02E 60/122
See application file for complete search history.

(56) References Cited

U.S. PATENT DOCUMENTS

| | | | |
|---|---|---|---|
| 6,153,333 A | 11/2000 | Barker | |
| 6,890,686 B1 | 5/2005 | Barker | |
| 2006/0035137 A1 | 2/2006 | Maruo et al. | |
| 2008/0102376 A1 | 5/2008 | Kato et al. | |
| 2008/0153005 A1 | 6/2008 | Horikawa et al. | |
| 2010/0015514 A1 | 1/2010 | Miyagi et al. | |
| 2011/0091768 A1* | 4/2011 | Ohashi .............. | H01M 10/0567 429/199 |

FOREIGN PATENT DOCUMENTS

| | | |
|---|---|---|
| CN | 1287695 | 3/2001 |
| CN | 1181592 C | 12/2004 |
| CN | 1853307 | 10/2006 |
| EP | 1205996 | 5/2002 |
| EP | 1 905 739 A1 | 4/2008 |
| JP | 04-349365 | 12/1992 |
| JP | 8-78053 | 3/1996 |
| JP | 10-503421 | 2/1998 |
| JP | 11-67270 | 3/1999 |
| JP | 11-67270 A | 3/1999 |
| JP | 11-185804 | 7/1999 |
| JP | 2001-6729 | 1/2001 |
| JP | 2001-256996 | 9/2001 |
| JP | 2002-231306 A | 8/2002 |
| JP | 3439085 | 6/2003 |
| JP | 2003-331915 | 11/2003 |
| JP | 2004-31079 | 1/2004 |
| JP | 2004-111359 | 4/2004 |
| JP | 2004-146346 | 5/2004 |
| JP | 2004-273152 | 9/2004 |

(Continued)

OTHER PUBLICATIONS

Office Action issued Aug. 5, 2013 in Chinese Patent Application No. 200880012840.2 (with English translation).
Combined Chinese Office Action and Search Report issued Jul. 25, 2014 in Patent Application No. 201210059663.1 (with English Translation and English Translation of Category of Cited Documents).
Chinese Office Action issued Nov. 21, 2014, in China Patent Application No. 200880012840.2 (with English translation).
Office Action issued Dec. 29, 2014 in Korean Patent Application No. 10-2014-7027685 (with English translation).
Office Action issued Feb. 16, 2015 in Korean Patent Application No. 10-2009-7021561 (with English language translation).

(Continued)

*Primary Examiner* — Laura Weiner
(74) *Attorney, Agent, or Firm* — Oblon, McClelland, Maier & Neustadt, L.L.P.

(57) ABSTRACT

A nonaqueous electrolyte containing a monofluorophosphate and/or a difluorophosphate and a compound having a specific chemical structure or specific properties. The nonaqueous electrolyte can contain at least one of a saturated chain hydrocarbon, a saturated cyclic hydrocarbon, an aromatic compound having a halogen atom and an ether having a fluorine atom.

19 Claims, No Drawings

(56) References Cited

FOREIGN PATENT DOCUMENTS

| JP | 2005-38722 | | 2/2005 |
|---|---|---|---|
| JP | 2005-85545 | A | 3/2005 |
| JP | 2005-219994 | | 8/2005 |
| JP | 2005-251456 | | 9/2005 |
| JP | 2006-107910 | | 4/2006 |
| JP | 2006-143572 | A | 6/2006 |
| JP | 2006-179458 | | 7/2006 |
| KR | 2001-0110685 | | 12/2001 |
| WO | WO 2006/043538 A1 | | 4/2006 |
| WO | WO 2006/088021 A1 | | 8/2006 |
| WO | WO 2006/137177 A1 | | 12/2006 |
| WO | 2007/055087 | | 6/2007 |
| WO | WO 2009/035054 | * | 3/2009 |

OTHER PUBLICATIONS

U.S. Appl. No. 14/624,914, filed Feb. 18, 2015, Fujii, et al.
Office Action issued on Oct. 26, 2011 in the corresponding Chinese Application No. 200880012840.2 (with English Translation).
Extended European Search Report issued Dec. 20, 2011, in Patent Application No. 08751880.9.
Office Action issued Jul. 4, 2012 in Chinese Patent Application No. 200880012840.2 (with English translation).
Office Action issued Oct. 17, 2012 in Japanese Application No. 2007-111976 (With English Translation).
Combined Chinese Office Action and Search Report issued Nov. 2, 2012 in Chinese Patent Application No. 200880012840.2 (with English-language translation).
Extended European Search Report issued Feb. 21, 2013, in European Patent Application No. 12195887.0.
Fourth Chinese Office Action issued Mar. 6, 2013 in connection with corresponding Chinese Application No. 200880012840.2, filed Apr. 18, 2008.
Japanese Office Action Issued Apr. 16, 2013 in Patent Application No. 2007-111918 (with English translation).
Information Offer Form Issued Mar. 13, 2013 in Japanese Patent Application No. 2007-111918 (with English translation).
Office Action issued Jun. 11, 2013 in Japanese patent application No. 2007-111976 filed on Apr. 20, 2007, (with English Translation).
Office Action issued Dec. 4, 2013, in Chinese Patent Application No. 201210059663.1 (with English Translation).
Decision of Reexamination issued Apr. 7, 2015 in Chinese Patent Application No. 200880012840.2 (with English language translation).
Korean Office Action issued Jul. 1, 2015 in Patent Application No. 10-2009-7021561 (with English Tranlsation).
Korean Office Action issued Jul. 29, 2015 in Patent Application No. 10-2014-7027685 (with English Translation).
U.S. Appl. No. 14/644,905, filed Mar. 11, 2015, Fujii, et al.
Chinese Office Action issued Dec. 21, 2016 in connection with corresponding Chinese Patent Application No. 201510395046.2, filed Apr. 18, 2008.
A Decision issued Feb. 28, 2017 in connection with corresponding Korean Patent Application No. 10-2014-7027685, filed Apr. 18, 2008.

* cited by examiner ically, the invention relates to nonaqueous electrolytes con-
NONAQUEOUS ELECTROLYTES AND NONAQUEOUS-ELECTROLYTE SECONDARY BATTERIES EMPLOYING THE SAME The present application is a Divisional application of Ser. No. 13/536,254, now U.S. Pat. No. 9,231,277, which is a divisional application of Ser. No. 12/580,507, now U.S. Pat. No. 9,048,508, which is a continuation-in-part application of PCT/JP08/05761 having a filing date of Apr. 18, 2008 and claiming priority to Japanese Application Nos. 2007-111976 having a filing date of Apr. 20, 2007, 2007-111918 having a filing date of Apr. 20, 2007, 2007-116444 having a filing date of Apr. 26, 2007, 2007-116448 having a filing date of Apr. 26, 2007, 2007-272163 having a filing date of Oct. 19, 2007, and 2008-267700 having a filing date of Oct. 16, 2008.

TECHNICAL FIELD

The present invention relates to nonaqueous electrolytes for secondary batteries and to nonaqueous-electrolyte secondary batteries employing the electrolytes. More particularly, the invention relates to nonaqueous electrolytes containing a specific ingredient, and to nonaqueous-electrolyte secondary batteries employing the electrolytes.

BACKGROUND ART

With the recent trend toward size reduction in electronic appliances, secondary batteries are increasingly required to have a higher capacity, etc. Attention is hence focused on lithium secondary batteries, which have a higher energy density than nickel-cadmium batteries and nickel-hydrogen batteries.

The electrolytes used in lithium secondary batteries are nonaqueous electrolytes prepared by dissolving an electrolyte such as $LiPF_6$, $LiBF_4$, $LiClO_4$, $LiCF_3SO_3$, $LiAsF_6$, $LiN(CF_3SO_2)_2$, or $LiCF_3(CF_2)_3SO_3$ in a nonaqueous solvent such as a cyclic carbonate, e.g., ethylene carbonate or propylene carbonate, a chain carbonate, e.g., dimethyl carbonate, diethyl carbonate, or ethyl methyl carbonate, a cyclic ester, e.g., γ-butyrolactone or γ-valerolactone, a chain ester, e.g., methyl acetate or methyl propionate, or the like.

<Nonaqueous Electrolytes 1 and 1-1, Nonaqueous-Electrolyte Secondary Batteries 1 and 1-1>:

First, such nonaqueous-electrolyte secondary batteries have advantages of having a high energy density and being less apt to suffer self-discharge. In recent years, the secondary batteries are hence extensively used as power sources for mobile appliances for public use, such as portable telephones, notebook personal computers, and PDAs. The electrolytes for nonaqueous-electrolyte secondary batteries are constituted of a lithium salt as a supporting electrolyte and a nonaqueous organic solvent. The nonaqueous organic solvent is required to have a high permittivity for dissociating the lithium salt, to show high ionic conductivity in a wide temperature range, and to be stable in the batteries. It is difficult to meet these requirements with a single solvent. Because of this, use is generally made of a combination of a high-boiling solvent represented by propylene carbonate, ethylene carbonate, or the like and a low-boiling solvent such as dimethyl carbonate or diethyl carbonate.

On the other hand, many reports have been made on the addition of various additives to electrolytes in order to improve initial capacity, rate characteristics, cycle performances, high-temperature storability, continuous-charge characteristics, self-discharge characteristics, overcharge-preventive properties, etc. For example, addition of a lithium fluorophosphate compound has been reported as a technique for inhibiting self-discharge at high temperatures (see patent document 1).

<Nonaqueous Electrolyte 2 and Nonaqueous-Electrolyte Secondary Battery 2>:

Secondly, various investigations have been made on nonaqueous solvents and electrolytes in order to improve the battery characteristics including output characteristics, cycle performances, and storability of those lithium secondary batteries. For example, patent document 2 describes a technique in which a battery having excellent low-temperature output characteristics is produced by using an electrolyte containing a tetrafluoroboric acid salt in a certain amount relative to the overall area of the active-material layer formed on the positive-electrode current collector.

This technique has, in some degree, the effect of improving output characteristics without reducing high-temperature cycle performances. However, the degree of output improvement attainable with this technique is limited, and the technique failed to attain an even higher output.

<Nonaqueous Electrolyte 3 and Nonaqueous-Electrolyte Secondary Battery 3>:

Thirdly, various investigations have been made on nonaqueous solvents and electrolytes in order to improve the battery characteristics including load characteristics, cycle performances, storability, and low-temperature characteristics of those lithium secondary batteries. For example, patent document 3 includes a statement to the effect that when an electrolyte containing a vinylethylene carbonate compound is used, the decomposition of this electrolyte is minimized and a battery excellent in storability and cycle performances can be fabricated. Patent document 4 includes a statement to the effect that when an electrolyte containing propanesultone is used, recovery capacity after storage can be increased.

The incorporation of such compounds can produce, in some degree, the effect of improving storability and cycle performances. However, those techniques have had a problem that a coating film having high resistance is formed on the negative-electrode side and this, in particular, reduces discharge load characteristics.

<Nonaqueous Electrolyte 4 and Nonaqueous-Electrolyte Secondary Battery 4>:

Fourthly, various investigations have been made on nonaqueous solvents and electrolytes in order to improve the battery characteristics including load characteristics, cycle performances, storability, and low-temperature characteristics of those lithium secondary batteries. For example, patent document 3 includes a statement to the effect that when an electrolyte containing a vinylethylene carbonate compound is used, the decomposition of this electrolyte is minimized and a battery excellent in storability and cycle performances can be fabricated. Patent document 4 includes a statement to the effect that when an electrolyte containing propanesultone is used, recovery capacity after storage can be increased.

The incorporation of such compounds produces, in some degree, the effect of improving storability and cycle performances. However, those techniques have had a problem that a coating film having high resistance is formed on the negative-electrode side and this, in particular, reduces discharge load characteristics.

On the other hand, it has been reported in patent document 5 that the addition of a compound represented by the formula (1) given in patent document 5 improves both cycle performances and current characteristics. It has also been reported in patent document 6 that the addition of a specific compound improves low-temperature discharge characteristics.

However, battery characteristics such as load characteristics, cycle performances, storability, and low-temperature characteristics are still insufficient, and there has been room for improvement.

<Nonaqueous Electrolyte 5 and Nonaqueous-Electrolyte Secondary Battery 5>:

Fifthly, nonaqueous-electrolyte batteries including lithium secondary batteries are coming to be practically used in extensive applications ranging from power sources for applications for public use, such as, e.g., portable telephones and notebook personal computers, to on-vehicle power sources for driving motor vehicles or the like. However, recent nonaqueous-electrolyte batteries are increasingly required to have higher performances, and there is a desire for improvements in both battery characteristics and battery safety.

Electrolytes for use in nonaqueous-electrolyte batteries are usually constituted mainly of an electrolyte and a nonaqueous solvent. As main components of the nonaqueous solvent, use is being made of: cyclic carbonates such as ethylene carbonate and propylene carbonate; chain carbonates such as dimethyl carbonate, diethyl carbonate, and ethyl methyl carbonate; cyclic carboxylic acid esters such as γ-butyrolactone and γ-valerolactone; and the like.

However, these organic solvents have volatility and are apt to catch fire. Because of this, nonaqueous-electrolyte batteries employing an electrolyte containing any of those organic solutions in a large amount potentially have the risk of igniting or exploding in case where the batteries are misused or improperly used, for example, the batteries are heated, suffer internal short-circuiting or external short-circuiting, or are overcharged or overdischarged, or in case of an accident. Such risk is exceedingly high in large batteries intended to be used especially as power sources for motor vehicles.

From such standpoints, a nonaqueous electrolyte containing an ambient-temperature-molten salt (also called room-temperature-molten salt or ionic liquid) has been proposed. Although liquid, this ambient-temperature-molten salt is too low in volatility to be detected. It is also known that this salt does not burn because it does not volatilize. Patent document 7 discloses an attempt to obtain a nonaqueous-electrolyte battery having excellent safety by using the ambient-temperature-molten salt as an electrolyte for lithium secondary batteries.

Furthermore, patent document 8 discloses a technique in which an ambient-temperature-molten salt having a quaternary ammonium cation and having excellent reductional stability is dissolved in combination with a compound, such as ethylene carbonate or vinylene carbonate, which undergoes reductional decomposition at a nobler potential than the ambient-temperature-molten salt. According to this technique, the compound which undergoes reductional decomposition at a nobler potential than the ambient-temperature-molten salt electrochemically reacts in the step of initial charge/discharge to form an electrode-protective coating film on the electrode active materials, in particular, on the negative-electrode active material, to thereby improve charge/discharge efficiency.

Patent Document 1: Japanese Patent No. 3439085
Patent Document 2: JP-A-2004-273152
Patent Document 3: JP-A-2001-006729
Patent Document 4: JP-A-10-050342
Patent Document 5: JP-A-08-078053
Patent Document 6: JP-A-11-185804
Patent Document 7: JP-A-4-349365
Patent Document 8: JP-A-2004-146346

DISCLOSURE OF THE INVENTION

Problems that the Invention is to Solve

<Nonaqueous Electrolytes 1 and 1-1, and Nonaqueous-Electrolyte Secondary Batteries 1 and 1-1>

However, the desire for higher performances in nonaqueous-electrolyte secondary batteries is growing more and more, and it is desired to attain various characteristics including high capacity, high-temperature storability, continuous-charge characteristics, and cycle performances on a high level. The prior-art technique disclosed in patent document 1, which is regarded therein as effective in improving high-temperature storability, has had a problem that this technique, when used alone, results in poor cycle performances especially under high-voltage conditions as will be shown by a Comparative Example given later. An object of inventions 1 and 1-1, which has been achieved in view of the background art described above, is to provide nonaqueous electrolytes 1 and 1-1, which has excellent cycle performances.

<Nonaqueous Electrolyte 2 and Nonaqueous-Electrolyte Secondary Battery 2>

An object of invention 2, which has been achieved in view of the background art described above, is to provide nonaqueous electrolyte 2 for secondary batteries (nonaqueous electrolyte 2), which has excellent output characteristics and is excellent also in high-temperature storability and cycle performances.

<Nonaqueous Electrolyte 3 and Nonaqueous-Electrolyte Secondary Battery 3>

An object of invention 3, which has been achieved in view of the background art described above, is to provide nonaqueous electrolyte 3 for secondary batteries (nonaqueous electrolyte 3), which has excellent cycle performances.

<Nonaqueous Electrolyte 4 and Nonaqueous-Electrolyte Secondary Battery 4>

Invention 4 has been achieved in view of the problem described above. Namely, an object of invention 4 is to provide nonaqueous electrolyte 4, which is excellent not only in low-temperature discharge characteristics and heavy-current discharge characteristics but also in high-temperature storability and cycle performances and has no problem concerning safety.

<Nonaqueous Electrolyte 5 and Nonaqueous-Electrolyte Secondary Battery 5>

However, the desire for higher performances in recent batteries is growing more and more, and it is desired to attain high capacity, high output, high-temperature storability, cycle performances, etc. simultaneously with high safety on a higher level.

Nonaqueous-electrolyte batteries employing the electrolyte described in patent document 7 were insufficient in the reversibility of electrode reactions during charge/discharge and were hence unsatisfactory in battery performances such as charge/discharge capacity, charge/discharge efficiency, and cycle performances (see Comparative Examples 1 to 3 for Invention 5). On the other hand, a nonaqueous-electrolyte battery employing the electrolyte described in an Example of patent document 8, prepared by dissolving ethylene carbonate or vinylene carbonate in an ambient-temperature-molten salt, has the following problem. When the battery in a charged state is held at a temperature of 80° C. or higher, the electrode-protective coating film formed by the decomposition of the ethylene carbonate or vinylene carbonate cannot inhibit the ambient-temperature-molten salt from decomposing, resulting in considerable evolution of a decomposition gas within the battery. The evolution of a decomposition gas within the battery increases the internal pressure of the battery and this may cause the safety valve to work. In the case of a battery having no safety valve, there are cases where the battery expands due to the pressure of the gas evolved and the battery itself becomes unusable. Furthermore, in the case where the gas evolved is flammable, there is a risk that the battery ignites or explodes even when the nonaqueous electrolyte including an ambient-temperature-molten salt has no combustibility.

As described above, in the case where the nonaqueous electrolytes containing an ambient-temperature-molten salt which are described in patent document 7 and patent document 8 are used, the batteries have been still unsatisfactory from the standpoint of reconciling battery characteristics and safety.

Consequently, an object of invention 5 is to reconcile an improvement in charge/discharge efficiency and the maintenance of high safety in the case of using nonaqueous electrolyte 5, which contains an ambient-temperature-molten salt.

Means for Solving the Problems

<Nonaqueous Electrolytes 1 and 1-1, and Nonaqueous-Electrolyte Secondary Batteries 1 and 1-1>:

The present inventors diligently made investigations in view of the problem described above. As a result, the inventors have found that by incorporating a fluorophosphoric acid salt into a nonaqueous electrolyte and further incorporating an iron-group element in a specific concentration, cycle performances especially under high-voltage conditions are greatly improved while maintaining high capacity.

Inventions 1 and 1-1 have been thus completed.

Namely, invention 1 resides in nonaqueous electrolyte 1 which is a nonaqueous electrolyte comprising a nonaqueous solvent and an electrolyte dissolved therein, and is characterized by containing a monofluorophosphate and/or a difluorophosphate and further containing an iron-group element in an amount of 1-2,000 ppm of the whole nonaqueous electrolyte.

Invention 1-1 resides in nonaqueous electrolyte 1-1 which is a nonaqueous electrolyte comprising a nonaqueous solvent and an electrolyte dissolved therein, the nonaqueous electrolyte comprising: a monofluorophosphate and/or a difluorophosphate; and further an iron-group element in an amount of 0.001 ppm or more and less than 1 ppm of the whole nonaqueous electrolyte.

Invention 1-1 further resides in nonaqueous-electrolyte secondary battery 1-1 which employs the nonaqueous electrolyte 1-1 described above.

Invention 1 further resides in nonaqueous-electrolyte secondary battery 1 which is characterized by employing the nonaqueous electrolyte 1 described above.

<Nonaqueous Electrolyte 2 and Nonaqueous-Electrolyte Secondary Battery 2>:

The present inventors diligently made investigations in view of the problem described above. As a result, the inventors have found that a nonaqueous electrolyte into which a certain kind of organic compound and a specific inorganic compound have been incorporated has excellent output characteristics and can retain satisfactory high-temperature storability and satisfactory cycle performances. Invention 2 has been thus completed.

Namely, invention 2 resides in nonaqueous electrolyte 2 which is a nonaqueous electrolyte mainly comprising a nonaqueous solvent and an electrolyte dissolved therein, and is characterized by containing at least one compound selected from the group consisting of saturated chain hydrocarbons, saturated cyclic hydrocarbons, aromatic compounds having a halogen atom, and ethers having a fluorine atom, and by further containing a monofluorophosphate and/or a difluorophosphate.

Invention 2 further resides in nonaqueous-electrolyte secondary battery 2 which is a nonaqueous-electrolyte secondary battery comprising a negative electrode and a positive electrode which are capable of occluding/releasing lithium ions and a nonaqueous electrolyte, and is characterized in that the nonaqueous electrolyte is the nonaqueous electrolyte described above.

<Nonaqueous Electrolyte 3 and Nonaqueous-Electrolyte Secondary Battery 3>:

The present inventors diligently made investigations in view of the problem described above. As a result, the inventors have found that a nonaqueous electrolyte to which a specific compound and a "monofluorophosphate and/or difluorophosphate" have been added can retain satisfactory cycle performances. Invention 3 has been thus achieved.

Namely, an essential point of invention 3 resides in nonaqueous electrolyte 3 for secondary battery which is a nonaqueous electrolyte for use in a nonaqueous-electrolyte secondary battery comprising a negative electrode and a positive electrode which are capable of occluding and releasing ions and a nonaqueous electrolyte, and is characterized by comprising an electrolyte and a nonaqueous solvent and by further containing a monofluorophosphate and/or a difluorophosphate and containing a compound represented by the following general formula (1) and/or the following general formula (2) in a proportion of from 0.001% by mass to 10% by mass based on the whole nonaqueous electrolyte:

[Chemical Formula-1]

(1)

[wherein $R^1$, $R^2$, $R^3$, and $R^4$ each independently are an organic group or a halogen atom, provided that at least one of the $R^1$, $R^2$, $R^3$, and $R^4$ is a group in which the atom directly bonded to the X is a heteroatom and that two or more of the $R^1$, $R^2$, $R^3$, and $R^4$ may be the same; and X is an atom other than a carbon atom]

[Chemical Formula-2]

(2)

[wherein $R^5$, $R^6$, and $R^7$ each independently are an organic group or a halogen atom, provided that at least one of $R^5$, $R^6$, and $R^7$ is a group in which the atom directly bonded to the Y is a heteroatom and that two or more of the $R^5$, $R^6$, and $R^7$ may be the same; and Y is an atom other than a carbon atom].

Another essential point of invention 3 resides in nonaqueous electrolyte 3 for secondary battery which is a nonaqueous electrolyte for use in a nonaqueous-electrolyte secondary battery comprising a negative electrode and a positive electrode which are capable of occluding and releasing ions and a nonaqueous electrolyte, and is characterized in that the nonaqueous electrolyte contains a monofluorophosphate and/or a difluorophosphate and is for use in the nonaqueous-electrolyte secondary battery in which the positive electrode or negative electrode has been treated with at least one compound represented by the following general formula (1) and/or the following general formula (2):

[Chemical Formula-3]

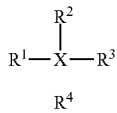

(1)

[wherein $R^1$, $R^2$, $R^3$, and $R^4$ each independently are an organic group or a halogen atom, provided that at least one of the $R^1$, $R^2$, $R^3$, and $R^4$ is a group in which the atom directly bonded to the X is a heteroatom and that two or more of the $R^1$, $R^2$, $R^3$, and $R^4$ may be the same; and X is an atom other than a carbon atom]

[Chemical Formula-4]

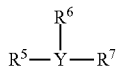

(2)

[wherein $R^5$, $R^6$, and $R^7$ each independently are an organic group or a halogen atom, provided that at least one of $R^5$, $R^6$, and $R^7$ is a group in which the atom directly bonded to the Y is a heteroatom and that two or more of the $R^5$, $R^6$, and $R^7$ may be the same; and Y is an atom other than a carbon atom].

Still another essential point of invention 3 resides in nonaqueous-electrolyte secondary battery 3 which is a nonaqueous-electrolyte secondary battery comprising a negative electrode and a positive electrode which are capable of occluding/releasing lithium ions and a nonaqueous electrolyte, and is characterized in that the nonaqueous electrolyte is the nonaqueous electrolyte 3 described above.

<Nonaqueous Electrolyte 4 and Nonaqueous-Electrolyte Secondary Battery 4>:

The present inventors diligently made investigations in view of the problems described above. As a result, the inventors have found that a battery which is excellent not only in low-temperature discharge characteristics and heavy-current discharge characteristics but also in high-temperature storability and cycle performances can be produced when specific compounds are added to a nonaqueous electrolyte. Invention 4 has been thus completed.

Namely, invention 4 resides in nonaqueous electrolyte 4 which is a nonaqueous electrolyte comprising a nonaqueous solvent and a lithium salt dissolved therein, and is characterized by containing a compound represented by the following general formula (3) and further containing a monofluorophosphate and/or a difluorophosphate. Hereinafter, this invention is referred to as "embodiment 4-1".

[Chemical Formula-5]

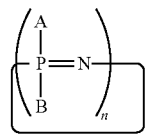

(3)

[In general formula (3), A and B each represent any of various substituents, provided that at least one of the substituents represented by A and B is fluorine; and n is a natural number of 3 or larger.]

Invention 4 further resides in nonaqueous electrolyte 4 which is a nonaqueous electrolyte comprising a nonaqueous solvent and a lithium salt dissolved therein, and is characterized by containing a compound represented by the general formula (3) given above in an amount of from 0.001% by mass to 5% by mass based on the whole nonaqueous electrolyte and further containing a carbonic acid ester having at least one of an unsaturated bond and a halogen atom in an amount of from 0.001% by mass to 5% by mass based on the whole nonaqueous electrolyte. Hereinafter, this invention is referred to as "embodiment 4-2".

Furthermore, invention 4 resides in nonaqueous-electrolyte secondary battery 4 which is a nonaqueous-electrolyte secondary battery comprising a negative electrode and a positive electrode which are capable of occluding/releasing lithium ions and a nonaqueous electrolyte, and is characterized in that the nonaqueous electrolyte is the nonaqueous electrolyte described above.

<Nonaqueous Electrolyte 5 and Nonaqueous-Electrolyte Secondary Battery 5>:

The present inventors repeatedly made various investigations in order to accomplish the object. As a result, the inventors have found that the problems described above can be overcome by incorporating a compound having a specific structure into a nonaqueous electrolyte including an ambient-temperature molten salt. Invention 5 has been thus completed.

Namely, an essential point of invention 5 resides in nonaqueous electrolyte 5 which is a nonaqueous electrolyte comprising a lithium salt and an ambient-temperature-molten salt, and is characterized by containing a monofluorophosphate and/or a difluorophosphate.

Another essential point of invention 5 resides in nonaqueous-electrolyte battery 5 which is a nonaqueous-electrolyte battery comprising a negative electrode and a positive electrode which are capable of occluding and releasing lithium ions and a nonaqueous electrolyte, and is characterized in that the nonaqueous electrolyte is the nonaqueous electrolyte 5 described above.

Advantages of the Invention

<Nonaqueous Electrolytes 1 and 1-1, and Nonaqueous-Electrolyte Secondary Batteries 1 and 1-1>

According to invention 1 and invention 1-1, it is possible to provide nonaqueous electrolytes 1 and 1-1 and nonaqueous-electrolyte secondary batteries 1 and 1-1, which attain high capacity and excellent cycle performances.

<Nonaqueous Electrolyte 2 and Nonaqueous-Electrolyte Secondary Battery 2>

According to invention 2, nonaqueous electrolyte 2 can be provided, which is for use in secondary batteries excellent not only in output characteristics but in high-temperature storability and cycle performances. Nonaqueous-electrolyte secondary battery 2 can also be provided.

<Nonaqueous Electrolyte 3 and Nonaqueous-Electrolyte Secondary Battery 3>

According to invention 3, nonaqueous electrolyte 3 can be provided, which is for use in secondary batteries having excellent cycle performances. Nonaqueous-electrolyte secondary battery 3 can also be provided.

<Nonaqueous Electrolyte 4 and Nonaqueous-Electrolyte Secondary Battery 4>

According to the nonaqueous electrolyte of invention 4, nonaqueous-electrolyte secondary battery 4 can be provided, which is excellent not only in low-temperature discharge characteristics and heavy-current discharge characteristics but in high-temperature storability and cycle performances. The nonaqueous electrolyte 4 can also be provided.

<Nonaqueous Electrolyte 5 and Nonaqueous-Electrolyte Secondary Battery 5>

According to invention 5, high charge/discharge capacity and charge/discharge efficiency which compare with those of nonaqueous electrolytes containing ordinary nonaqueous organic solvents are made possible while maintaining high safety, which is the most significant merit of nonaqueous electrolytes containing an ambient-temperature-molten salt. A size increase and performance enhancement in nonaqueous-electrolyte batteries can hence be attained.

BEST MODE FOR CARRYING OUT THE INVENTION

Embodiments of invention 1 to invention 5 (these are often referred to as "the invention") will be explained below in detail. The following explanations on constituent elements are for embodiments (typical embodiments) of the invention, and the invention should not be construed as being to the contents thereof. Various modifications of the invention can be made within the spirit of the invention.

<Nonaqueous Electrolyte 1 and Nonaqueous-Electrolyte Secondary Battery 1>

[1. Nonaqueous Electrolyte 1]

The nonaqueous electrolyte to be used in the nonaqueous-electrolyte secondary battery of invention 1 (hereinafter, this electrolyte is suitably referred to as "nonaqueous electrolyte in invention 1") is a nonaqueous electrolyte comprising a nonaqueous solvent and an electrolyte dissolved therein, and is characterized by containing a monofluorophosphate and/or a difluorophosphate and further containing at least one iron-group element in an amount of 1-2,000 ppm of the whole nonaqueous electrolyte.

<1-1. Electrolyte>

The electrolyte to be used in the nonaqueous electrolyte of invention 1 is not limited, and known ones for use as electrolytes in a target nonaqueous-electrolyte secondary battery can be employed and incorporated at will. In the case where the nonaqueous electrolyte of invention 1 is to be used in nonaqueous-electrolyte secondary batteries, the electrolyte preferably is one or more lithium salts.

Examples of the electrolyte include inorganic lithium salts such as $LiClO_4$, $LiAsF_6$, $LiPF_6$, $Li_2CO_3$, and $LiBF_4$;

fluorine-containing organic lithium salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_3(CF_3)$, $LiBF_3(C_2F_5)$, $LiBF_2(CF_3)_2$, $LiBF_2(C_2F_5)_2$, $LiBF_2(CF_3SO_2)_2$, and $LiBF_2(C_2F_5SO_2)_2$;

dicarboxylic acid complex lithium salts such as lithium bis(oxalato)borate, lithium tris(oxalato)phosphate, and lithium difluorooxalatoborate; and sodium salts or potassium salts such as $KPF_6$, $NaPF_6$, $NaBF_4$, and $CF_3SO_3Na$.

Preferred of these are $LiPF_6$, $LiBF_4$, $LiCF_3SO_3$, $LiN(CF_3SO_2)_2$, $LiN(C_2F_5SO_2)_2$, and lithium bis(oxalato)borate. Especially preferred is $LiPF_6$ or $LiBF_4$.

One lithium salt may be used alone, or any desired combination of two or more lithium salts may be used in any desired proportion. In particular, a combination of two specific inorganic lithium salts or a combination of an inorganic lithium salt and a fluorine-containing organic lithium salt is preferred because use of this combination is effective in inhibiting gas evolution during continuous charge or inhibiting deterioration through high-temperature storage.

It is especially preferred to use a combination of $LiPF_6$ and $LiBF_4$ or a combination of an inorganic lithium salt, e.g., $LiPF_6$ or $LiBF_4$, and a fluorine-containing organic lithium salt, e.g., $LiCF_3SO_3$, $LiN(CF_3SO_2)_2$, or $LiN(C_2F_5SO_2)_2$.

In the case where $LiPF_6$ and $LiBF_4$ are used in combination, it is preferred that the proportion of the $LiBF_4$ contained should be generally 0.01% by mass or higher and generally 20% by mass or lower based on all electrolytes. $LiBF_4$ has a low degree of dissociation, and too high proportions thereof may result in cases where the nonaqueous electrolyte has increased resistance.

On the other hand, in the case where an inorganic lithium salt, e.g., $LiPF_6$ or $LiBF_4$, and a fluorine-containing organic lithium salt, e.g., $LiCF_3SO_3$, $LiN(CF_3SO_2)_2$, or $LiN(C_2F_5SO_2)_2$, are used in combination, it is desirable that the proportion of the inorganic lithium salt in all lithium salts should be in the range of from generally 70% by mass to generally 99% by mass. Since fluorine-containing organic lithium salts generally have a higher molecular weight than inorganic lithium salts, too high proportions of the organic lithium salt in that combination results in a reduced proportion of the nonaqueous solvent in the whole nonaqueous electrolyte. There are hence cases where this nonaqueous electrolyte has increased resistance.

The lithium salt concentration in the final composition of the nonaqueous electrolyte of invention 1 may be any desired value unless this concentration value considerably lessens the effect of invention 1. However, the lithium salt concentration therein is generally 0.5 mol/L or higher, preferably 0.6 mol/L or higher, more preferably 0.8 mol/L or higher, and is generally 3 mol/L or lower, preferably 2 mol/L or lower, more preferably 1.5 mol/L or lower. When the concentration thereof is too low, there are cases where this nonaqueous electrolyte has insufficient electrical conductivity. When the concentration thereof is too high, a viscosity increase occurs and this reduces electrical conductivity. There are hence cases where the nonaqueous-electrolyte secondary battery employing this nonaqueous electrolyte of invention 1 has reduced performance.

Especially in the case where the nonaqueous solvent of the nonaqueous electrolyte consists mainly of one or more carbonate compounds such as alkylene carbonates or dialkyl carbonates, use of $LiPF_6$ in combination with $LiBF_4$ is preferred although $LiPF_6$ may be used alone. This is because use of that combination inhibits capacity from deteriorating with continuous charge. When these two salts are used in combination, the molar ratio of $LiBF_4$ to $LiPF_6$ is generally 0.005 or higher, preferably 0.01 or higher, especially preferably 0.05 or higher, and is generally 0.4 or lower, preferably 0.2 or lower. Incase where the molar ratio thereof is too high, battery characteristics tend to decrease through high-temperature storage. Conversely, too low molar ratios thereof result in difficulties in obtaining the effect of inhibiting gas evolution during continuous charge or inhibiting capacity deterioration.

In the case where the nonaqueous solvent of the nonaqueous electrolyte includes at least 50% by volume cyclic carboxylic ester compound such as, e.g., γ-butyrolactone or γ-valerolactone, it is preferred that $LiBF_4$ should account for 50 mol % or more of the whole first lithium salt (the lithium salt used in a highest proportion).

<1-2. Nonaqueous Solvent>

The nonaqueous solvent to be contained in the nonaqueous electrolyte of invention 1 is not particularly limited so long as it is a solvent which, after used to fabricate a battery, exerts no adverse influence on the battery characteristics. However, the nonaqueous solvent preferably is one or more of the following solvents for use in nonaqueous electrolytes.

Examples of nonaqueous solvents for ordinary use include chain and cyclic carbonates, chain and cyclic carboxylic acid esters, chain and cyclic ethers, phosphorus-containing organic solvents, and sulfur-containing organic solvents.

The chain carbonates are not limited in the kind thereof. Preferred examples of chain carbonates for ordinary use include dialkyl carbonates, and the number of carbon atoms of each constituent alkyl group is preferably 1-5, especially preferably 1-4. Examples thereof include dimethyl carbonate, ethyl methyl carbonate, diethyl carbonate, methyl-n-propyl carbonate, ethyl-n-propyl carbonate, and di-n-propyl carbonate.

Of these, dimethyl carbonate, ethyl methyl carbonate, and diethyl carbonate are preferred from the standpoint of industrial availability and because these compounds are satisfactory in various properties in a nonaqueous-electrolyte secondary battery.

The cyclic carbonates are not limited in the kind thereof. Examples of cyclic carbonates for ordinary use include ones in which the number of carbon atoms of the alkylene group constituting the cyclic carbonate is preferably 2-6, especially preferably 2-4. Specific examples thereof include ethylene carbonate, propylene carbonate, and butylene carbonate (2-ethylethylene carbonate or cis and trans 2,3-dimethylethylene carbonates).

Of these, ethylene carbonate or propylene carbonate is preferred because these compounds are satisfactory in various properties in a nonaqueous-electrolyte secondary battery.

The chain carboxylic acid esters also are not limited in the kind thereof. Examples of chain carboxylic acid esters for ordinary use include methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, and t-butyl propionate.

Of these, ethyl acetate, methyl propionate, and ethyl propionate are preferred from the standpoint of industrial availability and because these compounds are satisfactory in various properties in a nonaqueous-electrolyte secondary battery.

The cyclic carboxylic acid esters also are not limited in the kind thereof. Examples of cyclic carboxylic acid esters for ordinary use include γ-butyrolactone, γ-valerolactone, and δ-valerolactone.

Of these, γ-butyrolactone is preferred from the standpoint of industrial availability and because this compound is satisfactory in various properties in a nonaqueous-electrolyte secondary battery.

The chain ethers also are not limited in the kind thereof. Examples of chain esters for ordinary use include dimethoxymethane, dimethoxyethane, diethoxymethane, diethoxyethane, ethoxymethoxymethane, and ethoxymethoxyethane.

Of these, dimethoxyethane and diethoxyethane are preferred from the standpoint of industrial availability and because these compounds are satisfactory in various properties in a nonaqueous-electrolyte secondary battery.

The cyclic ethers also are not limited in the kind thereof. Examples of cyclic ethers for ordinary use include tetrahydrofuran, 2-methyltetrahydrofuran, and tetrahydropyran.

The phosphorus-containing organic solvents also are not particularly limited in the kind thereof. Examples of phosphorus-containing organic solvents for ordinary use include phosphoric acid esters such as trimethyl phosphate, triethyl phosphate, and triphenyl phosphate;
phosphorous acid esters such as trimethyl phosphite, triethyl phosphite, and triphenyl phosphite; and
phosphine oxides such as trimethylphosphine oxide, triethylphosphine oxide, and triphenylphosphine oxide.

Furthermore, the sulfur-containing organic solvents also are not particularly limited in the kind thereof. Examples of sulfur-containing organic solvents for ordinary use include ethylene sulfite, 1,3-propanesultone, 1,4-butanesultone, methyl methanesulfonate, busulfan, sulfolane, sulfolene, dimethyl sulfone, diphenyl sulfone, methyl phenyl sulfone, dibutyl disulfide, dicyclohexyl disulfide, tetramethylthiuram monosulfide, N,N-dimethylmethanesulfonamide, and N,N-diethylmethanesulfonamide.

Of those compounds, the chain and cyclic carbonates or the chain and cyclic carboxylic acid esters are preferred because these compounds are satisfactory in various properties in a nonaqueous-electrolyte secondary battery. More preferred of these are ethylene carbonate, propylene carbonate, dimethyl carbonate, ethyl methyl carbonate, diethyl carbonate, ethyl acetate, methyl propionate, ethyl propionate, and γ-butyrolactone. Even more preferred are ethylene carbonate, propylene carbonate, dimethyl carbonate, ethyl methyl carbonate, diethyl carbonate, ethyl acetate, methyl propionate, and γ-butyrolactone.

Those compounds may be used alone or in combination of two or more thereof. It is, however, preferred to use two or more compounds in combination. For example, it is preferred to use a high-permittivity solvent, such as a cyclic carbonate, in combination with a low-viscosity solvent, such as a chain carbonate or a chain ester.

A preferred combination of nonaqueous solvents is a combination consisting mainly of at least one cyclic carbonate and at least one chain carbonate. Especially preferred is such a combination in which the total proportion of the cyclic carbonate and the chain carbonate to the whole nonaqueous solvent is 80% by volume or higher, preferably 85% by volume or higher, more preferably 90% by volume or higher, and the proportion by volume of the cyclic carbonate to the sum of the cyclic carbonate and the chain carbonate is 5% by volume or higher, preferably 10% by volume or higher, more preferably 15% by volume or higher, and is generally 50% by volume or lower, preferably 35% by volume or lower, more preferably 30% by volume or lower. Use of such combination of nonaqueous solvents is preferred because the battery fabricated with this combination has an improved balance between cycle performances and high-temperature storability (in particular, residual capacity and high-load discharge capacity after high-temperature storage).

Examples of the preferred combination including at least one cyclic carbonate and at least one chain carbonate include: ethylene carbonate and dimethyl carbonate; ethylene carbonate and diethyl carbonate; ethylene carbonate and ethyl methyl carbonate; ethylene carbonate, dimethyl carbonate, and diethyl carbonate; ethylene carbonate, dimethyl carbonate, and ethyl methyl carbonate; ethylene carbonate, diethyl carbonate, and ethyl methyl carbonate; and ethylene carbonate, dimethyl carbonate, diethyl carbonate, and ethyl methyl carbonate.

Combinations obtained by further adding propylene carbonate to those combinations including ethylene carbonate and one or more chain carbonates are also included in preferred combinations. In the case where propylene carbonate is contained, the volume ratio of the ethylene carbonate to the propylene carbonate is preferably from 99:1 to 40:60, especially preferably from 95:5 to 50:50. It is also preferred to regulate the proportion of the propylene carbonate to the whole nonaqueous solvent to a value which is 0.1% by volume or higher, preferably 1% by volume or higher, more preferably 2% by volume or higher, and is generally 10% by volume or lower, preferably 8% by volume or lower, more preferably 5% by volume or lower. This is because this regulation brings about excellent discharge load characteristics while maintaining the properties of the combination of ethylene carbonate and one or more chain carbonates.

More preferred of these are combinations including an asymmetric chain carbonate. In particular, combinations including ethylene carbonate, asymmetric chain carbonate, and an asymmetric chain carbonate, such as a combination of ethylene carbonate, dimethyl carbonate, and ethyl methyl carbonate, a combination of ethylene carbonate, diethyl carbonate, and ethyl methyl carbonate, and a combination of ethylene carbonate, dimethyl carbonate, diethyl carbonate, and ethyl methyl carbonate, or such combinations which further contain propylene carbonate are preferred because these combinations have a satisfactory balance between cycle performances and discharge load characteristics. Preferred of such combinations are ones in which the asymmetric chain carbonate is ethyl methyl carbonate. Furthermore, the number of carbon atoms of each of the alkyl groups constituting each dialkyl carbonate is preferably 1-2.

Other examples of preferred mixed solvents are ones containing a chain ester. In particular, the cyclic carbonate/chain carbonate mixed solvents which contain a chain ester are preferred from the standpoint of improving the discharge load characteristics of a battery. The chain ester especially preferably is ethyl acetate or methyl propionate. The proportion by volume of the chain ester to the nonaqueous solvent is generally 5% or higher, preferably 8% or higher, more preferably 15% or higher, and is generally 50% or lower, preferably 35% or lower, more preferably 30% or lower, even more preferably 25% or lower.

Other preferred examples of the nonaqueous solvent are ones in which one organic solvent selected from the group consisting of ethylene carbonate, propylene carbonate, butylene carbonate, γ-butyrolactone, and γ-valerolactone or a mixed solvent composed of two or more organic solvents selected from the group accounts for at least 60% by volume of the whole. Such mixed solvents have a flash point of preferably 50° C. or higher, especially preferably 70° C. or higher. The nonaqueous electrolyte employing this solvent is reduced in solvent vaporization and liquid leakage even when used at high temperatures. In particular, when such a nonaqueous solvent which includes ethylene carbonate and γ-butyrolactone in a total amount of 80% by volume or larger, preferably 90% by volume or larger, based on the nonaqueous solvent and in which the volume ratio of the ethylene carbonate to the γ-butyrolactone is from 5:95 to 45:55 or such a nonaqueous solvent which includes ethylene carbonate and propylene carbonate in a total amount of 80% by volume or larger, preferably 90% by volume or larger, based on the nonaqueous solvent and in which the volume ratio of the ethylene carbonate to the propylene carbonate is from 30:70 to 80:20 is used, then an improved balance between cycle performances and discharge load characteristics, etc. is generally obtained.

<1-3. Monofluorophosphate and Difluorophosphate>

The nonaqueous electrolyte of invention 1 contains a monofluorophosphate and/or a difluorophosphate as an essential component. The "monofluorophosphate and/or difluorophosphate" to be used in invention 1 is not particularly limited in the kind thereof so long as this ingredient is constituted of one or more monofluorophosphate ions and/or difluorophosphate ions and one or more cations. However, this ingredient must be selected in view of the necessity of finally producing a nonaqueous electrolyte usable as the electrolyte of a nonaqueous-electrolyte secondary battery to be used.

It is therefore preferred that the monofluorophosphate and/or difluorophosphate in invention 1 should be a salt of one or more monofluorophosphate ions and/or difluorophosphate ions with one or more ions of at least one metal selected from Group 1, Group 2, and Group 13 of the periodic table (hereinafter these metal ions are suitably referred to as "specific metal ions") or with a quaternary onium. The monofluorophosphate and/or difluorophosphate may be one salt or may be any desired combination of two or more salts.

<1-3-1. Monofluorophosphoric Acid Metal Salt and Difluorophosphoric Acid Metal Salt>

First, an explanation is given on the case where the monofluorophosphate and difluorophosphate in invention 1 are a salt of one or more monofluorophosphate ions or one or more difluorophosphate ions with one or more specific metal ions (hereinafter sometimes referred to as "monofluorophosphoric acid metal salt" and "difluorophosphoric acid metal salt", respectively).

Examples of the metals in Group 1 of the periodic table among the specific metals usable in the monofluorophosphoric acid metal salt and difluorophosphoric acid metal salt in invention 1 include lithium, sodium, potassium, and cesium. Preferred of these is lithium or sodium. Lithium is especially preferred.

Examples of the metals in Group 2 of the periodic table include magnesium, calcium, strontium, and barium. Preferred of these is magnesium or calcium. Magnesium is especially preferred.

Examples of the metals in Group 13 of the periodic table include aluminum, gallium, indium, and thallium. Preferred of these is aluminum or gallium. Aluminum is especially preferred.

The number of the atoms of such a specific metal possessed by one molecule of the monofluorophosphoric acid metal salt or difluorophosphoric acid metal salt in invention 1 is not limited. The salt may have only one atom of the specific metal or two or more atoms thereof.

In the case where the monofluorophosphoric acid metal salt or the difluorophosphoric acid metal salt in invention 1 has two or more atoms of a specific metal per molecule, these specific-metal atoms may be of the same kind or may be of different kinds. Besides the specific metal(s), one or more atoms of a metal other than the specific metals may be possessed.

Examples of the monofluorophosphoric acid metal salt and difluorophosphoric acid metal salt include $Li_2PO_3F$, $Na_2PO_3F$, $MgPO_3F$, $CaPO_3F$, $Ale (PO_3F)_3$, $Ga_2 (PO_3F)_3$, $LiPO_2F_2$, $NaPO_2F_2$, $Mg(PO_2F_2)_2$, $Ca(PO_2F_2)_2$, $Al(PO_2F_2)_3$, and $Ga(PO_2F_2)_3$. Preferred of these are $Li_2PO_3F$, $LiPO_2F_2$, $NaPO_2F_2$, and $Mg(PO_2F_2)_2$.

<1-3-2. Monofluorophosphoric Acid Quaternary Onium Salt and Difluorophosphoric Acid Quaternary Onium Salt>

An explanation is then given on the case where the monofluorophosphate and difluorophosphate in invention 1 are a salt of a monofluorophosphate ion or difluorophosphate ion with a quaternary onium (hereinafter sometimes referred to as "monofluorophosphoric acid quaternary onium salt" and "difluorophosphoric acid quaternary onium salt", respectively).

The quaternary onium used in the monofluorophosphoric acid quaternary onium salt and difluorophosphoric acid quaternary onium salt in invention 1 usually is a cation. Examples thereof include cations represented by the following general formula (4).

[Chemical Formula-6]

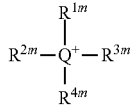

(4)

In general formula (4), $R^{1m}$ to $R^{4m}$ each independently represent a hydrocarbon group. The kind of this hydrocarbon group is not limited. Namely, the hydrocarbon group may be an aliphatic hydrocarbon group or an aromatic hydrocarbon group, or may be a hydrocarbon group including these two kinds of groups bonded to each other. In the case of an aliphatic hydrocarbon group, this group may be a chain or cyclic group or may be a structure including a chain moiety and a cyclic moiety bonded thereto. In the case of a chain hydrocarbon group, this group may be linear or branched. The hydrocarbon group may be a saturated hydrocarbon group or may have one or more unsaturated bonds.

Examples of the hydrocarbon groups represented by $R^{1m}$ to $R^{4m}$ include alkyl groups, cycloalkyl groups, aryl groups, and aralkyl groups.

Examples of the alkyl groups include methyl, ethyl, 1-propyl, 1-methylethyl, 1-butyl, 1-methylpropyl, 2-methylpropyl, and 1,1-dimethylethyl.

Preferred of these are methyl, ethyl, 1-propyl, 1-butyl, and the like.

Examples of the cycloalkyl groups include cyclopentyl, 2-methylcyclopentyl, 3-methylcyclopentyl, 2,2-dimethylcyclopentyl, 2,3-dimethylcyclopentyl, 2,4-dimethylcyclopentyl, 2,5-dimethylcyclopentyl, 3,3-dimethylcyclopentyl, 3,4-dimethylcyclopentyl, 2-ethylcyclopentyl, 3-ethylcyclopentyl, cyclohexyl, 2-methylcyclohexyl, 3-methylcyclohexyl, 4-methylcyclohexyl, 2,2-dimethylcyclohexyl, 2,3-dimethylcyclohexyl, 2,4-dimethylcyclohexyl, 2,5-dimethylcyclohexyl, 2,6-dimethylcyclohexyl, 3,4-dimethylcyclohexyl, 3,5-dimethylcyclohexyl, 2-ethylcyclohexyl, 3-ethylcyclohexyl, 4-ethylcyclohexyl, bicyclo[3.2.1]oct-1-yl, and bicyclo[3.2.1]oct-2-yl.

Preferred of these are cyclopentyl, 2-methylcyclopentyl, 3-methylcyclopentyl, cyclohexyl, 2-methylcyclohexyl, 3-methylcyclohexyl, 4-methylcyclohexyl, and the like.

Examples of the aryl groups include phenyl, 2-methylphenyl, 3-methylphenyl, 4-methylphenyl, and 2,3-dimethylphenyl.

Preferred of these is phenyl.

Examples of the aralkyl groups include phenylmethyl, 1-phenylethyl, 2-phenylethyl, diphenylmethyl, and triphenylmethyl.

Preferred of these are phenylmethyl and 2-phenylethyl.

The hydrocarbon groups represented by $R^{1m}$ to $R^{4m}$ each may have been substituted with one or more substituents. The kinds of the substituents are not limited unless the substituents considerably lessen the effects of invention 1. Examples of the substituents include halogen atoms, hydroxyl, amino, nitro, cyano, carboxyl, ether groups, and aldehyde groups. In the case where the hydrocarbon group represented by each of $R^{1m}$ to $R^{4m}$ has two or more substituents, these substituents may be the same or different.

When any two or more of the hydrocarbon groups represented by $R^{1m}$ to $R^{4m}$ are compared, the hydrocarbon groups may be the same or different. When the hydrocarbon groups represented by $R^{1m}$ to $R^{4m}$ have a substituent, these substituted hydrocarbon groups including the substituents may be the same or different. Furthermore, any desired two or more of the hydrocarbon groups represented by $R^{1m}$ to $R^{4m}$ may have been bonded to each other to form a cyclic structure.

The number of carbon atoms of each of the hydrocarbon groups represented by $R^{1m}$ to $R^{4m}$ is generally 1 or larger, and the upper limit thereof is generally 20 or smaller, preferably 10 or smaller, more preferably 5 or smaller. When the number of carbon atoms thereof is too large, the number of moles per unit mass is too small and various effects tend to be reduced. In the case where the hydrocarbon group represented by each of $R^{1m}$ to $R^{4m}$ has substituents, the number of carbon atoms of the substituted hydrocarbon group including these substituents is generally within that range.

In general formula (4), Q represents an atom belonging to Group 15 of the periodic table. Preferred of such atoms is a nitrogen atom or phosphorus atom.

In view of the above explanation, preferred examples of the quaternary onium represented by general formula (4) include aliphatic chain quaternary salts, alicyclic ammoniums, alicyclic phosphoniums, and nitrogen-containing heterocyclic aromatic cations.

Especially preferred of the aliphatic chain quaternary salts are tetraalkylammoniums, tetraalkylphosphoniums, and the like.

Examples of the tetraalkylammoniums include tetramethylammonium, ethyltrimethylammonium, diethyldimethylammonium, triethylmethylammonium, tetraethylammonium, and tetra-n-butylammonium.

Examples of the tetraalkylphosphoniums include tetramethylphosphonium, ethyltrimethylphosphonium, diethyldimethylphosphonium, triethylmethylphosphonium, tetraethylphosphonium, and tetra-n-butylphosphonium.

Especially preferred of the alicyclic ammoniums are pyrrolidiniums, morpholiniums, imidazoliniums, tetrahydropyrimidiniums, piperaziniums, piperidiniums, and the like.

Examples of the pyrrolidiniums include N,N-dimethylpyrrolidium, N-ethyl-N-methylpyrrolidium, and N,N-diethylpyrrolidium.

Examples of the morpholiniums include N,N-dimethylmorpholinium, N-ethyl-N-methylmorpholinium, and N,N-diethylmorpholinium.

Examples of the imidazoliniums include N,N'-dimethylimidazolinium, N-ethyl-N'-methylimidazolinium, N,N'-diethylimidazolinium, and 1,2,3-trimethylimidazolinium.

Examples of the tetrahydropyrimidiniums include N,N'-dimethyltetrahydropyrimidinium, N-ethyl-N'-methyltetrahydropyrimidinium, N,N'-diethyltetrahydropyrimidinium, and 1,2,3-trimethyltetrahydropyrimidinium.

Examples of the piperaziniums include N,N,N',N'-tetramethylpiperazinium, N-ethyl-N,N',N'-trimethylpiperazinium, N,N-diethyl-N',N'-dimethylpiperazinium, N,N,N'-triethyl-N'-methylpiperazinium, and N,N,N',N'-tetraethylpiperazinium.

Examples of the piperidiniums include N,N-dimethylpiperidinium, N-ethyl-N-methylpiperidinium, and N,N-diethylpiperidinium.

Especially preferred of the nitrogen-containing heterocyclic aromatic cations are pyridiniums, imidazoliums, and the like.

Examples of the pyridiniums include N-methylpyridinium, N-ethylpyridinium, 1,2-dimethylpyrimidinium, 1,3-dimethylpyrimidinium, 1,4-dimethylpyrimidinium, and 1-ethyl-2-methylpyrimidinium.

Examples of the imidazoliums include N,N'-dimethylimidazolium, N-ethyl-N'-methylimidazolium, N,N'-diethylimidazolium, and 1,2,3-trimethylimidazolium.

Namely, the salts of the quaternary oniums enumerated above with the monofluorophosphate ions and/or difluorophosphate ions enumerated above are preferred examples of the monofluorophosphoric acid quaternary onium salt and difluorophosphoric acid quaternary onium salt in invention 1.

<1-3-3. Content, Detection (Derivation of Containment), Technical Range, Etc.>

In the nonaqueous electrolyte of invention 1, one monofluorophosphate or difluorophosphate only may be used or any desired combination of two or more monofluorophosphates and/or difluorophosphates may be used in any desired proportion. However, from the standpoint of efficiently operating the nonaqueous-electrolyte secondary battery, it is preferred to use one monofluorophosphate or difluorophosphate.

The molecular weight of the monofluorophosphate or difluorophosphate is not limited, and may be any desired value unless this considerably lessens the effects of invention 1. However, the molecular weight thereof is generally 100 or higher. There is no particular upper limit on the molecular weight thereof. However, it is preferred that the molecular weight thereof should be generally 1,000 or lower, preferably 500 or lower, because such a value is practicable in view of the reactivity of this reaction.

Processes for producing the monofluorophosphate and the difluorophosphate also are not particularly limited, and known processes selected at will can be used to produce the salts.

The proportion of the monofluorophosphate and difluorophosphate in the nonaqueous electrolyte is preferably 10 ppm or higher (0.001% by mass or higher), more preferably 0.01% by mass or higher, especially preferably 0.05% by mass or higher, even more preferably 0.1% by mass or higher, in terms of the total content of the salts based on the whole nonaqueous electrolyte. The upper limit of the proportion of the sum of the salts is preferably 5% by mass or lower, more preferably 4% by mass or lower, even more preferably 3% by mass or lower. When the concentration of the monofluorophosphate and the difluorophosphate is too low, there are cases where the effect of improving discharge load characteristics is difficult to obtain. On the other hand, too high concentrations thereof may lead to a decrease in charge/discharge efficiency.

When a nonaqueous electrolyte containing a monofluorophosphate and a difluorophosphate is subjected to the actual fabrication of a nonaqueous-electrolyte secondary battery and the battery is disassembled to discharge the nonaqueous electrolyte again, then there are often cases where the content of the salts in this nonaqueous electrolyte has decreased considerably. Consequently, the nonaqueous electrolyte discharged from a battery can be regarded as included in invention 1 when at least one monofluorophosphate and/or difluorophosphate can be detected in the electrolyte even in a slight amount. Furthermore, even when a nonaqueous electrolyte containing a monofluorophosphate and a difluorophosphate is subjected to the actual fabrication of a nonaqueous-electrolyte secondary battery and the nonaqueous electrolyte recovered by disassembling this battery and discharging the nonaqueous electrolyte therefrom does not contain the monofluorophosphate and/or difluorophosphate, then there are often cases where the phosphoric acid salt is detected on the positive electrode, negative electrode, or separator as another constituent member of the nonaqueous-electrolyte secondary battery. Consequently, when at least one monofluorophosphate and/or difluorophosphate has been detected in at least one constituent member selected from the positive electrode, negative electrode, and separator, this case also is regarded as included in invention 1.

Moreover, when a monofluorophosphate and/or a difluorophosphate has been incorporated into a nonaqueous electrolyte and has further been incorporated into at least one constituent member selected from the positive electrode, negative electrode, and separator, this case also is regarded as included in invention 1.

On the other hand, a monofluorophosphate and/or a difluorophosphate may be incorporated beforehand into an inner part or the surface of the positive electrode of a nonaqueous-electrolyte secondary battery to be fabricated. In this case, part or the whole of the monofluorophosphate and/or difluorophosphate which has been incorporated beforehand is expected to dissolve in the nonaqueous electrolyte to perform the function thereof. This case also is regarded as included in invention 1.

Techniques for incorporating the salt beforehand into an inner part of a positive electrode or into the surface of a positive electrode are not particularly limited. Examples thereof include: a method in which a monofluorophosphate and/or a difluorophosphate is dissolved beforehand in a slurry to be prepared in the production of a positive electrode which will be described later; and a method in which a solution prepared by dissolving a monofluorophosphate and/or a difluorophosphate in any desired nonaqueous solvent beforehand is applied to or infiltrated into a positive electrode which has been produced, and this electrode is dried to remove the solvent used and thereby incorporate the salt.

Furthermore, use may be made of a method in which a nonaqueous-electrolyte secondary battery is actually fabricated using a nonaqueous electrolyte containing at least one monofluorophosphate and/or difluorophosphate so that the salt is incorporated into an inner part of the positive electrode or the surface of the positive electrode from the nonaqueous electrolyte. Since the nonaqueous electrolyte is infiltrated into the positive electrode in fabricating a nonaqueous-electrolyte secondary battery, there are often cases where the monofluorophosphate and difluorophosphate are contained in an inner part of the positive electrode or in the surface of the positive electrode. Because of this, when at least a monofluorophosphate and/or a difluorophosphate can be detected in the positive electrode recovered from a disassembled battery, this case is regarded as included in invention 1.

A monofluorophosphate and a difluorophosphate may be incorporated beforehand into an inner part or the surface of the negative electrode of a nonaqueous-electrolyte secondary battery to be fabricated. In this case, part or the whole of the monofluorophosphate and/or difluorophosphate which has been incorporated beforehand is expected to dissolve in the nonaqueous electrolyte to perform the function thereof. This case is regarded as included in invention 1. Techniques for incorporating the salt beforehand into an inner part of a negative electrode or into the surface of a negative electrode are not particularly limited. Examples thereof include: a method in which a monofluorophosphate and a difluorophosphate are dissolved beforehand in a slurry to be prepared in the production of a negative electrode which will be described later; and a method in which a solution prepared by dissolving a monofluorophosphate and a difluorophosphate in any desired nonaqueous solvent beforehand is applied to or infiltrated into a negative electrode which has been produced, and this electrode is dried to remove the solvent used and thereby incorporate the salt.

Furthermore, use may be made of a method in which a nonaqueous-electrolyte secondary battery is actually fabricated using a nonaqueous electrolyte containing at least one monofluorophosphate and difluorophosphate so that the salt is incorporated into an inner part of the negative electrode or the surface of the negative electrode from the nonaqueous electrolyte. Since the nonaqueous electrolyte is infiltrated into the negative electrode in fabricating a nonaqueous-electrolyte secondary battery, there are often cases where the monofluorophosphate and difluorophosphate are contained in an inner part of the negative electrode or in the surface of the negative electrode. Because of this, when at least a monofluorophosphate and a difluorophosphate can be detected in the negative electrode recovered from a disassembled battery, this case is regarded as included in invention 1.

A monofluorophosphate and/or a difluorophosphate may also be incorporated beforehand into an inner part or the surface of the separator of a nonaqueous-electrolyte secondary battery to be fabricated. In this case, part or the whole of the monofluorophosphate and difluorophosphate which have been incorporated beforehand is expected to dissolve in the nonaqueous electrolyte to perform the function thereof. This case is regarded as included in invention 1. Techniques for incorporating the salts beforehand into an inner part of a separator or into the surface of a separator are not particularly limited. Examples thereof include: a method in which a monofluorophosphate and a difluorophosphate are mixed beforehand during separator production; and a method in which a solution prepared by dissolving a monofluorophosphate and a difluorophosphate in any desired nonaqueous solvent beforehand is applied to or infiltrated into a separator to be subjected to the fabrication of a nonaqueous-electrolyte secondary battery, and this separator is dried to remove the solvent used and thereby incorporate the salt.

Furthermore, use may be made of a method in which a nonaqueous-electrolyte secondary battery is actually fabricated using a nonaqueous electrolyte containing a monofluorophosphate and/or a difluorophosphate so that the salt is incorporated into an inner part of the separator or the surface of the separator from the nonaqueous electrolyte. Since the nonaqueous electrolyte is infiltrated into the separator in fabricating a nonaqueous-electrolyte secondary battery, there are often cases where the monofluorophosphate and difluorophosphate are contained in an inner part of the separator or in the surface of the separator. Because of this, when at least a monofluorophosphate and a difluorophosphate can be detected in the separator recovered from a disassembled battery, this case is regarded as included in invention 1.

<1-4. Iron-Group Element>

The nonaqueous electrolyte of invention 1 further contains at least one iron-group element in a specific concentration besides the monofluorophosphate and/or difluorophosphate described above. The coexistence of the monofluorophosphate and/or difluorophosphate of invention 1 with an iron-group element contained in a specific concentration produces a synergistic effect, whereby cycle performances especially under the conditions of a high voltage exceeding 4.2 V, which is the upper-limit use voltage of ordinary nonaqueous-electrolyte secondary batteries, can be greatly improved.

Factors in the production of such synergistic effect have not been elucidated in detail. Although the scope of invention 1 is not construed as being limited by the factors, the following is thought. Cations of the iron-group element are incorporated into a product of the reduction reaction of the "monofluorophosphate and/or difluorophosphate", which is an essential component of the nonaqueous electrolyte of invention 1, to form an ionomer such as, e.g., one having P—O—M—O—P bonds (wherein M represents the iron-group element). A stabler protective coating film is presumed to be thus formed. It is thought that to cause the nonaqueous electrolyte to contain an iron-group element in the stage of initial charge, in which a coating film is formed, is effective in forming such a protective coating film.

<1-4-1. Kind of Iron-Group Element>

The "iron-group element" to be contained in the nonaqueous electrolyte in invention 1 specifically means any of iron element, cobalt element, and nickel element. Of these, cobalt element and nickel element are preferred from the standpoint of forming a stabler coating film.

With respect to techniques for incorporating an iron-group element into a nonaqueous electrolyte in invention 1, it is preferred to dissolve an iron-group element compound in the nonaqueous electrolyte. As the "iron-group element compound" in invention 1, it is generally preferred to use an ionic compound in which the iron-group element has an oxidation number of +2 or +3.

Examples of the "iron-group element compound" include hexafluorophosphoric acid salts such as iron(II) hexafluorophosphate, iron(III) hexafluorophosphate, cobalt(II) hexafluorophosphate, and nickel(II) hexafluorophosphate;
tetrafluoroboric acid salts such as iron (II) tetrafluoroborate, iron(III) tetrafluoroborate, cobalt(II) tetrafluoroborate, and nickel(II) tetrafluoroborate;
perchloric acid salts such as iron(II) perchlorate, iron(III) perchlorate, cobalt(II) perchlorate, and nickel(II) perchlorate;
sulfuric acid salts such as iron (II) sulfate, iron (III) sulfate, cobalt(II) sulfate, and nickel(II) sulfate;
nitric acid salts such as iron(II) nitrate, iron(III) nitrate, cobalt(II) nitrate, and nickel(II) nitrate;
acetic acid salts such as iron(II) acetate, iron(III) acetate, cobalt(II) acetate, and nickel(II) acetate;
carbonic acid salts such as iron(II) carbonate, iron(III) carbonate, cobalt(II) carbonate, and nickel(II) carbonate;

oxalic acid salts such as iron(II) oxalate, iron(III) oxalate, cobalt(II) oxalate, and nickel(II) oxalate;
citric acid salts such as iron(II) citrate, iron (III) citrate, cobalt(II) citrate, and nickel(II) citrate;
benzoic acid salts such as iron(II) benzoate, iron(III) benzoate, cobalt(II) benzoate, and nickel(II) benzoate;
phosphoric acid salts such as iron(II) phosphate, iron(III) phosphate, cobalt(II) phosphate, and nickel(II) phosphate;
fluorides such as iron(II) fluoride, iron(III) fluoride, cobalt (II) fluoride, and nickel(II) fluoride; and
iron-group element acetylacetonates such as iron(II) acetylacetonate, iron(III) acetylacetonate, cobalt(II) acetylacetonate, cobalt(III) acetylacetonate, and nickel(II) acetylacetonate.

Preferred of these are the following salts constituted of one or more anions less apt to react in batteries and of cobalt or nickel: hexafluorophosphoric acid salts such as cobalt(II) hexafluorophosphate and nickel(II) hexafluorophosphate; tetrafluoroboric acid salts such as cobalt(II) tetrafluoroborate and nickel(II) tetrafluoroborate; perchloric acid salts such as cobalt(II) perchlorate and nickel(II) perchlorate; phosphoric acid salts such as cobalt(II) phosphate and nickel(II) phosphate; and fluorides such as cobalt(II) fluoride and nickel(II) fluoride.

Of these, hexafluorophosphoric acid salts such as cobalt (II) hexafluorophosphate and nickel(II) hexafluorophosphate and fluorides such as cobalt(II) fluoride and nickel(II) fluoride are more preferred because these compounds are stable in batteries. These iron-group element compounds may be used alone or in any desired combination of two or more thereof. It is preferred that those iron-group element compounds should be anhydrides. However, even when the compounds are hydrates, they can be used so long as the dehydration which will be described later is conducted.

<1-4-2. Content and Method of Determining the Same>

The content of the iron-group element in invention 1 is generally 1 ppm or higher, preferably 2 ppm or higher, more preferably 3 ppm or higher, especially preferably 5 ppm or higher, most preferably 8 ppm or higher, and is generally 2,000 ppm or lower, preferably 600 ppm or lower, more preferably 100 ppm or lower, especially preferably 50 ppm or lower, most preferably 30 ppm or lower, based on the whole nonaqueous electrolyte. When the content thereof is lower than the lower limit of that range, there are cases where the effect of invention 1 described above is hardly produced. When the content thereof exceeds the upper limit, there are cases where the iron-group element is apt to be reduced at the negative electrode to deposit as the metal on the negative electrode. Furthermore, there are cases where the iron-group element present in too large an amount induces the decomposition of the electrolyte, resulting in reduced cycle performances. Incidentally, in the case where two or more iron-group elements of invention 1 are used in combination, these iron-group elements are used so that the total concentration thereof is within that range.

Although an iron-group element may be added in invention 1, an iron-group element may have been generated in the electrolyte. In the case where an iron-group element has been generated in the electrolyte, the content of the iron-group element in the nonaqueous electrolyte can be determined by an ordinary method of metallic-element analysis, such as, e.g., atomic absorption spectrometry (AAS), inductively coupled plasma spectroscopy (ICP), or X-ray fluorescence analysis (XRF). In particular, ICP spectroscopy is suitable because a pretreatment therefor is easy and the analysis has high accuracy and is less apt to be influenced by other elements.

<1-5. Additives>

The nonaqueous electrolyte of invention 1 may contain various additives so long as these additives do not considerably lessen the effects of invention 1. In the case where additives are additionally incorporated to prepare the nonaqueous electrolyte, conventionally known additives can be used at will. One additive may be used alone, or any desired combination of two or more additives in any desired proportion may be used.

Examples of the additives include overcharge inhibitors and aids for improving capacity retention after high-temperature storage and cycle performances. It is preferred to add a carbonate having at least one of an unsaturated bond and a halogen atom (hereinafter sometimes referred to as "specific carbonate") as an aid for improving capacity retention after high-temperature storage and cycle performances, among those additives. The specific carbonate and other additives are separately explained below.

<1-5-1. Specific Carbonate>

The specific carbonate is a carbonate having at least one of an unsaturated bond and a halogen atom. The specific carbonate may have one or more unsaturated bonds only or have one or more halogen atoms only, or may have both one or more unsaturated bonds and one or more halogen atoms.

The molecular weight of the specific carbonate is not particularly limited, and may be any desired value unless this considerably lessens the effects of invention 1. However, the molecular weight thereof is generally 50 or higher, preferably 80 or higher, and is generally 250 or lower, preferably 150 or lower. When the molecular weight thereof is too high, this specific carbonate has reduced solubility in the nonaqueous electrolyte and there are cases where the effect of the carbonate is difficult to produce sufficiently.

Processes for producing the specific carbonate also are not particularly limited, and a known process selected at will can be used to produce the carbonate.

Any one specific carbonate may be incorporated alone into the nonaqueous electrolyte of invention 1, or any desired combination of two or more specific carbonates may be incorporated thereinto in any desired proportion.

The amount of the specific carbonate to be incorporated into the nonaqueous electrolyte of invention 1 is not limited, and may be any desired value unless this considerably lessens the effects of invention 1. It is, however, desirable that the specific carbonate should be incorporated in a concentration which is generally 0.01% by mass or higher, preferably 0.1% by mass or higher, more preferably 0.3% by mass or higher, and is generally 70% by mass or lower, preferably 50% by mass or lower, more preferably 40% by mass or lower, based on the nonaqueous electrolyte of invention 1.

When the amount of the specific carbonate is below the lower limit of that range, there are cases where use of this nonaqueous electrolyte of invention 1 in a nonaqueous-electrolyte secondary battery results in difficulties in producing the effect of sufficiently improving the cycle performances of the nonaqueous-electrolyte secondary battery. On the other hand, when the proportion of the specific carbonate is too high, there is a tendency that use of this nonaqueous electrolyte of invention 1 in a nonaqueous-electrolyte secondary battery results in decreases in the high-temperature storability and continuous-charge characteristics of the nonaqueous-electrolyte secondary battery. In particular, there are cases where gas evolution is enhanced and capacity retention decreases.

(1-5-1-1. Unsaturated Carbonate)

The carbonate having one or more unsaturated bonds (hereinafter often referred to as "unsaturated carbonate") as one form of the specific carbonate according to invention 1 is not limited so long as it is a carbonate having one or more carbon-carbon unsaturated bonds, such as carbon-carbon double bonds or carbon-carbon triple bonds, and any desired unsaturated carbonate can be used. Incidentally, carbonates having one or more aromatic rings are also included in the carbonate having one or more unsaturated bonds.

Examples of the unsaturated carbonate include vinylene carbonate and derivatives thereof, ethylene carbonate derivatives substituted with one or more aromatic rings or with one or more substituents having a carbon-carbon unsaturated bond, phenyl carbonates, vinyl carbonates, and allyl carbonates.

Examples of the vinylene carbonate and derivatives thereof include vinylene carbonate, methylvinylene carbonate, 4,5-dimethylvinylene carbonate, phenylvinylene carbonate, 4,5-diphenylvinylene carbonate, and catechol carbonate.

Examples of the ethylene carbonate derivatives substituted with one or more aromatic rings or with one or more substituents having a carbon-carbon unsaturated bond include vinylethylene carbonate, 4,5-divinylethylene carbonate, phenylethylene carbonate, and 4,5-diphenylethylene carbonate.

Examples of the phenyl carbonates include diphenyl carbonate, ethyl phenyl carbonate, methyl phenyl carbonate, and t-butyl phenyl carbonate.

Examples of the vinyl carbonates include divinyl carbonate and methyl vinyl carbonate.

Examples of the allyl carbonates include diallyl carbonate and allyl methyl carbonate.

Preferred of these unsaturated carbonates as examples of the specific carbonate are the vinylene carbonate and derivatives thereof and the ethylene carbonate derivatives substituted with one or more aromatic rings or with one or more substituents having a carbon-carbon unsaturated bond. In particular, vinylene carbonate, 4,5-diphenylvinylene carbonate, 4,5-dimethylvinylene carbonate, and vinylethylene carbonate are more preferred because these carbonates form a stable interface-protective coating film.

(1-5-1-2. Halogenated Carbonate)

On the other hand, the carbonate having one or more halogen atoms (hereinafter often referred to as "halogenated carbonate") as one form of the specific carbonate according to invention 1 is not particularly limited so long as it is a carbonate having one or more halogen atoms, and any desired halogenated carbonate can be used.

Examples of the halogen atoms include fluorine, chlorine, bromine, and iodine atoms. Preferred of these are fluorine atoms or chlorine atoms. Especially preferred are fluorine atoms. The number of halogen atoms possessed by the halogenated carbonate also is not particularly limited so long as the number thereof is 1 or larger. However, the number thereof is generally 6 or smaller, preferably 4 or smaller. In the case where the halogenated carbonate has two or more halogen atoms, these atoms may be the same or different.

Examples of the halogenated carbonate include ethylene carbonate derivatives, dimethyl carbonate derivatives, ethyl methyl carbonate derivatives, and diethyl carbonate derivatives.

Examples of the ethylene carbonate derivatives include fluoroethylene carbonate, chloroethylene carbonate, 4,4-difluoroethylene carbonate, 4,5-difluoroethylene carbonate, 4,4-dichloroethylene carbonate, 4,5-dichloroethylene carbonate, 4-fluoro-4-methylethylene carbonate, 4-chloro-4-methylethylene carbonate, 4,5-difluoro-4-methylethylene carbonate, 4,5-dichloro-4-methylethylene carbonate, 4-fluoro-5-methylethylene carbonate, 4-chloro-5-methylethylene carbonate, 4,4-difluoro-5-methylethylene carbonate, 4,4-dichloro-5-methylethylene carbonate, 4-(fluoromethyl)-ethylene carbonate, 4-(chloromethyl)-ethylene carbonate, 4-(difluoromethyl)-ethylene carbonate, 4-(dichloromethyl)-ethylene carbonate, 4-(trifluoromethyl)-ethylene carbonate, 4-(trichloromethyl)-ethylene carbonate, 4-(fluoromethyl)-4-fluoroethylene carbonate, 4-(chloromethyl)-4-chloroethylene carbonate, 4-(fluoromethyl)-5-fluoroethylene carbonate, 4-(chloromethyl)-5-chloroethylene carbonate, 4-fluoro-4,5-dimethylethylene carbonate, 4-chloro-4,5-dimethylethylene carbonate, 4,5-difluoro-4,5-dimethylethylene carbonate, 4,5-dichloro-4,5-dimethylethylene carbonate, 4,4-difluoro-5,5-dimethylethylene carbonate, and 4,4-dichloro-5,5-dimethylethylene carbonate.

Examples of the dimethyl carbonate derivatives include fluoromethyl methyl carbonate, difluoromethyl methyl carbonate, trifluoromethyl methyl carbonate, bis(fluoromethyl) carbonate, bis(difluoromethyl) carbonate, bis(trifluoromethyl) carbonate, chloromethyl methyl carbonate, dichloromethyl methyl carbonate, trichloromethyl methyl carbonate, bis(chloromethyl) carbonate, bis(dichloro)methyl carbonate, and bis(trichloro)methyl carbonate.

Examples of the ethyl methyl carbonate derivatives include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, ethyl trifluoromethyl carbonate, 2-chloroethyl methyl carbonate, ethyl chloromethyl carbonate, 2,2-dichloroethyl methyl carbonate, 2-chloroethyl chloromethyl carbonate, ethyl dichloromethyl carbonate, 2,2,2-trichloroethyl methyl carbonate, 2,2-dichloroethyl chloromethyl carbonate, 2-chloroethyl dichloromethyl carbonate, and ethyl trichloromethyl carbonate.

Examples of the diethyl carbonate derivatives include ethyl-(2-fluoroethyl) carbonate, ethyl-(2,2-difluoroethyl) carbonate, bis(2-fluoroethyl) carbonate, ethyl-(2,2,2-trifluoroethyl) carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, bis(2,2,2-trifluoroethyl) carbonate, ethyl-(2-chloroethyl) carbonate, ethyl-(2,2-dichloroethyl) carbonate, bis(2-chloroethyl) carbonate, ethyl-(2,2,2-trichloroethyl) carbonate, 2,2-dichloroethyl-2'-chloroethyl carbonate, bis(2,2-dichloroethyl) carbonate, 2,2,2-trichloroethyl-2'-chloroethyl carbonate, 2,2,2-trichloroethyl-2',2'-dichloroethyl carbonate, and bis(2,2,2-trichloroethyl) carbonate.

Preferred of these halogenated carbonates are the carbonates having one or more fluorine atoms. More preferred are the ethylene carbonate derivatives having one or more fluorine atoms. In particular, fluoroethylene carbonate, 4-(fluoromethyl)-ethylene carbonate, 4,4-difluoroethylene carbonate, and 4,5-difluoroethylene carbonate are more suitable because these carbonates form an interface-protective coating film.

(1-5-1-3. Halogenated Unsaturated Carbonate)

Furthermore usable as the specific carbonate is a carbonate having both one or more unsaturated bonds and one or more halogen atoms (this carbonate is suitably referred to as "halogenated unsaturated carbonate"). This halogenated unsaturated carbonate is not particularly limited, and any desired halogenated unsaturated carbonate can be used unless the effects of invention 1 are considerably lessened thereby.

Examples of the halogenated unsaturated carbonate include vinylene carbonate derivatives, ethylene carbonate derivatives substituted with one or more aromatic rings or with one or more substituents having a carbon-carbon unsaturated bond, and allyl carbonates.

Examples of the vinylene carbonate derivatives include fluorovinylene, 4-fluoro-5-methylvinylene carbonate, 4-fluoro-5-phenylvinylene carbonate, 4-(trifluoromethyl)vinylene carbonate, chlorovinylene carbonate, 4-chloro-5-methylvinylene carbonate, 4-chloro-5-phenylvinylene carbonate, and 4-(trichloromethyl)vinylene carbonate.

Examples of the ethylene carbonate derivatives substituted with one or more aromatic rings or with one or more substituents having a carbon-carbon unsaturated bond include 4-fluoro-4-vinylethylene carbonate, 4-fluoro-5-vinylethylene carbonate, 4,4-difluoro-5-vinylethylene carbonate, 4,5-difluoro-4-vinylethylene carbonate, 4-chloro-5-vinylethylene carbonate, 4,4-dichloro-5-vinylethylene carbonate, 4,5-dichloro-4-vinylethylene carbonate, 4-fluoro-4,5-divinylethylene carbonate, 4,5-difluoro-4,5-divinylethylene carbonate, 4-chloro-4,5-divinylethylene carbonate, 4,5-dichloro-4,5-divinylethylene carbonate, 4-fluoro-4-phenylethylene carbonate, 4-fluoro-5-phenylethylene carbonate, 4,4-difluoro-5-phenylethylene carbonate, 4,5-difluoro-4-phenylethylene carbonate, 4-chloro-4-phenylethylene carbonate, 4-chloro-5-phenylethylene carbonate, 4,4-dichloro-5-phenylethylene carbonate, 4,5-dichloro-4-phenylethylene carbonate, 4,5-difluoro-4,5-diphenylethylene carbonate, and 4,5-dichloro-4,5-diphenylethylene carbonate.

Examples of phenyl carbonates include fluoromethyl phenyl carbonate, 2-fluoroethyl phenyl carbonate, 2,2-difluoroethyl phenyl carbonate, 2,2,2-trifluoroethyl phenyl carbonate, chloromethyl phenyl carbonate, 2-chloroethyl phenyl carbonate, 2,2-dichloroethyl phenyl carbonate, and 2,2,2-trichloroethyl phenyl carbonate.

Examples of vinyl carbonates include fluoromethyl vinyl carbonate, 2-fluoroethyl vinyl carbonate, 2,2-difluoroethyl vinyl carbonate, 2,2,2-trifluoroethyl vinyl carbonate, chloromethyl vinyl carbonate, 2-chloroethyl vinyl carbonate, 2,2-dichloroethyl vinyl carbonate, and 2,2,2-trichloroethyl vinyl carbonate.

Examples of the allyl carbonates include fluoromethyl allyl carbonate, 2-fluoroethyl allyl carbonate, 2,2-difluoroethyl allyl carbonate, 2,2,2-trifluoroethyl allyl carbonate, chloromethyl allyl carbonate, 2-chloroethyl allyl carbonate, 2,2-dichloroethyl allyl carbonate, and 2,2,2-trichloroethyl allyl carbonate.

It is especially preferred to use, as the specific carbonate, one or more members selected from the group consisting of vinylene carbonate, vinylethylene carbonate, fluoroethylene carbonate, 4,5-difluoroethylene carbonate, and derivatives of these, among the examples of the halogenated unsaturated carbonate enumerated above. These preferred carbonates are highly effective when used alone.

<1-5-2. Other Additives>

Additives other than the specific carbonate are explained below. Examples of the additives other than the specific carbonate include overcharge inhibitors and aids for improving capacity retention after high-temperature storage and cycle performances.

<1-5-2-1. Overcharge Inhibitors>

Examples of the overcharge inhibitors include aromatic compounds including:

toluene and derivatives thereof, such as toluene and xylene; unsubstituted biphenyl or alkyl-substituted biphenyl derivatives, such as biphenyl, 2-methylbiphenyl, 3-methylbiphenyl, and 4-methylbiphenyl; unsubstituted terphenyls or alkyl-substituted terphenyl derivatives, such as o-terphenyl, m-terphenyl, and p-terphenyl;

partly hydrogenated unsubstituted terphenyls or partly hydrogenated alkyl-substituted terphenyl derivatives;

cycloalkylbenzenes and derivatives thereof, such as cyclopentylbenzene and cyclohexylbenzene;

alkylbenzene derivatives having one or more tertiary carbon atoms directly bonded to the benzene ring, such as cumene, 1,3-diisopropylbenzene, and 1,4-diisopropylbenzene;

alkylbenzene derivatives having a quaternary carbon atom directly bonded to the benzene ring, such as t-butylbenzene, t-amylbenzene, and t-hexylbenzene; and aromatic compounds having an oxygen atom, such as diphenyl ether and dibenzofuran.

Other examples of the overcharge inhibitors include products of the partial fluorination of aromatic compounds shown above, such as fluorobenzene, fluorotoluene, benzotrifluoride, 2-fluorobiphenyl, o-cyclohexylfluorobenzene, and p-cyclohexylfluorobenzene; and fluorine-containing anisole compounds such as 2,4-difluoroanisole, 2,5-difluoroanisole, and 1,6-difluoroanisole.

One of those overcharge inhibitors may be used alone, or any desired combination of two or more thereof may be used in any desired proportion. In the case of employing any desired combination, compounds in the same class among those enumerated above may be used in combination or compounds in different classes may be used in combination.

Examples of the case where compounds in different classes are used in combination include:

a toluene derivative and a biphenyl derivative;
a toluene derivative and a terphenyl derivative;
a toluene derivative and a partly hydrogenated terphenyl derivative;
a toluene derivative and a cycloalkylbenzene derivative;
a toluene derivative and an alkylbenzene derivative having one or more tertiary carbon atoms directly bonded to the benzene ring;
a toluene derivative and an alkylbenzene derivative having a quaternary carbon atom directly bonded to the benzene ring;
a toluene derivative and an aromatic compound having an oxygen atom;
a toluene derivative and a partly fluorinated aromatic compound;
a toluene derivative and a fluorine-containing anisole compound;
a biphenyl derivative and a terphenyl derivative;
a biphenyl derivative and a partly hydrogenated terphenyl derivative;
a biphenyl derivative and a cycloalkylbenzene derivative;
a biphenyl derivative and an alkylbenzene derivative having one or more tertiary carbon atoms directly bonded to the benzene ring;
a biphenyl derivative and an alkylbenzene derivative having a quaternary carbon atom directly bonded to the benzene ring;
a biphenyl derivative and an aromatic compound having an oxygen atom;
a biphenyl derivative and a partly fluorinated aromatic compound;

a biphenyl derivative and a fluorine-containing anisole compound;
a terphenyl derivative and a partly hydrogenated terphenyl derivative;
a terphenyl derivative and a cycloalkylbenzene derivative;
a terphenyl derivative and an alkylbenzene derivative having one or more tertiary carbon atoms directly bonded to the benzene ring;
a terphenyl derivative and an alkylbenzene derivative having a quaternary carbon atom directly bonded to the benzene ring;
a terphenyl derivative and an aromatic compound having an oxygen atom;
a terphenyl derivative and a partly fluorinated aromatic compound;
a terphenyl derivative and a fluorine-containing anisole compound;
a partly hydrogenated terphenyl derivative and a cycloalkylbenzene derivative;
a partly hydrogenated terphenyl derivative and an alkylbenzene derivative having one or more tertiary carbon atoms directly bonded to the benzene ring;
a partly hydrogenated terphenyl derivative and an alkylbenzene derivative having a quaternary carbon atom directly bonded to the benzene ring;
a partly hydrogenated terphenyl derivative and an aromatic compound having an oxygen atom;
a partly hydrogenated terphenyl derivative and a partly fluorinated aromatic compound;
a partly hydrogenated terphenyl derivative and a fluorine-containing anisole compound;
a cycloalkylbenzene derivative and an alkylbenzene derivative having one or more tertiary carbon atoms directly bonded to the benzene ring;
a cycloalkylbenzene derivative and an alkylbenzene derivative having a quaternary carbon atom directly bonded to the benzene ring;
a cycloalkylbenzene derivative and an aromatic compound having an oxygen atom;
a cycloalkylbenzene derivative and a partly fluorinated aromatic compound;
a cycloalkylbenzene derivative and a fluorine-containing anisole compound;
an alkylbenzene derivative having one or more tertiary carbon atoms directly bonded to the benzene ring and an alkylbenzene derivative having a quaternary carbon atom directly bonded to the benzene ring;
an alkylbenzene derivative having one or more tertiary carbon atoms directly bonded to the benzene ring and an aromatic compound having an oxygen atom;
an alkylbenzene derivative having one or more tertiary carbon atoms directly bonded to the benzene ring and a partly fluorinated aromatic compound;
an alkylbenzene derivative having one or more tertiary carbon atoms directly bonded to the benzene ring and a fluorine-containing anisole compound;
an alkylbenzene derivative having a quaternary carbon atom directly bonded to the benzene ring and an aromatic compound having an oxygen atom;
an alkylbenzene derivative having a quaternary carbon atom directly bonded to the benzene ring and a partly fluorinated aromatic compound;
an alkylbenzene derivative having a quaternary carbon atom directly bonded to the benzene ring and a fluorine-containing anisole compound;
an aromatic compound having an oxygen atom and a partly fluorinated aromatic compound;
an aromatic compound having an oxygen atom and a fluorine-containing anisole compound; and
a partly fluorinated aromatic compound and a fluorine-containing anisole compound.

Specific examples thereof include a combination of biphenyl and o-terphenyl, a combination of biphenyl and m-terphenyl, a combination of biphenyl and a partly hydrogenated terphenyl derivative, a combination of biphenyl and cumene, a combination of biphenyl and cyclopentylbenzene, a combination of biphenyl and cyclohexylbenzene, a combination of biphenyl and t-butylbenzene, a combination of biphenyl and t-amylbenzene, a combination of biphenyl and diphenyl ether, a combination of biphenyl and dibenzofuran, a combination of biphenyl and fluorobenzene, a combination of biphenyl and benzotrifluoride, a combination of biphenyl and 2-fluorobiphenyl, a combination of biphenyl and o-fluorocyclohexylbenzene, a combination of biphenyl and p-fluorocyclohexylbenzene, a combination of biphenyl and 2,4-difluoroanisole, a combination of o-terphenyl and a partly hydrogenated terphenyl derivative, a combination of o-terphenyl and cumene, a combination of o-terphenyl and cyclopentylbenzene, a combination of o-terphenyl and cyclohexylbenzene, a combination of o-terphenyl and t-butylbenzene, a combination of o-terphenyl and t-amylbenzene, a combination of o-terphenyl and diphenyl ether, a combination of o-terphenyl and dibenzofuran, a combination of o-terphenyl and fluorobenzene, a combination of o-terphenyl and benzotrifluoride, a combination of o-terphenyl and 2-fluorobiphenyl, a combination of o-terphenyl and o-fluorocyclohexylbenzene, a combination of o-terphenyl and p-fluorocyclohexylbenzene, a combination of o-terphenyl and 2,4-difluoroanisole, a combination of m-terphenyl and a partly hydrogenated terphenyl derivative, a combination of m-terphenyl and cumene, a combination of m-terphenyl and cyclopentylbenzene, a combination of m-terphenyl and cyclohexylbenzene, a combination of m-terphenyl and t-butylbenzene, a combination of m-terphenyl and t-amylbenzene, a combination of m-terphenyl and diphenyl ether, a combination of m-terphenyl and dibenzofuran, a combination of m-terphenyl and fluorobenzene, a combination of m-terphenyl and benzotrifluoride, a combination of m-terphenyl and 2-fluorobiphenyl, a combination of m-terphenyl and o-fluorocyclohexylbenzene, a combination of m-terphenyl and p-fluorocyclohexylbenzene, a combination of m-terphenyl and 2,4-difluoroanisole, a combination of a partly hydrogenated terphenyl derivative and cumene, a combination of a partly hydrogenated terphenyl derivative and cyclopentylbenzene, a combination of a partly hydrogenated terphenyl derivative and cyclohexylbenzene, a combination of a partly hydrogenated terphenyl derivative and t-butylbenzene, a combination of a partly hydrogenated terphenyl derivative and t-amylbenzene, a combination of a partly hydrogenated terphenyl derivative and diphenyl ether, a combination of a partly hydrogenated terphenyl derivative and dibenzofuran, a combination of a partly hydrogenated terphenyl derivative and fluorobenzene, a combination of a partly hydrogenated terphenyl derivative and benzotrifluoride, a combination of a partly hydrogenated terphenyl derivative and 2-fluorobiphenyl, a combination of a partly hydrogenated terphenyl derivative and o-fluorocyclohexylbenzene, a combination of a partly hydrogenated terphenyl derivative and p-fluorocyclohexylbenzene, a combination of a partly hydrogenated terphenyl derivative and 2,4-difluoroanisole, a combination of cumene and cyclopentylbenzene, a combination of cumene and cyclohexylbenzene, a combination of cumene and t-butylbenzene, a combination of cumene and t-amylbenzene, a combination of cumene and diphenyl ether, a combination of cumene and dibenzofuran, a combination of cumene and fluorobenzene, a combination of cumene and benzotrifluoride, a combination of cumene and 2-fluorobiphenyl, a combination of cumene and o-fluorocyclohexylbenzene, a combination of cumene and p-fluorocyclohexylbenzene, a combination of cumene and 2,4-difluoroanisole, a combination of cyclohexylbenzene and t-butylbenzene, a combination of cyclohexylbenzene and t-amylbenzene, a combination of cyclohexylbenzene and diphenyl ether, a combination of cyclohexylbenzene and dibenzofuran, a combination of cyclohexylbenzene and fluorobenzene, a combination of cyclohexylbenzene and benzotrifluoride, a combination of cyclohexylbenzene and 2-fluorobiphenyl, a combination of cyclohexylbenzene and o-fluorocyclohexylbenzene, a combination of cyclohexylbenzene and p-fluorocyclohexylbenzene, a combination of cyclohexylbenzene and 2,4-difluoroanisole, a combination of t-butylbenzene and t-amylbenzene, a combination of t-butylbenzene and diphenyl ether, a combination of t-butylbenzene and dibenzofuran, a combination of t-butylbenzene and fluorobenzene, a combination of t-butylbenzene and benzotrifluoride, a combination of t-butylbenzene and 2-fluorobiphenyl, a combination of t-butylbenzene and o-fluorocyclohexylbenzene, a combination of t-butylbenzene and p-fluorocyclohexylbenzene, a combination of t-butylbenzene and 2,4-difluoroanisole, a combination of t-amylbenzene and diphenyl ether, a combination of t-amylbenzene and dibenzofuran, a combination of t-amylbenzene and fluorobenzene, a combination of t-amylbenzene and benzotrifluoride, a combination of t-amylbenzene and 2-fluorobiphenyl, a combination of t-amylbenzene and o-fluorocyclohexylbenzene, a combination of t-amylbenzene and p-fluorocyclohexylbenzene, a combination of t-amylbenzene and 2,4-difluoroanisole, a combination of diphenyl ether and dibenzofuran, a combination of diphenyl ether and fluorobenzene, a combination of diphenyl ether and benzotrifluoride, a combination of diphenyl ether and 2-fluorobiphenyl, a combination of diphenyl ether and o-fluorocyclohexylbenzene, a combination of diphenyl ether and p-fluorocyclohexylbenzene, a combination of diphenyl ether and 2,4-difluoroanisole, a combination of dibenzofuran and fluorobenzene, a combination of dibenzofuran and benzotrifluoride, a combination of dibenzofuran and 2-fluorobiphenyl, a combination of dibenzofuran and o-fluorocyclohexylbenzene, a combination of dibenzofuran and p-fluorocyclohexylbenzene, a combination of dibenzofuran and 2,4-difluoroanisole, a combination of fluorobenzene and benzotrifluoride, a combination of fluorobenzene and 2-fluorobiphenyl, a combination of fluorobenzene and o-fluorocyclohexylbenzene, a combination of fluorobenzene and p-fluorocyclohexylbenzene, a combination of fluorobenzene and 2,4-difluoroanisole, a combination of benzotrifluoride and 2-fluorobiphenyl, a combination of benzotrifluoride and o-fluorocyclohexylbenzene, a combination of benzotrifluoride and p-fluorocyclohexylbenzene, a combination of benzotrifluoride and 2,4-difluoroanisole, a combination of 2-fluorobiphenyl and o-fluorocyclohexylbenzene, a combination of 2-fluorobiphenyl and p-fluorocyclohexylbenzene, a combination of 2-fluorobiphenyl and 2,4-difluoroanisole, a combination of o-fluorocyclohexylbenzene and p-fluorocyclohexylbenzene, a combination of o-fluorocyclohexylbenzene and 2,4-difluoroanisole, and a combination of p-fluorocyclohexylbenzene and 2,4-difluoroanisole.

In the case where the nonaqueous electrolyte of invention 1 contains an overcharge inhibitor, the concentration thereof may be any value unless this considerably lessens the effects of invention 1. It is, however, desirable that the concentration thereof should be regulated so as to be in the range of generally from 0.1% by mass to 5% by mass based on the whole nonaqueous electrolyte.

To incorporate an overcharge inhibitor into the nonaqueous electrolyte of invention 1 in such an amount as not to considerably lessen the effects of invention 1 is preferred because the nonaqueous-electrolyte secondary battery has improved safety even if overcharged due to an erroneous usage or under a situation in which an overcharge protection circuit does not work normally, such as, e.g., charger abnormality.

<1-5-2-2. Aids>

On the other hand, examples of the aids for improving capacity retention after high-temperature storage and cycle performances include the anhydrides of dicarboxylic acids such as succinic acid, maleic acid, and phthalic acid;

carbonate compounds other than the specific carbonates, such as erythritan carbonate and spiro-bis-dimethylene carbonate;

sulfur-containing compounds such as ethylene sulfite, 1,3-propanesultone, 1,4-butanesultone, methyl methanesulfonate, busulfan, sulfolane, sulfolene, dimethyl sulfone, diphenyl sulfone, methyl phenyl sulfone, dibutyl disulfide, dicyclohexyl disulfide, tetramethylthiuram monosulfide, N,N-dimethylmethanesulfonamide, and N,N-diethylmethanesulfonamide;

nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide; hydrocarbon compounds such as heptane, octane, and cycloheptane; and fluorine-containing aromatic compounds such as fluorobenzene, difluorobenzene, and benzotrifluoride.

<1-6. Process for Producing Nonaqueous Electrolyte>

The nonaqueous electrolyte in invention 1 can be prepared by dissolving an electrolyte and the "monofluorophosphate and/or difluorophosphate" and "iron-group element compound" according to invention 1 in a nonaqueous solvent optionally together with "other aids".

It is preferred that in preparing the nonaqueous electrolyte, each of the raw materials for the nonaqueous electrolyte, i.e., the lithium salt, monofluorophosphate and/or difluorophosphate and iron-group element compound according to invention 1, nonaqueous organic solvent, and other aids, should be dehydrated beforehand. With respect to the degree of dehydration, it is desirable to dehydrate each raw material to generally 50 ppm or lower, preferably 30 ppm or lower. In this description, ppm means proportion by mass.

When water is present in the nonaqueous electrolyte, there is a possibility that electrolysis of the water, reaction of the water with lithium metal, hydrolysis of the lithium salt, etc. might occur. The presence of water is hence undesirable. Techniques for the dehydration are not particularly limited. However, in the case where the material to be dehydrated is, for example, a liquid, e.g., a nonaqueous solvent, a molecular sieve or the like may be used. In the case where the material to be dehydrated is a solid, e.g., an electrolyte, this material may be dried at a temperature lower than decomposition temperatures. In the case where the iron-group element compound is a hydrate, use may be made of a method in which the iron-group element compound is dissolved in a nonaqueous solvent and the resultant solution is dehydrated with a molecular sieve or the like.

[2. Nonaqueous-Electrolyte Secondary Battery]

The nonaqueous-electrolyte secondary battery of invention 1 includes: a negative electrode and a positive electrode which are capable of occluding and releasing ions; and the nonaqueous electrolyte of invention 1 described above.

<2-1. Battery Constitution>

The constitution of the nonaqueous-electrolyte secondary battery of invention 1, excluding the negative electrode and the nonaqueous electrolyte, may be the same as that of conventionally known nonaqueous-electrolyte secondary batteries. Usually, the battery of invention 1 has a constitution including a positive electrode and a negative electrode which have been superposed through a porous film (separator) impregnated with the nonaqueous electrolyte of invention 1, the electrodes and the separator being held in a case. Consequently, the shape of the nonaqueous-electrolyte secondary battery of invention 1 is not particularly limited, and may be any of the cylindrical type, prismatic type, laminate type, coin type, large type, and the like.

<2-2. Nonaqueous Electrolyte>

As the nonaqueous electrolyte, the nonaqueous electrolyte of invention 1 described above is used. Incidentally, a mixture of the nonaqueous electrolyte of invention 1 and another nonaqueous electrolyte may be used so long as this is not counter to the spirit of invention 1.

<2-3. Negative Electrode>

Negative-electrode active materials usable in the negative electrode are described below. The negative-electrode active materials are not particularly limited so long as these are capable of electrochemically occluding/releasing lithium ions. Examples thereof include a carbonaceous material, an alloy material, and a lithium-containing metal composite oxide material.

<2-3-1. Carbonaceous Material>

The carbonaceous material to be used as a negative-electrode active material preferably is one which is selected from: (1) natural graphites; (2) artificial carbonaceous substances and carbonaceous materials obtained by subjecting artificial graphitic substances to a heat treatment at a temperature in the range of 400-3,200° C. one or more times; (3) carbonaceous materials giving a negative-electrode active-material layer which is composed of at least two carbonaceous substances differing in crystallinity and/or has an interface where at least two carbonaceous substances differing in crystallinity are in contact with each other; and (4) carbonaceous materials giving a negative-electrode active-material layer which is composed of at least two carbonaceous substances differing in orientation and/or has an interface where at least two carbonaceous substances differing in orientation are in contact with each other. This is because this carbonaceous material brings about a satisfactory balance between initial irreversible capacity and high-current-density charge/discharge characteristics. One of the carbonaceous materials (1) to (4) may be used alone, or any desired combination of two or more thereof in any desired proportion may be used.

Examples of the artificial carbonaceous substances and artificial graphitic substances in (2) above include natural graphites, coal coke, petroleum coke, coal pitch, petroleum pitch, carbonaceous substances obtained by oxidizing these pitches, needle coke, pitch coke, carbon materials obtained by partly graphitizing these cokes, products of the pyrolysis of organic substances, such as furnace black, acetylene black, and pitch-derived carbon fibers, organic substances capable of carbonization and products of the carbonization thereof, or solutions obtained by dissolving any of such organic substances capable of carbonization in a low-molecular organic solvent, e.g., benzene, toluene, xylene, quinoline, or n-hexane, and products of the carbonization of these solutions.

Examples of the organic substances capable of carbonization include coal tar pitches ranging from soft pitch to hard pitch, coal-derived heavy oil such as dry distillation/liquefaction oil, straight-run heavy oil such as topping residues and vacuum distillation residues, heavy oils resulting from petroleum cracking, such as ethylene tar as a by-product of the thermal cracking of crude oil, naphtha, etc., aromatic hydrocarbons such as acenaphthylene, decacyclene, anthracene, and phenanthrene, nitrogen-atom-containing heterocyclic compounds such as phenazine and acridine, sulfur-atom-containing heterocyclic compounds such as thiophene and bithiophene, polyphenylenes such as biphenyl and terphenyl, poly(vinyl chloride), poly(vinyl alcohol), poly(vinyl butyral), substances obtained by insolubilizing these compounds, nitrogen-containing organic polymers such as polyacrylonitrile and polypyrrole, sulfur-containing organic polymers such as polythiophene, organic polymers such as polystyrene, natural polymers such as polysaccharides represented by cellulose, lignin, mannan, poly(galacturonic acid), chitosan, and saccharose, thermoplastic resins such as poly(phenylene sulfide) and poly(phenylene oxide), and thermosetting resins such as furfuryl alcohol resins, phenol-formaldehyde resins, and imide resins.

<2-3-2. Constitution and Properties of Carbonaceous Negative Electrode and Method of Preparation Thereof>

With respect to the properties of the carbonaceous material, negative electrode containing the carbonaceous material, method of electrode formation, current collector, and nonaqueous-electrolyte secondary battery, it is desirable that any one of the following (1) to (18) should be satisfied or two or more thereof be simultaneously satisfied.

(1) X-Ray Parameter

The carbonaceous material preferably has a value of d (interplanar spacing) for the lattice planes (002), as determined by X-ray diffractometry in accordance with the method of the Japan Society for Promotion of Scientific Research, of generally 0.335-0.340 nm, especially 0.335-0.338 nm, in particular 0.335-0.337 nm. The crystallite size (Lc) thereof, as determined by X-ray diffractometry in accordance with the method of the Japan Society for Promotion of Scientific Research, is generally 1.0 nm or larger, preferably 1.5 nm or larger, especially preferably 2 nm or larger.

A preferred material obtained by coating the surface of a graphite with amorphous carbon is one which is constituted of a graphite having a value of d for the lattice planes (002) as determined by X-ray diffractometry of 0.335-0.338 nm as a core material and, adherent to the surface thereof, a carbonaceous material having a larger value of d for the lattice planes (002) as determined by X-ray diffractometry than the core material, and in which the proportion of the core material to the carbonaceous material having a larger value of d for the lattice planes (002) as determined by X-ray diffractometry than the core material is from 99/1 to 80/20 in terms of weight ratio. By using this material, a negative electrode which has a high capacity and is less apt to react with the electrolyte can be produced.

(2) Ash Content

The ash content of the carbonaceous material is preferably 1% by mass or lower, especially 0.5% by mass or lower, in particular 0.1% by mass or lower, based on the whole carbonaceous material. The lower limit of the ash content thereof is preferably at least 1 ppm by mass of the whole carbonaceous material. When the ash content by mass thereof exceeds the upper limit of that range, there are cases where battery performance deterioration caused by reaction with the nonaqueous electrolyte during charge/discharge becomes not negligible. When the ash content thereof is lower than the lower limit of that range, there are cases where the production of this carbonaceous material necessitates much time and energy and an apparatus for pollution prevention, resulting in an increase in cost.

(3) Volume-Average Particle Diameter

With respect to the volume-average particle diameter of the carbonaceous material, the volume-average particle diameter (median diameter) thereof as determined by the laser diffraction/scattering method is generally 1 µm or larger, preferably 3 µm or larger, more preferably 5 µm or larger, especially preferably 7 µm or larger, and is generally 100 µm or smaller, preferably 50 µm or smaller, more preferably 40 or smaller, even more preferably 30 µm or smaller, especially preferably 25 µm or smaller. When the volume-average particle diameter thereof is smaller than the lower limit of that range, there are cases where irreversible capacity increases, leading to a loss in initial battery capacity. When the volume-average particle diameter thereof exceeds the upper limit of that range, there are cases where such a carbonaceous material is undesirable from the standpoint of battery production because an uneven coating surface is apt to result when an electrode is produced through coating fluid application.

Volume-average particle diameter is determined by dispersing the carbon powder in a 0.2% by mass aqueous solution (about 10 mL) of poly(oxyethylene (20)) sorbitan monolaurate as a surfactant and examining the dispersion with a laser diffraction/scattering type particle size distribution analyzer (LA-700, manufactured by HORIBA, Ltd.). The median diameter determined through this measurement is defined as the volume-average particle diameter of the carbonaceous material in invention 1.

(4) Raman R Value, Raman Half-Value Width

The Raman R value of the carbonaceous material as determined by the argon ion laser Raman spectroscopy is generally 0.01 or higher, preferably 0.03 or higher, more preferably 0.1 or higher, and is generally 1.5 or lower, preferably 1.2 or lower, more preferably 1 or lower, especially preferably 0.5 or lower.

When the Raman R value thereof is lower than the lower limit of that range, the surface of such particles has too high crystallinity and there are cases where the number of intercalation sites into which lithium comes with charge/discharge decreases. Namely, there are cases where suitability for charge decreases. In addition, when a coating fluid containing such a carbonaceous material is applied to a current collector and the resultant coating is pressed to heighten the density of the negative electrode, then the crystals are apt to orient in directions parallel to the electrode plate and this may lead to a decrease in load characteristics. On the other hand, when the Raman R value thereof exceeds the upper limit of that range, the surface of such particles has reduced crystallinity and enhanced reactivity with the nonaqueous electrolyte and this may lead to a decrease in efficiency and enhanced gas evolution.

The Raman half-value width around 1,580 cm$^{-1}$ of the carbonaceous material is not particularly limited. However, the half-value width thereof is generally 10 cm$^{-1}$ or larger, preferably 15 cm$^{-1}$ or larger, and is generally 100 cm$^{-1}$ or smaller, preferably 80 cm$^{-1}$ or smaller, more preferably 60 cm$^{-1}$ or smaller, especially preferably 40 cm$^{-1}$ or smaller.

When the Raman half-value width thereof is smaller than the lower limit of that range, the surface of such particles has too high crystallinity and there are cases where the number of intercalation sites into which lithium comes with charge/discharge decreases. Namely, there are cases where suitability for charge decreases. In addition, when a coating fluid containing such a carbonaceous material is applied to a current collector and the resultant coating is pressed to heighten the density of the negative electrode, then the crystals are apt to orient in directions parallel to the electrode plate and this may lead to a decrease in load characteristics. On the other hand, when the Raman half-value width thereof exceeds the upper limit of that range, the surface of such particles has reduced crystallinity and enhanced reactivity with the nonaqueous electrolyte and this may lead to a decrease in efficiency and enhanced gas evolution.

The examination for a Raman spectrum is made with a Raman spectrometer (Raman spectrometer manufactured by Japan Spectroscopic Co., Ltd.). In the examination, a sample is charged into a measuring cell by causing the sample to fall naturally into the cell and the surface of the sample in the cell is irradiated with argon ion laser light while rotating the cell in a plane perpendicular to the laser light. The Raman spectrum obtained is examined for the intensity $I_A$ of a peak $P_A$ around 1,580 cm$^{-1}$ and the intensity $I_B$ of a peak PB around 1,360 cm$^{-1}$. The ratio between these intensities R ($R=I_B/I_A$) is calculated. The Raman R value calculated through this examination is defined as the Raman R value of the carbonaceous material in invention 1. Furthermore, the half-value width of the peak $P_A$ around 1,580 cm$^{-1}$ in the Raman spectrum obtained is measured, and this value is defined as the Raman half-value width of the carbonaceous material in invention 1.

Conditions for the Raman spectroscopy are as follows.
Wavelength of argon ion laser: 514.5 nm
Laser power on sample: 15-25 mW
Resolution: 10-20 cm$^{-1}$
Examination range: 1,100 cm$^{-1}$ to 1,730 cm$^{-1}$
Analysis for Raman R value and Raman half-value width: background processing
Smoothing: simple average; convolution, 5 points

(5) BET Specific Surface Area

The BET specific surface area of the carbonaceous material, in terms of the value of specific surface area as determined by the BET method, is generally 0.1 m$^2$·g$^{-1}$ or larger, preferably 0.7 m$^2$·g$^{-1}$ or larger, more preferably 1.0 m$^2$·g$^{-1}$ or larger, especially preferably 1.5 m$^2$·g$^{-1}$ or larger, and is generally 100 m$^2$·g$^{-1}$ or smaller, preferably 25 m$^2$·g$^{-1}$ or smaller, more preferably 15 m$^2$·g$^{-1}$ or smaller, especially preferably 10 m$^2$·g$^{-1}$ or smaller.

When the BET specific surface area thereof is smaller than the lower limit of that range, use of this carbonaceous material as a negative-electrode material is apt to result in poor lithium acceptance during charge and in lithium deposition on the electrode surface. Consequently, there is the possibility of resulting in reduced stability. On the other hand, when the specific surface area thereof exceeds the upper limit of that range, there are cases where use of this carbonaceous material as a negative-electrode material is apt to result in enhanced reactivity with the nonaqueous electrolyte and enhanced gas evolution and a preferred battery is difficult to obtain.

The determination of specific surface area by the BET method is made with a surface area meter (a fully automatic surface area measuring apparatus manufactured by Ohukura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmospheric pressure. The specific surface area determined through this measurement is defined as the BET specific surface area of the carbonaceous material in invention 1.

(6) Pore Diameter Distribution

The pore diameter distribution of the carbonaceous material is calculated through a measurement of the amount of mercury intruded. It is desirable that the carbonaceous material should have a pore diameter distribution in which the amount of interstices which correspond to pores having a diameter of from 0.01 µm to 1 µm and which include pores within the particles, particle surface irregularities formed by steps, and pores attributable to contact surfaces among the particles, as determined by mercury porosimetry (mercury intrusion method), is generally 0.01 $cm^3 \cdot g^{-1}$ or larger, preferably 0.05 $cm^3 \cdot g^{-1}$ or larger, more preferably 0.1 $cm^3 \cdot g^{-1}$ or larger, and is generally 0.6 $cm^3 \cdot g^{-1}$ or smaller, preferably 0.4 $cm^3 \cdot g^{-1}$ or smaller, more preferably 0.3 $cm^3 \cdot g^{-1}$ or smaller.

When the pore diameter distribution thereof is larger than the upper limit of that range, there are cases where a large amount of a binder is necessary in electrode plate formation. When the amount of interstices thereof is smaller than the lower limit of that range, there are cases where high-current-density charge/discharge characteristics decrease and the effect of diminishing electrode expansion/contraction during charge/discharge is not obtained.

The total volume of pores thereof corresponding to the pore diameter range of from 0.01 µm to 100 µm, as determined by mercury porosimetry (mercury intrusion method), is generally 0.1 $cm^3 \cdot g^{-1}$ or larger, preferably 0.25 $cm^3 \cdot g^{-1}$ or larger, more preferably 0.4 $cm^3 \cdot g^{-1}$ or larger, and is generally 10 $cm^3 \cdot g^{-1}$ or smaller, preferably 5 $cm^3 \cdot g^{-1}$ or smaller, more preferably 2 $cm^3 \cdot g^{-1}$ or smaller. When the total pore volume thereof exceeds the upper limit of that range, there are cases where a large amount of a binder is necessary in electrode plate formation. When the total pore volume thereof is smaller than the lower limit of that range, there are cases where the dispersing effect of a thickener or binder in electrode plate formation is not obtained.

The average pore diameter thereof is generally 0.05 µm or larger, preferably 0.1 µm or larger, more preferably 0.5 µm or larger, and is generally 50 µm or smaller, preferably 20 µm or smaller, more preferably 10 µm or smaller. When the average pore diameter thereof exceeds the upper limit of that range, there are cases where a large amount of a binder is necessary. When the average pore diameter thereof is smaller than the lower limit of that range, there are cases where high-current-density charge/discharge characteristics decrease.

The amount of mercury intruded is measured with a mercury porosimeter (Autopore 9520, manufactured by Micromeritics Corp.) as an apparatus for the mercury porosimetry. A sample is pretreated by placing about 0.2 g of the sample in a powder cell, closing the cell, and degassing the sample at room temperature under vacuum (50 µmHg or lower) for 10 minutes. Subsequently, the pressure in the cell is reduced to 4 psia (about 28 kPa) and mercury is introduced thereinto. The internal pressure is stepwise elevated from 4 psia (about 28 kPa) to 40,000 psia (about 280 MPa) and then lowered to 25 psia (about 170 kPa). The number of steps in the pressure elevation is 80 or larger. In each step, the amount of mercury intruded is measured after an equilibrium time of 10 seconds.

A pore diameter distribution is calculated from the mercury intrusion curve thus obtained, using the Washburn equation. Incidentally, the surface tension ($\gamma$) and contact angle ($\gamma$) of mercury are taken as 485 $dyne \cdot cm^{-1}$ (1 dyne=10 µN) and 140°, respectively. The average pore diameter used is the pore diameter corresponding to a cumulative pore volume of 50%.

(7) Roundness

When the carbonaceous material is examined for roundness as an index to the degree of sphericity thereof, the roundness thereof is preferably within the range shown below. Roundness is defined by "Roundness=(length of periphery of equivalent circle having the same area as projected particle shape)/(actual length of periphery of projected particle shape)". When a particle has a roundness of 1, this particle theoretically is a true sphere.

The closer to 1 the roundness of carbonaceous-material particles having a particle diameter in the range of 3-40 µm, the more the particles are desirable. The roundness of the particles is desirably 0.1 or higher, preferably 0.5 or higher, more preferably 0.8 or higher, even more preferably 0.85 or higher, especially preferably 0.9 or higher.

The higher the roundness, the more the high-current-density charge/discharge characteristics are improved. Consequently, when the roundness of the carbonaceous-material particles is lower than the lower limit of that range, there are cases where the negative-electrode active material has reduced suitability for loading and interparticle resistance is increased, resulting in reduced short-time high-current-density charge/discharge characteristics.

Roundness is determined with a flow type particle image analyzer (FPIA, manufactured by Sysmex Industrial Corp.). About 0.2 g of a sample is dispersed in a 0.2% by mass aqueous solution (about 50 mL) of poly(oxyethylene(20)) sorbitan monolaurate as a surfactant, and an ultrasonic wave of 28 kHz is propagated to the dispersion for 1 minute at an output of 60 W. Thereafter, particles having a particle diameter in the range of 3-40 µm are examined with the analyzer having a detection range set at 0.6-400 µm. The roundness determined through this measurement is defined as the roundness of the carbonaceous material in invention 1.

Methods for improving roundness are not particularly limited. However, a carbonaceous material in which the particles have been rounded by a rounding treatment is preferred because it gives an electrode in which the interstices among particles are uniform in shape. Examples of the rounding treatment include: a method in which a shear force or compressive force is applied to thereby mechanically make the shape of the particles close to sphere; and a method of mechanical/physical treatment in which fine particles are aggregated into particles by means of the bonding force of a binder or of the fine particles themselves.

(8) True Density

The true density of the carbonaceous material is generally 1.4 $g \cdot cm^{-3}$ or higher, preferably 1.6 $g \cdot cm^{-3}$ or higher, more preferably 1.8 $g \cdot cm^{-3}$ or higher, especially preferably 2.0 $g \cdot cm^{-3}$ or higher, and is generally 2.26 $g \cdot cm^{-3}$ or lower. When the true density of the carbonaceous material is lower than the lower limit of that range, there are cases where this carbon has too low crystallinity, resulting in an increase in initial irreversible capacity. Incidentally, the upper limit of that range is a theoretical value of the true density of graphites.

The true density of the carbonaceous material is determined by the liquid-phase displacement method (pycnometer method) using butanol. The value determined through this measurement is defined as the true density of the carbonaceous material in invention 1.

(9) Tap Density

The tap density of the carbonaceous material is generally 0.1 g·cm$^{-3}$ or higher, preferably 0.5 g·cm$^{-3}$ or higher, more preferably 0.7 g·cm$^{-3}$ or higher, especially preferably 1 g·cm$^{-3}$ or higher, and is preferably 2 g·cm$^{-3}$ or lower, more preferably 1.8 g·cm$^{-3}$ or lower, especially preferably 1.6 g·cm$^{-3}$ or lower.

When the tap density thereof is lower than the lower limit of that range, there are cases where this carbonaceous material, when used in a negative electrode, is less apt to have a high loading density and cannot give a battery having a high capacity. On the other hand, when the tap density thereof exceeds the upper limit of that range, the amount of interparticle interstices in the electrode is too small and it is difficult to secure electrical conductivity among the particles. There are hence cases where preferred battery performances are difficult to obtain.

Tap density is determined by dropping a sample through a sieve having an opening size of 300 μm into a 20-cm$^3$ tapping cell to fill the cell with the sample up to the brim, subsequently conducting tapping operations 1,000 times over a stroke length of 10 mm using a powder densimeter (e.g., Tap Denser, manufactured by Seishin Enterprise Co., Ltd.), and calculating the tap density from the resultant volume of the sample and the weight thereof. The tap density calculated through this measurement is defined as the tap density of the carbonaceous material in invention 1.

(10) Orientation Ratio

The orientation ratio of the carbonaceous material is generally 0.005 or higher, preferably 0.01 or higher, more preferably 0.015 or higher, and is generally 0.67 or lower. When the orientation ratio thereof is lower than the lower limit of that range, there are cases where high-density charge/discharge characteristics decrease. The upper limit of that range is a theoretical upper limit of the orientation ratio of carbonaceous materials.

Orientation ratio is determined by X-ray diffractometry after a sample is molded by compaction. A molding obtained by packing 0.47 g of a sample into a molding machine having a diameter of 17 mm and compacting the sample at 58.8 MN·m$^{-2}$ is set with clay on a sample holder for examination so as to be flush with the holder. This sample molding is examined for X-ray diffraction. From the intensities of the resultant (110) diffraction peak and (009) diffraction peak for the carbon, the ratio represented by (110) diffraction peak intensity/(004) diffraction peak intensity is calculated. The orientation ratio calculated through this measurement is defined as the orientation ratio of the carbonaceous material in invention 1.

Conditions for the X-ray diffractometry are as follows. Incidentally, "2θ" represents diffraction angle.
Target: Cu(Kα line) graphite monochromator
Slit:
Divergence slit=0.5 degrees
Receiving slit=0.15 mm
Scattering slit=0.5 degrees Examination range and step angle/measuring time:

| | |
|---|---|
| (110) plane: 75° ≤ 2θ ≤ 80° | 1°/60 sec |
| (004) plane: 52° ≤ 2θ ≤ 57° | 1°/60 sec |

(11) Aspect Ratio (Powder)

The aspect ratio of the carbonaceous material is generally 1 or higher, and is generally 10 or lower, preferably 8 or lower, more preferably 5 or lower. When the aspect ratio thereof exceeds the upper limit of that range, there are cases where this carbonaceous material causes streak lines in electrode plate formation and an even coating surface cannot be obtained, resulting in a decrease in high-current-density charge/discharge characteristics. Incidentally, the lower limit of that range is a theoretical lower limit of the aspect ratio of carbonaceous materials.

In determining aspect ratio, particles of the carbonaceous material are examined with a scanning electron microscope with enlargement. Fifty are arbitrarily selected from graphite particles fixed to an edge face of a metal having a thickness of 50 μm or smaller, and each particle is examined in a three-dimensional manner while rotating or inclining the stage to which the sample is fixed. In this examination, the length of the longest axis A of each carbonaceous-material particle and the length of the shortest axis B perpendicular to that axis are measured, and the average of the A/B values is determined. The aspect ratio (A/B) determined through this measurement is defined as the aspect ratio of the carbonaceous material in invention 1.

(12) Minor-Material Mixing

Minor-material mixing means that the negative electrode and/or the negative-electrode active material contains two or more carbonaceous materials differing in property. The term property herein means one or more properties selected from the group consisting of X-ray diffraction parameter, median diameter, aspect ratio, BET specific surface area, orientation ratio, Raman R value, tap density, true density, pore distribution, roundness, and ash content.

Especially preferred examples of the minor-material mixing include: one in which the volume-based particle size distribution is not symmetrical about the median diameter; one in which two or more carbonaceous materials differing in Raman R value are contained; and one in which carbonaceous materials differing in X-ray parameter are contained.

One example of the effects of the minor-material mixing is that the incorporation of a carbonaceous material, such as a graphite, e.g., a natural graphite or artificial graphite, or an amorphous carbon, e.g., a carbon black such as acetylene black or needle coke, as a conductive material serves to reduce electrical resistance.

In the case where conductive materials are incorporated as minor-material mixing, one conductive material may be incorporated alone or any desired combination of two or more conductive materials in any desired proportion may be incorporated. The proportion of the conductive material(s) to be incorporated is generally 0.1% by mass or higher, preferably 0.5% by mass or higher, more preferably 0.6% by mass or higher, and is generally 45% by mass or lower, preferably 40% by mass or lower, based on the carbonaceous material. When the proportion thereof is lower than the lower limit of that range, there are cases where the effect of improving conductivity is difficult to obtain. Proportions thereof exceeding the upper limit of that range may lead to an increase in initial irreversible capacity.

(13) Electrode Production

Any known method can be used for electrode production unless this considerably lessens the effects of invention 1. For example, a binder and a solvent are added to a negative-electrode active material optionally together with a thickener, conductive material, filler, etc. to obtain a slurry and this slurry is applied to a current collector and dried. Thereafter, the coated current collector is pressed, whereby an electrode can be formed.

The thickness of the negative-electrode active-material layer per one side in the stage just before the step of injecting a nonaqueous electrolyte in battery fabrication is generally 15 µm or larger, preferably 20 µm or larger, more preferably 30 µm or larger, and is generally 150 µm or smaller, preferably 120 µm or smaller, more preferably 100 µm or smaller. The reasons for this are as follows. When the thickness of the negative-electrode active-material layer is larger than the upper limit of that range, a nonaqueous electrolyte is less apt to infiltrate into around the interface of the current collector and, hence, there are cases where high-current-density charge/discharge characteristics decrease. When the thickness thereof is smaller than the lower limit of that range, the proportion by volume of the current collector to the negative-electrode active material increases and there are cases where battery capacity decreases. The negative-electrode active material may be roller-pressed to obtain a sheet electrode, or may be subjected to compression molding to obtain a pellet electrode.

(14) Current Collector

As the current collector for holding the negative-electrode active material, a known one can be used at will. Examples of the current collector for the negative electrode include metallic materials such as copper, nickel, stainless steel, and nickel-plated steel. Copper is especially preferred from the standpoints of processability and cost.

In the case where the current collector is a metallic material, examples of the shape of the current collector include metal foils, metal cylinders, metal coils, metal plates, thin metal films, expanded metals, punching metals, and metal foams. Preferred of these are thin metal films. More preferred are copper foils. Even more preferred are a rolled copper foil, which is produced by the rolling process, and an electrolytic copper foil, which is produced by the electrolytic process. Either of these can be used as a current collector.

In the case of a copper foil having a thickness smaller than 25 µm, use can be made of a copper alloy (e.g., phosphor bronze, titanium-copper, Corson alloy, or Cu—Cr—Zr alloy) having a higher strength than pure copper.

The current collector constituted of a copper foil produced by the rolling process is less apt to crack even when the negative electrode is rolled tightly or rolled at an acute angle, because the copper crystals are oriented in the rolling direction. This current collector can be advantageously used in small cylindrical batteries.

The electrolytic copper foil is obtained by immersing a metallic drum in a nonaqueous electrolyte containing copper ions dissolved therein, causing current to flow through the system while rotating the drum to thereby deposit copper on the drum surface, and peeling the copper deposit from the drum. Copper may be deposited on a surface of the rolled copper foil by the electrolytic process. One or each side of such a copper foil may have undergone a surface-roughening treatment or a surface treatment (e.g., a chromate treatment in a thickness of from several nanometers to about 1 µm or a priming treatment with titanium).

The current collector base is desired to further have the following properties.

(14-1) Average Surface Roughness (Ra)

The average surface roughness (Ra) of that side of the current collector base on which a thin negative-electrode active-material film is to be formed, as determined by the method provided for in JIS B 0601-1994, is not particularly limited. However, the average surface roughness thereof is generally 0.05 µm or higher, preferably 0.1 µm or higher, more preferably 0.15 µm or higher, and is generally 1.5 µm or lower, preferably 1.3 µm or lower, more preferably 1.0 µm or lower. This is because when the average surface roughness (Ra) of the current collector base is within that range, satisfactory charge/discharge cycle performances can be expected. In addition, the area of the interface between the base and a thin negative-electrode active-material film is increased and adhesion to the thin negative-electrode active-material film is improved. The upper limit of the average surface roughness (Ra) thereof is not particularly limited. However, a current collector base having an Ra of 1.5 µm or lower is usually employed because a foil having a practical thickness for batteries and having an average surface roughness (Ra) exceeding 1.5 µm is generally difficult to procure.

(14-2) Tensile Strength

Tensile strength is a quotient obtained by dividing the maximum tensile force required before test piece breakage by the sectional area of the test piece. In invention 1, the tensile strength is determined through a measurement conducted with the same apparatus and by the same method as those described in JIS Z 2241 (Method of Metallic-Material Tensile Test).

The tensile strength of the current collector base is not particularly limited. However, it is generally 100 $N \cdot mm^{-2}$ or higher, preferably 250 $N \cdot mm^{-2}$ or higher, more preferably 400 $N \cdot mm^{-2}$ or higher, especially preferably 500 $N \cdot mm^{-2}$ or higher. The higher the tensile strength, the more the current collector base is preferred. However, the tensile strength thereof is generally 1,000 $N \cdot mm^{-2}$ or lower from the standpoint of industrial availability. A current collector base having a high tensile strength can be inhibited from cracking with the expansion/contraction of the thin negative-electrode active-material film which occur upon charge/discharge. With this current collector base, satisfactory cycle performances can be obtained.

(14-3) 0.2% Proof Stress

The term 0.2% proof stress means the degree of load necessary for imparting a plastic (permanent) deformation of 0.2%. Namely, it means that application of that degree of load and subsequent removal thereof result in a 0.2% deformation. The 0.2% proof stress is determined through a measurement conducted with the same apparatus and by the same method as for tensile strength.

The 0.2% proof stress of the current collector base is not particularly limited. However, it is desirable that the 0.2% proof stress thereof should be generally 30 $N \cdot mm^{-2}$ or higher, preferably 150 $N \cdot mm^{-2}$ or higher, especially preferably 300 $N/mm^2$ or higher. The higher the 0.2% proof stress, the more the current collector base is preferred. However, the 0.2% proof stress thereof is generally desirably 900 $N \cdot mm^{-2}$ or lower from the standpoint of industrial availability. A current collector base having a high 0.2% proof stress can be inhibited from plastically deforming with the expansion/contraction of the thin negative-electrode active-material film which occur upon charge/discharge. With this current collector base, satisfactory cycle performances can be obtained.

(14-4) Thickness of Current Collector

The current collector may have any desired thickness. However, the thickness thereof is generally 1 µm or larger, preferably 3 µm or larger, more preferably 5 µm or larger, and is generally 1 mm or smaller, preferably 100 µm or smaller, more preferably 50 µm or smaller. In case where the metal film is thinner than 1 µm, this current collector has reduced strength and there are hence cases where coating is difficult. When the current collector is thicker than 100 there are cases where this collector deforms an electrode shape, e.g., a rolled form. The current collector may be in a mesh form.

(15) Thickness Ratio between Current Collector and Negative-Electrode Active-Material Layer The thickness ratio between the current collector and the negative-electrode active-material layer is not particularly limited. However, the value of "(thickness of the negative-electrode active-material layer on one side just before impregnation with the nonaqueous electrolyte)/(thickness of the current collector)" is preferably 150 or smaller, more preferably 20 or smaller, especially preferably 10 or smaller, and is preferably 0.1 or larger, more preferably 0.4 or larger, especially preferably 1 or larger.

When the thickness ratio between the current collector and the negative-electrode active-material layer exceeds the upper limit of that range, there are cases where this current collector heats up due to Joule's heat during high-current-density charge/discharge. When that ratio decreases beyond the lower limit of that range, the proportion by volume of the current collector to the negative-electrode active material increases and this may reduce the capacity of the battery.

(16) Electrode Density

When the negative-electrode active material is used to form an electrode, the electrode structure is not particularly limited. However, the density of the negative-electrode active material present on the current collector is preferably g·cm$^{-3}$ or higher, more preferably 1.2 g·cm$^{-3}$ or higher, especially preferably 1.3 g·cm$^{-3}$ or higher, and is preferably 2 g·cm$^{-3}$ or lower, more preferably 1.9 g·cm$^{-3}$ or lower, even more preferably 1.8 g·cm$^{-3}$ or lower, especially preferably 1.7 g·cm$^{-3}$ or lower. When the density of the negative-electrode active material present on the current collector exceeds the upper limit of that range, there are cases where the negative-electrode active-material particles are broken and this increases the initial irreversible capacity and reduces the infiltration of a nonaqueous electrolyte into around the current collector/negative-electrode active material interface. As a result, high-current-density charge/discharge characteristics may decrease. When the density thereof is lower than the lower limit of that range, there are cases where electrical conductivity among the negative-electrode active-material particles decreases and this increases battery resistance, resulting in a reduced capacity per unit volume.

(17) Binder

The binder for binding the negative-electrode active material is not particularly limited so long as it is stable to the nonaqueous electrolyte and to the solvent to be used for electrode production.

Examples thereof include resinous polymers such as polyethylene, polypropylene, poly(ethylene terephthalate), poly(methyl methacrylate), aromatic polyamides, cellulose, and nitrocellulose; rubbery polymers such as SBR (styrene/butadiene rubbers), isoprene rubbers, butadiene rubbers, fluororubbers, NBR (acrylonitrile/butadiene rubbers), and ethylene/propylene rubbers; styrene/butadiene/styrene block copolymers or products of hydrogenation thereof; thermoplastic elastomeric polymers such as EPDM (ethylene/propylene/diene terpolymers), styrene/ethylene/butadiene/styrene copolymers, and styrene/isoprene/styrene block copolymers or products of hydrogenation thereof; flexible resinous polymers such as syndiotactic 1,2-polybutadiene, poly(vinyl acetate), ethylene/vinyl acetate copolymers, and propylene/α-olefin copolymers; fluorochemical polymers such as poly(vinylidene fluoride), polytetrafluoroethylene, fluorinated poly(vinylidene fluoride), and polytetrafluoroethylene/ethylene copolymers; and polymer compositions having the property of conducting alkali metal ions (especially lithium ions). One of these may be used alone, or any desired combination of two or more thereof in any desired proportion may be used.

The kind of the solvent to be used for forming a slurry is not particularly limited so long as it is a solvent in which the negative-electrode active material and binder and the thickener and conductive material which are optionally used according to need can be dissolved or dispersed. Either an aqueous solvent or an organic solvent may be used.

Examples of the aqueous solvent include water and alcohols. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, diethyl ether, hexamethylphosphoramide, dimethyl sulfoxide, benzene, xylene, quinoline, pyridine, methylnaphthalene, and hexane.

Especially when an aqueous solvent is used, it is preferred to add a dispersant or the like in combination with a thickener and prepare a slurry using a latex of, e.g., SBR. One of those solvents may be used alone, or any desired combination of two or more thereof in any desired proportion may be used.

The proportion of the binder to the negative-electrode active material is preferably 0.1% by mass or higher, more preferably 0.5% by mass or higher, especially preferably 0.6% by mass or higher, and is preferably 20% by mass or lower, more preferably 15% by mass or lower, even more preferably 10% by mass or lower, especially preferably 8% by mass or lower. In case where the proportion of the binder to the negative-electrode active material exceeds the upper limit of that range, the proportion of the binder which does not contribute to battery capacity increases and this may lead to a decrease in battery capacity. When the binder amount is smaller than the lower limit of that range, there are cases where the negative electrode has a reduced strength.

Especially when the binder includes a rubbery polymer represented by SBR as the main component, the proportion of this binder to the negative-electrode active material is generally 0.1% by mass or higher, preferably 0.5% by mass or higher, more preferably 0.6% by mass or higher, and is generally 5% by mass or lower, preferably 3% by mass or lower, more preferably 2% by mass or lower.

In the case where the binder includes a fluorochemical polymer represented by poly(vinylidene fluoride) as the main component, the proportion of this binder to the negative-electrode active material is generally 1% by mass or higher, preferably 2% by mass or higher, more preferably 3% by mass or higher, and is generally 15% by mass or lower, preferably 10% by mass or lower, more preferably 8% by mass or lower.

A thickener is used generally for the purpose of regulating the slurry viscosity. The thickener is not particularly limited. Examples thereof include carboxymethyl cellulose, methyl cellulose, hydroxymethyl cellulose, ethyl cellulose, poly(vinyl alcohol), oxidized starch, phosphorylated starch, casein, and salts of these. One of these thickeners may be used alone, or any desired combination of two or more thereof in any desired proportion may be used.

In the case where such a thickener is further added, the proportion of the thickener to the negative-electrode active material is generally 0.1% by mass or higher, preferably 0.5% by mass or higher, more preferably 0.6% by mass or higher, and is generally 5% by mass or lower, preferably 3% by mass or lower, more preferably 2% by mass or lower. When the proportion of the thickener to the negative-electrode active material is lower than the lower limit of that range, there are cases where applicability decreases considerably. Proportions thereof exceeding the upper limit of that range result in a reduced proportion of the negative-electrode active material in the negative-electrode active-material layer, and this may pose a problem that battery capacity decreases and a problem that resistance among the particles of the negative-electrode active material increases.

(18) Orientation Ratio in Electrode Plate

The orientation ratio in the electrode plate is generally 0.001 or higher, preferably 0.005 or higher, more preferably 0.01 or higher, and is generally 0.67 or lower. When the orientation ratio therein is lower than the lower limit of that range, there are cases where high-density charge/discharge characteristics decrease. The upper limit of that range is a theoretical upper limit of orientation ratio in carbonaceous-material electrodes.

An examination for determining the orientation ratio in the electrode plate is as follows. The negative electrode which has been pressed to a target density is examined by X-ray diffractometry to determine the orientation ratio of the negative-electrode active material in this electrode. Although specific techniques therefor are not particularly limited, a standard method is as follows. The peaks attributable to the (110) diffraction and (004) diffraction of the carbon obtained by X-ray diffractometry are subjected to peak separation by fitting with asymmetric Pearson VII as a profile function. Thus, the integrated intensities of the (110) diffraction and (004) diffraction peaks are calculated. From the integrated intensities obtained, the ratio represented by (integrated intensity of (110) diffraction)/(integrated intensity of (004) diffraction) is calculated. The negative-electrode active-material orientation ratio for the electrode thus calculated is defined as the orientation ratio in the electrode plate employing the carbonaceous material in invention 1.

Conditions for this X-ray diffractometry are as follows. Incidentally, "2θ" represents diffraction angle.

Target: Cu(Kα line) graphite monochromator

Slit:

Divergence slit=1 degree

Receiving slit=0.1 mm

Scattering slit=1 degree

Examination range and step angle/measuring time:

| (110) plane: 76.5° ≤ 2θ ≤ 78.5° | 0.01°/3 sec |
| (004) plane: 53.5° ≤ 2θ ≤ 56.0° | 0.01°/3 sec |

Sample preparation:

The electrode is fixed to a glass plate with a double-faced pressure-sensitive adhesive tape having a thickness of 0.1 mm.

<2-3-3. Metal Compound Material, Constitution and Properties of Negative Electrode Employing Metal Compound Material, and Method of Preparation Thereof>

The metal compound material to be used as a negative-electrode active material is not particularly limited so long as the material is capable of occluding/releasing lithium. Use may be made of an elemental metal or alloy which forms a lithium alloy or any of compounds thereof, such as oxides, carbides, nitrides, silicides, sulfides, and phosphides. Examples of such metal compounds include compounds containing a metal such as Ag, Al, Ba, Bi, Cu, Ga, Ge, In, Ni, P, Pb, Sb, Si, Sn, Sr, or Zn. In particular, the negative-electrode active material preferably is an elemental metal or alloy which forms a lithium alloy. It is preferred that the active material should be a material containing any of the metals and semimetals in Group 13 and Group 14 (i.e., carbon is excluded). Furthermore, it is preferred that the active material should be an elemental metal which is silicon (Si), tin (Sn), or lead (Pb) (hereinafter, these three elements are often referred to as "specific metallic elements") or an alloy containing atoms of any of these metals or a compound of one or more of these metals (specific metallic elements). One of such materials may be used alone, or any desired combination of two or more of these in any desired proportion may be used.

Examples of the negative-electrode active material including atoms of at least one member selected from the specific metallic elements include: the elemental metal which is any one of the specific metallic elements; alloys constituted of two or more specific metal elements; alloys constituted of one or more specific metal elements and one or more metallic elements of another kind; compounds containing one or more specific metallic elements; and composite compounds, e.g., oxides, carbides, nitrides, silicides, sulfides, or phosphides, of these compounds. By using any of these elemental metals, alloys, and metal compounds as a negative-electrode active material, a battery having a higher capacity can be obtained.

Examples of the negative-electrode active material further include compounds formed by the complicated bonding of any of those composite compounds to one or more elemental metals or alloys or to several elements, e.g., nonmetallic elements. More specifically, in the case of silicon and tin, for example, use can be made of an alloy of those elements with a metal which does not function as a negative electrode. In the case of tin, for example, use may be made of a complicated compound constituted of a combination of five to six elements including tin, a metal which functions as a negative electrode and is not silicon, a metal which does not function as a negative electrode, and a nonmetallic element.

Preferred of those negative-electrode active materials are the elemental metal which is any one of the specific metallic elements, alloys of two or more of the specific metallic elements, and oxides, carbides, nitrides, and other compounds of the specific metallic elements. This is because these negative-electrode active materials give a battery having a high capacity per unit weight. Especially preferred are the elemental metal (s), alloys, oxides, carbides, nitrides, and the like of silicon and/or tin from the standpoints of capacity per unit weight and environmental burden.

The following compounds containing silicon and/or tin also are preferred because these compounds bring about excellent cycle performances, although inferior in capacity per unit weight to the elemental metals or alloys thereof.

A "silicon and/or tin oxide" in which the elemental ratio of the silicon and/or tin to the oxygen is generally 0.5 or higher, preferably 0.7 or higher, more preferably 0.9 or higher, and is generally 1.5 or lower, preferably 1.3 or lower, more preferably 1.1 or lower.

A "silicon and/or tin nitride" in which the elemental ratio of the silicon and/or tin to the nitrogen is generally 0.5 or higher, preferably 0.7 or higher, more preferably 0.9 or higher, and is generally 1.5 or lower, preferably 1.3 or lower, more preferably 1.1 or lower.

A "silicon and/or tin carbide" in which the elemental ratio of the silicon and/or tin to the carbon is generally 0.5 or higher, preferably 0.7 or higher, more preferably 0.9 or higher, and is generally 1.5 or lower, preferably 1.3 or lower, more preferably 1.1 or lower.

Any one of the negative-electrode active materials described above may be used alone, or any desired combination of two or more thereof in any desired proportion may be used.

The negative electrode in the nonaqueous-electrolyte secondary battery of invention 1 can be produced by any known method. Examples of methods for negative-electrode production include: a method in which a binder, a conductive material, and other ingredients are added to any of the negative-electrode active materials described above and this mixture is directly roller-pressed to form a sheet electrode; and a method in which the mixture is compression-molded to form a pellet electrode. Usually, however, use is made of a method in which a thin film layer containing any of the negative-electrode active materials described above (negative-electrode active-material layer) is formed on a current collector for negative electrodes (hereinafter sometimes referred to as "negative-electrode current collector") by a technique such as, e.g., coating fluid application, vapor deposition, sputtering, or plating. In this case, a negative-electrode active-material layer may be formed on a negative-electrode current collector by adding a binder, thickener, conductive material, solvent, etc. to the negative-electrode active material to obtain a mixture in a slurry form, applying this mixture to the negative-electrode current collector, drying the mixture applied, and then pressing the coated current collector to densify the coating.

Examples of the material of the negative-electrode current collector include copper, copper alloys, nickel, nickel alloys, and stainless steel. Copper foils are preferred of these materials from the standpoints of processability into thin films and cost.

The thickness of the negative-electrode current collector is generally 1 μm or larger, preferably 5 μm or larger, and is generally 100 μm or smaller, preferably 50 μm or smaller. The reasons for this are as follows. In case where the negative-electrode current collector is too thick, this may result in too large a decrease in the capacity of the whole battery. Conversely, in case where the current collector is too thin, this collector may be difficult to handle.

It is preferred that the surface of each of those negative-electrode current collectors should be subjected to a surface-roughening treatment beforehand in order to improve the effect of binding the negative-electrode active-material layer to be formed on the surface. Examples of techniques for the surface roughening include blasting, rolling with a roll having a roughened surface, and mechanical polishing in which the collector surface is polished with an abrasive cloth or paper having abrasive particles fixed thereto, a grindstone, an emery wheel, a wire brush equipped with steel bristles, or the like. Examples thereof further include electrolytic polishing and chemical polishing.

It is also possible to use a negative-electrode current collector of the perforated type, such as an expanded metal or a punching metal, as a negative-electrode current collector having a reduced weight in order to improve energy density per unit weight of the battery. A negative-electrode current collector of this type can be varied in weight at will by changing the percentage of openings thereof. Furthermore, in the case where a negative-electrode active-material layer is formed on each side of a negative-electrode current collector of this type, the negative-electrode active-material layers are even less apt to peel off because of the effect of rivetting through the holes. It should, however, be noted that too high a percentage of openings results in a reduced contact area between each negative-electrode active-material layer and the negative-electrode current collector and hence in reduced, rather than increased adhesion strength.

The slurry for forming a negative-electrode active-material layer is generally produced by adding a binder, a thickener, etc. to a negative-electrode material. The term "negative-electrode material" in this description means a material including both a negative-electrode active material and a conductive material.

It is preferred that the content of the negative-electrode active material in the negative-electrode material should be generally 70% by mass or higher, especially 75% by mass or higher, and be generally 97% by mass or lower, especially 95% by mass or lower. The reasons for this are as follows. In case where the content of the negative-electrode active material is too low, a secondary battery employing the resultant negative electrode tends to have an insufficient capacity. In case where the content thereof is too high, the relative content of the binder and other components is insufficient and this tends to result in insufficient strength of the negative electrode obtained. When two or more negative-electrode active materials are used in combination, this combination may be used so that the total amount of the negative-electrode active materials satisfies that range.

Examples of the conductive material for use in the negative electrode include metallic materials such as copper and nickel, and carbon materials such as graphites and carbon blacks. One of these materials may be used alone, or any desired combination of two or more thereof in any desired proportion may be used. In particular, use of a carbon material as the conductive material is preferred because the carbon material functions also as an active material. It is preferred that the content of the conductive material in the negative electrode should be generally 3% by mass or higher, especially 5% by mass or higher, and be generally 30% by mass or lower, especially 25% by mass or lower. The reasons for this are as follows. In case where the content of the conductive material is too low, conductivity tends to be insufficient. In case where the content thereof is too high, the relative content of the negative-electrode active material and other components is insufficient and this tends to result in decreases in battery capacity and strength. When two or more conductive materials are used in combination, this combination may be used so that the total amount of the conductive materials satisfies that range.

As the binder for the negative electrode, any desired binder can be used so long as it is safe for the solvent to be used in electrode production and for the electrolyte. Examples thereof include poly(vinylidene fluoride), polytetrafluoroethylene, polyethylene, polypropylene, styrene/butadiene rubbers, isoprene rubbers, butadiene rubbers, ethylene/acrylic acid copolymers, and ethylene/methacrylic acid copolymers. One of these binders may be used alone, or any desired combination of two or more thereof in any desired proportion may be used. It is preferred that the content of the binder should be generally 0.5 parts by weight or larger, especially 1 part by weight or larger, and be generally 10 parts by weight or smaller, especially 8 parts by weight or smaller, per 100 parts by weight of the negative-electrode material. The reasons for this are as follows. In case where the content of the binder is too low, the resultant electrode tends to have insufficient strength. In case where the content thereof is too high, the relative content of the negative-electrode active material and other components is insufficient and this tends to result in insufficient battery capacity and insufficient conductivity. When two or more binders are used in combination, this combination may be used so that the total amount of the binders satisfies that range.

Examples of the thickener for use in the negative electrode include carboxymethyl cellulose, methyl cellulose, hydroxymethyl cellulose, ethyl cellulose, poly(vinyl alcohol), oxidized starch, phosphorylated starch, and casein. One of these thickeners may be used alone, or any desired combination of two or more thereof in any desired proportion may be used. A thickener may be used according to need. In the case of using a thickener, it is preferred to use the thickener so that the content thereof in the negative-electrode active-material layer is in the range of generally from 0.5% by mass to 5% by mass.

The slurry for forming a negative-electrode active-material layer is prepared by mixing the negative-electrode active material with a conductive material, a binder, and a thickener according to need using an aqueous solvent or an organic solvent as a dispersion medium. Water is generally used as the aqueous solvent. However, a solvent other than water, such as an alcohol, e.g., ethanol, a cyclic amide, e.g., N-methylpyrrolidone, or the like, can be used in combination with water in a proportion of up to about 30% by mass based on the water. Examples of the organic solvent usually include cyclic amides such as N-methylpyrrolidone, linear amides such as N,N-dimethylformamide and N,N-dimethylacetamide, aromatic hydrocarbons such as anisole, toluene, and xylene, and alcohols such as butanol and cyclohexanol. Preferred of these are cyclic amides such as N-methylpyrrolidone and linear amides such as N,N-dimethylformamide and N,N-dimethylacetamide. Any one of such solvents may be used alone, or any desired combination of two or more thereof in any desired proportion may be used.

The viscosity of the slurry is not particularly limited so long as the slurry is applicable to a current collector. The slurry may be suitably prepared while changing the amount of the solvent to be used, etc. so that the slurry is applicable.

The slurry obtained is applied to the negative-electrode current collector described above, and the coated collector is dried and then pressed, whereby a negative-electrode active-material layer is formed. Techniques for the application are not particularly limited, and a technique which itself is known can be employed. Techniques for the drying also are not particularly limited, and use can be made of a known technique such as, e.g., natural drying, drying by heating, or vacuum drying.

The negative-electrode active material is used to produce an electrode in the manner described above. The structure of this electrode is not particularly limited. However, the density of the active material present on the current collector is preferably 1 g·cm$^{-3}$ or higher, more preferably 1.2 g·cm$^{-3}$ or higher, especially preferably 1.3 g·cm$^{-3}$ or higher, and is preferably 2 g·cm$^{-3}$ or lower, more preferably 1.9 g·cm$^{-3}$ or lower, even more preferably 1.8 g·cm$^{-3}$ or lower, especially preferably 1.7 g·cm$^{-3}$ or lower.

When the density of the active material present on the current collector exceeds the upper limit of that range, there are cases where particles of the active material are destroyed and this causes an increase in initial irreversible capacity and reduces the infiltration of the nonaqueous electrolyte into around the current collector/active material interface, resulting in impaired high-current-density charge/discharge characteristics. When the density thereof is lower than the lower limit of that range, there are cases where conductivity between particles of the active material decreases, resulting in increased battery resistance and reduced capacity per unit volume.

<2-3-4. Lithium-Containing Metal Composite Oxide Material, Constitution and Properties of Negative Electrode Employing Lithium-Containing Metal Composite Oxide Material, and Method of Preparation Thereof>

The lithium-containing metal composite oxide material to be used as a negative-electrode active material is not particularly limited so long as the material is capable of occluding/releasing lithium. However, a lithium-containing composite metal oxide material containing titanium is preferred, and a composite oxide of lithium and titanium (hereinafter abbreviated to "lithium-titanium composite oxide") is especially preferred. Namely, use of a lithium-titanium composite oxide having a spinel structure is especially preferred because incorporation of this composite oxide into a negative-electrode active material for lithium ion secondary batteries is effective in considerably reducing output resistance.

Also preferred are lithium-titanium composite oxides in which the lithium or titanium has been replaced by one or more other metallic elements, e.g., at least one element selected from the group consisting of Na, K, Co, Al, Fe, Ti, Mg, Cr, Ga, Cu, Zn, and Nb.

Such metal oxide preferably is a lithium-titanium composite oxide represented by general formula (5) wherein $0.7 \leq x \leq 1.5$, $1.5 \leq y \leq 2.3$, and because the structure thereof is stable during lithium ion doping/undoping.

$$Li_xTi_yM_zO_4 \quad (5)$$

[In general formula (5), M represents at least one element selected from the group consisting of Na, K, Co, Al, Fe, Ti, Mg, Cr, Ga, Cu, Zn, and Nb.]

Of the compositions represented by general formula (5), structures represented by general formula (5) wherein (a) $1.2 \leq x \leq 1.4$, $1.5 \leq y \leq 1.7$, and $z=0$, $$0.9 \leq x \leq 1.1,\ 1.9 \leq y \leq 2.1,\ \text{and } z=0, \text{ or} \quad (b)$$

$$0.7 \leq x \leq 0.9,\ 2.1 \leq y \leq 2.3,\ \text{and } z=0 \quad (c)$$

are especially preferred because they bring about a satisfactory balance among battery performances.

Especially preferred typical compositions of those compounds are: $Li_{4/3}Ti_{5/3}O_4$ for (a), $Li_1Ti_2O_4$ for (b), and $Li_{4/5}Ti_{11/5}O_4$ for (c). Preferred examples of the structure wherein $z \neq 0$ include $Li_{4/3}Ti_{4/3}Al_{1/3}O_4$.

It is preferred that the lithium-titanium composite oxide for use as the negative-electrode active material in invention 1 should satisfy at least one of the following features (1) to (13) concerning properties, shape, etc., besides the requirements described above. Especially preferably, the composite oxide simultaneously satisfies two or more of the following features.

(1) BET Specific Surface Area

The BET specific surface area of the lithium-titanium composite oxide for use as the negative-electrode active material, as determined by the BET method, is preferably 0.5 m$^2$·g$^{-1}$ or larger, more preferably 0.7 m$^2$·g$^{-1}$ or larger, even more preferably 1.0 m$^2$·g$^{-1}$ or larger, especially preferably 1.5 m$^2$·g$^{-1}$ or larger, and is preferably 200 m$^2$·g$^{-1}$ or smaller, more preferably 100 m$^2$·g$^{-1}$ or smaller, even more preferably 50 m$^2$·g$^{-1}$ or smaller, especially preferably 25 m$^2$·g$^{-1}$ or smaller.

When the BET specific surface area thereof is smaller than the lower limit of that range, there are cases where use of this composite oxide as a negative-electrode material results in a reduced reaction area available for contact with the nonaqueous electrolyte and in an increase in output resistance. On the other hand, in case where the BET specific surface area thereof exceeds the upper limit of that range, the proportion of surfaces and edge faces of crystals of the titanium-containing metal oxide increases and this causes crystal deformation. There are hence cases where irreversible capacity becomes not negligible and a preferred battery is difficult to obtain.

BET specific surface area is determined with a surface area meter (a fully automatic surface area measuring apparatus manufactured by Ohukura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmosphere pressure. The specific surface area determined through this measurement is defined as the BET specific surface area of the lithium-titanium composite oxide in invention 1.

(2) Volume-Average Particle Diameter

The volume-average particle diameter (secondary-particle diameter in the case where the primary particles have aggregated to form secondary particles) of the lithium-titanium composite oxide is defined as the volume-average particle diameter (median diameter) determined by the laser diffraction/scattering method.

The volume-average particle diameter of the lithium-titanium composite oxide is generally 0.1 μm or larger, preferably 0.5 μm or larger, more preferably 0.7 μm or larger, and is generally 50 μm or smaller, preferably 40 μm or smaller, even more preferably 30 μm or smaller, especially preferably 25 μm or smaller.

Volume-average particle diameter is determined by dispersing the lithium-titanium composite powder in a 0.2% by mass aqueous solution (10 mL) of poly(oxyethylene (20)) sorbitan monolaurate as a surfactant and examining the dispersion with a laser diffraction/scattering type particle size distribution analyzer (LA-700, manufactured by HORIBA, Ltd.). The median diameter determined by this measurement is defined as the volume-average particle diameter of the carbonaceous material in invention 1.

When the volume-average particle diameter of the lithium-titanium composite oxide is smaller than the lower limit of that range, there are cases where a large amount of a binder is necessary in electrode production and this results in a decrease in battery capacity. When the volume-average particle diameter thereof exceeds the upper limit of that range, there are cases where such a composite oxide is undesirable from the standpoint of battery production because an uneven coating surface is apt to result when an electrode plate is produced.

(3) Average Primary-Particle Diameter

In the case where the primary particles have aggregated to form secondary particles, the average primary-particle diameter of the lithium-titanium composite oxide is generally 0.01 μm or larger, preferably 0.05 μm or larger, more preferably 0.1 μm or larger, especially preferably 0.2 μm or larger, and is generally 2 μm or smaller, preferably 1.6 μm or smaller, more preferably 1.3 μm or smaller, especially preferably 1 μm or smaller. In case where the volume-average primary-particle diameter thereof exceeds the upper limit of that range, spherical secondary particles are difficult to form and this adversely influences powder loading or results in a considerably reduced specific surface area. There may hence be a high possibility that battery performances such as output characteristics might decrease. When the average primary-particle diameter thereof is smaller than the lower limit of that range, crystal growth is usually insufficient and, hence, there are cases where use of this composite oxide gives a secondary battery having reduced performances, e.g., poor charge/discharge reversibility.

Primary-particle diameter is determined through an examination with a scanning electron microscope (SEM). Specifically, arbitrarily selected 50 primary-particle images in a photograph having a magnification capable of particle observation, e.g., 10,000-100,000 diameters, each are examined for the length of the longest segment of a horizontal line which extends across the primary-particle image from one side to the other side of the boundary. These measured lengths are averaged, whereby the average value can be determined.

(4) Shape

The shape of the particles of the lithium-titanium composite oxide may be any of massive, polyhedral, spherical, ellipsoidal, platy, acicular, columnar, and other shapes such as those in common use. Preferred of these is one in which the primary particles have aggregated to form secondary particles and these secondary particles have a spherical or ellipsoidal shape.

In electrochemical elements, the active material in each electrode usually expands/contracts with the charge/discharge of the element and, hence, deterioration is apt to occur, such as active-material breakage and conduction path breakage, due to the stress caused by the expansion/contraction. Because of this, an active material in which the primary particles have aggregated to form secondary particles is preferable to an active material composed of primary particles only since the particles in the former active material relieve the stress caused by expansion/contraction to prevent deterioration.

Furthermore, particles of a spherical or ellipsoidal shape are preferable to particles showing axial orientation, e.g., platy ones, because the former particles are less apt to orient during electrode molding and hence this electrode is reduced in expansion/contraction during charge/discharge, and because these particles are apt to be evenly mixed with a conductive material in electrode production.

(5) Tap Density

The tap density of the lithium-titanium composite oxide is preferably 0.05 g·cm$^{-3}$ or higher, more preferably 0.1 g·cm$^{-3}$ or higher, even more preferably 0.2 g·cm$^{-3}$ or higher, especially preferably 0.4 g·cm$^{-3}$ or higher, and is preferably 2.8 g·cm$^{-3}$ or lower, more preferably 2.4 g·cm$^{-3}$ or lower, especially preferably 2 g·cm$^{-3}$ or lower. In case where the tap density thereof is lower than the lower limit of that range, this composite oxide, when used in a negative electrode, is less apt to have a high loading density and has a reduced interparticle contact area. There are hence cases where interparticle resistance increases and output resistance increases. On the other hand, in case where the tap density thereof exceeds the upper limit of that range, the electrode has too small an amount of interparticle interstices and a reduced amount of channels for the nonaqueous electrolyte. There are hence cases where output resistance increases.

The tap density of a sample is determined by dropping the sample through a sieve having an opening size of 300 μm into a 20-cm$^3$ tapping cell to fill the cell with the sample up to the brim, subsequently conducting tapping operations 1,000 times over a stroke length of 10 mm using a powder densimeter (e.g., Tap Denser, manufactured by Seishin Enterprise Co., Ltd.), and calculating a density from the resultant volume of the sample and the weight thereof. The tap density calculated through this measurement is defined as the tap density of the lithium-titanium composite oxide in invention 1.

(6) Roundness

When the lithium-titanium composite oxide is examined for roundness as an index to the degree of sphericity thereof, the roundness thereof is preferably within the range shown below. Roundness is defined by "Roundness=(length of periphery of equivalent circle having the same area as projected particle shape)/(actual length of periphery of projected particle shape)". When a particle has a roundness of 1, this particle theoretically is a true sphere.

The closer to 1 the roundness of the lithium-titanium composite oxide, the more the particles thereof are preferred. The roundness of the composite oxide is generally 0.10 or higher, preferably 0.80 or higher, more preferably 0.85 or higher, especially preferably 0.90 or higher. The higher the roundness, the more the high-current-density charge/discharge characteristics are improved. Consequently, when the roundness of the composite oxide is lower than the lower limit of that range, there are cases where the negative-electrode active material has reduced suitability for loading and interparticle resistance is increased, resulting in reduced short-time high-current-density charge/discharge characteristics.

Roundness is determined with a flow type particle image analyzer (FPIA, manufactured by Sysmex Industrial Corp.). About 0.2 g of a sample is dispersed in a 0.2% by mass aqueous solution (about 50 mL) of poly(oxyethylene(20)) sorbitan monolaurate as a surfactant, and an ultrasonic wave of 28 kHz is propagated to the dispersion for 1 minute at an output of 60 W. Thereafter, particles having a particle diameter in the range of 3-40 μm are examined with the analyzer having a detection range set at 0.6-400 μm. The roundness determined through this measurement is defined as the roundness of the lithium-titanium composite oxide in invention 1.

(7) Aspect Ratio

The aspect ratio of the lithium-titanium composite oxide is generally 1 or higher, and is generally 5 or lower, preferably 4 or lower, more preferably 3 or lower, especially preferably 2 or lower. When the aspect ratio thereof exceeds the upper limit of that range, there are cases where this composite oxide causes streak lines in electrode plate formation and an even coating surface cannot be obtained, resulting in a decrease in short-time high-current-density charge/discharge characteristics. Incidentally, the lower limit of that range is a theoretical lower limit of the aspect ratio of lithium-titanium composite oxides.

In determining aspect ratio, particles of the lithium-titanium composite oxide are examined with a scanning electron microscope with enlargement. Fifty are arbitrarily selected from composite-oxide particles fixed to an edge face of a metal having a thickness of 50 μm or smaller, and each particle is examined in a three-dimensional manner while rotating or inclining the stage to which the sample is fixed. In this examination, the length of the longest axis A of each particle and the length of the shortest axis B perpendicular to that axis are measured, and the average of the A/B values is determined. The aspect ratio (A/B) determined through this measurement is defined as the aspect ratio of the lithium-titanium composite oxide in invention 1.

(8) Processes for Producing Negative-Electrode Active Material Processes for producing the lithium-titanium composite oxide are not particularly limited unless they depart from the spirit of invention 1. Examples thereof include several processes, and processes in general use for producing inorganic compounds may be employed.

Examples thereof include a method in which a titanium source, e.g., titanium oxide, is evenly mixed with a lithium source, e.g., LiOH, $Li_2CO_3$, or $LiNO_3$, and optionally with a source of other element (s) and this mixture is burned at a high temperature to obtain the active material.

Especially for producing spherical or ellipsoidal active materials, various techniques are usable. Examples thereof include: a method which comprises dissolving or pulverizing/dispersing a titanium source, e.g., titanium oxide, optionally together with a source of other element(s) in a solvent, e.g., water, regulating the pH of the solution or dispersion with stirring to produce a spherical precursor, recovering and optionally drying the precursor, subsequently adding thereto a lithium source, e.g., LiOH, $Li_2CO_3$, or $LiNO_3$, and burning the mixture at a high temperature to obtain the active material.

Another example is a method which comprises dissolving or pulverizing/dispersing a titanium source, e.g., titanium oxide, optionally together with a source of other element(s) in a solvent, e.g., water, drying and forming the solution or dispersion with a spray dryer or the like to obtain a spherical or ellipsoidal precursor, adding thereto a lithium source, e.g., LiOH, $Li_2CO_3$, or $LiNO_3$, and burning the mixture at a high temperature to obtain the active material.

Still another example is a method which comprises dissolving or pulverizing/dispersing a titanium source, e.g., titanium oxide, together with a lithium source, e.g., LiOH, $Li_2CO_3$, or $LiNO_3$, and optionally with a source of other element(s) in a solvent, e.g., water, drying and forming the solution or dispersion with a spray dryer or the like to obtain a spherical or ellipsoidal precursor, and burning the precursor at a high temperature to obtain the active material.

In those steps, one or more of elements other than Ti, such as, e.g., Al, Mn, Ti, V, Cr, Mn, Fe, Co, Li, Ni, Cu, Zn, Mg, Ga, Zr, C, Si, Sn, and Ag, can be caused to be present in the titanium-containing metal oxide structure and/or present so as be in contact with the titanium-containing oxide. The incorporation of such elements can be used to regulate the operating voltage and capacity of the battery.

(9) Electrode Production

Any known method can be used for electrode production. For example, a binder and a solvent are added to a negative-electrode active material optionally together with a thickener, conductive material, filler, etc. to obtain a slurry and this slurry is applied to a current collector and dried. Thereafter, the coated current collector is pressed, whereby an electrode can be formed.

The thickness of the negative-electrode active-material layer per one side in the stage just before the step of injecting a nonaqueous electrolyte in battery fabrication is generally 15 μm or larger, preferably 20 μm or larger, more preferably 30 μm or larger. The upper limit thereof desirably is 150 or smaller, preferably 120 μm or smaller, more preferably 100 or smaller.

When the thickness thereof is larger than the upper limit of that range, a nonaqueous electrolyte is less apt to infiltrate into around the interface of the current collector and, hence, there are cases where high-current-density charge/discharge characteristics decrease. When the thickness thereof is smaller than the lower limit of that range, the proportion by volume of the current collector to the negative-electrode active material increases and there are cases where battery capacity decreases. The negative-electrode active material may be roller-pressed to obtain a sheet electrode, or may be subjected to compression molding to obtain a pellet electrode.

(10) Current Collector

As the current collector for holding the negative-electrode active material, a known one can be used at will. Examples of the current collector for the negative electrode include metallic materials such as copper, nickel, stainless steel, and nickel-plated steel. Copper is especially preferred of these from the standpoints of processability and cost.

In the case where the current collector is a metallic material, examples of the shape of the current collector include metal foils, metal cylinders, metal coils, metal plates, thin metal films, expanded metals, punching metals, and metal foams. Preferred of these are metal foil films including copper (Cu) and/or aluminum (Al). More preferred are copper foils and aluminum foils. Even more preferred are a rolled copper foil, which is produced by the rolling process, and an electrolytic copper foil, which is produced by the electrolytic process. Either of these can be used as a current collector.

In the case of a copper foil having a thickness smaller than 25 μm, use can be made of a copper alloy (e.g., phosphor bronze, titanium-copper, Corson alloy, or Cu—Cr—Zr alloy) having a higher strength than pure copper. Furthermore, an aluminum foil can be advantageously used because it has a low specific gravity and, hence, use of the foil as a current collector can reduce the weight of the battery.

The current collector comprising a copper foil produced by the rolling process is less apt to crack even when the negative electrode is rolled tightly or rolled at an acute angle, because the copper crystals are oriented in the rolling direction. This current collector can be advantageously used in small cylindrical batteries.

The electrolytic copper foil is obtained by immersing a metallic drum in a nonaqueous electrolyte containing copper ions dissolved therein, causing current to flow through the system while rotating the drum to thereby deposit copper on the drum surface, and peeling the copper deposit from the drum. Copper may be deposited on a surface of the rolled copper foil by the electrolytic process. One or each side of such a copper foil may have undergone a surface-roughening treatment or a surface treatment (e.g., a chromate treatment in a thickness of from several nanometers to about 1 μm or a priming treatment with titanium).

The current collector base is desired to further have the following properties.

(10-1) Average Surface Roughness (Ra)

The average surface roughness (Ra) of that side of the current collector base on which a thin active-material film is to be formed, as determined by the method provided for in JIS B 0601-1994, is not particularly limited. However, the average surface roughness thereof is generally 0.01 μm or higher, preferably 0.03 μm or higher, and is generally 1.5 μm or lower, preferably 1.3 μm or lower, more preferably 1.0 μm or lower.

This is because when the average surface roughness (Ra) of the current collector base is within that range, satisfactory charge/discharge cycle performances can be expected. In addition, the area of the interface between the base and a thin active-material film is increased and adhesion to the thin negative-electrode active-material film is improved. The upper limit of the average surface roughness (Ra) thereof is not particularly limited. However, a current collector base having an average surface roughness (Ra) of 1.5 μm or lower is usually employed because a foil having a practical thickness for batteries and having an Ra exceeding 1.5 μm is generally difficult to procure.

(10-2) Tensile Strength

Tensile strength is a quotient obtained by dividing the maximum tensile force required before test piece breakage by the sectional area of the test piece. In invention 1, the tensile strength is determined through a measurement conducted with the same apparatus and by the same method as those described in JIS Z 2241 (Method of Metallic-Material Tensile Test).

The tensile strength of the current collector base is not particularly limited. However, it is generally 50 N·mm$^{-2}$ or higher, preferably 100 N·mm$^{-2}$ or higher, more preferably 150 N·mm$^{-2}$ or higher. The higher the tensile strength, the more the current collector base is preferred. However, it is desirable that the tensile strength thereof should be generally 1,000 N·mm$^{-2}$ or lower from the standpoint of industrial availability.

A current collector base having a high tensile strength can be inhibited from cracking with the expansion/contraction of the thin active-material film which occur upon charge/discharge. With this current collector base, satisfactory cycle performances can be obtained.

(10-3) 0.2% Proof Stress

The term 0.2% proof stress means the degree of load necessary for imparting a plastic (permanent) deformation of 0.2%. Namely, it means that application of that degree of load and subsequent removal thereof result in a 0.2% deformation. The 0.2% proof stress is determined through a measurement conducted with the same apparatus and by the same method as for tensile strength.

The 0.2% proof stress of the current collector base is not particularly limited. However, the 0.2% proof stress thereof is generally 30 N·mm$^{-2}$ or higher, preferably 100 N·mm$^{-2}$ or higher, especially preferably 150 N/mm$^2$ or higher. The higher the 0.2% proof stress, the more the current collector base is preferred. However, the 0.2% proof stress thereof is generally desirably 900 N·mm$^{-2}$ or lower from the standpoint of industrial availability.

A current collector base having a high 0.2% proof stress can be inhibited from plastically deforming with the expansion/contraction of the thin active-material film which occur upon charge/discharge. With this current collector base, satisfactory cycle performances can be obtained.

(10-4) Thickness of Current Collector

The current collector may have any desired thickness. However, the thickness thereof is generally 1 μm or larger, preferably 3 μm or larger, more preferably 5 μm or larger, and is generally 1 mm or smaller, preferably 100 μm or smaller, more preferably 50 μm or smaller.

In case where the current collector is thinner than 1 μm, this collector has reduced strength and there are hence cases where coating is difficult. When the current collector is thicker than 100 μm, there are cases where this collector deforms an electrode shape, e.g., a rolled form. The current collector may be in a mesh form.

(11) Thickness Ratio between Current Collector and Active-Material Layer

The thickness ratio between the current collector and the active-material layer is not particularly limited. However, the value of "(thickness of the active-material layer on one side just before impregnation with the nonaqueous electrolyte)/(thickness of the current collector)" is generally 150 or smaller, preferably 20 or smaller, more preferably 10 or smaller, and is generally 0.1 or larger, preferably 0.4 or larger, more preferably 1 or larger.

When the thickness ratio between the current collector and the negative-electrode active-material layer exceeds the upper limit of that range, there are cases where this current collector heats up due to Joule's heat during high-current-density charge/discharge. When that ratio decreases beyond the lower limit of that range, the proportion by volume of the current collector to the negative-electrode active material increases and this may reduce the capacity of the battery.

(12) Electrode Density

When the negative-electrode active material is used to form an electrode, the electrode structure is not particularly limited. However, the density of the active material present on the current collector is preferably 1.0 g·cm$^{-3}$ or higher, more preferably 1.2 g·cm$^{-3}$ or higher, even more preferably 1.3 g·cm$^{-3}$ or higher, especially preferably 1.5 g·cm$^{-3}$ or higher, and is preferably 3 g·cm$^{-3}$ or lower, more preferably 2.5 g·cm$^{-3}$ or lower, even more preferably 2.2 g·cm$^{-3}$ or lower, especially preferably 2 g·cm$^{-3}$ or lower.

When the density of the active material present on the current collector exceeds the upper limit of that range, there are cases where bonding between the current collector and the negative-electrode active material is weak and the active material sheds from the electrode. When the density thereof is lower than the lower limit of that range, there are cases where electrical conductivity among particles of the negative-electrode active material decreases and this increases battery resistance.

(13) Binder

The binder for binding the negative-electrode active material is not particularly limited so long as it is stable to the nonaqueous electrolyte and to the solvent to be used for electrode production.

Examples thereof include resinous polymers such as polyethylene, polypropylene, poly(ethylene terephthalate), poly(methyl methacrylate), polyimides, aromatic polyamides, cellulose, and nitrocellulose; rubbery polymers such as SBR (styrene/butadiene rubbers), isoprene rubbers, butadiene rubbers, fluororubbers, NBR (acrylonitrile/butadiene rubbers), and ethylene/propylene rubbers; styrene/butadiene/styrene block copolymers or products of hydrogenation thereof; thermoplastic elastomeric polymers such as EPDM (ethylene/propylene/diene terpolymers), styrene/ethylene/butadiene/styrene copolymers, and styrene/isoprene/styrene block copolymers and products of hydrogenation thereof; flexible resinous polymers such as syndiotactic 1,2-polybutadiene, poly(vinyl acetate), ethylene/vinyl acetate copolymers, and propylene/α-olefin copolymers; fluorochemical polymers such as poly(vinylidene fluoride), polytetrafluoroethylene, fluorinated poly(vinylidene fluoride), and polytetrafluoroethylene/ethylene copolymers; and polymer compositions having the property of conducting alkali metal ions (especially lithium ions). One of these may be used alone, or any desired combination of two or more thereof in any desired proportion may be used.

The kind of the solvent to be used for forming a slurry is not particularly limited so long as it is a solvent in which the negative-electrode active material and binder and the thickener and conductive material which are optionally used according to need can be dissolved or dispersed. Either an aqueous solvent or an organic solvent may be used.

Examples of the aqueous solvent include water and alcohols. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, dimethyl ether, hexamethylphosphoramide, dimethyl sulfoxide, benzene, xylene, quinoline, pyridine, methylnaphthalene, and hexane. Especially when an aqueous solvent is used, a dispersant or the like is added in combination with the thickener described above to prepare a slurry using a latex of, e.g., SBR. One of such ingredients may be used alone, or any desired combination of two or more thereof in any desired proportion may be used.

The proportion of the binder to the negative-electrode active material is generally 0.1% by mass or higher, preferably 0.5% by mass or higher, more preferably 0.6% by mass or higher, and is generally 20% by mass or lower, preferably 15% by mass or lower, more preferably 10% by mass or lower, especially preferably 8% by mass or lower.

In case where the proportion of the binder to the negative-electrode active material exceeds the upper limit of that range, the proportion of the binder which does not contribute to battery capacity increases and this may lead to a decrease in battery capacity. When the binder proportion is smaller than the lower limit, there are cases where the negative electrode has reduced strength and this is undesirable from the standpoint of battery fabrication step.

Especially when the binder includes a rubbery polymer represented by SBR as the main component, the proportion of this binder to the active material is generally 0.1% by mass or higher, preferably 0.5% by mass or higher, more preferably 0.6% by mass or higher, and is generally 5% by mass or lower, preferably 3% by mass or lower, more preferably 2% by mass or lower.

In the case where the binder includes a fluorochemical polymer represented by poly(vinylidene fluoride) as the main component, the proportion of this binder to the active material is 1% by mass or higher, preferably 2% by mass or higher, more preferably 3% by mass or higher, and is generally 15% by mass or lower, preferably 10% by mass or lower, more preferably 8% by mass or lower.

A thickener is used generally for the purpose of regulating the slurry viscosity. The thickener is not particularly limited. Examples thereof include carboxymethyl cellulose, methyl cellulose, hydroxymethyl cellulose, ethyl cellulose, poly(vinyl alcohol), oxidized starch, phosphorylated starch, casein, and salts of these. One of these thickeners may be used alone, or any desired combination of two or more thereof in any desired proportion may be used.

In the case where such a thickener is further added, the proportion of the thickener to the negative-electrode active material may be 0.1% by mass or higher, preferably 0.5% by mass or higher, more preferably 0.6% by mass or higher, and is generally 5% by mass or lower, preferably 3% by mass or lower, more preferably 2% by mass or lower. When the proportion thereof is lower than the lower limit of that range, there are cases where applicability decreases considerably. Proportions thereof exceeding the upper limit of that range result in a reduced proportion of the active material in the negative-electrode active-material layer, and this may pose a problem that battery capacity decreases and a problem that resistance among the particles of the negative-electrode active material increases.

<2-4 Positive Electrode>

The positive electrode for use in the nonaqueous-electrolyte secondary battery of invention 1 is explained below.

<2-4-1 Positive-Electrode Active Material>

Positive-electrode active materials usable in the positive electrode are explained below.

(1) Composition

The positive-electrode active materials are not particularly limited so long as these are capable of electrochemically occluding/releasing lithium ions. For example, however, a substance containing lithium and at least one transition metal is preferred. Examples thereof include lithium-transition metal composite oxides and lithium-containing transition metal/phosphoric acid compounds.

The transition metal in the lithium-transition metal composite oxides preferably is V, Ti, Cr, Mn, Fe, Co, Ni, Cu, or the like. Specific examples of the composite oxides include lithium-cobalt composite oxides such as $LiCoO_2$, lithium-nickel composite oxides such as $LiNiO_2$, lithium-manganese composite oxides such as $LiMnO_2$, $LiMn_2O_4$, and $Li_2MnO_4$, and ones formed by partly replacing the transition metal atom(s) as a main component of these lithium-transition metal composite oxides by one or more other metals, e.g., Al, Ti, V, Cr, Mn, Fe, Co, Li, Ni, Cu, Zn, Mg, Ga, Zr, Si, etc.

Examples of such compounds formed by replacement include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiMn_{1.8}Al_{0.2}O_4$, and $LiMn_{1.5}Ni_{0.5}O_4$.

The transition metal in the lithium-containing transition metal/phosphoric acid compounds preferably is V, Ti, Cr, Mn, Fe, Co, Ni, Cu, or the like. Specific examples of the compounds include iron phosphate compounds such as $LiFePO_4$, $Li_3Fe_2(PO_4)_3$, and $LiFeP_2O_7$, cobalt phosphate compounds such as $LiCoPO_4$, and ones formed by partly replacing the transition metal atom(s) as a main component of these lithium-transition metal/phosphoric acid compounds by one or more other metals, e.g., Al, Ti, V, Cr, Mn, Fe, Co, Li, Ni, Cu, Zn, Mg, Ga, Zr, Nb, Si, etc.

(2) Surface Coating

Use may be made of a material including any of those positive-electrode active materials and, adherent to the surface thereof, a substance (hereinafter abbreviated to "surface-adherent substance") having a composition different from that of the substance constituting the core positive-electrode active material. Examples of the surface-adherent substance include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium, sulfate, and aluminum sulfate, and carbonates such as lithium carbonate, calcium carbonate, and magnesium carbonate.

Those surface-adherent substances each can be adhered to the surface of a positive-electrode active material, for example, by: a method in which the substance is dissolved or suspended in a solvent and this solution or suspension is infiltrated into a positive-electrode active material and then dried; a method in which a precursor for the surface-adherent substance is dissolved or suspended in a solvent and this solution or suspension is infiltrated into a positive-electrode active material and then heated or otherwise treated to react the precursor; or a method in which the substance is added to a precursor for a positive-electrode active material and heat-treated together with the precursor.

The mass of the surface-adherent substance adherent to the surface of the positive-electrode active material is generally 0.1 ppm or larger, preferably 1 ppm or larger, more preferably 10 ppm or larger, in terms of mass ppm of the positive-electrode active material. The amount thereof is generally 20% or smaller, preferably 10% or smaller, more preferably 5% or smaller, based on the mass of the positive-electrode active material.

The surface-adherent substance serves to inhibit the nonaqueous electrolyte from undergoing an oxidation reaction on the surface of the positive-electrode active material, whereby the battery life can be improved. However, in case where the amount of the substance adhered is smaller than the lower limit of that range, that effect is not sufficiently produced. On the other hand, amounts thereof exceeding the upper limit of that range may result in an increase in resistance because the surface-adherent substance inhibits the occlusion/release of lithium ions. Consequently, that range is preferred.

(3) Shape

The shape of the particles of the positive-electrode active material may be any of massive, polyhedral, spherical, ellipsoidal, platy, acicular, columnar, and other shapes such as those in common use. Preferred of these is one in which the primary particles have aggregated to form secondary particles and these secondary particles have a spherical or ellipsoidal shape.

The reasons for that are as follows. In electrochemical elements, the active material in each electrode usually expands/contracts with the charge/discharge of the element and, hence, deterioration is apt to occur, such as active-material breakage and conduction path breakage, due to the stress caused by the expansion/contraction. Consequently, a positive-electrode active material in which the primary particles have aggregated to form secondary particles is preferable to an active material composed of primary particles only since the particles in the former active material relieve the stress caused by expansion/contraction to prevent deterioration.

Furthermore, particles of a spherical or ellipsoidal shape are preferable to particles showing axial orientation, e.g., platy ones, because the former particles are less apt to orient during electrode molding and hence this electrode is reduced in expansion/contraction during charge/discharge, and because these particles are apt to be evenly mixed with a conductive material in electrode production.

(4) Tap Density

The tap density of the positive-electrode active material is generally 1.3 g·cm$^{-3}$ or higher, preferably 1.5 g·cm$^{-3}$ or higher, more preferably 1.6 g·cm$^{-3}$ or higher, especially preferably 1.7 g·cm$^{-3}$ or higher, and is generally 2.5 g·cm$^{-3}$ or lower, preferably 2.4 g·cm$^{-3}$ or lower.

By using a metal composite oxide powder having a high tap density, a positive-electrode active-material layer having a high density can be formed. Consequently, when the tap density of the positive-electrode active material is lower than the lower limit of that range, not only it is necessary to use a larger amount of a dispersion medium and larger amounts of a conductive material and a binder in forming a positive-electrode active-material layer. There are hence cases where the loading of the positive-electrode active material in the positive-electrode active-material layer is limited, resulting in a limited battery capacity. The higher the tap density, the more the positive-electrode active material is generally preferred. There is no particular upper limit on the tap density. However, when the tap density thereof is lower than that range, there are cases where the diffusion of lithium ions in the positive-electrode active-material layer through the nonaqueous electrolyte as a medium becomes a rate-determining stage and this is apt to reduce load characteristics.

The tap density of a sample is determined by dropping the sample through a sieve having an opening size of 300 μm into a 20-cm$^3$ tapping cell to fill the capacity of the cell with the sample, subsequently conducting tapping operations 1,000 times over a stroke length of 10 mm using a powder densimeter (e.g., Tap Denser, manufactured by Seishin Enterprise Co., Ltd.), and determining a density from the resultant volume of the sample and the weight thereof. The tap density determined through this measurement is defined as the tap density of the positive-electrode active material in invention 1.

(5) Median Diameter d50

The median diameter d50 (secondary-particle diameter in the case where the primary particles have aggregated to form secondary particles) of the particles of the positive-electrode active material can be determined also with a laser diffraction/scattering type particle size distribution analyzer.

The median diameter d50 thereof is generally 0.1 μm or larger, preferably 0.5 μm or larger, more preferably 1 μm or larger, especially preferably 3 μm or larger, and is generally 20 μm or smaller, preferably 18 μm or smaller, more preferably 16 μm or smaller, especially preferably 15 μm or smaller. When the median diameter d50 thereof is smaller than the lower limit of that range, there are cases where a product having a high bulk density cannot be obtained. When the median diameter thereof exceeds the upper limit of that range, lithium diffusion in the individual particles requires a longer time and this results in a decrease in battery performance. In addition, there are cases where such positive-electrode active-material particles, when used in producing a positive electrode for batteries, i.e., when the active material and other ingredients including a conductive material and a binder are slurried with a solvent and this slurry is applied in a thin-film form, pose a problem, for example, that streak lines generate.

It is possible to further improve loading in positive-electrode production by mixing two or more positive-electrode active materials differing in median diameter d50.

In determining median diameter d50, a 0.1% by mass aqueous solution of sodium hexametaphosphate is used as a dispersion medium. LA-920, manufactured by HORIBA, Ltd., is used as a particle size distribution analyzer to conduct a five-minute ultrasonic dispersing treatment, before the particles are examined at a measuring refractive index set at 1.24.

(6) Average Primary-Particle Diameter

In the case where the primary particles have aggregated to form secondary particles, the average primary-particle diameter of this positive-electrode active material is generally 0.01 μm or larger, preferably 0.05 μm or larger, more preferably 0.08 μm or larger, especially preferably 0.1 μm or larger, and is generally 3 μm or smaller, preferably 2 μm or smaller, more preferably 1 μm or smaller, especially preferably 0.6 μm or smaller. In case where the average primary-particle diameter thereof exceeds the upper limit of that range, spherical secondary particles are difficult to form and this adversely influences powder loading or results in a considerably reduced specific surface area. There may hence be a high possibility that battery performances such as output characteristics might decrease. When the average primary-particle diameter thereof is smaller than the lower limit of that range, crystal growth is usually insufficient and, hence, there are cases where use of this positive-electrode active material gives a secondary battery having reduced performances, e.g., poor charge/discharge reversibility.

Average primary-particle diameter is determined through an examination with a scanning electron microscope (SEM). Specifically, arbitrarily selected 50 primary-particle images in a photograph having a magnification of 10,000 diameters each are examined for the length of the longest segment of a horizontal line which extends across the primary-particle image from one side to the other side of the boundary. These measured lengths are averaged, whereby the average value can be determined.

(7) BET Specific Surface Area

The BET specific surface area of the positive-electrode active material, in terms of the value of specific surface area as determined by the BET method, is generally 0.2 $m^2 \cdot g^{-1}$ or larger, preferably 0.3 $m^2 \cdot g^{-1}$ or larger, more preferably 0.4 $m^2 \cdot g^{-1}$ or larger, and is generally 4.0 $m^2 \cdot g^{-1}$ or smaller, preferably 2.5 $m^2 \cdot g^{-1}$ or smaller, more preferably 1.5 $m^2 \cdot g^{-1}$ or smaller. In case where the BET specific surface area thereof is smaller than the lower limit of that range, battery performances are apt to decrease. In case where the BET specific surface area thereof exceeds the upper limit of that range, a high tap density is difficult to obtain and there are cases where applicability in forming a positive-electrode active-material layer is poor.

BET specific surface area is measured with a surface area meter (a fully automatic surface area measuring apparatus manufactured by Ohukura Riken Co., Ltd.). The specific surface area is determined by preliminarily drying a sample at 150° C. for 30 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmosphere pressure. The specific surface area determined through this measurement is defined as the BET specific surface area of the positive-electrode active material in invention 1.

(8) Processes for Producing Positive-Electrode Active Material

Processes for producing positive-electrode active materials are not particularly limited unless the processes depart from the spirit of invention 1. Examples thereof include several processes. Techniques which are in general use for producing inorganic compounds may be employed.

Especially for producing spherical or ellipsoidal active materials, various techniques are usable. Examples thereof include: a method which comprises dissolving or pulverizing/dispersing a transition metal source, e.g., a transition metal nitrate or sulfate, optionally together with a source of other element(s) in a solvent, e.g., water, regulating the pH of the solution or dispersion with stirring to produce a spherical precursor, recovering and optionally drying the precursor, subsequently adding thereto a lithium source, e.g., LiOH, $Li_2CO_3$, or $LiNO_3$, and burning the mixture at a high temperature to obtain the active material.

Another example is a method which comprises dissolving or pulverizing/dispersing a transition metal source, e.g., a transition metal nitrate, sulfate, hydroxide, or oxide, optionally together with a source of other element(s) in a solvent, e.g., water, drying and forming the solution or dispersion with a spray dryer or the like to obtain a spherical or ellipsoidal precursor, adding thereto a lithium source, e.g., LiOH, $Li_2CO_3$, or $LiNO_3$, and burning the mixture at a high temperature to obtain the active material.

Still another example is a method which comprises dissolving or pulverizing/dispersing a transition metal source, e.g., a transition metal nitrate, sulfate, hydroxide, or oxide, together with a lithium source, e.g., LiOH, $Li_2CO_3$, or $LiNO_3$, and optionally with a source of other element(s) in a solvent, e.g., water, drying and forming the solution or dispersion with a spray dryer or the like to obtain a spherical or ellipsoidal precursor, and burning the precursor at a high temperature to obtain the active material.

<2-4-2 Electrode Structure and Production Process>

The constitution of the positive electrode to be used in invention 1 and a process for producing the electrode will be described below.

(1) Process for Producing Positive Electrode

The positive electrode is produced by forming a positive-electrode active-material layer including particles of a positive-electrode active material and a binder on a current collector. The production of the positive electrode with a positive-electrode active material can be conducted in an ordinary manner. Namely, a positive-electrode active material and a binder are mixed together by a dry process optionally together with a conductive material, thickener, etc. and this mixture is formed into a sheet and press-bonded to a positive-electrode current collector. Alternatively, those materials are dissolved or dispersed in a liquid medium to obtain a slurry and this slurry is applied to a positive-electrode current collector and dried. Thus, a positive-electrode active-material layer is formed on the current collector, whereby the positive electrode can be obtained.

The content of the positive-electrode active material in the positive-electrode active-material layer is generally 10% by mass or higher, preferably 30% by mass or higher, especially preferably 50% by mass or higher, and is generally 99.9% by mass or lower, preferably 99% by mass or lower. The reasons for this are as follows. When the content of the positive-electrode active material in the positive-electrode active-material layer is lower than the lower limit of that range, there are cases where an insufficient electrical capacity results. When the content thereof exceeds the upper limit of that range, there are cases where the positive electrode has insufficient strength. One positive-electrode active-material powder may be used alone in invention 1, or any desired combination of two or more positive-electrode active materials differing in composition or powder properties may be used in any desired proportion.

(2) Conductive Material

As the conductive material, a known conductive material can be used at will. Examples thereof include metallic materials such as copper and nickel; graphites such as natural graphites and artificial graphites; carbon blacks such as acetylene black; and carbon materials such as amorphous carbon, e.g., needle coke. One of these materials may be used alone, or any desired combination of two or more thereof in any desired proportion may be used.

The conductive material may be used so that it is incorporated in the positive-electrode active-material layer in an amount of generally 0.01% by mass or larger, preferably 0.1% by mass or larger, more preferably 1% by mass or larger, and of generally 50% by mass or lower, preferably 30% by mass or lower, more preferably 15% by mass or lower. When the content thereof is lower than the lower limit of that range, there are cases where electrical conductivity becomes insufficient. Conversely, when the content thereof exceeds the upper limit of that range, there are cases where battery capacity decreases.

(3) Binder

The binder to be used for producing the positive-electrode active-material layer is not particularly limited so long as the binder is stable to the nonaqueous electrolyte and to the solvent to be used for electrode production.

In the case where the layer is to be formed through coating fluid application, any binder may be used so long as it is a material which is soluble or dispersible in the liquid medium for use in electrode production. Examples thereof include resinous polymers such as polyethylene, polypropylene, poly(ethylene terephthalate), poly(methyl methacrylate), aromatic polyamides, cellulose, and nitrocellulose; rubbery polymers such as SBR (styrene/butadiene rubbers), NBR (acrylonitrile/butadiene rubbers), fluororubbers, isoprene rubbers, butadiene rubbers, and ethylene/propylene rubbers; thermoplastic elastomeric polymers such as styrene/butadiene/styrene block copolymers or products of hydrogenation thereof, EPDM (ethylene/propylene/diene terpolymers), styrene/ethylene/butadiene/ethylene copolymers, and styrene/isoprene/styrene block copolymers or products of hydrogenation thereof; flexible resinous polymers such as syndiotactic 1,2-polybutadiene, poly(vinyl acetate), ethylene/vinyl acetate copolymers, and propylene/α-olefin copolymers; fluorochemical polymers such as poly(vinylidene fluoride) (PVdF), polytetrafluoroethylene, fluorinated poly(vinylidene fluoride), and polytetrafluoroethylene/ethylene copolymers; and polymer compositions having the property of conducting alkali metal ions (especially lithium ions). One of these substances may be used alone, or any desired combination of two or more thereof in any desired proportion may be used.

The proportion of the binder in the positive-electrode active-material layer is generally 0.1% by mass or higher, preferably 1% by mass or higher, more preferably 3% by mass or higher, and is generally 80% by mass or lower, preferably 60% by mass or lower, more preferably 40% by mass or lower, especially preferably 10% by mass or lower. When the proportion of the binder is lower than the lower limit of that range, there are cases where the positive-electrode active material cannot be sufficiently held and the positive electrode has insufficient mechanical strength to impair battery performances such as cycle performances. When the proportion thereof is higher than the upper limit of that range, there are cases where such high proportions lead to a decrease in battery capacity or conductivity.

(4) Liquid Medium

The kind of the liquid medium to be used for forming a slurry is not particularly limited so long as it is a solvent in which the positive-electrode active material, conductive material, and binder and a thickener, which is used according to need, can be dissolved or dispersed. Either an aqueous solvent or an organic solvent may be used.

Examples of the aqueous medium include water and mixed solvents including an alcohol and water. Examples of the organic medium include aliphatic hydrocarbons such as hexane; aromatic hydrocarbons such as benzene, toluene, xylene, and methylnaphthalene; heterocyclic compounds such as quinoline and pyridine; ketones such as acetone, methyl ethyl ketone, and cyclohexanone; esters such as methyl acetate and methyl acrylate; amines such as diethylenetriamine and N,N-dimethylaminopropylamine; ethers such as diethyl ether and tetrahydrofuran (THF); amides such as N-methylpyrrolidone (NMP), dimethylformamide, and dimethylacetamide; and aprotic polar solvents such as hexamethylphosphoramide and dimethyl sulfoxide. One of these liquid media may be used alone, or any desired combination of two or more thereof in any desired proportion may be used.

(5) Thickener

When an aqueous medium is used as a liquid medium for forming a slurry, it is preferred to use a thickener and a latex of, e.g., a styrene/butadiene rubber (SBR) to prepare a slurry. A thickener is used generally for the purpose of regulating the viscosity of the slurry.

The thickener is not particularly limited unless it considerably lessens the effects of invention 1. Examples thereof include carboxymethyl cellulose, methyl cellulose, hydroxymethyl cellulose, ethyl cellulose, poly(vinyl alcohol), oxidized starch, phosphorylated starch, casein, and salts of these. One of these thickeners may be used alone, or any desired combination of two or more thereof in any desired proportion may be used.

In the case where such a thickener is further used, the proportion of the thickener to the active material desirably is generally 0.1% by mass or higher, preferably 0.5% by mass or higher, more preferably 0.6% by mass or higher, and is generally 5% by mass or lower, preferably 3% by mass or lower, more preferably 2% by mass or lower. When the proportion thereof is lower than the lower limit of that range, there are cases where applicability decreases considerably. Proportions thereof exceeding the upper limit of that range result in a reduced proportion of the active material in the positive-electrode active-material layer, and this may pose a problem that battery capacity decreases and a problem that resistance among the particles of the positive-electrode active material increases.

(6) Compaction

It is preferred that the positive-electrode active-material layer obtained by coating fluid application and drying should be compacted with a handpress, roller press, or the like in order to heighten the loading density of the positive-electrode active material. The density of the positive-electrode active-material layer is preferably 1 g·cm$^{-3}$ or higher, more preferably 1.5 g·cm$^{-3}$ or higher, especially preferably 2 g·cm$^{-3}$ or higher, and is preferably 4 g·cm$^{-3}$ or lower, more preferably 3.5 g·cm$^{-3}$ or lower, especially preferably 3 g·cm$^{-3}$ or lower.

When the density of the positive-electrode active-material layer exceeds the upper limit of that range, the infiltration of a nonaqueous electrolyte into around the current collector/active material interface is reduced and there are cases where charge/discharge characteristics especially at a high current density decrease. When the density thereof is lower than the lower limit of that range, there are cases where electrical conductivity among the active-material particles decreases to increase battery resistance.

(7) Current Collector

The material of the positive-electrode current collector is not particularly limited, and a known one can be used at will. Examples thereof include metallic materials such as aluminum, stainless steel, nickel-plated materials, titanium, and tantalum; and carbonaceous materials such as carbon cloths and carbon papers. Of these, metallic materials are preferred. Especially preferred is aluminum.

In the case of a metallic material, examples of the shape of the current collector include metal foils, metal cylinders, metal coils, metal plates, thin metal films, expanded metals, punching metals, and metal foams. In the case of a carbonaceous material, examples of the collector shape include carbon plates, thin carbon films, and carbon cylinders. Of these, a thin metal film is preferred. The thin film may be in a suitable mesh form.

Although the current collector may have any desired thickness, the thickness thereof is generally 1 μm or larger, preferably 3 μm or larger, more preferably 5 μm or larger, and is generally 1 mm or smaller, preferably 100 μm or smaller, more preferably 50 μm or smaller. When the thin film is thinner than the lower limit of that range, there are cases where this film is deficient in strength required of a current collector. When the thin film is thicker than the upper limit of that range, there are cases where this film has impaired handleability.

<2-5. Separator>

A separator is generally interposed between the positive electrode and the negative electrode in order to prevent short-circuiting. In this case, the nonaqueous electrolyte of invention 1 is usually infiltrated into the separator.

The material and shape of the separator are not particularly limited, and known separators can be employed at will unless the effects of invention 1 are considerably lessened thereby. In particular, use may be made of separators constituted of materials stable to the nonaqueous electrolyte of invention 1, such as resins, glass fibers, and inorganic materials. It is preferred to use a separator which is in the form of a porous sheet, nonwoven fabric, or the like and has excellent liquid retentivity.

As the material of the resinous or glass-fiber separators, use can be made of, for example, polyolefins such as polyethylene and polypropylene, polytetrafluoroethylene, polyethersulfones, glass filters, and the like. Preferred of these are glass filters and polyolefins. More preferred are polyolefins. One of these materials may be used alone, or any desired combination of two or more thereof in any desired proportion may be used.

The separator may have any desired thickness. However, the thickness thereof is generally 1 μm or larger, preferably 5 μm or larger, more preferably 10 μm or larger, and is generally 50 μm or smaller, preferably 40 μm or smaller, more preferably 30 μm or smaller. When the separator is thinner than the lower limit of that range, there are cases where insulating properties and mechanical strength decrease. When the separator is thicker than the upper limit of that range, there are cases where battery performances including rate characteristics decrease. In addition, there also are cases where use of such a separator gives a nonaqueous-electrolyte secondary battery which as a whole has a reduced energy density.

In the case where a porous material such as, e.g., a porous sheet or a nonwoven fabric is used as the separator, this separator may have any desired porosity. However, the porosity thereof is generally 20% or higher, preferably 35% or higher, more preferably 45% or higher, and is generally 90% or lower, preferably 85% or lower, more preferably 75% or lower. In case where the porosity thereof is lower than the lower limit of that range, this separator tends to have increased film resistance, resulting in impaired rate characteristics. In case where the porosity thereof is higher than the upper limit of that range, this separator tends to have reduced mechanical strength and reduced insulating properties.

The separator may have any desired average pore diameter. However, the average pore diameter thereof is generally 0.5 μm or smaller, preferably 0.2 μm or smaller, and is generally 0.05 μm or larger. In case where the average pore diameter thereof exceeds the upper limit of that range, short-circuiting is apt to occur. When the average pore diameter thereof is smaller than the lower limit of that range, there are cases where this separator has increased film resistance, resulting in reduced rate characteristics.

On the other hand, examples of the inorganic materials which may be used include oxides such as alumina and silicon dioxide, nitrides such as aluminum nitride and silicon nitride, and sulfates such as barium sulfate and calcium sulfate. Such materials of a particulate shape or fibrous shape may be used.

With respect to form, a separator of a thin film form may be used, such as a nonwoven fabric, woven fabric, or microporous film. Suitable ones of a thin film form have a pore diameter of 0.01-1 μm and a thickness of 5-50 μm. Besides such a separator in an independent thin film form, use can be made of a separator obtained by forming a composite porous layer containing particles of the inorganic material on a surface layer of the positive electrode and/or negative electrode with a resinous binder. Examples of such separators include a porous layer formed by fixing alumina particles having a 90% particle diameter smaller than 1 μm on both sides of the positive electrode with a fluororesin as a binder.

<2-6. Battery Design>
[Electrode Group]

The electrode group may be either of: one having a multilayer structure in which the positive-electrode plate and negative-electrode plate described above have been superposed through the separator described above; and one having a wound structure in which the positive-electrode plate and negative-electrode plate described above have been spirally wound through the separator described above. The proportion of the volume of the electrode group to the internal volume of the battery (hereinafter referred to as electrode group proportion) is generally 40% or higher, preferably 50% or higher, and is generally 90% or lower, preferably 80% or lower. In case where the electrode group proportion is lower than the lower limit of that range, a decrease in battery capacity results. In case where the electrode group proportion exceeds the upper limit of that range, this battery has a reduced space volume. There are hence cases where battery heating-up causes members to expand and a liquid component of the electrolyte to have a heightened vapor pressure, resulting in an increased internal pressure. This battery is reduced in various characteristics including charge/discharge cycling performance and high-temperature storability, and there are even cases where the gas release valve, which releases the gas from the internal pressure, works.

[Current Collector Structure]

The current collector structure is not particularly limited. However, for more effectively realizing the improvement in discharge characteristics which is brought about by the nonaqueous electrolyte of invention 1, it is preferred to employ a structure reduced in the resistance of wiring parts and joint parts. In the case where internal resistance has been reduced in this manner, use of the nonaqueous electrolyte of Invention 1 produces its effects especially satisfactorily.

In the case of electrode groups assembled into the multilayer structure described above, a structure obtained by bundling the metallic core parts of respective electrode layers and welding the bundled parts to a terminal is suitable. When each electrode has a large area, this results in increased internal resistance. In this case, it is preferred to dispose two or more terminals in each electrode to reduce the resistance. In the case of an electrode group having the wound structure described above, two or more lead structures may be disposed on each of the positive electrode and negative electrode and bundled into a terminal, whereby internal resistance can be reduced.

[Case]

The material of the case is not particularly limited so long as it is a substance stable to the nonaqueous electrolyte to be used. For example, use may be made of metals such as nickel-plated steel sheets, stainless steel, aluminum or aluminum alloys, and magnesium alloys or laminated films constituted of a resin and an aluminum foil. From the standpoint of weight reduction, it is preferred to use a metal which is aluminum or an aluminum alloy or a laminated film.

Examples of the case made of such a metal include one of a sealed structure formed by fusion-bonding metallic members to each other by laser welding, resistance welding, or ultrasonic welding and one of a caulked structure obtained by caulking members of the metal through a resinous gasket. Examples of the case made of the laminated film include one of a sealed structure formed by thermally fusion-bonding resin layers to each other. For the purpose of enhancing sealability, a resin different from the resin used in the laminated film may be interposed between the resin layers. Especially when resin layers are to be thermally fusion-bonded to each other through a current collector terminal to produce a sealed structure, metal/resin bonding is necessary and, hence, a resin having polar groups or a modified resin having polar groups introduced therein is suitable for use as the resin to be interposed.

[Protective Element]

Examples of the protective element include a PTC (positive temperature coefficient), which increases in resistance upon abnormal heating-up or when an excessive current flows, a temperature fuse, a thermister, and a valve (current breaker valve) which breaks current flow through the circuit in abnormal heating-up based on an abrupt increase in the internal pressure or internal temperature of the battery. It is preferred to select such a protective element which does not work under ordinary high-current use conditions. From the standpoint of high output, it is preferred to employ a design which prevents abnormal heating-up and thermal run-away even without a protective element.

[Casing]

The nonaqueous-electrolyte secondary battery of invention 1 is usually fabricated by housing the nonaqueous electrolyte, negative electrode, positive electrode, separator, etc. in a casing. This casing is not limited, and a known one can be employed at will unless this considerably lessens the effects of invention 1.

The casing may be made of any desired material. For example, however, nickel-plated iron, stainless steel, aluminum or an alloy thereof, nickel, titanium, or the like is generally used.

The casing may have any desired shape. For example, the casing may be any of the cylindrical type, prismatic type, laminate type, coin type, large type, and the like.

<Nonaqueous Electrolyte 1-1 and Nonaqueous-Electrolyte Secondary Battery 1-1>

[1. Nonaqueous Electrolyte 1-1]

The nonaqueous electrolyte of invention 1-1 is a nonaqueous electrolyte comprising a nonaqueous solvent and an electrolyte dissolved therein, and is characterized by containing a monofluorophosphate and/or a difluorophosphate and further containing at least one iron-group element in an amount of from 0.001 ppm to 1 ppm, excluding 1 ppm, of the whole nonaqueous electrolyte.

<Iron-Group Element>

In the nonaqueous electrolyte of invention 1-1, the coexistence of the monofluorophosphate and/or difluorophosphate with an iron-group element contained in a specific concentration produces a synergistic effect, whereby cycle performances especially under the conditions of a high voltage exceeding 4.2 V, which is the upper-limit use voltage of ordinary nonaqueous-electrolyte secondary batteries, can be greatly improved.

Factors in the production of such synergistic effect have not been elucidated in detail. Although the scope of invention 1-1 is not construed as being limited by the factors, it is thought that the factors are the same as in invention 1.

The content of the iron-group element in invention 1-1 is generally 0.001 ppm or higher, preferably 0.002 ppm or higher, more preferably 0.003 ppm or higher, especially preferably 0.005 ppm or higher, most preferably 0.01 ppm or higher, and is generally lower than 1 ppm, based on the whole nonaqueous electrolyte. When the content thereof is lower than the lower limit of that range, there are cases where the effect of this invention described above is hardly produced. Incidentally, in the case where two or more iron-group elements of invention 1-1 are used in combination, these iron-group elements are used so that the total concentration thereof is within that range.

In invention 1-1, an iron-group element may be added, during the preparation of the nonaqueous electrolyte, as, e.g., any of the iron-group element compounds enumerated above. However, an iron-group element may be generated in an electrolyte. In the case where an iron-group element has been generated in an electrolyte, the content of the iron-group element in the nonaqueous electrolyte can be determined by the same methods as those described in invention 1. However, especially in microanalysis for determining an iron-group element concentration of 1 ppm or lower, "inductively coupled plasma/mass spectrometry (ICP-MS)" is effective, which is a combination of ICP emission spectrometry and mass spectrometry.

With respect to the iron-group element, the statements given under <1-4-1. Kind of Iron-group element> in invention 1 apply.

With respect to the compounds for use in the nonaqueous electrolyte of invention 1-1, such as the electrolyte, nonaqueous solvent, monofluorophosphate, difluorophosphate, and usable additives, the usable ranges, preferred compounds, preferred amounts, production processes, and the like are the same as those described above with regard to invention 1.

[2. Nonaqueous-Electrolyte Secondary Battery 1-1]

The nonaqueous-electrolyte secondary battery of invention 1-1 includes a negative electrode and a positive electrode which are capable of occluding and releasing ions and the nonaqueous electrolyte of invention 1-1 described above.

Except for the content of the iron-group element, the nonaqueous-electrolyte secondary battery of invention 1-1 is the same as the nonaqueous-electrolyte secondary battery of invention 1 described above.

<Nonaqueous Electrolyte 2 and Nonaqueous-Electrolyte Secondary Battery 2>

[1. Nonaqueous Electrolyte for Secondary Battery]

The nonaqueous electrolyte for secondary batteries of invention 2 is a nonaqueous electrolyte mainly comprising a nonaqueous solvent and an electrolyte dissolved therein, and is characterized by containing at least one compound selected from the group consisting of saturated chain hydrocarbons, saturated cyclic hydrocarbons, aromatic compounds having a halogen atom, and ethers having a fluorine atom (hereinafter referred to as "compounds of invention 2"), and by further containing a monofluorophosphate and/or a difluorophosphate.

<1-1. Electrolyte>

The electrolyte to be used in the nonaqueous electrolyte of invention 2 is not limited, and known ones for use as electrolytes in a target nonaqueous-electrolyte secondary battery can be employed and incorporated at will. In the case where the nonaqueous electrolyte of invention 2 is to be used in nonaqueous-electrolyte secondary batteries, the electrolyte preferably is one or more lithium salts.

Examples of the electrolyte include the same electrolytes as those shown above with regard to invention 1.

Preferred of these are $LiPF_6$, $LiBF_4$, $LiCF_3SO_3$, $LiN(CF_3SO_2)_2$, $LiN(C_2F_5SO_2)_2$, and lithium bis(oxalato)borate. Especially preferred is $LiPF_6$ or $LiBF_4$.

In the case of using a combination of electrolytes, the kinds of the electrolytes and the proportions of the electrolytes are the same as those described above with regard to invention 1.

Furthermore, the lithium salt concentration, preferred concentration, and the like in the final composition of the nonaqueous electrolyte of invention 2 are the same as those described above with regard to invention 1. The phenomena which occur when the concentration is outside the range also are the same as those described above with regard to invention 1.

Especially in the case where the nonaqueous solvent of the nonaqueous electrolyte consists mainly of one or more carbonate compounds such as alkylene carbonates or dialkyl carbonates, preferred electrolytes and the proportion thereof are also the same as those described above with regard to invention 1. The phenomena which occur when the proportion is outside the range also are the same as those described above with regard to invention 1.

In the case where the nonaqueous solvent of this nonaqueous electrolyte includes at least 50% by volume cyclic carboxylic acid ester compound such as, e.g., γ-butyrolactone or γ-valerolactone, the kind and content of the electrolyte may also be the same as those described above with regard to invention 1.

<1-2. Nonaqueous Solvent>

The nonaqueous solvent contained in the nonaqueous electrolyte of invention 2 is the same as that described above with regard to the nonaqueous solvent contained in the nonaqueous electrolyte of invention 1.

<1-3. Compounds of Invention 2>

The "compounds of invention 2" are at least one compound selected from the group consisting of saturated chain hydrocarbons, saturated cyclic hydrocarbons, aromatic compounds having a halogen atom, and ethers having a fluorine atom. Of these, saturated cyclic hydrocarbons or ethers having a fluorine atom are prepared because these compounds bring about a large increase in output characteristics. One compound selected from the compounds of invention 2 may be used alone, or any desired combination of two or more compounds selected therefrom may be used. Each of the compounds constituting the "compounds of invention 2" in invention 2 are explained below in more detail.

<1-3-1. Saturated Chain Hydrocarbons>

The saturated chain hydrocarbons are not particularly limited. From the standpoint of handleability, however, ones which are liquid at ordinary temperature and ones which have low toxicity are preferred. From the standpoint of battery characteristics, ones having a relatively low molecular weight are preferred. More specifically, ones having 5-20 carbon atoms are preferred, and ones having 7-16 carbon atoms are especially preferred.

For example, pentane, hexane, heptane, octane, nonane, decane, undecane, dodecane, tridecane, tetradecane, pentadecane, hexadecane, heptadecane, octadecene, nonadecane, or eicosane is preferred. Especially preferred is heptane, octane, nonane, decane, undecane, dodecane, tridecane, tetradecane, pentadecane, or hexadecane. These saturated chain hydrocarbons may be linear ones or branched ones. These saturated chain hydrocarbons may be used alone or in any desired combination of two or more thereof.

<1-3-2. Saturated Cyclic Hydrocarbons>

The saturated cyclic hydrocarbons are not particularly limited. However, ones having 3-20 carbon atoms are preferred, and ones having 5-16 carbon atoms are especially preferred.

For example, cyclopropane, cyclobutane, cyclopentane, cyclohexane, cycloheptane, cyclooctane, cyclononane, cyclodecane, cycloundecane, cyclododecane, cyclotridecane, cyclotetradecane, cyclopentadecane, cyclohexadecane, cycloheptadecane, cyclooctadecane, cyclononadecane, or cycloeicosane is preferred. Especially preferred is cyclopentane, cyclohexane, cycloheptane, cyclooctane, cyclononane, cyclodecane, cycloundecane, cyclododecane, cyclotridecane, cyclotetradecane, cyclopentadecane, or cyclohexadecane.

These saturated cyclic hydrocarbons may have one or more linear alkyl groups in the molecule. Although such linear alkyl groups are not limited, alkyl groups having 1-8 carbon atoms are preferred. Examples thereof include methyl, ethyl, propyl, butyl, pentyl, hexyl, heptyl, or octyl. A most preferred example of the saturated cyclic hydrocarbons is cyclohexane. Those saturated cyclic hydrocarbons may be used alone or in any desired combination of two or more thereof.

<1-3-3. Aromatic Compounds Having Halogen Atom(s)>

The aromatic compounds having a halogen atom are not particularly limited. However, the halogen atoms preferably are fluorine or chlorine atoms, and especially preferably are fluorine atoms. The halogen atoms may have been directly bonded to the aromatic ring, or may be contained in a substituent.

Examples of the aromatic compounds having a halogen atom include fluorobenzene, chlorobenzene, 1,2-difluorobenzene, 1,3-difluorobenzene, 1,4-difluorobenzene, 1,2-dichlorobenzene, 1,3-dichlorobenzene, 1,4-dichlorobenzene, 1,2,4-trifluorobenzene, 1,3,5-trifluorobenzene, 1,2,4,6-tetrafluorobenzene, hexafluorobenzene, 2-fluorotoluene, 3-fluorotoluene, 4-fluorotoluene, fluoromethylbenzene, difluoromethylbenzene, trifluoromethylbenzene, 2-fluoro-1-trifluoromethylbenzene, 4-fluoro-1-trifluoromethylbenzene, 2-fluorobiphenyl, o-cyclohexylfluorobenzene, and p-cyclohexylfluorobenzene. Preferred is fluorobenzene, 2-fluorotoluene, 4-fluorotoluene, or trifluoromethylbenzene. These "aromatic compounds having a halogen atom" may be used alone or in any desired combination of two or more thereof.

<1-3-4. Ethers Having Fluorine Atom(s)>

The ethers having a fluorine atom are not particularly limited. When ethers are expressed by the general formula "$R^5$—O—$R^6$", then the "ethers having a fluorine atom" are compounds in which at least either of the groups $R^5$ and $R^6$ contain one or more fluorine atoms. On the assumption that $R^5$ is the group containing one or more fluorine atoms, it is preferred that the $R^5$ should be an alkyl group having 1-20 carbon atoms and substituted with 1-30 fluorine atoms.

Preferred examples of such ethers include
fluoromethyl, difluoromethyl, trifluoromethyl;
1-fluoroethyl, 2-fluoroethyl, 1,1-difluoroethyl, 1,2-difluoroethyl, 2,2-difluoroethyl, 1,1,2-trifluoroethyl, 1,2,2-trifluoroethyl, 2,2,2-trifluoroethyl, 1,1,2,2-tetrafluoroethyl, 1,2,2,2-tetrafluoroethyl, pentafluoroethyl;
3-fluoropropyl, 3,3-difluoropropyl, 3,3,3-trifluoropropyl, 2,2,3,3,3-pentafluoropropyl, heptafluoropropyl;
4-fluorobutyl, 4,4-difluorobutyl, 4,4,4-trifluorobutyl, 3,3,4,4-pentafluorobutyl, 2,2,3,3,4,4,4-heptafluorobutyl, nonafluorobutyl;
5-fluoropentyl, 5,5-difluoropentyl, 5,5,5-trifluoropentyl, 4,4,5,5,5-pentafluoropentyl, 3,3,4,4,5,5,5-heptafluoropentyl, 2,2,3,3,4,4,5,5,5-nonafluoropentyl, undecafluoropentyl;
6-fluorohexyl, 6,6-difluorohexyl, 6,6,6-trifluorohexyl, and tridecafluorohexyl.

It is preferred that $R^6$ should be an alkyl group which has 1-20 carbon atoms and may have been substituted with substituents, e.g., halogens. Besides the fluorine-containing alkyl groups enumerated above with regard to $R^5$, examples of $R^6$ include ordinary chain alkyl groups (which may be linear or branched), such as methyl, ethyl, propyl, butyl, pentyl, hexyl, heptyl, octyl, nonyl, decyl, undecyl, and dodecyl, alkyl groups containing a halogen other than fluorine, and cycloalkyl groups such as cyclohexyl.

Specific examples of the fluorine-containing ethers include 2-fluoroethyl ethyl ether, bis(2-fluoroethyl)ether, 2,2,2-trifluoroethyl ethyl ether, bis(2,2,2-trifluoroethyl) ether, bis(pentafluoroethyl)ether, 3-fluoropropyl methyl ether, 3-fluoropropyl fluoromethyl ether, 3-fluoropropyl trifluoromethyl ether, 3-fluoropropyl ethyl ether, 3-fluoropropyl-2-fluoroethyl ether, 3,3,3-trifluoropropyl methyl ether, 3,3,3-trifluoropropyl ethyl ether, 3,3,3-trifluoropropyl-2-fluoroethyl ether, 3,3,3-trifluoropropyl-2,2,2-trifluoroethyl ether, heptafluoropropyl methyl ether, heptafluoropropyl ethyl ether, heptafluoropropyl-2,2,2-trifluoroethyl ether, heptafluoropropyl pentafluoroethyl ether, 4-fluorobutyl methyl ether, 4-fluorobutyl ethyl ether, 4-fluorobutyl-2-fluoroethyl ether, 4,4,4-trifluorobutyl ethyl ether, 4,4,4-trifluorobutyl-2-fluoroethyl ether, 4,4,4-trifluorobutyl-2,2,2-trifluoroethyl ether, 4,4,4-trifluorobutylpentafluoroethyl ether, nonafluorobutyl methyl ether, nonafluorobutyl ethyl ether, nonafluorobutyl-2-fluoroethyl ether, nonafluorobutyl-2,2,2-trifluoroethyl ether, and nonafluorobutyl pentafluoroethyl ether.

Preferred of these is 2-fluoroethyl ethyl ether, bis(2-fluoroethyl)ether, 2,2,2-trifluoroethyl ethyl ether, bis(2,2,2-trifluoroethyl)ether, heptafluoropropyl ethyl ether, or nonafluorobutyl ethyl ether. These fluorine-containing ethers may be used alone or in any desired combination of two or more thereof.

<1-3-5. Content>

The content of the "compounds of invention 2" based on the whole nonaqueous electrolyte is not particularly limited. From the standpoint of battery characteristics, however, the content thereof is preferably 0.01% by mass or higher, more preferably 0.1% by mass or higher, especially preferably 0.3% by mass or higher. On the other hand, the upper limit thereof is preferably 15% by mass or lower, more preferably 12% by mass or lower, especially preferably 10% by mass or lower. When the content thereof is too low, there are cases where the excellent effect of improving "output" and "output after cycling" possessed by the "monofluorophosphate and/or difluorophosphate" which will be described below cannot be enhanced.

<1-4. Monofluorophosphate and Difluorophosphate>

The "monofluorophosphate and/or difluorophosphate" to be used in invention 2 is the same as in invention 1. Preferred ranges also are the same as in invention 1.

<1-4-1. Monofluorophosphoric Acid Metal Salt and Difluorophosphoric Acid Metal Salt>

First, in the case where the monofluorophosphate and difluorophosphate in invention 2 are a salt of one or more monofluorophosphate ions or one or more difluorophosphate ions with one or more specific metal ions, examples of this salt include the same salts as those enumerated above with regard to invention 1.

<1-4-2. Monofluorophosphoric Acid Quaternary Onium Salt and Difluorophosphoric Acid Quaternary Onium Salt>

Next, in the case where the monofluorophosphate and difluorophosphate in invention 2 are a salt of a monofluorophosphate ion or difluorophosphate ion with a quaternary onium, examples of this salt include the same salts as those enumerated above with regard to invention 1.

<1-4-3. Content, Detection (Derivation of Containment), Technical Range, Etc.>

In the nonaqueous electrolyte of invention 2, one monofluorophosphate or difluorophosphate only may be used or any desired combination of two or more monofluorophosphates and/or difluorophosphates may be used in any desired proportion. However, from the standpoint of efficiently operating the nonaqueous-electrolyte secondary battery, it is preferred to use one monofluorophosphate or difluorophosphate.

The molecular weight of the monofluorophosphate or difluorophosphate, processes for producing the salt, proportion of the salt in the nonaqueous electrolyte, etc. are the same as those described above with regard to invention 1.

Furthermore, the time at which a monofluorophosphate or difluorophosphate is detected (the time at which the salt is contained), the place into which the salt is incorporated first (derivation of containment), means of incorporating the salt, detection places based on which the salt is considered to be contained (or have been contained) in the nonaqueous electrolyte, etc. are also the same as those described above with regard to invention 1.

<1-5. Additives>

The nonaqueous electrolyte of invention 2 may contain various additives so long as these additives do not considerably lessen the effects of invention 2. In the case where additives are additionally incorporated to prepare the nonaqueous electrolyte, conventionally known additives can be used at will. One additive may be used alone, or any desired combination of two or more additives in any desired proportion may be used.

Examples of the additives include overcharge inhibitors and aids for improving capacity retention after high-temperature storage and cycle performances. It is preferred to add a carbonate having at least one of an unsaturated bond and a halogen atom (hereinafter sometimes referred to as "specific carbonate") as an aid for improving capacity retention after high-temperature storage and cycle performances, among those additives.

<1-5-1. Specific Carbonate>

Examples of the specific carbonate include the same carbonates as those enumerated above with regard to invention 1.

<1-5-2. Other Additives>

Additives other than the specific carbonate are explained below. Examples of the additives other than the specific carbonate include overcharge inhibitors and aids for improving capacity retention after high-temperature storage and cycle performances.

<1-5-2-1. Overcharge Inhibitors>

Examples of the overcharge inhibitors include aromatic compounds including: toluene and derivatives thereof, such as toluene and xylene;
unsubstituted biphenyl or alkyl-substituted biphenyl derivatives, such as biphenyl, 2-methylbiphenyl, 3-methylbiphenyl, and 4-methylbiphenyl;
unsubstituted terphenyls or alkyl-substituted terphenyl derivatives, such as o-terphenyl, m-terphenyl, and p-terphenyl;
partly hydrogenated unsubstituted terphenyls or partly hydrogenated alkyl-substituted terphenyl derivatives;
cycloalkylbenzenes and derivatives thereof, such as cyclopentylbenzene and cyclohexylbenzene;
alkylbenzene derivatives having one or more tertiary carbon atoms directly bonded to the benzene ring, such as cumene, 1,3-diisopropylbenzene, and 1,4-diisopropylbenzene;
alkylbenzene derivatives having a quaternary carbon atom directly bonded to the benzene ring, such as t-butylbenzene, t-amylbenzene, and t-hexylbenzene; and
aromatic compounds having an oxygen atom, such as diphenyl ether and dibenzofuran.

One of those overcharge inhibitors may be used alone, or any desired combination of two or more thereof may be used in any desired proportion. In the case of employing any desired combination, compounds in the same class among those enumerated above may be used in combination or compounds in different classes may be used in combination.

Examples of the case where compounds in different classes are used in combination are the same as in invention 1.

In the case where the nonaqueous electrolyte of invention 2 contains an overcharge inhibitor, the concentration and effect thereof are the same as in invention 1.

<1-5-2-2. Aids>

Examples of the aids for improving capacity retention after high-temperature storage and cycle performances include:
the anhydrides of dicarboxylic acids such as succinic acid, maleic acid, and phthalic acid;
carbonate compounds other than the specific carbonates, such as erythritan carbonate and spiro-bis-dimethylene carbonate;
sulfur-containing compounds such as ethylene sulfite, 1,3-propanesultone, 1,4-butanesultone, methyl methanesulfonate, busulfan, sulfolane, sulfolene, dimethyl sulfone, diphenyl sulfone, methyl phenyl sulfone, dibutyl disulfide, dicyclohexyl disulfide, tetramethylthiuram monosulfide, N,N-dimethylmethanesulfonamide, and N,N-diethylmethanesulfonamide;
nitrogen-containing compounds such as 1-methyl-2-pyrrolidinone, 1-methyl-2-piperidone, 3-methyl-2-oxazolidinone, and 1,3-dimethyl-2-imidazolidinone, and N-methylsuccinimide.

<1-6. Process for Producing Nonaqueous Electrolyte>

For producing nonaqueous electrolyte 2, the same process as in invention 1 can be used.

[2. Nonaqueous-Electrolyte Secondary Battery]

The nonaqueous-electrolyte secondary battery of invention 2 includes: a negative electrode and a positive electrode which are capable of occluding and releasing ions; and the nonaqueous electrolyte of invention 2 described above.

The following are the same as those described above with regard to invention 1: battery constitution; negative electrode; carbonaceous material; constitution and properties of carbonaceous negative electrode and method of preparation thereof; metal compound material, constitution and properties of negative electrode employing metal compound material, and method of preparation thereof; positive electrode; separator; battery design; and the like.

<Function>

Use of the nonaqueous electrolyte according to invention 2, which contains both of a compound selected from the "compounds of invention 2" and a monofluorophosphate and/or difluorophosphate, enables the nonaqueous-electrolyte secondary battery to show high output characteristics. Although the mechanism by which such effect is brought about is not clear, the following is thought. However, invention 2 should not be construed as being limited by the following mechanism. As will be demonstrated by "Comparative Example 6 for Invention 2" given later, a certain degree of high output is obtained even when a difluorophosphate only is contained. On the other hand, when a compound selected from the "compounds of invention 2" is incorporated alone, no clear effect is observed, as will be demonstrated by "Comparative Examples 2 to 5 for Invention 2". Consequently, it is thought that the compound selected from the "compounds of invention 2" in invention 2 helps the effect of the monofluorophosphate and difluorophosphate. Specifically, it is thought that the compound leads the monofluorophosphate and/or difluorophosphate, which improves output based on interaction with each electrode, to inner parts of the electrode active-material layer to enhance the interaction with the electrode.

<Nonaqueous Electrolyte 3 and Nonaqueous-Electrolyte Secondary Battery 3>

[1. Nonaqueous Electrolyte]

Like ordinary nonaqueous electrolytes, the nonaqueous electrolyte of invention 3 includes an electrolyte and a nonaqueous solvent containing the electrolyte dissolved therein.

<1-1. Electrolyte>

The electrolyte to be contained in the nonaqueous electrolyte of invention 3 is not limited, and known ones for use as electrolytes in a target nonaqueous-electrolyte secondary battery can be employed and mixed at will. In the case where the nonaqueous electrolyte of invention 3 is to be used in lithium ion secondary batteries, it is preferred to use one or more lithium salts.

Examples of the electrolyte include the same electrolytes as those shown above with regard to invention 1.

Preferred of these are $LiPF_6$, $LiBF_4$, $LiCF_3SO_3$, $LiN(CF_3SO_2)$ $LiN(C_2F_5SO_2)_2$, and lithium bis(oxalato)borate. Especially preferred is $LiPF_6$ or $LiBF_4$.

In the case of using a combination of electrolytes, the kinds of the electrolytes and the proportions of the electrolytes are the same as those described above with regard to the nonaqueous electrolyte of invention 1.

Furthermore, the lithium salt concentration, preferred concentration, and the like in the final composition of the nonaqueous electrolyte of invention 3 are the same as those described above with regard to nonaqueous electrolyte 1. The phenomena which occur when the concentration is outside the range also are the same as those described above with regard to nonaqueous electrolyte 1.

Especially in the case where the nonaqueous solvent of the nonaqueous electrolyte consists mainly of one or more carbonate compounds such as alkylene carbonates or dialkyl carbonates, preferred electrolytes and the proportion thereof are also the same as those described above with regard to the nonaqueous electrolyte of invention 1. The phenomena which occur when the proportion is outside the range also are the same as those described above with regard to the nonaqueous electrolyte of invention 1.

In the case where the nonaqueous solvent of this nonaqueous electrolyte includes at least 50% by volume cyclic carboxylic acid ester compound such as, e.g., γ-butyrolactone or γ-valerolactone, the kind and content of the electrolyte may also be the same as those described above with regard to invention 1.

<1-2. Compound Represented by General Formula (1)>

In invention 3, the compound represented by general formula (1) is the following compound.

[Chemical Formula-7]

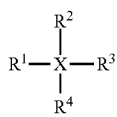

(1)

[$R^1$, $R^2$, $R^3$, and $R^4$ each independently are an organic group or a halogen atom, provided that at least one of the $R^1$, $R^2$, $R^3$, and $R^4$ is a group in which the atom directly bonded to the X is a heteroatom and that two or more of the $R^1$, $R^2$, $R^3$, and $R^4$ may be the same. X is an atom other than a carbon atom.]

In general formula (1) in invention 3, X is not particularly limited so long as it is an atom other than a carbon atom. However, in view of stability in the nonaqueous electrolyte, etc., a silicon atom or a titanium atom is preferred.

$R^1$, $R^2$, $R^3$, and $R^4$ each independently represent an organic group or a halogen atom. The organic group is not particularly limited. Examples of the "organic group" in which the atom directly bonded to the X is a carbon atom include alkyl, alkenyl, and alkynyl groups which may have one or more substituents. The number of carbon atoms of each of these organic groups is more preferably 1-10.

Specifically, examples of the alkyl groups include methyl, ethyl, propyl, butyl, pentyl, hexyl, heptyl, octyl, isopropyl, isobutyl, 2-methylpropyl, 1-methylbutyl, 2-methylbutyl, 3-methylbutyl, 1,2-dimethylpropyl, and neopentyl. Examples of the alkenyl groups include vinyl, allyl, isopropenyl, 1-propenyl, butenyl, butadienyl, and pentenyl. Examples of the alkynyl groups include ethynyl, 1-propionyl, 1-butynyl, 1-pentynyl, 2-propionyl, 2-butynyl, and 3-butynyl.

The substituents of these groups are not particularly limited. Examples thereof include a fluorine atom, chlorine atom, methacryloxy, mercapto, alkylamino groups, arylamino groups, glycidoxy, benzoyloxy, and acetyloxy.

Examples of the halogen atom include fluorine, chlorine, bromine, and iodine atoms. Especially preferred is a chlorine atom or a fluorine atom.

At least one of the $R^1$, $R^2$, $R^3$, and $R^4$ is a group in which the atom directly bonded to the X is a heteroatom. The heteroatom is not particularly limited so long as it is an atom other than a carbon atom. However, B, N, O, P, S, or halogen atoms are preferred because these atoms bring about high reactivity and, as a result, can impart excellent cycle performances. Especially preferred of these is a halogen atom, oxygen atom, or nitrogen atom.

In the case where the "group in which the atom directly bonded to the X is a heteroatom" is a group in which the heteroatom is an oxygen atom, examples of this group include alkoxy groups such as methoxy, ethoxy, propoxy, butoxy, pentoxy, isopropoxy, 1-methylpropoxy, 2-methylpropoxy, and tert-butoxy; and benzoyloxy and acetyloxy. In the case where the heteroatom is a nitrogen atom, examples of the group include dimethylamino, diethylamino, and ethylmethylamino. Of these, alkoxy groups such as methoxy, ethoxy, propoxy, and butoxy are more preferred for the same reason as shown above.

The "group in which the atom directly bonded to the X is a heteroatom" may be a halogen atom. In this case, the halogen atom preferably is a fluorine atom, chlorine atom, bromine atom, or iodine atom. A chlorine atom is more preferred for the same reason as shown above.

The "group in which the atom directly bonded to the X is a heteroatom" may have one or more substituents. However, an alkoxy group having no substituents or a chlorine atom is especially preferred for the same reason as shown above.

In the compound represented by general formula (1) in invention 3, at least one of the $R^1$, $R^2$, $R^3$, and $R^4$ is a group in which the atom directly bonded to the X is a heteroatom. It is, however, preferred that at least two of the $R^1$, $R^2$, $R^3$, and $R^4$ each should be a group in which the atom directly bonded to the X is a heteroatom. It is especially preferred that two or three of the $R^1$, $R^2$, $R^3$, and $R^4$ each should be a "group in which the atom directly bonded to the X is a heteroatom". In this case, a nonaqueous electrolyte for secondary batteries which has excellent cycle performances can be obtained.

The reasons for this are as follows. When an electrode interacts with the "groups in which the atom directly bonded to the X is a heteroatom", there are cases where the interaction therebetween is weak when the number of the "groups in which the atom directly bonded to the X is a heteroatom" is too small. On the other hand, especially when all of the four groups $R^1$, $R^2$, $R^3$, and $R^4$ are "groups in which the atom directly bonded to the X is a heteroatom", there are cases where sufficient electrode stabilization cannot be attained because there is no group which interacts with the nonaqueous electrolyte.

In general formula (1), two or more of the $R^1$, $R^2$, $R^3$, and $R^4$ may be the same.

Examples of the compound represented by general formula (1) in invention 3 include vinyltrichlorosilane, vinyltrimethoxysilane, vinyltriethoxysilane, vinyltris(β-methoxyethoxy)silane, 3-methacryloxypropyltriethoxysilane, 3-methacryloxypropylmethyldimethoxysilane, 3-methacryloxypropylmethyldiethoxysilane, 3-methacryloxypropyltrimethoxysilane, 2-methacryloxypropyltrimethoxysilane, 3-chloropropyltrimethoxysilane, 3-mercaptopropyltrimethoxysilane, N-(2-aminoethyl)-γaminopropyltrimethoxysilane, N-(2-aminoethyl)-γaminopropyltriethoxysilane, N-(2-aminoethyl)-γaminopropylmethyldimethoxysilane, 3-aminopropyltrimethoxysilane, 3-aminopropyltriethoxysilane, N-phenyl-3-aminopropyltrimethoxysilane, 3-glycidoxypropyltrimethoxysilane, 3-glycidoxypropyltriethoxysilane, (2-n-butoxycarbonylbenzoyloxy)tributoxytitanium, diisopropoxytitanium diisostearate, and titanium stearate. One of these compounds may be used alone, or two or more thereof may be used in combination.

In the case where X is titanium, organotitanium chelate compounds and the like are also preferred in which a chelating compound such as, e.g., acetylacetone or an alkyl acetoacetate has coordinated to the titanium. One of these compounds may be used alone, or two or more thereof may be used in combination.

<1-3. Compound Represented by General Formula (2)>

In invention 3, the compound represented by general formula (2) is the following compound.

[Chemical Formula-8]

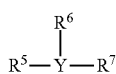

(2)

[$R^5$, $R^6$, and $R^7$ each independently are an organic group or a halogen atom, provided that at least one of $R^5$, $R^6$, and $R^7$ is a group in which the atom directly bonded to the Y is a heteroatom (including a halogen atom) and that two or more of the $R^5$, $R^6$, and $R^7$ may be the same. Y is an atom other than a carbon atom.]

$R^5$, $R^6$, and $R^7$ in general formula (2) in invention 3 each independently are an organic group or a halogen atom. With respect to this organic group or halogen atom, the same statements given above with regard to general formula (1) hold. Furthermore, at least one of the $R^5$, $R^6$, and $R^7$ is a group in which the atom directly bonded to the Y is a heteroatom. With respect to the "heteroatom" and the "group in which the atom directly bonded to the Y is a heteroatom" also, the same statements given above with regard to general formula (1) hold.

Y in general formula (2) in invention 3 preferably is an aluminum atom in view of stability in the electrolyte, etc.

Although at least one of the $R^5$, $R^6$, and $R^7$ is a "group in which the atom directly bonded to the Y is a heteroatom", it is preferred that just two of these should be ones in which the atom directly bonded to the Y is a heteroatom. In this case, a nonaqueous electrolyte for secondary batteries which has excellent cycle performances can be obtained.

The reasons for this are as follows. When an electrode interacts with the "groups in which the atom directly bonded to the Y is a heteroatom", there are cases where the interaction therebetween is too weak when the proportion of the "group in which the atom directly bonded to the Y is a heteroatom" in the $R^5$, $R^6$, and $R^7$ is too small. On the other hand, when all of the three groups $R^1$, $R^2$, and $R^3$ are "groups in which the atom directly bonded to the Y is a heteroatom", there are cases where sufficient electrode stabilization cannot be attained because there is no group which interacts with the nonaqueous electrolyte.

In general formula (2), two or more of the $R^5$, $R^6$, and $R^7$ may be the same.

Examples of the compound represented by general formula (2) in invention 3 include acetylacetonatodiisopropylaluminum. One of such compounds may be used alone, or two or more thereof may be used in combination.

Examples thereof further include organoaluminum chelate compounds in which a chelating compound other than acetylacetone as in the example shown above, such as, e.g., an alkyl acetoacetate, has coordinated to the aluminum. One of these compounds may be used alone, or two or more thereof may be used in combination.

<1-4. Content of Compound Represented by General Formula (1) and Compound Represented by General Formula (2)>

It is preferred that the compound represented by general formula (1) in invention 3 and the compound represented by general formula (2) in invention 3 should be contained in a total proportion of from 0.001% by mass to 10% by mass based on the whole nonaqueous electrolyte. The total proportion of these compounds is especially preferably from 0.01% by mass to 5% by mass. In case where the proportion of these compounds to the whole nonaqueous electrolyte is too low, the effect of the addition thereof cannot be sufficiently produced. There are hence cases where a nonaqueous electrolyte for secondary batteries which has excellent cycle performances cannot be obtained. On the other hand, when the proportion thereof is too high, there are cases where battery capacity is impaired by the reaction of the compounds themselves.

It is preferred that in preparing the nonaqueous electrolyte, the compounds represented by general formula (1) or general formula (2) should be incorporated in mass amounts corresponding to from 0.001% by mass to 10% by mass in terms of the total amount thereof based on the whole nonaqueous electrolyte. Especially preferably, the compounds are incorporated in mass amounts corresponding to form 0.01% by mass to 5% by mass to prepare the nonaqueous electrolyte.

<1-5. Nonaqueous Solvent>

The nonaqueous solvent contained in the nonaqueous electrolyte of invention 3 is the same as the nonaqueous solvent contained in the nonaqueous electrolyte of invention 1.

<1-6. Monofluorophosphate and Difluorophosphate>

The nonaqueous electrolyte of invention 3 contains a monofluorophosphate and/or difluorophosphate as an essential component. The "monofluorophosphate and/or difluorophosphate" to be used in invention 3 is the same as the "monofluorophosphate and/or difluorophosphate" used in invention 1.

<1-6-1. Monofluorophosphoric Acid Metal Salt and Difluorophosphoric Acid Metal Salt>

Also in the case where the monofluorophosphate and difluorophosphate in invention 3 are a salt of one or more monofluorophosphate ions or one or more difluorophosphate ions with one or more specific metal ions (respectively referred to as "monofluorophosphoric acid metal salt" and "difluorophosphoric acid metal salt"), these salts are the same as in invention 1.

<1-6-2. Monofluorophosphoric Acid Quaternary Onium Salt and Difluorophosphoric Acid Quaternary Onium Salt>

Also in the case where the monofluorophosphate and difluorophosphate in invention 3 are a salt of a monofluorophosphate ion or difluorophosphate ion with a quaternary onium (respectively referred to as "monofluorophosphoric acid quaternary onium salt" and "difluorophosphoric acid quaternary onium salt"), these salts are the same as in invention 1.

<1-6-3. Content, Detection (Derivation of Containment), Technical Range, Etc.>

In the nonaqueous electrolyte of invention 3, one monofluorophosphate or difluorophosphate only may be used or any desired combination of two or more monofluorophosphates and/or difluorophosphates may be used in any desired proportion. However, from the standpoint of efficiently operating the nonaqueous-electrolyte secondary battery, it is preferred to use one monofluorophosphate or difluorophosphate.

The molecular weight of the monofluorophosphate or difluorophosphate, processes for producing the salt, proportion of the salt in the nonaqueous electrolyte, etc. are the same as those described above with regard to invention 1.

Furthermore, the time at which a monofluorophosphate or difluorophosphate is detected (the time at which the salt is contained), the place into which the salt is incorporated first (derivation of containment), means of incorporating the salt, detection places based on which the salt is considered to be contained (or have been contained) in the nonaqueous electrolyte, etc. are also the same as those described above with regard to invention 1.

<1-7. Additives>

The nonaqueous electrolyte of invention 3 may contain various additives so long as these additives do not considerably lessen the effects of invention 3. In the case where additives are additionally incorporated to prepare the nonaqueous electrolyte, conventionally known additives can be used at will. One additive may be used alone, or any desired combination of two or more additives in any desired proportion may be used.

Examples of the additives include overcharge inhibitors and aids for improving capacity retention after high-temperature storage and cycle performances. It is preferred to add a carbonate having at least one of an unsaturated bond and a halogen atom (hereinafter sometimes referred to as "specific carbonate") as an aid for improving capacity retention after high-temperature storage and cycle performances, among those additives.

<1-7-1. Specific Carbonate>

Examples of the specific carbonate are the same as in invention 1.

<1-7-2. Other Additives>

Examples of additives other than the specific carbonate include overcharge inhibitors and aids for improving capacity retention after high-temperature storage and cycle performances. Examples of the overcharge inhibitors, the concentration and effect thereof, and examples of the aids are the same as those described above with regard to invention 1.

<1-6. Process for Producing Nonaqueous Electrolyte>

For producing nonaqueous electrolyte 3, the same process as in invention 1 can be used.

[2. Nonaqueous-Electrolyte Secondary Battery]

The nonaqueous-electrolyte secondary battery of invention 3 is constituted of the nonaqueous electrolyte of invention 3 described above and a positive electrode and a negative electrode which are capable of occluding and releasing ions. The nonaqueous-electrolyte secondary battery of invention 3 may have other constitutions.

The following are the same as those described above with regard to invention 1: battery constitution; negative electrode; carbonaceous material; constitution and properties of carbonaceous negative electrode and method of preparation thereof; metal compound material, constitution and properties of negative electrode employing metal compound material, and method of preparation thereof; positive electrode; separator; battery design; and the like. The negative-electrode active material is not particularly limited so long as the active material is capable of electrochemically occluding/releasing lithium ions. Examples thereof include a carbonaceous material, an alloy material, and a lithium-containing metal composite oxide material. Examples of the carbonaceous material, alloy material, metal compound material, and lithium-containing metal composite oxide material, the constitution and properties of negative electrodes respectively employing these materials, and the method of preparation thereof are the same as those described above with regard to invention 1.

<Treatment of Electrode>

It is preferred that the nonaqueous electrolyte of invention 3 should be used in a nonaqueous-electrolyte secondary battery including a positive electrode or negative electrode which has been treated with one or more compounds represented by general formula (1) and/or general formula (2) in invention 3, from the standpoints, for example, that the battery provided can have excellent cycle performances and that reactions occurring on the electrode surface can be inhibited.

Methods for treating a positive electrode or negative electrode with at least one member selected from the group consisting of compounds represented by general formula (1) and compounds represented by general formula (2) in invention 3 are not particularly limited. However, it is preferred to use a method in which a compound represented by general formula (1) and/or a compound represented by general formula (2) in invention 3 is evenly distributed on the electrode surface. Specifically, a method in which the electrode is immersed in or coated with a liquid obtained by dissolving or dispersing a compound represented by general formula (1) and/or a compound represented by general formula (2) according to invention 3 in a solvent or dispersion medium is especially preferred.

To treat a positive-electrode active material or a negative-electrode active material is also possible. This case also is included in the conception "treatment of a positive electrode or a negative electrode" in invention 3. In this case, the treatment can be accomplished by mixing a positive-electrode active material or negative-electrode active material with a liquid obtained by dissolving or dispersing a compound represented by general formula (1) and/or a compound represented by general formula (2) according to invention 3 in a solvent or dispersion medium. The active material which has been thus treated may be used to produce a positive electrode or negative electrode. It is preferred that the electrode which has been treated should be subjected to a heat treatment in order to enhance interaction between the compound represented by general formula (1) and/or compound represented by general formula (2) in invention 3 and the electrode or electrode active material. The heat treatment is conducted preferably at 45° C.-300° C., more preferably at 60° C.-200° C.

<Nonaqueous Electrolyte 4 and Nonaqueous-Electrolyte Secondary Battery 4>

[1. Nonaqueous Electrolyte]

Like ordinary nonaqueous electrolytes, the nonaqueous electrolyte of invention 4 includes an electrolyte salt and a nonaqueous solvent containing the electrolyte salt dissolved therein.

<1-1> Lithium Salt

The lithium salt to be contained in the nonaqueous electrolyte of invention 4 is not limited, and known ones for use as electrolyte salts in a target nonaqueous-electrolyte secondary battery can be employed at will. Examples of the lithium salt include the same lithium salts as those enumerated above as examples of the electrolyte salt in invention 1.

In the case of using a combination of lithium salts, the kinds of the electrolytes and the proportions of the lithium salts are the same as those described above with regard to the electrolyte salt of nonaqueous electrolyte 1.

Furthermore, the lithium salt concentration, preferred concentration, and the like in the final composition of nonaqueous electrolyte 4 of invention 4 are the same as those described above with regard to nonaqueous electrolyte 1. The phenomena which occur when the concentration is outside the range also are the same as those described above with regard to nonaqueous electrolyte 1.

Especially in the case where the nonaqueous solvent of the nonaqueous electrolyte consists mainly of one or more carbonate compounds such as alkylene carbonates or dialkyl carbonates, preferred electrolytes and the proportion thereof are also the same as those described above with regard to nonaqueous electrolyte 1. The phenomena which occur when the proportion is outside the range also are the same as those described above with regard to nonaqueous electrolyte 1.

<1-2. Nonaqueous Solvent>

The nonaqueous solvent contained in the nonaqueous electrolyte of invention 4 is the same as that described above with regard to the nonaqueous solvent contained in the nonaqueous electrolyte of invention 1.

<1-3> Additives

It is essential that the nonaqueous electrolyte of invention 4 should contain a compound represented by the following general formula (1). It is preferred that the nonaqueous electrolyte should further contain a monofluorophosphate and/or difluorophosphate. It is also preferred that the nonaqueous electrolyte should contain a carbonic acid ester having at least one of an unsaturated bond and/or a halogen atom. Namely, in embodiment 4-1 of invention 4, the nonaqueous electrolyte contains a compound represented by the following general formula (1) and a "monofluorophosphate and/or difluorophosphate" as additives. In embodiment 4-2 of invention 4, the nonaqueous electrolyte contains a compound represented by general formula (1) in an amount of from 0.001% by mass to 5% by mass based on the whole nonaqueous electrolyte and further contains a "carbonic acid ester having at least one of an unsaturated bond and a halogen atom" in an amount of from 0.001% by mass to 5% by mass based on the whole nonaqueous electrolyte.

<1-3-1> Compound Represented by General Formula (3)

The nonaqueous electrolyte of invention 4, either in embodiment 4-1 or in embodiment 4-2, contains a compound represented by the following general formula (3) in invention 4 as an essential component.

[Chemical Formula-9]

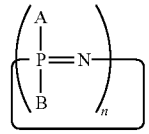

(3)

[In general formula (3), A and B each represent any of various substituents, provided that at least one thereof is fluorine; and n is a natural number of 3 or larger.]

In general formula (3) in invention 4, A and B each represents any of various substituents, provided that at least one thereof is fluorine. Although the substituents other than fluorine are not particularly limited, unsubstituted or fluorine-substituted alkyl or aryl groups are preferred because of the reactivity thereof. It is also preferred that such an alkyl or aryl group should be bonded to the P through an oxygen atom interposed there between, i.e., through an ether bond. Namely, such alkyl or aryl groups to which an oxygen atom has been bonded are also preferred.

The number of carbon atoms of the alkyl and aryl groups is not particularly limited. However, in case where the structural or mass proportion of the substituents to the basic framework represented by general formula (3) increases, the effect of the addition of the compound represented by general formula (3) is lessened for the amount thereof and there is a fear about side effects. Because of this, the substituents other than fluorine preferably are alkyl or aryl groups having preferably 10 or less carbon atoms, more preferably 6 or less carbon atoms. With respect to the alkyl groups only, the number of carbon atoms thereof is even more preferably 3 or smaller.

Examples of the alkyl groups include methyl, fluoromethyl, difluoromethyl, trifluoromethyl, ethyl, 1-fluoroethyl, 2-fluoroethyl, 1,1-difluoroethyl, 1,2-difluoroethyl, 2,2-difluoroethyl, 1,1,2-trifluoroethyl, 1,2,2-trifluoroethyl, 2,2,2-trifluoroethyl, 1,1,2,2-tetrafluoroethyl, 1,2,2,2-tetrafluoroethyl, pentafluoroethyl, propyl (n-propyl), 1-fluoropropyl, 2-fluoropropyl, 3-fluoropropyl, 1,1-difluoropropyl, 1,2-difluoropropyl, 1,3-difluoropropyl, 2,2-difluoropropyl, 2,3-difluoropropyl, 3,3-difluoropropyl, 1,1,2-trifluoropropyl, 1,2,2-trifluoropropyl, 1,1,3-trifluoropropyl, 1,2,3-trifluoropropyl, 1,3,3-trifluoropropyl, 2,2,3-trifluoropropyl, 2,3,3-trifluoropropyl, 3,3,3-trifluoropropyl, 1,1,2,2-tetrafluoropropyl, 1,1,2,3-tetrafluoropropyl, 1,1,3,3-tetrafluoropropyl, 1,2,2,3-tetrafluoropropyl, 1,2,3,3-tetrafluoropropyl, 2,2,3,3-tetrafluoropropyl, 2,3,3,3-tetrafluoropropyl, 1,1,2,2,3-pentafluoropropyl, 1,2,2,3,3-pentafluoropropyl, 1,1,3,3,3-pentafluoropropyl, 1,2,3,3,3-pentafluoropropyl, 2,2,3,3,3-pentafluoropropyl, 1,1,2,2,3,3-hexafluoropropyl, 1,1,2,3,3,3-hexafluoropropyl, 1,2,2,3,3,3-hexafluoropropyl, heptafluoropropyl, 1-methylethyl (isopropyl), 1-fluoro-1-methylethyl, 2-fluoro-1-methylethyl, 1,2-difluoro-1-methylethyl, 1,2-difluoro-1-(fluoromethyl)ethyl, 1,2,2-trifluoro-1- methylethyl, 2,2,2-trifluoro-1-methylethyl, 2,2-difluoro-1-(fluoromethyl)ethyl, 1,2,2,2-tetrafluoro-1-methylethyl, 1,2,2-trifluoro-1-(fluoromethyl)ethyl, 2,2,2-trifluoro-1-(fluoromethyl)ethyl, 2,2-difluoro-1-(difluoromethyl)ethyl, 1,2,2,2-tetrafluoro-1-(fluoromethyl)ethyl, 1,2,2-trifluoro-1-(difluoromethyl)ethyl, 2,2,2-trifluoro-1-(difluoromethyl)ethyl, 1,2,2,2-tetrafluoro-1-(difluoromethyl)ethyl, 2,2,2-trifluoro-1-(trifluoromethyl)ethyl, and 1,2,2,2-tetrafluoro-1-(trifluoromethyl)ethyl.

More preferred of these, from the standpoint of ease of production, are methyl, fluoromethyl, trifluoromethyl, ethyl, 2-fluoroethyl, 2,2,2-trifluoroethyl, pentafluoroethyl, propyl, 3-fluoropropyl, 3,3,3-trifluoropropyl, heptafluoropropyl, 1-methylethyl, 1-fluoro-1-methylethyl, 2-fluoro-1-methylethyl, 2-fluoro-1-(fluoromethyl)ethyl, 2,2,2-trifluoro-1-(trifluoromethyl)ethyl, and 1,2,2,2-tetrafluoro-1-(trifluoromethyl)ethyl. Especially preferred are methyl, trifluoromethyl, ethyl, 2,2,2-trifluoroethyl, propyl, and 1-methylethyl.

The aryl groups preferably are unsubstituted or fluorine-substituted phenyl groups. Examples thereof include phenyl, 2-fluorophenyl, 3-fluorophenyl, 4-fluorophenyl, 2,3-difluorophenyl, 2,4-difluorophenyl, 2,5-difluorophenyl, 2,6-difluorophenyl, 3,4-difluorophenyl, 3,5-difluorophenyl, 2,3,4-trifluorophenyl, 2,3,5-trifluorophenyl, 2,3,6-trifluorophenyl, 2,4,5-trifluorophenyl, 2,4,6-trifluorophenyl, 3,4,5-trifluorophenyl, 2,3,4,5-tetrafluorophenyl, 2,3,4,6-tetrafluorophenyl, 2,3,5,6-tetrafluorophenyl, and pentafluorophenyl.

More preferred of these are phenyl, 2-fluorophenyl, 3-fluorophenyl, 4-fluorophenyl, 2,3-difluorophenyl, 2,4-difluorophenyl, 2,5-difluorophenyl, 2,6-difluorophenyl, 3,4-difluorophenyl, 3,5-difluorophenyl, 2,3,4-trifluorophenyl, 2,3,5-trifluorophenyl, 2,3,6-trifluorophenyl, 2,4,5-trifluorophenyl, 2,4,6-trifluorophenyl, and 3,4,5-trifluorophenyl. Especially preferred is phenyl.

In the n repeating units, the A's may be the same or different. However, it is preferred that the A's should be the same. With respect to the B's also, it is preferred that the B's in the n repeating units should be the same although they may be the same or different.

The proportion of fluorine atoms in the A's or B's is not particularly limited. However, it is preferred that the proportion thereof should be higher from the standpoint of easily producing the effect. The proportion thereof is preferably ⅓ or higher, more preferably ½ or higher, especially preferably ⅔ or higher. Most preferred is the case where all of the A's and B's are fluorine.

Symbol n must be 3 or larger from the standpoint of the stability of the structure. However, there is no particular upper limit thereon.

Examples of the compound represented by general formula (3) in invention 4 include the following.

[Chemical Formula-10]

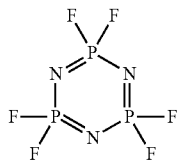

(cyclotriphosphazene
wholly substituted
with fluorine atoms)

-continued

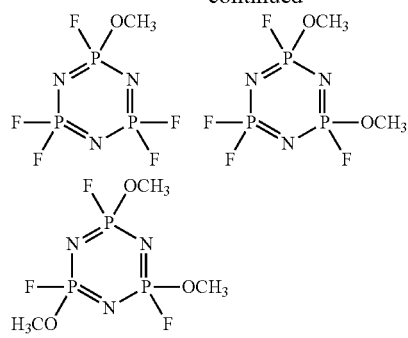

(cyclotriphosphazenes
having methyl group(s)
through oxygen)

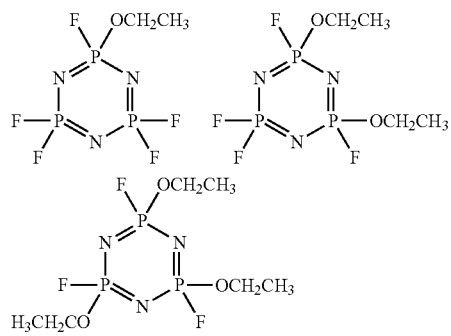

(cyclotriphosphazenes having
ethyl group(s) through oxygen)

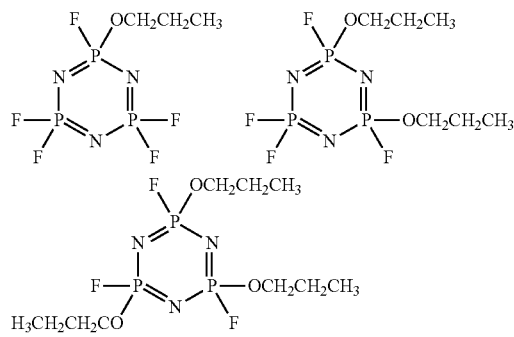

(cyclotriphosphazenes having
propyl group(s) through oxygen)

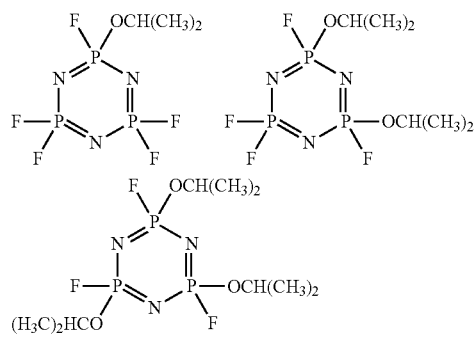

(cyclotriphosphazenes having
isopropyl group(s) through oxygen)

-continued

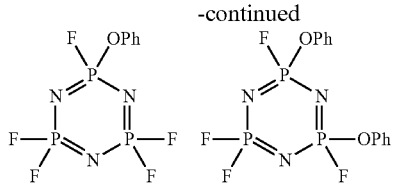

(cyclotriphosphazenes having phenyl group(s) through oxygen)

[Chemical Formula-11]

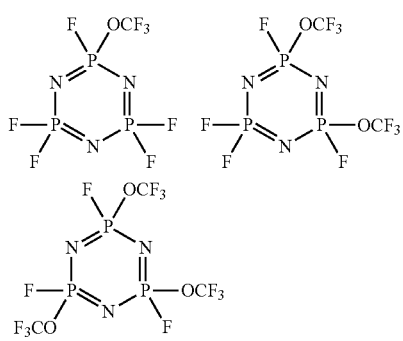

(cyclotriphosphazenes having trifluoromethyl group(s) through oxygen)

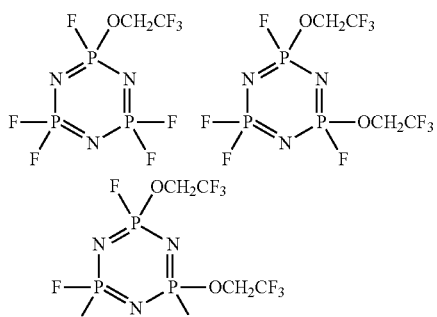

(cyclotriphosphazenes having trifluoroethyl group(s) through oxygen)

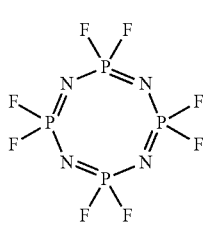

(cyclotetraphosphazene wholly substituted with fluorine atoms)

-continued

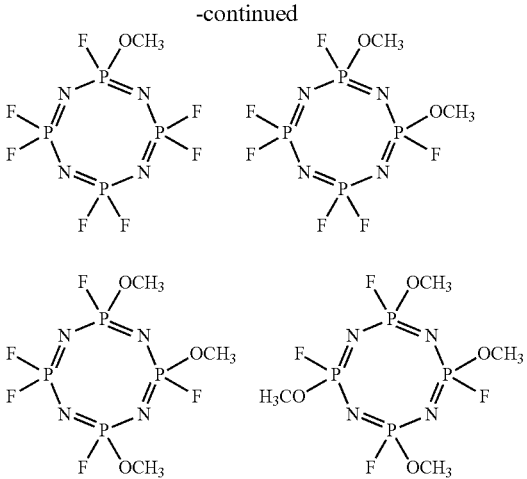

(cyclotetraphosphazenes having methyl group(s) through oxygen)

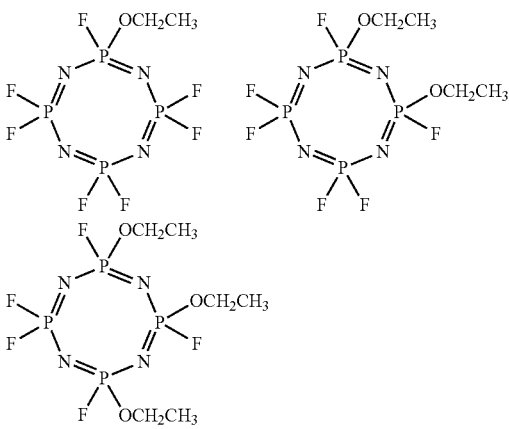

(cyclotetraphosphazenes having ethyl group(s) through oxygen)

[Chemical Formula-12]

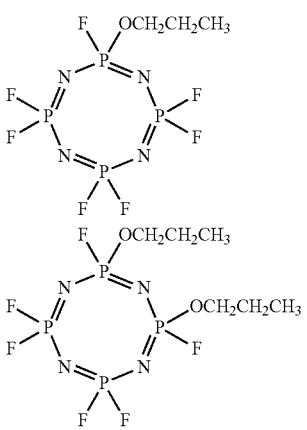

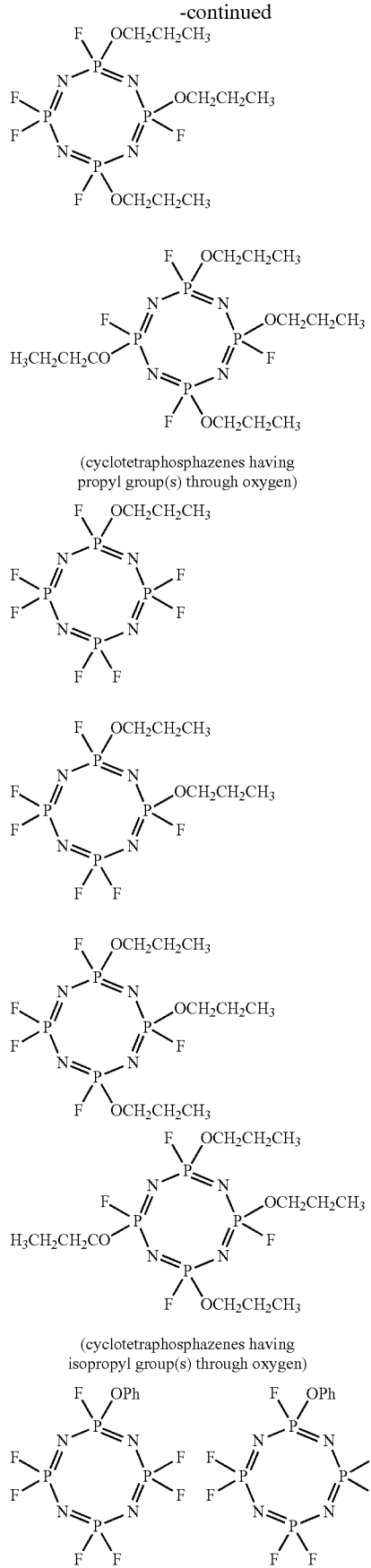
(cyclotetraphosphazenes having propyl group(s) through oxygen)
(cyclotetraphosphazenes having isopropyl group(s) through oxygen)
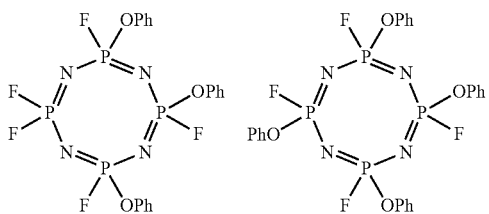
(cyclotetraphosphazenes having phenyl group(s) through oxygen)
(cyclotetraphosphazenes having trifluoromethyl group(s) through oxygen)
(cyclotetraphosphazenes having trifluoroethyl group(s) through oxygen)

[Chemical Formula-13]
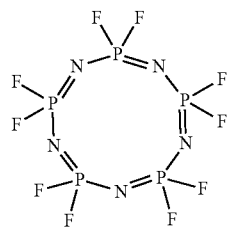
(cyclopentaphosphazene wholly substituted with fluorine atoms)
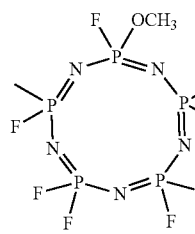
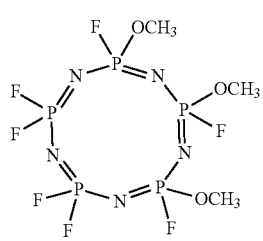
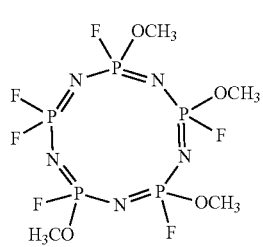
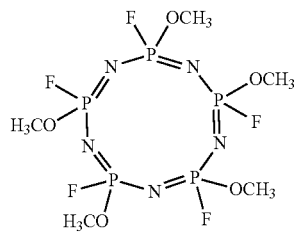
(cyclopentaphosphazenes having methyl group(s) through oxygen)
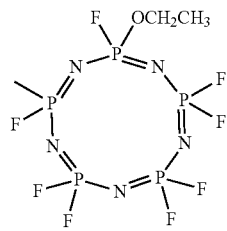
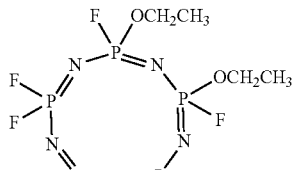
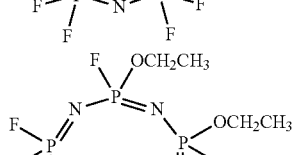
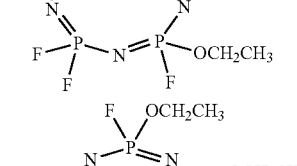
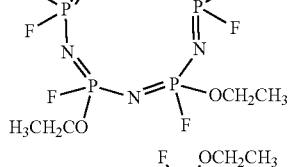
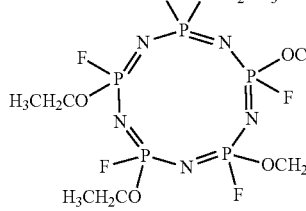
(cyclopentaphosphazenes having ethyl group(s) through oxygen)
[Chemical Formula-14]
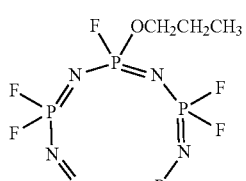
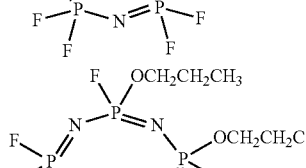
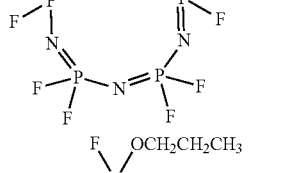
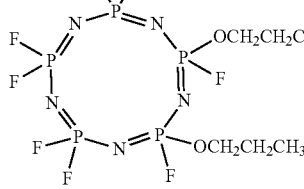

-continued
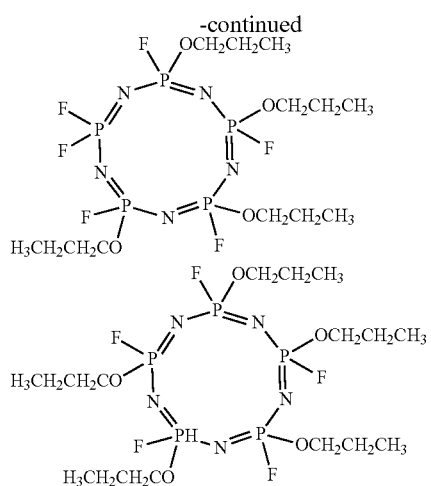
(cyclopentaphosphazenes having propyl group(s) through oxygen)
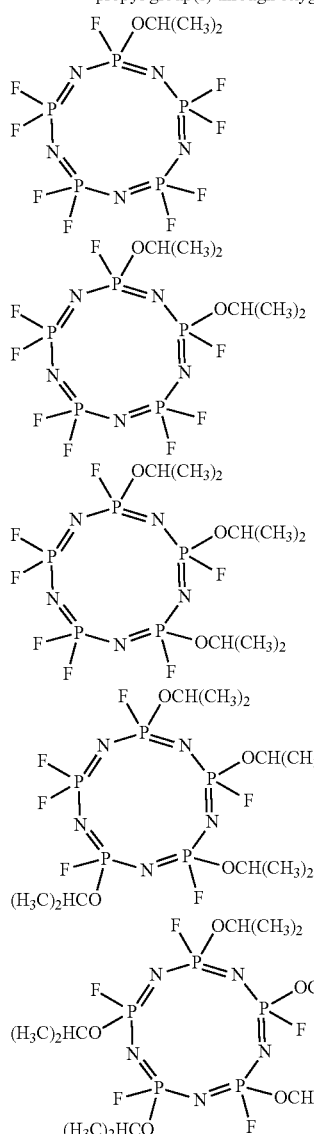
(cyclopentaphosphazenes having isopropyl group(s) through oxygen)
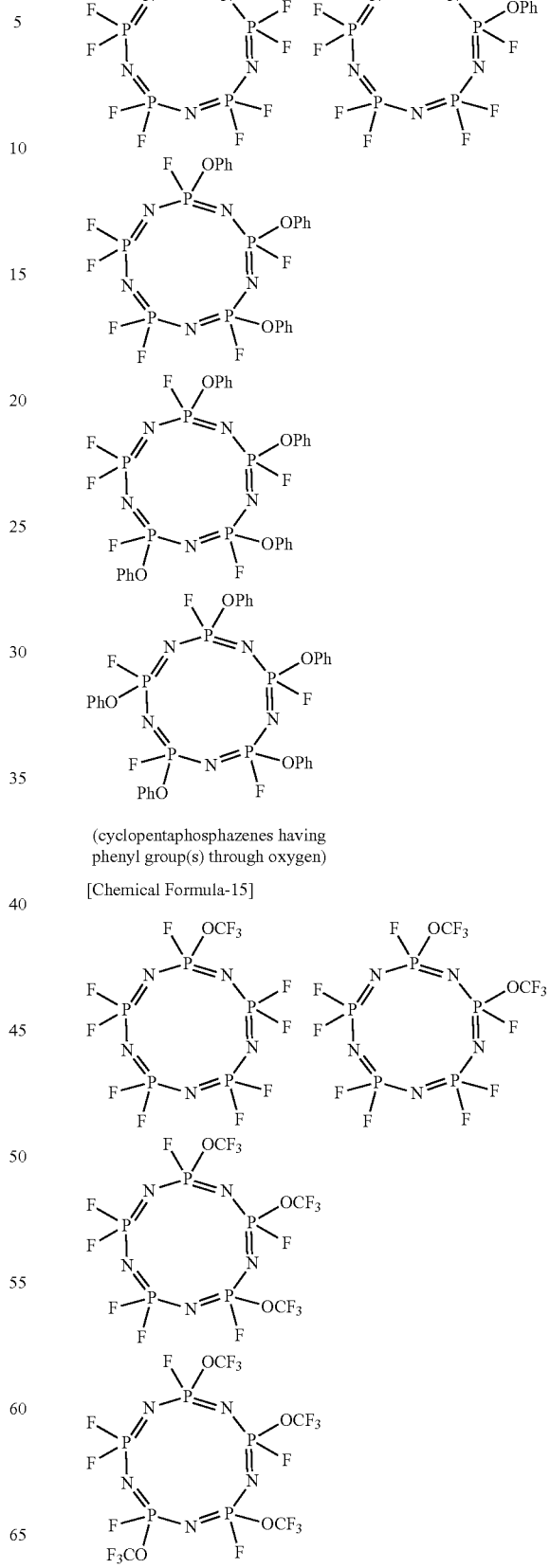
(cyclopentaphosphazenes having phenyl group(s) through oxygen)
[Chemical Formula-15]

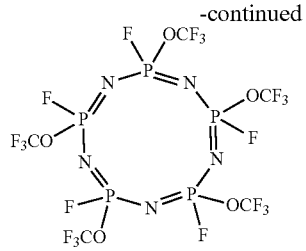
(cyclopentaphosphazenes having trifluoromethyl group(s) through oxygen)
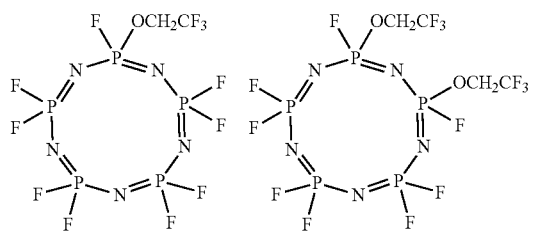
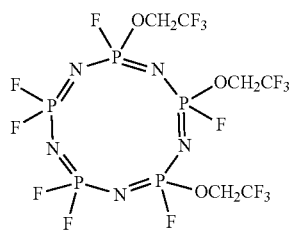
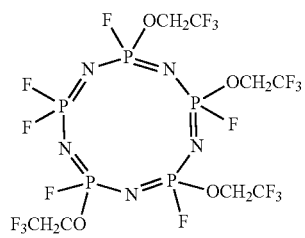
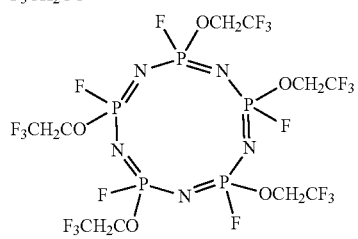
(cyclopentaphosphazenes having trifluoroethyl group(s) through oxygen)
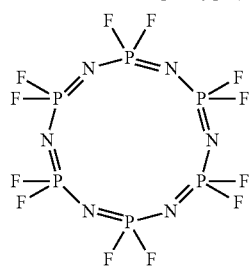
(cyclohexaphosphazene wholly substituted with fluorine atoms)
[Chemical Formula-16]
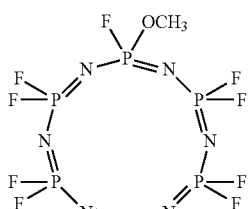
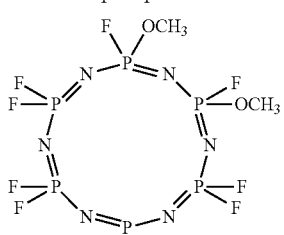
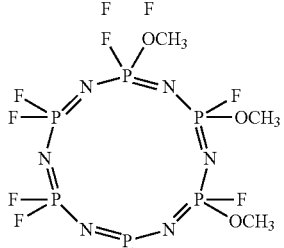
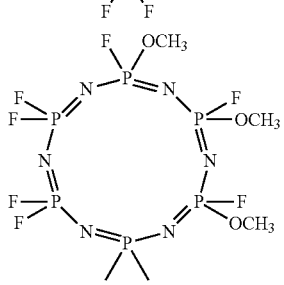
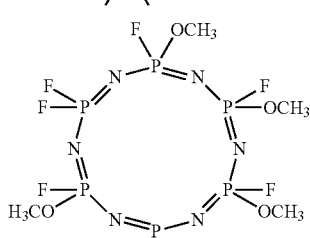
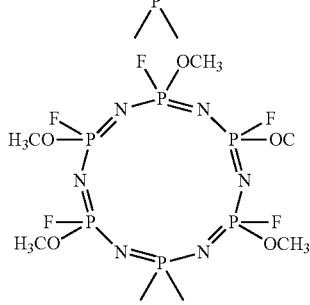
(cyclohexaphosphazenes having methyl group(s) through oxygen)

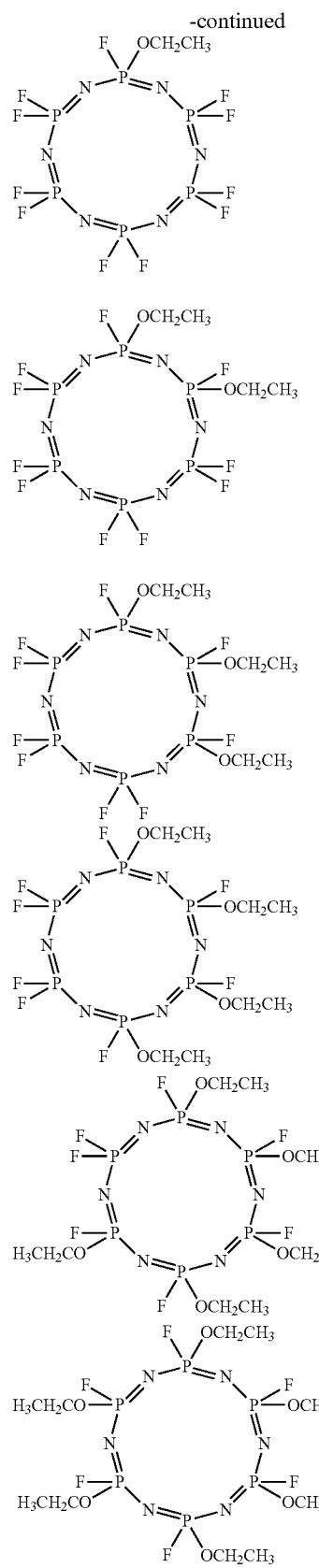
(cyclohexaphosphazenes having ethyl group(s) through oxygen)
[Chemical Formula-17]
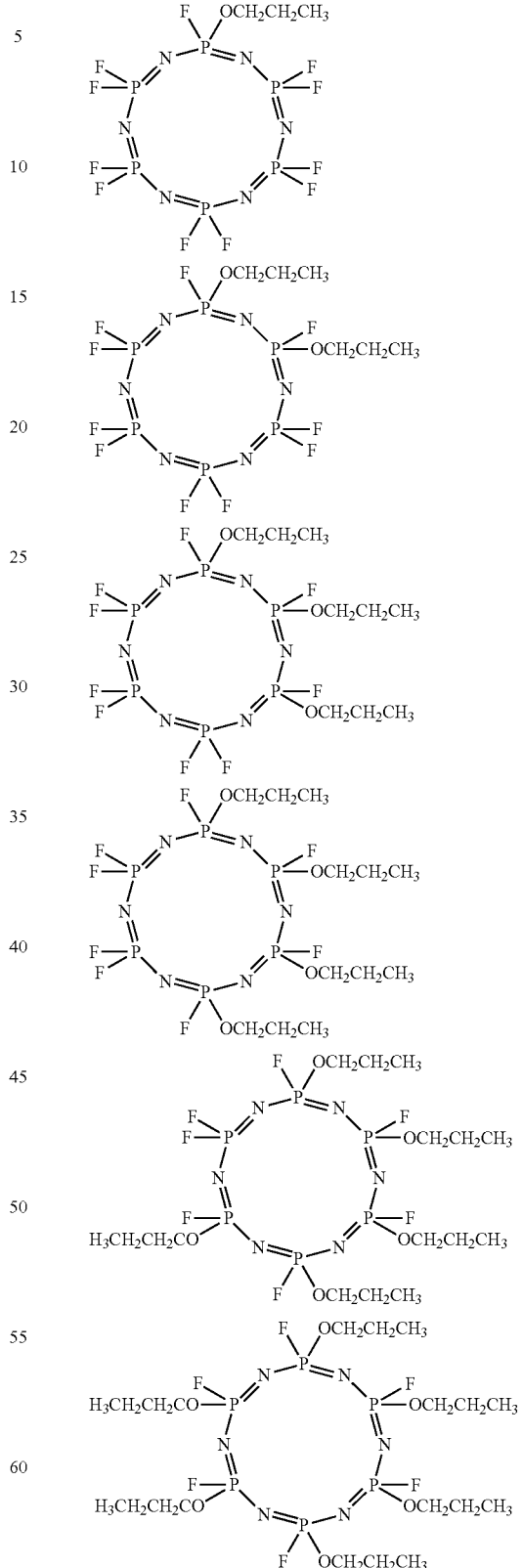
(cyclohexaphosphazenes having propyl group(s) through oxygen)

-continued
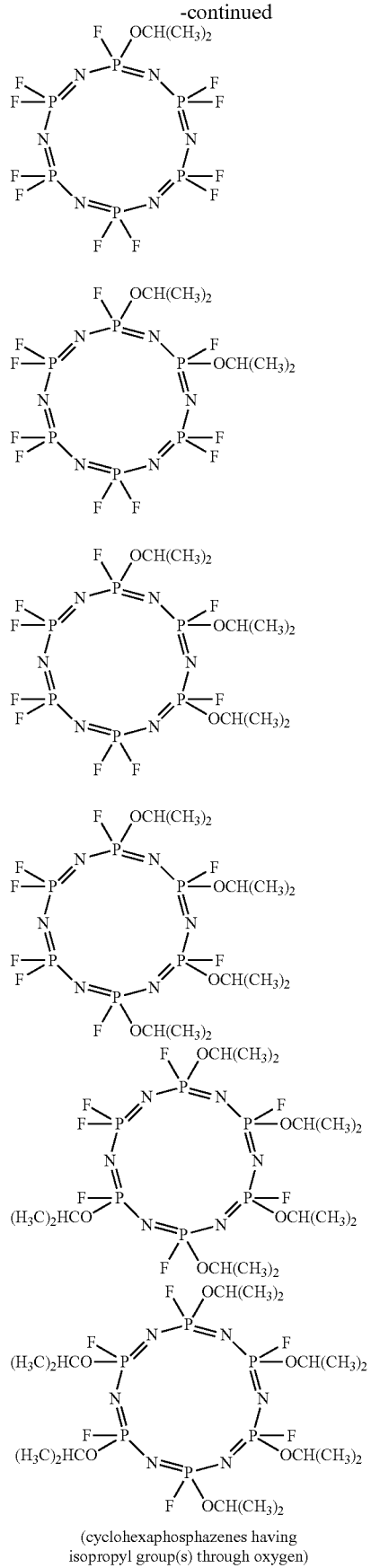
(cyclohexaphosphazenes having isopropyl group(s) through oxygen)
-continued
[Chemical Formula-18]
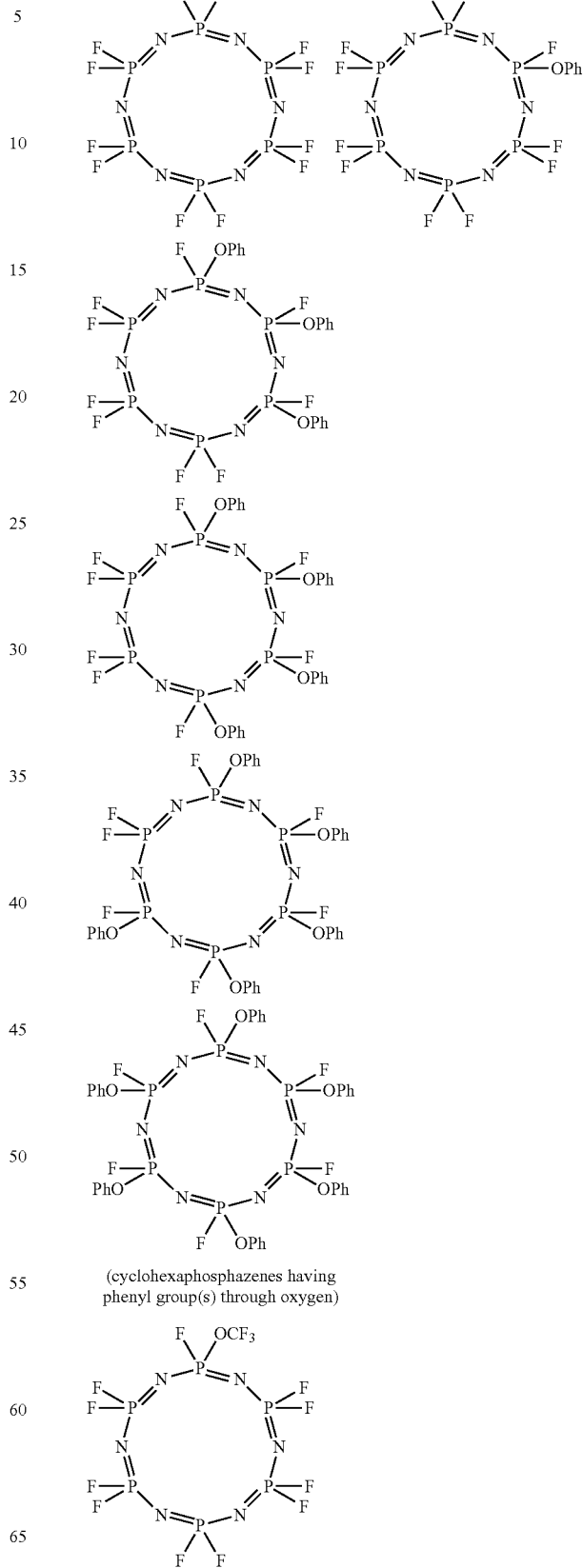
(cyclohexaphosphazenes having phenyl group(s) through oxygen)

-continued

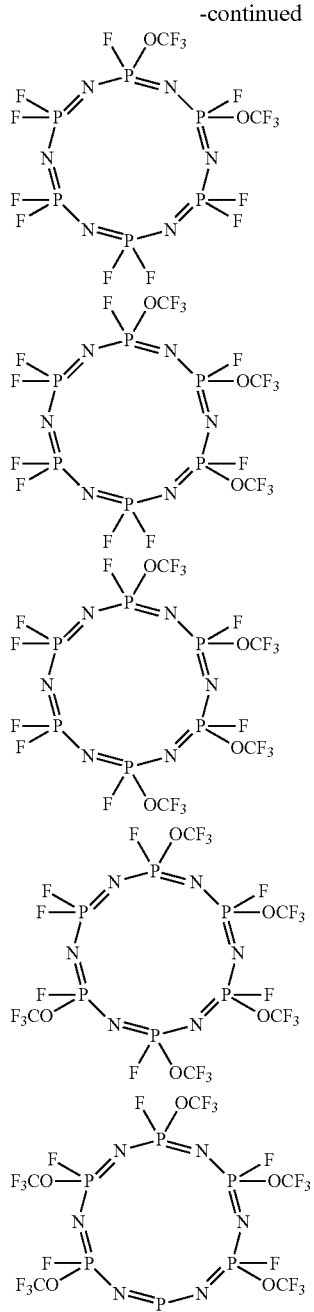

(cyclohexaphosphazenes having trifluoromethyl group(s) through oxygen)

[Chemical Formula-19]

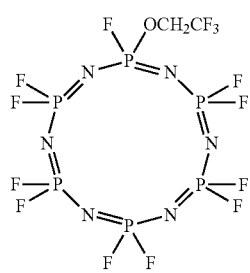

-continued

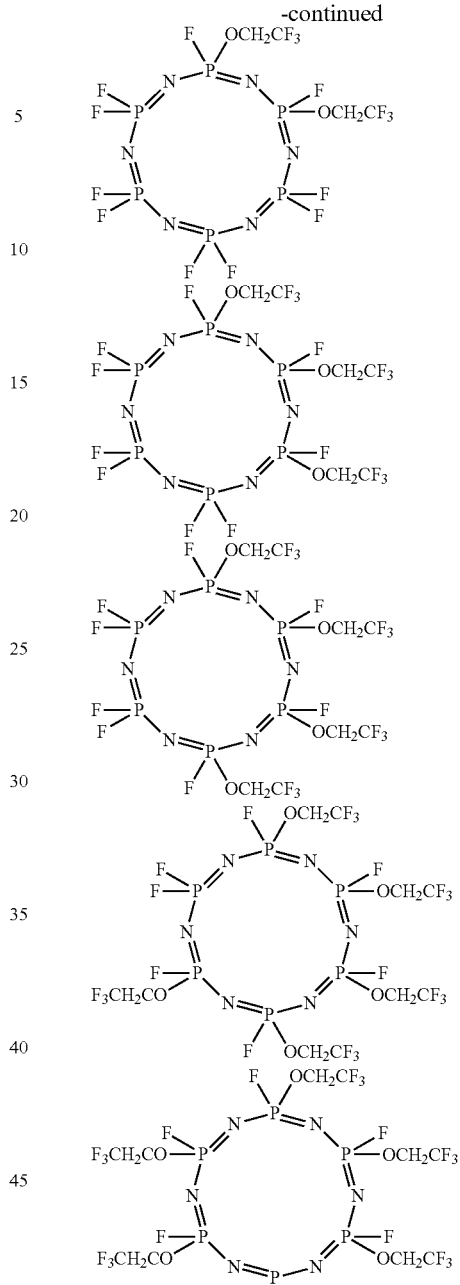

(cyclohexaphosphazenes having trifluoroethyl group(s) through oxygen)

In embodiment 4-1, the content of those compounds represented by general formula (3) according to invention 4 in the nonaqueous electrolyte is not particularly limited. However, the content thereof is preferably in the range of from 0.001% by mass to 2% by mass, more preferably in the range of from 0.01% by mass to 1.7% by mass, especially preferably in the range of from 0.05% by mass to 1.3% by mass, and even more preferably in the range of from 0.1% by mass to 1% by mass. On the other hand, the content thereof is preferably in the range of from 0.001% by volume to 1% by volume, more preferably in the range of from 0.01% by volume to 0.8% by volume, especially preferably in the range of from 0.05% by volume to 0.7% by volume, and even more preferably in the range of from 0.1% by volume to 0.5% by volume.

In embodiment 4-2, the content of those compounds represented by general formula (3) according to invention 4 in the nonaqueous electrolyte must be in the range of from 0.001% by mass to 5% by mass, and is more preferably in the range of from 0.01% by mass to 3% by mass, especially preferably in the range of from 0.05% by mass to 2% by mass, and even more preferably in the range of from 0.1% by mass to 1% by mass. On the other hand, the content thereof is preferably in the range of from 0.001% by volume to 3% by volume, more preferably in the range of from 0.01% by volume to 2% by volume, especially preferably in the range of from 0.05% by volume to 1% by volume, and even more preferably in the range of from 0.1% by volume to 0.5% by volume.

The "% by volume" is calculated based on the room-temperature density of each compound represented by general formula (3) according to invention 4.

In both embodiment 4-1 and embodiment 4-2, the content of those compounds represented by general formula (3) according to invention 4 in the nonaqueous electrolyte is preferably 0.001% by mass or higher and 0.001% by volume or higher, more preferably 0.01% by mass or higher and 0.01% by volume or higher, especially preferably 0.05% by mass or higher and 0.05% by volume or higher, and even more preferably 0.1% by mass or higher and 0.1% by volume or higher. The upper limit thereof is preferably 2% by mass or lower and 1% by volume or lower. When the concentration of the compounds represented by general formula (3) according to invention 4 is too low, there are cases where the effect of improving discharge load performances is difficult to obtain. On the other hand, when the concentration thereof is too high, there are cases where a decrease in charge/discharge efficiency results. Incidentally, in the case where two or more compounds represented by general formula (3) according to invention 4 are contained, those values of content mean total amounts thereof.

<1-4. Monofluorophosphate and Difluorophosphate>

The "monofluorophosphate and/or difluorophosphate" to be used in invention 4 is the same as in invention 1. Preferred ranges also are the same as in invention 1.

<1-4-1. Monofluorophosphoric Acid Metal Salt and Difluorophosphoric Acid Metal Salt>

First, in the case where the monofluorophosphate and difluorophosphate in invention 4 are a salt of one or more monofluorophosphate ions or one or more difluorophosphate ions with one or more specific metal ions, examples of this salt include the same salts as those enumerated above with regard to invention 1.

<1-4-2. Monofluorophosphoric Acid Quaternary Onium Salt and Difluorophosphoric Acid Quaternary Onium Salt>

Next, in the case where the monofluorophosphate and difluorophosphate in invention 4 are a salt of a monofluorophosphate ion or difluorophosphate ion with a quaternary onium, examples of this salt include the same salts as those enumerated above with regard to invention 1.

<1-4-3. Content, Detection (Derivation of Containment), Technical Range, Etc.>

In the nonaqueous electrolyte of invention 4, one monofluorophosphate or difluorophosphate only may be used or any desired combination of two or more monofluorophosphates and/or difluorophosphates may be used in any desired proportion. However, from the standpoint of efficiently operating the nonaqueous-electrolyte secondary battery, it is preferred to use one monofluorophosphate or difluorophosphate.

The molecular weight of the monofluorophosphate or difluorophosphate, processes for producing the salt, proportion of the salt in the nonaqueous electrolyte, etc. are the same as those described above with regard to invention 1.

Furthermore, the time at which a monofluorophosphate or difluorophosphate is detected (the time at which the salt is contained), the place into which the salt is incorporated first (derivation of containment), means of incorporating the salt, detection places based on which the salt is considered to be contained (or have been contained) in the nonaqueous electrolyte, etc. are also the same as those described above with regard to invention 1.

<1-5-1> Specific Carbonic Acid Ester

To add a carbonic acid ester having at least one of an unsaturated bond and a halogen atom (hereinafter sometimes referred to as "specific carbonic acid ester") as an additive besides the compound represented by general formula (1) in invention 4 and besides the monofluorophosphate or difluorophosphate is preferred in embodiment 4-1 and essential in embodiment 4-2. The incorporation of the specific carbonic acid ester has the effect of preventing overcharge. In addition, capacity retention, cycle performances, etc. after high-temperature storage can be improved thereby.

The specific carbonic acid ester may have one or more unsaturated bonds only or have one or more halogen atoms only, or may have both one or more unsaturated bonds and one or more halogen atoms.

With respect to this specific carbonic acid ester, the same statement made hereinabove on the specific carbonate in invention 1 holds.

<1-5-2> Other Additives

The nonaqueous electrolyte of invention 4 may further contain "other additives", such as, e.g., an overcharge inhibitor and an aid for improving capacity retention and cycle performance after high-temperature storage, so long as these additives do not considerably lessen the effects of invention 4. As such other additives, conventionally known additives can be used at will. Examples of the overcharge inhibitor and the concentration, effect, etc. thereof are the same as those described above with regard to invention 1.

One of those overcharge inhibitors may be used alone, or any desired combination of two or more thereof may be used in any desired proportion. In the case of employing any desired combination, compounds in the same class among those enumerated above may be used in combination or compounds in different classes may be used in combination.

Examples of the case where compounds in different classes are used in combination are the same as those enumerated above with regard to invention 1.

On the other hand, examples of the aid for improving capacity retention and cycle performances after high-temperature storage include the following phosphorus-containing compounds besides the compounds enumerated above with regard to invention 1:

phosphoric acid esters such as trimethyl phosphate, triethyl phosphate, and triphenyl phosphate;

phosphorous acid esters such as trimethyl phosphite, triethyl phosphite, and triphenyl phosphite; and phosphine oxides such as trimethylphosphine oxide, triethylphosphine oxide, and triphenylphosphine oxide.

The amount of those "other additives" to be incorporated into the nonaqueous electrolyte of invention 4 is not limited, and may be any desired value unless the effects of invention 4 are considerably lessened thereby. It is, however, desirable to incorporate the additives in a concentration which is generally 0.01% by mass or higher, preferably 0.1% by mass or higher, more preferably 0.3% by mass or higher, and is generally 10% by mass or lower, preferably 5% by mass or lower, more preferably 3% by mass or lower, even more preferably 2% by mass or lower, based on the nonaqueous electrolyte of invention 4.

<1-6. Process for Producing Nonaqueous Electrolyte>

For producing the nonaqueous electrolyte of invention 4, the same process as in invention 1 can be used.

[2. Nonaqueous-Electrolyte Secondary Battery]

The nonaqueous-electrolyte secondary battery of invention 4 includes: a negative electrode and a positive electrode which are capable of occluding and releasing ions; and the nonaqueous electrolyte of invention 4 described above.

The following are the same as those described above with regard to invention 1: battery constitution; negative electrode; carbonaceous material; constitution and properties of carbonaceous negative electrode and method of preparation thereof; metal compound material, constitution and properties of negative electrode employing metal compound material, and method of preparation thereof; positive electrode; separator; battery design; and the like.

By optimizing the structure described above, internal resistance can be minimized. In batteries to be used at a heavy current, it is preferred that the impedance thereof as measured by the 10-kHz alternating-current method (hereinafter referred to as "direct-current resistance component") should be regulated to 10 milliohms (mΩ) or lower. It is more preferred to regulate the direct-current resistance component thereof to 5 milliohms (mΩ) or lower.

When the direct-current resistance component is reduced to 0.1 milliohm or lower, high-output performances improve. However, this regulation results in an increased proportion of current collector structure materials and may reduce the battery capacity.

The nonaqueous electrolyte of invention 4 is effective in reducing the resistance of reactions relating to lithium elimination from and insertion into electrode active materials. This is a factor which renders satisfactory low-temperature discharge performances possible. However, in ordinary batteries having a direct-current resistance higher than 10 milliohms (mΩ), there are cases where the effect of reducing reaction resistance cannot be 100% reflected in low-temperature discharge performances because of inhibition by the direct-current resistance. By using a battery having a low direct-current resistance component, that problem can be mitigated and the effect of the nonaqueous electrolyte of invention 4 can be fully produced.

It is especially preferred that this requirement and the above-described requirement that the battery elements to be held in one battery case of a secondary battery have an electric capacity (electric capacity measured when the battery in a fully charged state is discharged to a discharged state) of 3 ampere-hour (Ah) or higher should be simultaneously satisfied from the standpoints of enabling the nonaqueous electrolyte to produce its effect and fabricating a battery having high low-temperature discharge performances.

<Nonaqueous Electrolyte 5 and Nonaqueous-Electrolyte Secondary Battery 5>

[1. Nonaqueous Electrolyte]

Like ordinary nonaqueous electrolytes, the nonaqueous electrolyte of invention 5 includes a lithium salt and an ambient-temperature-molten salt containing the lithium salt dissolved therein. Usually, the lithium salt and the molten salt are contained as main components.

<1-1> Lithium Salt

The lithium salt to be contained in the nonaqueous electrolyte of invention 5 is not limited, and known ones for use as electrolytes in a target nonaqueous-electrolyte secondary battery can be employed at will. Examples of the lithium salt include the same lithium salts as those enumerated above as examples of the electrolyte in invention 1.

In the case of using a combination of lithium salts, the kinds of the electrolytes and the proportions of the lithium salts are the same as those described above with regard to the electrolyte of nonaqueous electrolyte 1.

The concentration of the lithium salt in the nonaqueous electrolyte is not particularly limited. However, the concentration thereof is generally 0.1 mol/L or higher, preferably 0.2 mol/L or higher, more preferably 0.3 mol/L or higher. The upper limit thereof is generally 3 mol/L or lower, preferably 2 mol/L or lower, more preferably 1.8 mol/L or lower, especially preferably 1.5 mol/L or lower. When the concentration of the lithium salt is too low, there are cases where this nonaqueous electrolyte has insufficient electrical conductivity. On the other hand, when the concentration thereof is too high, there are cases where an increase in viscosity results and this reduces electrical conductivity. There are also cases where battery performances decrease.

The nonaqueous electrolyte of invention 5 includes a lithium salt and an ambient-temperature-molten salt. This nonaqueous electrolyte contains "at least one compound selected from the group consisting of monofluorophosphates and difluorophosphates".

<1-2. Ambient-Temperature-Molten Salt>

The term "ambient-temperature-molten salt" in invention means an ionic substance (salt) which has a molecular structure constituted of one or more cations and one or more anions and which is partly or wholly liquid at 45° C. Even a compound having a melting point of 45° C. or higher in thermal analysis falls under the category of ambient-temperature-molten salts according to invention 5 when the compound can be caused, by rapid cooling or the like, to stably retain a supercooled state at 45° C. over long and exist as a liquid. Furthermore, even a salt which is in a solid state at 45° C. falls under the category of ambient-temperature-molten salts according to invention 5 in the case where this salt, when mixed with one or more other ionic substances, such as a lithium salt and a monofluorophosphate or difluorophosphate, gives a mixture which is in a liquid state at 45° C.

The ambient-temperature-molten salt to be used in invention 5 is not particularly limited so long as the salt satisfies the requirement shown above. Of such ambient-temperature-molten salts, ones which are in a liquid state at 25° C. are preferred and ones which are in a liquid state at 15° C. are more preferred. Especially preferred are ones which are in a liquid state at 10° C.

The cation structure as a component of the ambient-temperature-molten salt is not particularly limited. However, a cation structure formed from an organic substance is preferred because the salt having this structure is apt to be in a liquid state at 45° C. It is more preferred, from the standpoint of attaining a low coefficient of viscosity, that the nonaqueous electrolyte should contain at least one ambient-temperature-molten salt selected from the group consisting of tertiary sulfonium salts having a structure represented by the following general formula (6), quaternary ammonium salts having a structure represented by the following general formula (7), and quaternary phosphonium salts having a structure represented by the following general formula (8).

[Chemical Formula-20]

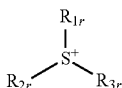

(6)

[In general formula (6), $R_{1r}$, $R_{2r}$, and $R_{3r}$ each independently represent an organic group having 1-12 carbon atoms, provided that two organic groups of the $R_{1r}$, $R_{2r}$, and $R_{3r}$ may have been bonded to each other to form a ring structure.]

[Chemical Formula-21]

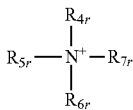

(7)

[In general formula (7), $R_{4r}$, $R_{5r}$, $R_{6r}$, and $R_{7r}$ each independently represent an organic group having 1-12 carbon atoms, provided that two to the four organic groups of the $R_{4r}$, $R_{5r}$, $R_{6r}$, and $R_{7r}$ may have been bonded to each other to form a ring structure and that two organic groups of the $R_{4r}$, $R_{5r}$, $R_{6r}$, and $R_{7r}$ may actually be one organic group bonded to the "$N^+$" atom through a double bond.]

[Chemical Formula-22]

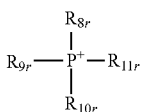

(8)

[In general formula (8), $R_{8r}$, $R_{9r}$, $R_{10r}$, and $R_{11r}$ each independently represent an organic group having 1-12 carbon atoms, provided that two to the four organic groups of the $R_{8r}$, $R_{9r}$, $R_{10r}$, and $R_{11r}$ may have been bonded to each other to form a ring structure and that two organic groups of the $R_{8r}$, $R_{9r}$, $R_{10r}$, and $R_{11r}$ may actually be one organic group bonded to the "$P^+$" atom through a double bond.]

[Compounds Represented by General Formula (6)]

$R_{1r}$, $R_{2r}$, and $R_{3r}$ in the sulfonium cation structure represented by general formula (6) in invention 5 are organic groups which each have 1-12 carbon atoms and which may be the same or different. Examples of $R_{1r}$, $R_{2r}$, and $R_{3r}$ include chain alkyl groups such as methyl, ethyl, n-propyl, isopropyl, butyl, isobutyl, sec-butyl, and t-butyl; cycloalkyl groups such as cyclohexyl and norbornanyl; alkenyl groups such as vinyl, 1-propenyl, allyl, butenyl, and 1,3-butadienyl; alkynyl groups such as ethynyl, propynyl, and butynyl; halogenated alkyl groups such as trifluoromethyl, trifluoroethyl, and hexafluoropropyl; aryl groups such as phenyl which may have one or more substituents, e.g., alkyl substituents; aralkyl groups such as benzyl and phenylethyl; trialkylsilyl groups such as trimethylsilyl; carbonyl-containing alkyl groups such as ethoxycarbonylethyl; alkyl groups containing one or more ether groups, such as methoxyethyl, phenoxymethyl, ethoxyethyl, allyloxyethyl, methoxyethoxyethyl, and ethoxyethoxyethyl; and sulfonyl-containing alkyl groups such as sulfonylmethyl.

It is, however, noted that $R_{1r}$, $R_{2r}$, and $R_{3r}$ in the sulfonium cation structure may have been bonded to each other to form a ring structure, and that besides the substituents shown above, a substituent may have been bonded to the $R_{1r}$, $R_{2r}$, and $R_{3r}$ through a saturated or unsaturated bond involving a heteroatom such as, e.g., oxygen, nitrogen, sulfur, or phosphorus.

Preferred of those $R_{1r}$, $R_{2r}$, and $R_{3r}$ are alkyl groups having 1-6 carbon atoms, halogenated alkyl groups, aryl groups, and alkyl groups having one or more ether groups. This is because these groups serve to reduce the intermolecular interaction of the sulfonium salt and are generally apt to thereby impart a low melting point to the salt.

Especially preferred of such sulfonium structures are the following because the following sulfoniums are apt to bring about a low coefficient of viscosity: trimethylsulfonium, triethylsulfonium, dimethylethylsulfonium, methyldiethylsulfonium, tripropylsulfonium, dimethylpropylsulfonium, methyldipropylsulfonium, diethylpropylsulfonium, ethyldipropylsulfonium, methylethylpropylsulfonium, tributylsulfonium, dimethylbutylsulfonium, methyldibutylsulfonium, diethylbutylsulfonium, ethyldibutylsulfonium, dipropylbutylsulfonium, propyldibutylsulfonium, methylethylbutylsulfonium, methylpropylbutylsulfonium, ethylpropylbutylsulfonium, compounds formed by replacing one or more of the hydrogen atoms of the alkyl groups of each of these sulfoniums with fluorine atoms, dimethylvinylsulfonium, dimethylallylsulfonium, dimethylbutenylsulfonium, diethylvinylsulfonium, diethylallylsulfonium, diethylbutenylsulfonium, methylethylvinylsulfonium, methylethylallylsulfonium, methylethylbutenylsulfonium, dimethylmethoxymethylsuifonium, dimethylmethoxyethylsulfonium, dimethylethoxymethylsulfonium, dimethylethoxyethylsulfonium, dimethylmethoxyethoxyethylsulfonium, dimethylethoxyethoxyethylsulfonium, diethylmethoxymethylsulfonium, diethylmethoxyethylsulfonium, diethylethoxyethylsulfonium, diethylmethoxyethoxyethylsulfonium, diethylethoxyethoxyethylsulfonium, and the like.

The anion of the tertiary sulfonium salts having a structure represented by general formula (6) in invention 5 is not particularly limited. However, anions having a van der Waals radius of 50 Å or larger are preferred because the salt having such an anion is apt to be in a liquid state at 45° C. or lower. More preferred of these are anion structures constituted of an element formally having a negative charge and one or more electron-withdrawing substituents bonded thereto. This is because the salt having such an anion structure is apt to be in a liquid state at room temperature.

Especially preferred of such anion structures are ones in which the electron-withdrawing substituents are any of the following: a fluorine atom; a cyano group; a carbonyl group having fluorine or a cyano, alkyl, fluoroalkyl, cyanoalkyl, phenyl, fluorophenyl, or cyanophenyl group, and a carboxyl group, sulfo group, and sulfonyl group; a phenyl group, a fluorophenyl group, a phenyl group having a fluoroalkyl group, and a cyanophenyl group; a phenoxy group, a fluorophenoxy group, a phenyl group having a fluoroalkyl group, and a cyanophenoxy group; a thiophenoxy group, a fluorothiophenoxy group, a thiophenoxy group having a fluoroalkyl group, and a cyanothiophenoxy group; a fluoroalkoxy group and a cyanoalkoxy group; and a fluorothioalkoxy group and a cyanothioalkoxy group. This is because these anion structures have excellent heat resistance and excellent oxidation resistance.

Furthermore, Lewis-acid compounds such as $BF_3$, $AlF_3$, $PF_3$, $PF_5$, $SbF_5$, and $AsF_5$ can be included in especially preferred substituents like the electron-withdrawing substituents shown above, because these Lewis-acid compounds also interact with the negatively charged site in the anion structure to thereby increase electrochemical oxidation stability of the anion.

Of those anions, the following are exceedingly preferred because the following anions have a satisfactory balance among ionic conductivity, viscosity coefficient, stability to oxidation/reduction, charge/discharge efficiency, high-temperature storability, etc. in application to nonaqueous-electrolyte secondary batteries: inorganic anions such as $BF_4^-$, $AlF_4^-$, $ClO_4^-$, $PF_6^-$, $SbF_6^-$, $SiF_6^{2-}$, $AsF_6^-$, $WF_7^-$, $CO_3^{2-}$, $FSO_3^-$, $(FSO_2)_2N^-$, $(FSO_2)_3C^-$, $NO_3^-$, $PO_4^{3-}$, $PO_3F^-$, $PO_2F_2^-$, and $B_{12}F_{12}^{2-}$; organic anions such as $(CN)_2N^-$, $(CNCO)_2N^-$, $(CNSO_2)_2N^-$, $(CF_3CO)_2N^-$, $(CF_3CF_2CO)_2N^-$, $(CF_3SO_2)_2N^-$, $(CF_3CO)(CF_3SO_2)_2N^-$, $(CF_3SO_2)$ $(CF_3CF_2SO_2)N^-$, $(CF_3CF_2SO_2)_2N^-$, $(CF_3SO_2)(C_4F_9SO_2)N^-$, cyclic 1,2-perfluoroethanedisulfonylimide, cyclic 1,3-perfluoropropanedisulfonylimide, $(CN)_3C^-$, $(CNCO)_3C^-$, $(CNSO_2)_3C^-$, $(FSO_2)_3C^-$, $(CF_3CO)_3C^-$, $(CF_3CF_2CO)_3C^-$, $(CF_3SO_2)_3C_-$, $CF_3BF_3^-$, $CF_3CF_2BF_3^-$, $CF_3CF_2CF_2BF_3^-$, $(CF_3CO)BF_3^-$, $(CF_3SO_2)BF_3^-$, $(CF_3CF_2SO_2)BF_3^-$, $(CF_3)_2BF_2^-$, $(CF_3CF_2)_2BF_2^-$, $(CF_3SO_2)_2BF_2^-$, $(CF_3CF_2SO_2)_2BF_2^-$, $(CF_3)_3BF^-$, $(CF_3CF_2)_3BF^-$, $(CF_3CO)_3BF^-$, $(CF_3SO_2)_3BF^-$, $(CF_3CF_2SO_2)_3BF^-$, $(CF_3)_4B^-$, $(CF_3CF_2)_4B^-$, $(C_6F_5)_4B^-$, $(CF_3CO_2)_4B^-$, $(CF_3SO_3)_4B^-$, $(CF_3CF_2SO_3)_4B^-$, $((CF_3)_3CO)_4B^-$, $((CF_3)_2CHO)_4B^-$, $(Ph(CF_3)_2CO)_4B^-$, $(C_6F_5O)_4B^-$, $(CF_3CO)_4Al^-$, $(CF_3SO_2)_4Al^-$, $(CF_3CF_2SO_2)_4Al^-$, $((CF_3)_3CO)_4Al^-$, $((CF_3)_2CHO)_4Al^-$, $(Ph(CF_3)_2CO)_4Al^-$, $(C_6F_5O)_4Al^-$, $(CF_3)_2PF_4^-$, $(C_2F_5)_2PF_4^-$, $(CF_3SO_2)_2PF_4^-$, $(C_2F_5SO_2)_2PF_4^-$, $(CF_3)_3PF_3^-$, $(C_2F_5)_3PF_3^-$, $(CF_3SO_2)_3PF_3^-$, $(C_2F_5SO_2)_3PF_3^-$, $(CF_3)_4PF_2^-$, $(C_2F_5)_4PF_2^-$, $(CF_3SO_2)_4PF_2^-$, and $(C_2F_5SO_2)_4PF_2^-$; and dicarboxylic-acid-containing complex anions such as bis(oxalato)borate, tris(oxalato)phosphate, and difluorooxalatoborate.

[Compounds Represented by General Formula (7)]

$R_{4r}$, $R_{5r}$, $R_{6r}$, and $R_{7r}$ in the quaternary ammonium cation structure represented by general formula (7) in invention 5 are organic groups which each have 1-12 carbon atoms and which may be the same or different. Examples of $R_{4r}$, $R_{5r}$, $R_{6r}$, and $R_{7r}$ include the same organic groups as those enumerated above with regard to the "$R_{1r}$, $R_{2r}$, and $R_{3r}$," in general formula (1), i.e., chain alkyl groups, cycloalkyl groups, alkenyl groups, alkynyl groups, halogenated alkyl groups, aryl groups such as phenyl which may have one or more alkyl substituents, aralkyl groups, trialkylsilyl groups, carbonyl-containing alkyl groups, alkyl groups containing one or more ether groups, and sulfonyl-containing alkyl groups. Preferred examples thereof also are the same as those enumerated above with regard to the "$R_{1r}$, $R_{2r}$, and $R_{3r}$," in general formula (1).

It is, however, noted that two to the four of the $R_{4r}$, $R_{5r}$, $R_{6r}$, and $R_{7r}$ may have been bonded to each other to form a ring structure, and that besides the substituents shown above, a substituent may have been bonded to $R_{4r}$, $R_{5r}$, $R_{6r}$, and $R_{7r}$ through a saturated or unsaturated bond involving a heteroatom such as oxygen, nitrogen, sulfur, or phosphorus.

In the case where the quaternary ammonium cation structure represented by general formula (7) given above is a chain ammonium cation, it is preferred that $R_{4r}$, $R_{5r}$, $R_{6r}$, and $R_{7r}$ each should be an alkyl group having 1-6 carbon atoms, a halogenated alkyl group, an allyl group, or an alkyl group containing one or more ether groups. This is because these groups serve to reduce the intermolecular interaction of the ammonium salt and are generally apt to thereby impart a low melting point to the salt.

More preferred of such ammonium cation structures are the following because the following ammoniums are apt to bring about a low coefficient of viscosity: trimethylpropylammonium, trimethylbutylammonium, trimethylpentylammonium, trimethylhexylammonium, dimethylethylpropylammonium, dimethylethylbutylammonium, dimethylethylpentylammonium, dimethylethylhexylammonium, dimethyldipropylammonium, dimethylpropylbutylammonium, dimethylpropylpentylammonium, dimethylpropylhexylammonium, dimethyldibutylammonium, dimethylbutylpentylammnium, dimethylbutylhexylammonium, dimethyldipentylammonium, dimethylpentylhexylammonium, dimethyldihexylammonium, methyldiethylpropylammonium, methyldiethylbutylammonium, methyldiethylpentylammonium, methyldiethylhexylammonium, methylethyldipropylammonium, methylethylpropylbutylammonium, methylethylpropylpentylammonium, methylethylpropylhexylammonium, methylethyldibutylammonium, methylethylbutylpentylammonium, methylethylbutylhexylammnium, methylethyldipentylammonium, methylethylpentylhexylammonium, methylethyldihexylammonium, methyltripropylammonium, methyldipropylbutylammonium, methyldipropylpentylammonium, methyldipropylhexylammonium, methylpropyldibutylammonium, methylpropylbutylpentylammonium, methylpropylbutylhexylammonium, methylpropyldipentylammonium, methylpropylpentylhexylammonium, methylpropyldihexylammonium, methyltributylammonium, methyldibutylpentylammonium, methyldibutylhexylammonium, methylbutyldipentylammonium, methylbutylpentylhexylammonium, methylbutyldihexylammonium, methyltripentylammonium, methyldipentylhexylammonium, methylpentyldihexylammonium, methyltrihexylammonium, triethylpropylammonium, triethylbutylammonium, triethylpentylammonium, triethylhexylammonium, compounds formed by replacing one or more of the hydrogen atoms of the alkyl groups of each of these ammoniums with fluorine atoms, trimethylallylammonium, trimethylbutenylammonium, trimethylmethoxymethylammonium, trimethylmethoxyethylammonium, trimethylmethoxyethoxyethylammonium, and the like.

Especially preferred of these are trimethylpropylammonium, trimethylbutylammonium, trimethylpentylammonium, trimethylhexylammonium, dimethylethylpropylammonium, dimethylethylbutylammonium, dimethylethylpentylammonium, dimethylethylhexylammonium, dimethylpropylbutylammonium, dimethylpropylpentylammonium, dimethylpropylhexylammonium, triethylpropylammonium, triethylbutylammonium, triethylpentylammonium, triethylhexylammonium, compounds formed by replacing one or more of the hydrogen atoms of the alkyl groups of each of these ammoniums with fluorine atoms, trimethylallylammonium, trimethylbutenylammonium, trimethylmethoxymethylammonium, trimethylmethoxyethylammonium, and the like. This is because these cations do not have too large a size and enable the ambient-temperature-molten salt to have a moderate number of ions per unit volume (i.e., ion density) so as not to impair the features of the ambient-temperature-molten salt. Namely, these cations enable the ambient-temperature-molten salt to have an excellent balance between melting point and the coefficient of viscosity.

In the quaternary ammonium cation structure represented by general formula (7), two to the four of the $R_{4r}$, $R_{5r}$, $R_{6r}$, and $R_{7r}$ may have been bonded to each other to form a ring structure. In particular, saturated heterocyclic structures represented by the following general formula (9), general formula (10), and general formula (11) are preferred because these saturated heterocyclic structures are generally apt to form a salt having a low melting point. In the following general formula (9), general formula (10), and general formula (11), $R_{12a}$, $R_{13a}$, $R_{12b}$, $R_{13b}$, $R_{12c}$, and $R_{13c}$, are the same as the "$R_{4r}$, $R_{5r}$, $R_{6r}$, and $R_{7r}$ which may be different from each other" in general formula (7).

[Chemical Formula-23]

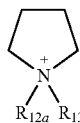
(9)

[Chemical Formula-24]

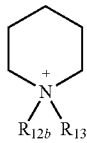
(10)

[Chemical Formula-25]

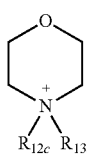
(11)

Of the pyrrolidinium cations represented by general formula (9), the following pyrrolidiniums are more preferred because they are generally apt to form an ambient-temperature-molten salt: dimethylpyrrolidinium, methylethylpyrrolidinium, diethylpyrrolidinium, methylpropylpyrrolidinium, ethylpropylpyrrolidinium, dipropylpyrrolidinium, methylbutylpyrrolidinium, ethylbutylpyrrolidinium, propylbutylpyrrolidinium, dibutylpyrrolidinium, compounds formed by replacing one or more of the hydrogen atoms of the alkyl groups of each of these pyrrolidiniums with fluorine atoms, methylvinylpyrrolidinium, ethylvinylpyrrolidinium, propylvinylpyrrolidinium, butylvinylpyrrolidinium, methylallylpyrrolidinium, ethylallylpyrrolidinium, propylallylpyrrolidinium, butylallylpyrrolidinium, diallylpyrrolidinium, methylbutenylpyrrolidinium, ethylbutenylpyrrolidinium, propylbutenylpyrrolidinium, butylbutenylpyrrolidinium, dibutenylpyrrolidinium, methylmethoxymethylpyrrolidinium, methylmethoxyethylpyrrolidinium, methylethoxyethylpyrrolidinium, methylmethoxyethoxyethylpyrrolidinium, methylethoxyethoxyethylpyrrolidinium, ethylmethoxymethylpyrrolidinium, ethylmethoxyethylpyrrolidinium, ethylethoxyethylpyrrolidinium, ethylmethoxyethoxyethylpyrrolidinium, ethylethoxyethoxyethylpyrrolidinium, propylmethoxymethylpyrrolidinium, propylmethoxyethylpyrrolidinium, propylethoxyethylpyrrolidinium, propylmethoxyethoxyethylpyrrolidinium, propylethoxyethoxyethylpyrrolidinium, butylmethoxymethylpyrrolidinium, butylmethoxyethylpyrrolidinium, butylethoxyethylpyrrolidinium, butylmethoxyethoxyethylpyrrolidinium, butylethoxyethoxyethylpyrrolidinium, and the like.

Especially preferred of these are the following because the following pyrrolidiniums are apt to bring about a low coefficient of viscosity: methylethylpyrrolidinium, methylpropylpyrrolidinium, ethylpropylpyrrolidinium, methylbutylpyrrolidinium, ethylbutylpyrrolidinium, compounds formed by replacing one or more of the hydrogen atoms of the alkyl groups of each of these pyrrolidiniums with fluorine atoms, methylallylpyrrolidinium, ethylallylpyrrolidinium, propylallylpyrrolidinium, butylallylpyrrolidinium, methylbutenylpyrrolidinium, ethylbutenylpyrrolidinium, propylbutenylpyrrolidinium, butylbutenylpyrrolidinium, methylmethoxymethylpyrrolidinium, methylmethoxyethylpyrrolidinium, ethylmethoxymethylpyrrolidinium, ethylmethoxyethylpyrrolidinium, and the like.

Of the piperidinium cations represented by general formula (10), the following piperidiniums are more preferred because they are generally apt to form an ambient-temperature-molten salt: dimethylpiperidinium, methylethylpiperidinium, diethylpiperidinium, methylpropylpiperidinium, ethylpropylpiperidinium, dipropylpiperidinium, methylbutylpiperidinium, ethylbutylpiperidinium, propylbutylpiperidinium, dibutylpiperidinium, compounds formed by replacing one or more of the hydrogen atoms of the alkyl groups of each of these piperidiniums with fluorine atoms, methylvinylpiperidinium, ethylvinylpiperidinium, propylvinylpiperidinium, butylvinylpiperidinium, methylallylpiperidinium, ethylallylpiperidinium, propylallylpiperidinium, butylallylpiperidinium, diallylpiperidinium, methylbutenylpiperidinium, ethylbutenylpiperidinium, propylbutenylpiperidinium, butylbutenylpiperidinium, dibutenylpiperidinium, methylmethoxymethylpiperidinium, methylmethoxyethylpiperidinium, methylethoxyethylpiperidinium, methylmethoxyethoxyethylpiperidinium, methylethoxyethoxyethylpiperidinium, ethylmethoxymethylpiperidinium, ethylmethoxyethylpiperidinium, ethylethoxyethylpiperidinium, ethylmethoxyethoxyethylpiperidinium, ethylethoxyethoxyethylpiperidinium, propylmethoxymethylpiperidinium, propylmethoxyethylpiperidinium, propylethoxyethylpiperidinium, propylmethoxyethoxyethylpiperidinium, propylethoxyethoxyethylpiperidinium, butylmethoxymethylpiperidinium, butylmethoxyethylpiperidinium, butylethoxyethylpiperidinium, butylmethoxyethoxyethylpiperidinium, butylethoxyethoxyethylpiperidinium, and the like.

Especially preferred of these are the following because the following piperidiniums are apt to bring about a low coefficient of viscosity: methylethylpiperidinium, methylpropylpiperidinium, ethylpropylpiperidinium, methylbutylpiperidinium, ethylbutylpiperidinium, compounds formed by replacing one or more of the hydrogen atoms of the alkyl groups of each of these piperidiniums with fluorine atoms, methylallylpiperidinium, ethylallylpiperidinium, propylallylpiperidinium, butylallylpiperidinium, methylbutenylpiperidinium, ethylbutenylpiperidinium, propylbutenylpiperidinium, butylbutenylpiperidinium, methylmethoxymethylpiperidinium, methylmethoxyethylpiperidinium, ethylmethoxymethylpiperidinium, ethylmethoxyethylpiperidinium, and the like.

Of the morpholinium cations represented by general formula (11), the following morpholiniums are more preferred because they are generally apt to form an ambient-temperature-molten salt: dimethylmorpholinium, methylethylmorpholinium, diethylmorpholinium, methylpropylmorpholinium, ethylpropylmorpholinium, dipropylmorpholinium, methylbutylmorpholinium, ethylbutylmorpholinium, propylbutylmorpholinium, dibutylmorpholinium, compounds formed by replacing one or more of the hydrogen atoms of the alkyl groups of each of these morpholiniums with fluorine atoms, methylvinylmorpholinium, ethylvinylmorpholinium, propylvinylmorpholinium, butylvinylmorpholinium, methylallylmorpholinium, ethylallylmorpholinium, propylallylmorpholinium, butylallylmorpholinium, diallylmorpholinium, methylbutenylmorpholinium, ethylbutenylmorpholinium, propylbutenylmorpholinium, butylbutenylmorpholinium, dibutenylmorpholinium, methylmethoxymethylmorpholinium, methylmethoxyethylmorpholinium, methylethoxyethylmorpholinium, methylmethoxyethoxyethylmorpholinium, methylethoxyethoxyethylmorpholinium, ethylmethoxymethylmorpholinium, ethylmethoxyethylmorpholinium, ethylethoxyethylmorpholinium, ethylmethoxyethoxyethylmorpholinium, ethylethoxyethoxyethylmorpholinium, propylmethoxymethylmorpholinium, propylmethoxyethylmorpholinium, propylethoxyethylmorpholinium, propylmethoxyethoxyethylmorpholinium, propylethoxyethoxyethylmorpholinium, butylmethoxymethylmorpholinium, butylmethoxyethylmorpholinium, butylethoxyethylmorpholinium, butylmethoxyethoxyethylmorpholinium, butylethoxyethoxyethylmorpholinium, and the like.

Especially preferred of these are the following because the following morpholiniums are apt to bring about a low coefficient of viscosity: methylethylmorpholinium, methylpropylmorpholinium, ethylpropylmorpholinium, methylbutylmorpholinium, ethylbutylmorpholinium, compounds formed by replacing one or more of the hydrogen atoms of the alkyl groups of each of these morpholiniums with fluorine atoms, methylallylmorpholinium, ethylallylmorpholinium, propylallylmorpholinium, butylallylmorpholinium, methylbutenylmorpholinium, ethylbutenylmorpholinium, propylbutenylmorpholinium, butylbutenylmorpholinium, methylmethoxymethylmorpholinium, methylmethoxyethylmorpholinium, ethylmethoxymethylmorpholinium, ethylmethoxyethylmorpholinium, and the like.

A quaternary ammonium cation structure represented by general formula (7) in which two organic groups of the $R_{4r}$, $R_{5r}$, $R_{6r}$, and $R_{7r}$ actually are one organic group and this one organic group has been bonded to the "N$^+$" atom through a double bond is also included in general formula (7) in invention 5. Namely, the case where two of the $R_{4r}$, $R_{5r}$, $R_{6r}$, and $R_{7r}$ have been united with each other to form an alkylidene group is also included in general formula (7). Such structures in which the alkylidene group forms a ring structure are also preferred. Of these structures, the unsaturated heterocyclic structures shown below are preferred because the following structures are generally apt to form a salt having a low melting point.

[Chemical Formula-26]

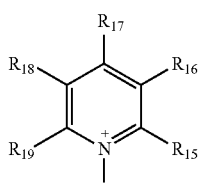

(12)

[Chemical Formula-27]

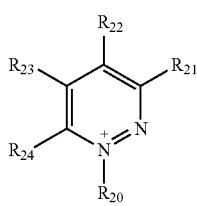

(13)

[Chemical Formula-28]

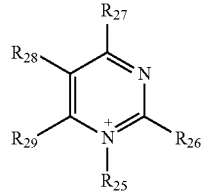

(14)

[Chemical Formula-29]

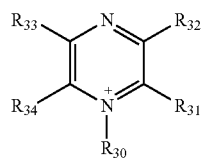

(15)

[Chemical Formula-30]

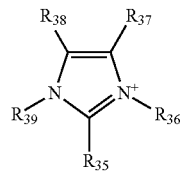

(16)

[Chemical Formula-31]

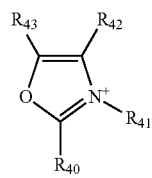

(17)

[Chemical Formula-32]

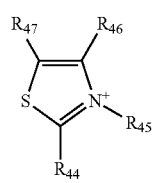

(18)

[Chemical Formula-33]

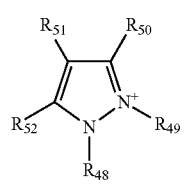

(19)

[Chemical Formula-34]

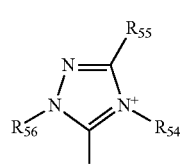

(20)

Of the pyridinium cations represented by general formula (12), the following are preferred because the following cations are generally apt to form an ambient-temperaturemolten salt. Preferred pyridinium cations are ones in which $R_{14}$ is any of ethyl, propyl, butyl, pentyl, and hexyl groups, compounds formed by replacing one or more of the hydrogen atoms of each of these alkyl groups with fluorine atoms, allyl, butenyl, methoxymethyl, methoxyethyl, ethoxyethyl, methoxyethoxyethyl, and ethoxyethoxyethyl groups, and the like, and $R_{15}$ to $R_{19}$ each are a hydrogen atom or methyl.

Especially preferred of these are the following because the following pyridiniums are apt to bring about a low coefficient of viscosity: 1-ethylpyridinium, 1-propylpyridinium, 1-butylpyridinium, 1-pentylpyridinium, 1-hexylpyridinium, 1-allylpyridinium, 1-butenylpyridinium, 1-methoxymethylpyridinium, 1-methoxyethylpyridinium, and the like.

Of the pyridazinium cations represented by general formula (13), the following are preferred because the following cations are generally apt to form an ambient-temperature-molten salt. Preferred pyridazinium cations are ones in which $R_{20}$ is any of ethyl, propyl, butyl, pentyl, and hexyl groups, compounds formed by replacing one or more of the hydrogen atoms of each of these alkyl groups with fluorine atoms, allyl, butenyl, methoxymethyl, methoxyethyl, ethoxyethyl, methoxyethoxyethyl, and ethoxyethoxyethyl groups, and the like, and $R_{21}$ to $R_{24}$ each are a hydrogen atom or methyl.

Especially preferred of these are the following because the following pyridaziniums are apt to bring about a low coefficient of viscosity: 1-ethylpyridazinium, 1-propylpyridazinium, 1-butylpyridazinium, 1-pentylpyridazinium, 1-hexylpyridazinium, 1-allylpyridazinium, 1-butenylpyridazinium, 1-methoxymethylpyridazinium, 1-methoxyethylpyridazinium, and the like.

Of the pyrimidinium cations represented by general formula (14), the following are preferred because the following cations are generally apt to form an ambient-temperature-molten salt. Preferred pyrimidinium cations are ones in which $R_{25}$ is any of ethyl, propyl, butyl, pentyl, and hexyl groups, compounds formed by replacing one or more of the hydrogen atoms of each of these alkyl groups with fluorine atoms, allyl, butenyl, methoxymethyl, methoxyethyl, ethoxyethyl, methoxyethoxyethyl, and ethoxyethoxyethyl groups, and the like, and $R_{26}$ to $R^{29}$ each are a hydrogen atom or methyl.

Especially preferred of these are the following because the following pyrimidiniums are apt to bring about a low coefficient of viscosity: 1-ethylpyrimidinium, 1-propylpyrimidinium, 1-butylpyrimidinium, 1-pentylpyrimidinium, 1-hexylpyrimidinium, 1-allylpyrimidinium, 1-butenylpyrimidinium, 1-methoxymethylpyrimidinium, 1-methoxyethylpyrimidinium, and the like.

Of the pyrazinium cations represented by general formula (15), the following are preferred because the following cations are generally apt to form an ambient-temperature-molten salt. Preferred pyrazinium cations are ones in which $R_{30}$ is any of ethyl, propyl, butyl, pentyl, and hexyl groups, compounds formed by replacing one or more of the hydrogen atoms of each of these alkyl groups with fluorine atoms, allyl, butenyl, methoxymethyl, methoxyethyl, ethoxyethyl, methoxyethoxyethyl, and ethoxyethoxyethyl groups, and the like, and $R_{31}$ to $R_{34}$ each are a hydrogen atom or methyl.

Especially preferred of these are the following because the following pyraziniums are apt to bring about a low coefficient of viscosity: 1-ethylpyrazinium, 1-propylpyrazinium, 1-butylpyrazinium, 1-pentylpyrazinium, 1-hexylpyrazinium, 1-allylpyrazinium, 1-butenylpyrazinium, 1-methoxymethylpyrazinium, 1-methoxyethylpyrazinium, and the like.

Of the imidazolium cations represented by general formula (16), the following are preferred because the following cations are generally apt to form an ambient-temperature-molten salt. Preferred imidazolium cations are ones in which $R_{36}$ and $R_{39}$ each are any of ethyl, propyl, butyl, pentyl, and hexyl groups, compounds formed by replacing one or more of the hydrogen atoms of each of these alkyl groups with fluorine atoms, vinyl, allyl, butenyl, methoxymethyl, methoxyethyl, ethoxyethyl, methoxyethoxyethyl, and ethoxyethoxyethyl groups, and the like, and $R_{35}$, $R_{37}$, and $R_{38}$ each are a hydrogen atom or methyl.

Especially preferred of these are the following because the following imidazoliums are apt to bring about a low coefficient of viscosity: 1,3-dimethylimidazolium, 1-ethyl-3-methylimidazolium, 1-propyl-3-methylimidazolium, 1-butyl-3-methylimidazolium, 1-pentyl-3-methylimidazolium, 1-hexyl-3-methylimidazolium, 1,3-diethylimidazolium, 1-ethyl-3-propylimidazolium, 1-ethyl-3-butylimidazolium, 1-ethyl-3-pentylimidazolium, 1-ethyl-3-hexylimidazolium, 1,3-dipropylimidazolium, 1-propyl-3-butylimidazolium, 1-propyl-3-pentylimidazolium, 1-hexyl-3-butylimidazolium, 1,2,3-trimethylimidazolium, 1-ethyl-2,3-dimethylimidazolium, 1-propyl-2,3-dimethylimidazolium, 1-butyl-2,3-dimethylimidazolium, 1-pentyl-2,3-dimethylimidazolium, 1-hexyl-2,3-dimethylimidazolium, 1,3-diethyl-2-methylimidazolium, 1-propyl-2-methyl-3-ethylimidazolium, 1-butyl-2-methyl-3-ethylimidazolium, 1-pentyl-2-methyl-3-ethylimidazolium, 1-hexyl-2-methyl-3-ethylimidazolium, 1,2,3,4,5-hexamethylimidazolium, 1-ethyl-2,3,4,5-tetramethylimidazolium, 1-propyl-2,3,4,5-tetramethylimidazolium, 1-butyl-2,3,4,5-tetramethylimidazolium, 1-pentyl-2,3,4,5-tetramethylimidazolium, 1-hexyl-2,3,4,5-tetramethylimidazolium, compounds formed by replacing one or more of the hydrogen atoms of the alkyl groups of each of these imidazoliums with fluorine atoms, 1-allyl-3-methylimidazolium, 1-allyl-3-ethylimidazolium, 1-allyl-3-propylimidazolium, 1-allyl-3-butylimidazolium, 1-allyl-2,3-dimethylimidazolium, 1-allyl-2,3,4,5-tetramethylimidazolium, 1-butenyl-3-methylimidazolium, 1-butenyl-3-ethylimidazolium, 1-butenyl-3-propylimidazolium, 1-butenyl-3-butylimidazolium, 1-butenyl-2,3-dimethylimidazolium, 1-butenyl-2,3,4,5-tetramethylimidazolium, 1-methoxymethyl-3-methylimidazolium, 1-methoxymethyl-3-ethylimidazolium, 1-methoxymethyl-3-propylimidazolium, 1-methoxymethyl-3-butylimidazolium, 1-methoxymethyl-2,3-dimethylimidazolium, 1-methoxymethyl-2,3,4,5-tetramethylimidazolium, 1-methoxyethyl-3-methylimidazolium, 1-methoxyethyl-3-ethylimidazolium, 1-methoxyethyl-3-propylimidazolium, 1-methoxyethyl-3-butylimidazolium, 1-methoxyethyl-2,3-dimethylimidazolium, 1-methoxyethyl-2,3,4,5-tetramethylimidazolium, and the like.

Of the oxazolium cations represented by general formula (17), the following are preferred because the following cations are generally apt to form an ambient-temperature-molten salt. Preferred oxazolium cations are ones in which $R_{41}$ is any of ethyl, propyl, butyl, pentyl, and hexyl groups, compounds formed by replacing one or more of the hydrogen atoms of each of these alkyl groups with fluorine atoms, vinyl, allyl, butenyl, methoxymethyl, methoxyethyl, ethoxyethyl, methoxyethoxyethyl, and ethoxyethoxyethyl groups, and the like, and $R_{40}$, $R_{42}$, and $R_{43}$ each are a hydrogen atom or methyl.

Especially preferred of these are the following because the following oxazoliums are apt to bring about a low coefficient of viscosity: 1-ethyloxazolium, 1-propyloxazolium, 1-butyloxazolium, 1-pentyloxazolium, 1-hexyloxazolium, 1-allyloxazolium, 1-butenyloxazolium, 1-methoxymethyloxazolium, 1-methoxyethyloxazolium, 1-ethyl-2,4,5-trimethyloxazolium, 1-propyl-2,4,5-trimethyloxazolium, 1-butyl-2,4,5-trimethyloxazolium, 1-pentyl-2,4,5-trimethyloxazolium, 1-hexyl-2,4,5-trimethyloxazolium, 1-allyl-2,4,5-trimethyloxazolium, 1-butenyl-2,4,5-trimethyloxazolium, 1-methoxymethyl-2,4,5-trimethyloxazolium, 1-methoxyethyl-2,4,5-trimethyloxazolium, and the like.

Of the thiazolium cations represented by general formula (18), the following are preferred because the following cations are generally apt to form an ambient-temperature-molten salt. Preferred thiazolium cations are ones in which $R_{45}$ is any of ethyl, propyl, butyl, pentyl, and hexyl groups, compounds formed by replacing one or more of the hydrogen atoms of each of these alkyl groups with fluorine atoms, vinyl, allyl, butenyl, methoxymethyl, methoxyethyl, ethoxyethyl, methoxyethoxyethyl, and ethoxyethoxyethyl groups, and the like, and $R_{44}$, $R_{46}$, and $R_{47}$ each are a hydrogen atom or methyl.

Especially preferred of these are the following because the following thiazoliums are apt to bring about a low coefficient of viscosity: 1-ethylthiazolium, 1-propylthiazolium, 1-butylthiazolium, 1-pentylthiazolium, 1-hexylthiazolium, 1-allylthiazolium, 1-butenylthiazolium, 1-methoxymethylthiazolium, 1-methoxyethylthiazolium, 1-ethyl-2,4,5-trimethylthiazolium, 1-propyl-2,4,5-trimethylthiazolium, 1-butyl-2,4,5-trimethylthiazolium, 1-pentyl-2,4,5-trimethylthiazolium, 1-hexyl-2,4,5-trimethylthiazolium, 1-allyl-2,4,5-trimethylthiazolium, 1-butenyl-2,4,5-trimethylthiazolium, 1-methoxymethyl-2,4,5-trimethylthiazolium, 1-methoxyethyl-2,4,5-trimethylthiazolium, and the like.

Of the pyrazolium cations represented by general formula (19), the following are preferred because the following cations are generally apt to form an ambient-temperature-molten salt. Preferred pyrazolium cations are ones in which $R_{49}$ is any of ethyl, propyl, butyl, pentyl, and hexyl groups, compounds formed by replacing one or more of the hydrogen atoms of each of these alkyl groups with fluorine atoms, vinyl, allyl, butenyl, methoxymethyl, methoxyethyl, ethoxyethyl, methoxyethoxyethyl, and ethoxyethoxyethyl groups, and the like, and $R_{48}$ and $R_{50}$ to $R_{52}$ each are a hydrogen atom or methyl.

Especially preferred of these are the following because the following pyrazoliums are apt to bring about a low coefficient of viscosity: 1-ethylpyrazolium, 1-propylpyrazolium, 1-butylpyrazolium, 1-pentylpyrazolium, 1-hexylpyrazolium, 1-allylpyrazolium, 1-butenylpyrazolium, 1-methoxymethylpyrazolium, 1-methoxyethylpyrazolium, 1-ethyl-2,3,4,5-tetramethylpyrazolium, 1-propyl-2,3,4,5-tetramethylpyrazolium, 1-butyl-2,3,4,5-tetramethylpyrazolium, 1-pentyl-2,3,4,5-tetramethylpyrazolium, 1-hexyl-2,3,4,5-tetramethylpyrazolium, 1-allyl-2,3,4,5-tetramethylpyrazolium, 1-butenyl-2,3,4,5-tetramethylpyrazolium, 1-methoxymethyl-2,3,4,5-tetramethylpyrazolium, 1-methoxyethyl-2,3,4,5-tetramethylpyrazolium, and the like.

Of the triazolium cations represented by general formula (20), the following are preferred because the following cations are generally apt to form an ambient-temperature-molten salt. Preferred triazolium cations are ones in which $R_{54}$ is any of ethyl, propyl, butyl, pentyl, and hexyl groups, compounds formed by replacing one or more of the hydrogen atoms of each of these alkyl groups with fluorine atoms, vinyl, allyl, butenyl, methoxymethyl, methoxyethyl, ethoxyethyl, methoxyethoxyethyl, and ethoxyethoxyethyl groups, and the like, and $R_{53}$, $R_{55}$, and $R_{56}$ each are a hydrogen atom or methyl.

Especially preferred of these are the following because the following triazoliums are apt to bring about a low coefficient of viscosity: 1-ethyltriazolium, 1-propyltriazolium, 1-butyltriazolium, 1-pentyltriazolium, 1-hexyltriazolium, 1-allyltriazolium, 1-butenyltriazolium, 1-methoxymethyltriazolium, 1-methoxyethyltriazolium, 1-ethyl-2,3,4,5-tetramethyltriazolium, 1-propyl-2,3,4,5-tetramethyltriazolium, 1-butyl-2,3,4,5-tetramethyltriazolium, 1-pentyl-2,3,4,5-tetramethyltriazolium, 1-hexyl-2,3,4,5-tetramethyltriazolium, 1-allyl-2,3,4,5-tetramethyltriazolium, 1-butenyl-2,3,4,5-tetramethyltriazolium, 1-methoxymethyl-2,3,4,5-tetramethyltriazolium, 1-methoxyethyl-2,3,4,5-tetramethyltriazolium, and the like.

The anion of the quaternary ammonium salts having a structure represented by general formula (7) in invention 5 is not particularly limited. However, preferred examples thereof include the same anions as the anions of the lithium salts or the anions of the tertiary sulfonium salts having a structure represented by general formula (6).

[Compounds Represented by General Formula (8)]

$R_{8r}$, $R_{9r}$, $R_{10r}$, and $R_{11r}$ in the quaternary phosphonium cation structure represented by general formula (8) in invention 5 are organic groups which each have 1-12 carbon atoms and which may be the same or different. Examples of the $R_{8r}$, $R_{9r}$, $R_{10r}$, and include the same organic groups as those enumerated above with regard to the "$R_{1r}$, $R_{2r}$, and $R_{3r}$" in general formula (6) in invention 5, i.e., chain alkyl groups, cycloalkyl groups, alkenyl groups, alkynyl groups, halogenated alkyl groups, aryl groups such as phenyl which may have one or more alkyl substituents, aralkyl groups, trialkylsilyl groups, carbonyl-containing alkyl groups, alkyl groups containing one or more ether groups, and sulfonyl-containing alkyl groups. Preferred examples thereof also are the same as those enumerated above with regard to the "$R_{1r}$, $R_{2r}$, and $R_{3r}$" in general formula (6).

It is, however, noted that two to the four of the $R_{8r}$, $R_{9r}$, $R_{10r}$, and $R_{11r}$ may have been bonded to each other to form a ring structure, and that besides the substituents shown above, a substituent may have been bonded to $R_{8r}$, $R_{9r}$, $R_{10r}$, and $R_{11r}$ through a saturated or unsaturated bond involving a heteroatom such as oxygen, nitrogen, sulfur, or phosphorus.

quaternary phosphonium cation structure represented by general formula (8) in invention 5 in which two organic groups of the $R_{8r}$, $R_{9r}$, $R_{10r}$, and $R_{11r}$ actually are one organic group and this one organic group has been bonded to the "P$^+$" atom through a double bond is also included in general formula (8) in invention 5. Namely, the case where two of the $R_{8r}$, $R_{9r}$, $R_{10r}$, and $R_{11r}$ have been united with each other to form an alkylidene group is also included in general formula (8) in invention 5.

Preferred of those examples of $R_{8r}$ to $R_{10r}$ are alkyl groups having 1-10 carbon atoms, halogenated alkyl groups, allyl, and alkyl groups containing one or more ether groups. This is because these groups serve to reduce the intermolecular interaction of the phosphonium salt and are generally apt to impart a low melting point to the salt.

More preferred of such phosphonium structures are the following because the following phosphoniums are apt to bring about a low coefficient of viscosity: triethylbutylphosphonium, triethylpentylphosphonium, triethylhexylphosphonium, triethylheptylphosphonium, triethyloctylphosphonium, diethylpropylbutylphosphonium, diethylpropylpentylphosphonium, diethylpropylhexylphosphonium, diethylpropylheptylphosphonium, diethylpropyloctylphosphonium, diethylbutylpentylphosphonium, diethylbutylhexylphosphonium, diethylbutylheptylphosphonium, diethylbutyloctylphosphonium, diethylpentylhexylphosphonium, diethylpentylheptylphosphonium, diethylpentyloctylphosphonium, diethylhexylheptylphosphonium, diethylhexyloctylphosphonium, diethylheptyloctylphosphonium, diethyldioctylphosphonium, ethyldipropylbutylphosphonium, ethyldipropylpentylphosphonium, ethyldipropylhexylphosphonium, ethyldipropylheptylphosphonium, ethyldipropyloctylphosphonium, ethylpropyldibutylphosphonium, ethylpropylbutylpentylphosphonium, ethylpropylbutylhexylphosphonium, ethylpropylbutylheptylphosphonium, ethylpropylbutylpeoctylphosphonium, ethylpropyldipentylphosphonium, ethylpropylpentylhexylphosphonium, ethylpropylpentylheptylphosphonium, ethylpropylpentyloctylphosphonium, ethylpropyldihexylphosphonium, ethylpropylhexylheptylphosphonium, ethylpropylhexyloctylphosphonium, ethylpropyldiheptylphosphonium, ethylpropylheptyloctylphosphonium, ethylpropyldioctylphosphonium, ethyltributylphosphonium, ethyldibutylpentylphosphonium, ethyldibutylhexylphosphonium, ethyldibutylheptylphosphonium, ethyldibutyloctylphosphonium, ethylbutyldipentylphosphonium, ethylbutylpentylhexylphosphonium, ethylbutylpentylheptylphosphonium, ethylbutylpentyloctylphosphonium, ethylbutyldihexylphosphonium, ethylbutylhexylheptylphosphonium, ethylbutylhexyloctylphosphonium, ethylbutylheptyloctylphosphonium, ethylbutyldioctylphosphonium, ethyltripentylphosphonium, ethyldipentylhexylphosphonium, ethyldipentylheptylphosphonium, ethyldipentyloctylphosphonium, ethylpentyldihexylphosphonium, ethylpentylhexylheptylphosphonium, ethylpentylhexyloctylphosphonium, ethylpentyldiheptylphosphonium, ethylpentylheptyloctylphosphonium, ethylpentyldioctylphosphonium, ethyltrihexylphosphonium, ethyldihexylheptylphosphonium, ethyldihexyloctylphosphonium, ethylhexyldiheptylphosphonium, ethylhexylheptyloctylphosphonium, ethylhexyldioctylphosphonium, ethyltriheptylphosphonium, ethyldiheptyloctylphosphonium, ethylheptyldioctylphosphonium, ethyltrioctylphosphonium, tripropylbutylphosphonium, tripropylpentylphosphonium, tripropylhexylphosphonium, tripropylheptylphosphonium, tripropyloctylphosphonium, dipropyldibutylphosphonium, dipropylbutylpentylphosphonium, dipropylbutylhexylphosphonium, dipropylbutylheptylphosphonium, dipropylbutyloctylphosphonium, dipropyldipentylphosphonium, dipropylpentylhexylphosphonium, dipropylpentylheptylphosphonium, dipropylpentyloctylphosphonium, dipropyldihexylphosphonium, dipropylhexylheptylphosphonium, dipropylhexyloctylphosphonium, dipropyldiheptylphosphonium, dipropylheptyloctylphosphonium, dipropyldioctylphosphonium, propyltributylphosphonium, propyldibutylpentylphosphonium, propyldibutylhexylphosphonium, propyldibutylheptylphosphonium, propyldibutyloctylphosphonium, propylbutyldipentylphosphonium, propylbutylpentylhexylphosphonium, propylbutylpentylheptylphosphonium, propylbutylpentyloctylphosphonium, propylbutyldihexylphosphonium, propylbutylheptyloctylphosphonium, propylbutyldioctylphosphonium, propyltripentylphosphonium, propyldipentylhexylphosphonium, propyldipentylheptylphosphonium, propyldipentyloctylphosphonium, propylpentylhexylheptylphosphonium, propylpentylhexyloctylphosphonium, propylpentyldiheptylphosphonium, propylpentylheptyloctylphosphonium, propylpentyldioctylphosphonium, propyltrihexylphosphonium, propyldihexylheptylphosphonium, propyldihexyloctylphosphonium, propylhexyldiheptylphosphonium, propylhexylheptyloctylphosphonium, propylhexyldioctylphosphonium, propyltriheptylphosphonium, propyldiheptyloctylphosphonium, propylheptyldioctylphosphonium, propyltrioctylphosphonium, tetrabutylphosphonium, tributylpentylphosphonium, tributylhexylphosphonium, tributylheptylphosphonium, tributyloctylphosphonium, tetrapentylphosphonium, tripentylhexylphosphonium, tripentylheptylphosphonium, tripentyloctylphosphonium, tetrahexylphosphonium, trihexylheptylphosphonium, trihexyloctylphosphonium, tetraheptylphosphonium, triheptyloctylphosphonium, tetraoctylphosphonium, compounds formed by replacing one or more of the hydrogen atoms of the alkyl groups of any of these phosphoniums with fluorine atoms, triethylallylphosphonium, triethylbutenylphosphonium, tripropylallylphosphonium, tripropylbutenylphosphonium, tributylallylphosphonium, tributylbutenylphosphonium, triethylmethoxyethylphosphonium, triethylmethoxyethoxyethylphosphonium, tripropylmethoxyethylphosphonium, tripropylmethoxyethoxyethylphosphonium, tributylmethoxyethylphosphonium, tributylmethoxyethoxyethylphosphonium, and the like.

Especially preferred of these are triethylbutylphosphonium, triethylpentylphosphonium, triethylhexylphosphonium, triethylheptylphosphonium, triethyloctylphosphonium, tripropylbutylphosphonium, tripropylpentylphosphonium, tripropylhexylphosphonium, tripropylheptylphosphonium, tripropyloctylphosphonium, tetrabutylphosphonium, tributylpentylphosphonium, tributylhexylphosphonium, tributylheptylphosphonium, tributyloctylphosphonium, tetrapentylphosphonium, tripentylhexylphosphonium, tripentylheptylphosphonium, tripentyloctylphosphonium, tetrahexylphosphonium, trihexylheptylphosphonium, trihexyloctylphosphonium, tetraheptylphosphonium, triheptyloctylphosphonium, tetraoctylphosphonium, compounds formed by replacing one or more of the hydrogen atoms of the alkyl groups of any of these phosphoniums with fluorine atoms, triethylallylphosphonium, triethylbutenylphosphonium, tripropylallylphosphonium, tripropylbutenylphosphonium, tributylallylphosphonium, tributylbutenylphosphonium, triethylmethoxyethylphosphonium, triethylmethoxyethoxyethylphosphonium, tripropylmethoxyethylphosphonium, tripropylmethoxyethoxyethylphosphonium, tributylmethoxyethylphosphonium, tributylmethoxyethoxyethylphosphonium, and the like. This is because these cations enable the ambient-temperature-molten salt to have a moderate number of ions per unit volume (i.e., ion density) so as not to impair the features of the ambient-temperature-molten salt. Namely, these cations enable the ambient-temperature-molten salt to have an excellent balance between melting point and the coefficient of viscosity.

The anion of the quaternary phosphonium salts having a structure represented by general formula (3) in invention 5 is not particularly limited. However, preferred examples thereof include the same anions as the anions of the lithium salts, the anions of the tertiary sulfonium salts having a structure represented by general formula (1), or the anions of the quaternary ammonium salts having a structure represented by general formula (2).

The nonaqueous solvent in the nonaqueous electrolyte in invention 5 may contain compounds conventionally known as solvents for nonaqueous electrolytes, so long as this does not lessen the effects of invention 5. In this case, one or more solvents may be suitably selected from known solvents for nonaqueous electrolytes and used. Preferred examples of the nonaqueous solvent include combinations respectively consisting mainly of: an ambient-temperature-molten salt and a chain carbonate; an ambient-temperature-molten salt and a cyclic carbonate; an ambient-temperature-molten salt and a cyclic ester; an ambient-temperature-molten salt and a cyclic sulfone; an ambient-temperature-molten salt and a fluorinated chain ether; an ambient-temperature-molten salt and a fluorinated chain carbonate; an ambient-temperature-molten salt and a polysiloxane having a molecular weight of about 500-3,000; an ambient-temperature-molten salt and a polyether having a molecular weight of about 700-3,000; and an ambient-temperature-molten salt and a phosphoric acid ester.

It is preferred that the ambient-temperature-molten salt should be contained in an amount of from 0.01% by mass to 100% by mass based on the component (s) of the nonaqueous electrolyte excluding both the lithium salt and the "monofluorophosphate and difluorophosphate" which will be described later. Examples of the component(s) of the nonaqueous electrolyte excluding both the lithium salt and the "monofluorophosphate and difluorophosphate" include chain or cyclic carbonates, chain or cyclic esters, chain or cyclic sulfones, chain or cyclic ethers, products of the fluorination of these compounds, "high-boiling solvents and noncombustible solvents" such as polysiloxanes, and polyethers. Examples thereof further include the nonaqueous solvent which will be described later.

The content of the ambient-temperature-molten salt is more preferably from 50% by mass to 100% by mass, especially preferably from 60% by mass to 95% by mass, even more preferably from 70% by mass to 90% by mass, based on all the component(s). When the content of the ambient-temperature-molten salt is too low, there are cases where the effect of imparting safety, such as nonflammability and high thermal stability, to the nonaqueous electrolyte is not obtained. On the other hand, when the content thereof is too high, this nonaqueous electrolyte has too high viscosity, depending on the structure of the ambient-temperature-molten salt, and there are cases where this nonaqueous electrolyte has a reduced ionic conductivity or is less apt to infiltrate into the separator and the positive electrode/negative electrode.

In invention 5, one preferred nonaqueous-solvent combination including an ambient-temperature-molten salt is a combination consisting mainly of an ambient-temperature-molten salt and a cyclic carbonate. In particular, this combination is one in which the proportion of the ambient-temperature-molten salt in the nonaqueous solvent is 50% by mass or higher, preferably 60% by mass or higher, more preferably 70% by mass or higher, and is generally 95% by mass or lower, preferably 90% by mass or lower, more preferably 85% by mass or lower. Use of this nonaqueous-solvent combination is preferred for the following reasons. The nonaqueous electrolyte has a lower coefficient of viscosity than in the case of using the ambient-temperature-molten salt as the only solvent for a nonaqueous electrolyte, and the cyclic carbonate has the effect of forming a satisfactory coating film on the surface of the negative electrode. Because of this, the battery produced using this nonaqueous-solvent combination is satisfactory in high-current density charge/discharge capacity and cycle performances.

Examples of the preferred combination of an ambient-temperature-molten salt and a "cyclic carbonate, cyclic ester, or cyclic sulfone" include: an ambient-temperature-molten salt and ethylene carbonate; an ambient-temperature-molten salt and propylene carbonate; an ambient-temperature-molten salt and fluoroethylene carbonate; an ambient-temperature-molten salt and butylene carbonate; an ambient-temperature-molten salt and γ-butyrolactone; an ambient-temperature-molten salt and γ-valerolactone; an ambient-temperature-molten salt and sulfolane; and an ambient-temperature-molten salt and fluorosulfolane.

Another preferred combination is a combination consisting mainly of an ambient-temperature-molten salt and a fluorinated chain ether. In particular, this combination is one in which the proportion of the ambient-temperature-molten salt in the nonaqueous solvent is 50% by mass or higher, preferably 60% by mass or higher, more preferably 70% by mass or higher, and is generally 95% by mass or lower, preferably 90% by mass or lower, more preferably 85% by mass or lower. Use of this nonaqueous-solvent combination is preferred for the following reasons. This nonaqueous-solvent combination enables the nonaqueous electrolyte to have a lower coefficient of viscosity than in the case of using the ambient-temperature-molten salt as the only solvent for a nonaqueous electrolyte, without impairing the nonflammability of the ambient-temperature-molten salt, and this nonaqueous electrolyte is more apt to infiltrate into pores of the positive electrode and negative electrode. Because of this, the battery produced using this nonaqueous-solvent combination has improved high-current density charge/discharge capacity.

Examples of the preferred combination of an ambient-temperature-molten salt and a fluorinated chain ether include: an ambient-temperature-molten salt and nonafluorobutyl methyl ether; an ambient-temperature-molten salt and nonafluorobutyl ethyl ether; an ambient-temperature-molten salt and trifluoroethoxyethoxymethane; an ambient-temperature-molten salt and trifluoroethoxyethoxyethane; an ambient-temperature-molten salt and hexafluoroethoxyethoxymethane; and an ambient-temperature-molten salt and hexafluoroethoxyethoxyethane.

Examples of the preferred combination of an ambient-temperature-molten salt and a phosphoric acid ester include: an ambient-temperature-molten salt and trimethyl phosphate; an ambient-temperature-molten salt and triethyl phosphate; an ambient-temperature-molten salt and dimethyl ethyl phosphate; an ambient-temperature-molten salt and methyl diethyl phosphate; an ambient-temperature-molten salt and tristrifluoroethyl phosphate; an ambient-temperature-molten salt and ethylene methyl phosphate; an ambient-temperature-molten salt and ethylene ethyl phosphate; an ambient-temperature-molten salt and trihexyl phosphate; and an ambient-temperature-molten salt and trioctyl phosphate.

<1-3. Monofluorophosphate and Difluorophosphate>

The nonaqueous electrolyte in invention 5 contains a "monofluorophosphate and/or difluorophosphate" besides the lithium salt and ambient-temperature-molten salt described above.

The counter cations of the monofluorophosphate and difluorophosphate are not particularly limited. Examples thereof include metal elements such as Li, Na, K, Mg, Ca, Fe, and Cu, and further include tertiary sulfoniums represented by general formula (6), quaternary ammoniums represented by general formula (7), and quaternary phosphoniums represented by general formula (8). The counter cations represented by general formulae (6) to (8) are the same as the structures usable in the ambient-temperature-molten salt.

Preferred of those counter cations, from the standpoint of the characteristics of the battery employing the nonaqueous electrolyte, are lithium, sodium, potassium, magnesium, calcium, or the tertiary sulfoniums, quaternary ammoniums, or quaternary phosphoniums. Lithium is especially preferred.

Of such monofluorophosphates and difluorophosphates, the difluorophosphates are preferred from the standpoints of the cycle performances, high-temperature storability, etc. of the battery. Especially preferred is lithium difluorophosphoate. Such compounds synthesized in a nonaqueous solvent may be used substantially as they are. Alternatively, such a compound which has been separately synthesized and substantially isolated may be added to a nonaqueous solvent or to a nonaqueous electrolyte.

The amount of the "monofluorophosphate and/or difluorophosphate" to be incorporated, based on the whole nonaqueous electrolyte of invention 5, is not limited, and may be any desired value unless this considerably lessens the effects of invention 5. However, the monofluorophosphate and/or difluorophosphate is incorporated in a total concentration which is generally 0.001% by mass or higher, preferably 0.01% by mass or higher, more preferably 0.1% by mass or higher, and is generally 20% by mass or lower, preferably 10% by mass or lower, more preferably 5% by mass or lower, based on the whole nonaqueous electrolyte of invention 5. When the amount thereof is too large, there are cases where the salts precipitate at low temperatures to reduce battery characteristics. On the other hand, when the amount thereof is too small, there are cases where the effect of improving cycle performances, high-temperature storability, etc. decreases considerably. It is, however, noted that when the monofluorophosphate and/or difluorophosphate serves also as an ambient-temperature-molten salt, this ingredient is incorporated in a concentration which is generally 0.001% by mass or higher, preferably 0.01% by mass or higher, more preferably 0.1% by mass or higher, and is generally 100% by mass or lower, preferably 95% by mass or lower, more preferably 90% by mass or lower, especially preferably 85% by mass or lower. When the amount thereof is too large, there are cases where this nonaqueous electrolyte has increased viscosity to have a reduced ionic conductivity or be less apt to infiltrate into the separator and the positive electrode/negative electrode. On the other hand, when the amount thereof is too small, there are cases where the effect of improving low-temperature characteristics, cycle performances, high-temperature storability, etc. decreases considerably as in the case described above.

The molecular weight of the monofluorophosphate or difluorophosphate, processes for producing the salt, etc. are the same as those described above with regard to invention 1.

Furthermore, the time at which a monofluorophosphate or difluorophosphate is detected (the time at which the salt is contained), the place into which the salt is incorporated first (derivation of containment), means of incorporating the salt, detection places based on which the salt is considered to be contained (or have been contained) in the nonaqueous electrolyte, etc. are also the same as those described above with regard to invention 1.

<1-4. Other Compounds>

The nonaqueous electrolyte of invention 5 can contain "other compounds" so long as this does not lessen the effects of invention 5. Examples of such "other compounds" include conventionally known various compounds such as negative-electrode coating agents, positive-electrode protective agents, overcharge inhibitors, and aids.

<1-4-1. Negative-Electrode Coating Agent>

By incorporating a negative-electrode coating agent, the reversibility of lithium ion reactions occurring at the negative electrode can be improved and charge/discharge capacity, charge/discharge efficiency, and cycle performances can be improved. Preferred examples of the negative-electrode coating agent include vinylene carbonate, vinylethylene carbonate, and fluoroethylene carbonate. One of such negative-electrode coating agents may be used alone, or any desired combination of two or more thereof in any desired proportion may be used.

The content of these negative-electrode coating agents in the nonaqueous electrolyte is not particularly limited. However, the content of each negative-electrode coating agent may be 0.01% by mass or higher, preferably 0.1% by mass or higher, more preferably 0.2% by mass or higher, based on the whole nonaqueous electrolyte. The upper limit thereof may be 12% by mass or lower, preferably 10% by mass or lower, more preferably 8% by mass or lower.

<1-4-2. Positive-Electrode Protective Agent>

By incorporating a positive-electrode protective agent, capacity retention and cycle performances after high-temperature storage can be improved. Preferred examples of the positive-electrode protective agent include ethylene sulfite, propylene sulfite, propanesultone, butanesultone, methyl methanesulfonate, and busulfan. Two or more of these may be used in combination.

The content of these positive-electrode protective agents in the nonaqueous electrolyte is not particularly limited. However, the content of each positive-electrode protective agent may be 0.01% by mass or higher, preferably 0.1% by mass or higher, more preferably 0.2% by mass or higher, based on the whole nonaqueous electrolyte. The upper limit thereof may be 5% by mass or lower, preferably 3% by mass or lower, more preferably 2% by mass or lower.

<1-4-3. Overcharge Inhibitor>

By incorporating an overcharge inhibitor, the battery can be inhibited from rupturing/igniting upon overcharge, etc.

Examples of the overcharge inhibitor include those enumerated above with regard to invention 1. The proportion of the overcharge inhibitor in the nonaqueous electrolyte is generally 0.1% by mass or higher, preferably 0.2% by mass or higher, especially preferably 0.3% by mass or higher, most preferably 0.5% by mass or higher, based on the whole nonaqueous electrolyte. The upper limit thereof is generally 5% by mass or lower, preferably 3% by mass or lower, especially preferably 2% by mass or lower. In case where the concentration thereof is lower than the lower limit, the overcharge inhibitor produces almost no effect. Conversely, in case where the concentration thereof is too high, battery characteristics such as high-temperature storability tend to decrease.

<1-4-4. Aids>

Examples of the aids include those enumerated above with regard to invention 1. Two or more of these may be used in combination. Of these aids, it is preferred to add a carbonate having at least one of an unsaturated bond and a halogen atom (hereinafter sometimes referred to as "specific carbonate") as an aid for improving capacity retention after high-temperature storage and cycle performances. Examples of the specific carbonate are the same as in invention 1.

The proportion of these aids in the nonaqueous electrolyte is generally 0.01% by mass or higher, preferably 0.1% by mass or higher, especially preferably 0.2% by mass or higher, based on the whole nonaqueous electrolyte. The upper limit thereof is generally 5% by mass or lower, preferably 3% by mass or lower, especially preferably 1% by mass or lower. By adding those aids, capacity retention after high-temperature storage and cycle performances can be improved. In case where the concentration thereof is lower than the lower limit, the aids produce almost no effect. Conversely, in case where the concentration thereof is too high, battery characteristics such as high-load discharge characteristics tend to decrease.

<1-5. Preparation of Nonaqueous Electrolyte>

The nonaqueous electrolyte in invention 5 can be prepared by dissolving a lithium salt, an ambient-temperature-molten salt, a monofluorophosphate or difluorophosphate in each other optionally together with "other compounds". It is preferred that in preparing the nonaqueous electrolyte, each of the raw materials should be dehydrated beforehand in order to reduce the water content of the nonaqueous electrolyte to be obtained. It is desirable to dehydrate each raw material to generally 50 ppm or lower, preferably 30 ppm or lower, especially preferably 10 ppm or lower. It is also possible to conduct dehydration, deacidification, and the like after the preparation of a nonaqueous electrolyte.

The nonaqueous electrolyte of invention 5 is suitable for use as an electrolyte for nonaqueous-electrolyte batteries, in particular, for secondary batteries, e.g., lithium secondary batteries. The nonaqueous-electrolyte battery employing the nonaqueous electrolyte of invention 5 is explained below.

<1-6. Process for Producing Nonaqueous Electrolyte>

For producing the nonaqueous electrolyte of invention 5, the same process as in invention 1 can be used.

[2. Nonaqueous-Electrolyte Secondary Battery]

The nonaqueous-electrolyte secondary battery of invention 5 includes: a negative electrode and a positive electrode which are capable of occluding and releasing ions; and the nonaqueous electrolyte of invention 5 described above.

The following are the same as those described above with regard to invention 1: battery constitution; negative electrode; carbonaceous material; constitution and properties of carbonaceous negative electrode and method of preparation thereof; metal compound material, constitution and properties of negative electrode employing metal compound material, and method of preparation thereof; positive electrode; separator; battery design; and the like. [Current Collector Structure]

The current collector structure is not particularly limited. However, for more effectively realizing the improvement in high-current-density charge/discharge characteristics which is brought about by the nonaqueous electrolyte of invention 5, it is preferred to employ a structure reduced in the resistance of wiring parts and joint parts. In the case where internal resistance has been reduced in this manner, use of the nonaqueous electrolyte of invention 5 produces its effects especially satisfactorily.

In the case of electrode groups assembled into the multilayer structure described above, a structure obtained by bundling the metallic core parts of respective electrode layers and welding the bundled parts to a terminal is suitable. When each electrode has a large area, this results in increased internal resistance. In this case, it is preferred to dispose two or more terminals in each electrode to reduce the resistance. In the case of an electrode group having the wound structure described above, two or more lead structures may be disposed on each of the positive electrode and negative electrode and bundled into a terminal, whereby internal resistance can be reduced.

By optimizing the structure described above, internal resistance can be minimized. In batteries to be used at a heavy current, it is preferred that the impedance thereof as measured by the 10-kHz alternating-current method (hereinafter referred to as "direct-current resistance component") should be regulated to 10 milliohms (m$\Omega$) or lower. It is more preferred to regulate the direct-current resistance component thereof to 5 m$\Omega$ or lower. When the direct-current resistance component is reduced to 0.1 m$\Omega$ or lower, output characteristics improve. However, this regulation results in an increased proportion of current collector structure materials and may reduce the battery capacity.

[Function]

According to invention 5, a "monofluorophosphate and/or difluorophosphate", which each has, for example, the effect of reducing interfacial resistance and the effect of improving suitability for charge/discharge cycling, is incorporated into a nonaqueous electrolyte comprising an ambient-temperature-molten salt. Although the mechanism by which invention 5 produces these effects is not clear and although invention 5 should not be construed as being limited by the following mechanism, the following is thought. The monofluorophosphate or difluorophosphate, among the compounds constituting the nonaqueous electrolyte, preferentially acts on the electrodes and is concentrated at the electrode interfaces or adsorbed onto the electrode surfaces. The salt thereby prevents the positive-electrode active material from dissolving away in the nonaqueous electrolyte and inhibits electron conduction paths from breaking due to volume changes of the electrode active material with charge/discharge. In the case of lithium monofluorophosphate or lithium difluorophosphate, this salt has the function of heightening lithium concentration on an electrode surface. These are presumed to give the effects of reducing interfacial resistance and improving suitability for charge/discharge cycling. In addition, since the monofluorophosphate and difluorophosphate are inorganic substances, this electrolyte is free from the evolution of any combustible gas derived from the decomposition of these salts.

Lithium monofluorophosphate and lithium difluorophosphate have exceedingly low solubility in general nonaqueous electrolytes including a cyclic carbonate such as ethylene carbonate and a chain carbonate such as dimethyl carbonate as main components. However, the lithium salts can be dissolved in a larger amount in ambient-temperature-molten salts than in the organic-solvent electrolytes. In addition, a monofluorophosphate anion or difluorophosphate anion may be used as the counter anion of an ambient-temperature-molten salt. By thus using a monofluorophosphate or difluorophosphate and an ambient-temperature-molten salt in combination, the effects of reducing interfacial resistance and improving charge/discharge cycle performances can be brought about more remarkably and synergistically.

EXAMPLES

The invention will be explained below in more detail by reference to Examples and Comparative Examples. However, the invention should not be construed as being limited to the following Examples unless the invention departs from the spirit thereof.

With Respect to Invention 1

[Production of Positive Electrode]

Ninety-two parts by weight of lithium cobalt oxide (LiCoO$_2$) was mixed with 4 parts by weight of poly(vinylidene fluoride) (hereinafter abbreviated to "PVdF") and 4 parts by weight of acetylene black. N-Methylpyrrolidone was added to the mixture to slurry it. This slurry was applied to each side of a current collector made of aluminum, and the coating was dried to obtain a positive electrode.

[Production of Negative Electrode]

Ninety-two parts by weight of a graphite powder was mixed with 8 parts by weight of PVdF, and N-methylpyrrolidone was added to the mixture to slurry it. This slurry was applied to one side of a current collector made of copper, and the coating was dried to obtain a negative electrode.

[Production of Nonaqueous-Electrolyte Secondary Battery]

The positive electrode and negative electrode described above and a separator made of polyethylene were superposed in the order of negative electrode/separator/positive electrode/separator/negative electrode. The battery element thus obtained was wrapped in a cylindrical aluminum-laminated film. The electrolyte which will be described later was introduced into this package, which was then vacuum-sealed. Thus, a sheet-form nonaqueous-electrolyte secondary battery was produced. Furthermore, this sheet battery was pressed by being sandwiched between glass plates, in order to enhance contact between the electrodes.

[Capacity Evaluation]

In a 25° C. thermostatic chamber, the sheet-form non-aqueous-electrolyte secondary battery was subjected to constant-current constant-voltage charge (hereinafter suitably referred to as "CCCV charge") to 4.4 V at 0.2 C and then discharged to 3.0 V at 0.2 C. This operation was repeated three times to conduct conditioning. Subsequently, this battery was subjected again to CCCV charge to 4.4 V at 0.7 C and discharged again to 3.0 V at 10 to determine initial discharge capacity. The cutoff current in each charging operation was set at 0.05 C. Incidentally, "1 C" means a current value at which the whole capacity of the battery is discharged over 1 hour.

[Evaluation of Cycle Performances]

The battery which had undergone the capacity evaluation test was placed in a 25° C. thermostatic chamber and repeatedly subjected to 50 cycles of charge/discharge in each of which the battery was charged by CCCV charge to 4.4 V at 0.7 C and discharged to 3 V at a constant current of 1 C. The capacity retention after the 50 cycles was determined according to the following calculation equation. Based on this value, cycle performances were evaluated. The larger the value of this property, the lower the cycle deterioration of the battery.

Capacity retention after 50 cycles (%)=[(discharge capacity in 50th cycle (mAh/g))/(discharge capacity in 1st cycle (mAh/g))]×100

Example 1 of Invention 1

$LiPF_6$ as an electrolyte was dissolved, in a proportion of 1 mol/L, in a mixed solvent composed of ethylene carbonate (EC) and ethyl methyl carbonate (EMC) (mixing volume ratio, 2:8). This solution is referred to as base electrolyte (I). A nonaqueous electrolyte was prepared by adding lithium difluorophosphate ($LiPO_2F_2$) and nickel (II) hexafluorophosphate ($Ni(PF_6)_2$) as an iron-group element compound to the base electrolyte (I) in concentrations of 0.5% by mass and 20 ppm (corresponding to Ni element concentration of 3.4 ppm), respectively, based on the nonaqueous electrolyte. Using the nonaqueous electrolyte obtained, a nonaqueous-electrolyte secondary battery was produced by the method described above. This battery was subjected to the capacity evaluation and the evaluation of cycle performances. The results thereof are shown in Table 1.

Example 2 of Invention 1

A nonaqueous electrolyte was prepared by adding lithium difluorophosphate ($LiPO_2F_2$) and nickel (II) hexafluorophosphate ($Ni(PF_6)_2$) as an iron-group element compound to the base electrolyte (I) in concentrations of 0.5% by mass and 50 ppm (corresponding to Ni element concentration of 8.4 ppm), respectively, based on the nonaqueous electrolyte. Using this nonaqueous electrolyte, a nonaqueous-electrolyte secondary battery was produced by the method described above. This battery was subjected to the capacity evaluation and the evaluation of cycle performances. The results thereof are shown in Table 1.

Example 3 of Invention 1

A nonaqueous electrolyte was prepared by adding lithium difluorophosphate ($LiPO_2F_2$) and nickel (II) hexafluorophosphate ($Ni(PF_6)_2$) as an iron-group element compound to the base electrolyte (I) in concentrations of 0.5% by mass and 100 ppm (corresponding to Ni element concentration of 16.8 ppm), respectively, based on the nonaqueous electrolyte. Using this nonaqueous electrolyte, a nonaqueous-electrolyte secondary battery was produced by the method described above. This battery was subjected to the capacity evaluation and the evaluation of cycle performances. The results thereof are shown in Table 1.

Example 4 of Invention 1

A nonaqueous electrolyte was prepared by adding lithium difluorophosphate ($LiPO_2F_2$) and nickel (II) hexafluorophosphate ($Ni(PF_6)_2$) as an iron-group element compound to the base electrolyte (I) in concentrations of 0.5% by mass and 200 ppm (corresponding to Ni element concentration of 33.7 ppm), respectively, based on the nonaqueous electrolyte. Using this nonaqueous electrolyte, a nonaqueous-electrolyte secondary battery was produced by the method described above. This battery was subjected to the capacity evaluation and the evaluation of cycle performances. The results thereof are shown in Table 1.

Example 5 of Invention 1

A nonaqueous electrolyte was prepared by adding lithium difluorophosphate ($LiPO_2F_2$) and nickel (II) hexafluorophosphate ($Ni(PF_6)_2$) as an iron-group element compound to the base electrolyte (I) in concentrations of 0.5% by mass and 300 ppm (corresponding to Ni element concentration of 50.5 ppm), respectively, based on the nonaqueous electrolyte. Using this nonaqueous electrolyte, a nonaqueous-electrolyte secondary battery was produced by the method described above. This battery was subjected to the capacity evaluation and the evaluation of cycle performances. The results thereof are shown in Table 1.

Example 6 of Invention 1

A nonaqueous electrolyte was prepared by adding lithium difluorophosphate ($LiPO_2F_2$) and nickel (II) hexafluorophosphate ($Ni(PF_6)_2$) as an iron-group element compound to the base electrolyte (I) in concentrations of 0.5% by mass and 1,000 ppm (corresponding to Ni element concentration of 168 ppm), respectively, based on the nonaqueous electrolyte. Using this nonaqueous electrolyte, a nonaqueous-electrolyte secondary battery was produced by the method described above. This battery was subjected to the capacity evaluation and the evaluation of cycle performances. The results thereof are shown in Table 1.

Example 7 of Invention 1

A nonaqueous electrolyte was prepared by adding lithium difluorophosphate ($LiPO_2F_2$) and nickel (II) hexafluorophosphate ($Ni(PF_6)_2$) as an iron-group element compound to the base electrolyte (I) in concentrations of 0.5% by mass and 3,500 ppm (corresponding to Ni element concentration of 589 ppm), respectively, based on the nonaqueous electrolyte. Using this nonaqueous electrolyte, a nonaqueous-electrolyte secondary battery was produced by the method described above. This battery was subjected to the capacity evaluation and the evaluation of cycle performances. The results thereof are shown in Table 1.

Example 8 of Invention 1

A nonaqueous electrolyte was prepared by adding lithium difluorophosphate ($LiPO_2F_2$) and nickel (II) hexafluorophosphate ($Ni(PF_6)_2$) as an iron-group element compound to the base electrolyte (I) in concentrations of 0.5% by mass and 10,000 ppm (corresponding to Ni element concentration of 1,684 ppm), respectively, based on the nonaqueous electrolyte. Using this nonaqueous electrolyte, a nonaqueous-electrolyte secondary battery was produced by the method described above. This battery was subjected to the capacity evaluation and the evaluation of cycle performances. The results thereof are shown in Table 1.

Example 9 of Invention 1

A nonaqueous electrolyte was prepared by adding lithium difluorophosphate ($LiPO_2F_2$) and cobalt (II) hexafluorophosphate ($Co(PF_6)_2$) as an iron-group element compound to the base electrolyte (I) in concentrations of 0.5% by mass and 50 ppm (corresponding to Co element concentration of 8.4 ppm), respectively, based on the nonaqueous electrolyte. Using this nonaqueous electrolyte, a nonaqueous-electrolyte secondary battery was produced by the method described above. This battery was subjected to the capacity evaluation and the evaluation of cycle performances. The results thereof are shown in Table 1.

Example 10 of Invention 1

A nonaqueous electrolyte was prepared by adding lithium difluorophosphate ($LiPO_2F_2$) and cobalt(II) hexafluorophosphate ($Co(PF_6)_2$) as an iron-group element compound to the base electrolyte (I) in concentrations of 0.5% by mass and 100 ppm (corresponding to Co element concentration of 16.9 ppm), respectively, based on the nonaqueous electrolyte. Using this nonaqueous electrolyte, a nonaqueous-electrolyte secondary battery was produced by the method described above. This battery was subjected to the capacity evaluation and the evaluation of cycle performances. The results thereof are shown in Table 1.

Comparative Example 1 for Invention 1

A nonaqueous electrolyte was prepared by adding lithium difluorophosphate ($LiPO_2F_2$) only to the base electrolyte (I) in a concentration of 0.5% by mass based on the nonaqueous electrolyte. Using this nonaqueous electrolyte, a nonaqueous-electrolyte secondary battery was produced by the method described above. This battery was subjected to the capacity evaluation and the evaluation of cycle performances. The results thereof are shown in Table 1.

Comparative Example 2 for Invention 1

A nonaqueous electrolyte was prepared by adding nickel (II) hexafluorophosphate ($Ni(PF_6)_2$) only as an iron-group element compound to the base electrolyte (I) in a concentration of 100 ppm (corresponding to Ni element concentration of 16.8 ppm) based on the nonaqueous electrolyte. Using this nonaqueous electrolyte, a nonaqueous-electrolyte secondary battery was produced by the method described above. This battery was subjected to the capacity evaluation and the evaluation of cycle performances. The results thereof are shown in Table 1.

TABLE 1

| No. | Monofluorophosphate or difluorophosphate (mass %) | | Iron-group element | | | Capacity retention after cycling (%) |
|---|---|---|---|---|---|---|
| | | | Kind of iron-group element compound | Concentration of iron-group element compound (ppm) | Concentration of iron-group element (ppm) | |
| Example 1 | $LiPO_2F_2$ | 0.5% | $Ni(PF_6)_2$ | 20 | 3.4 | 95.1 |
| Example 2 | $LiPO_2F_2$ | 0.5% | $Ni(PF_6)_2$ | 50 | 8.4 | 95.8 |
| Example 3 | $LiPO_2F_2$ | 0.5% | $Ni(PF_6)_2$ | 100 | 16.8 | 96.3 |
| Example 4 | $LiPO_2F_2$ | 0.5% | $Ni(PF_6)_2$ | 200 | 33.7 | 95.2 |
| Example 5 | $LiPO_2F_2$ | 0.5% | $Ni(PF_6)_2$ | 300 | 50.5 | 94.6 |
| Example 6 | $LiPO_2F_2$ | 0.5% | $Ni(PF_6)_2$ | 1000 | 168 | 94.0 |
| Example 7 | $LiPO_2F_2$ | 0.5% | $Ni(PF_6)_2$ | 3500 | 589 | 93.7 |
| Example 8 | $LiPO_2F_2$ | 0.5% | $Ni(PF_6)_2$ | 10000 | 1684 | 93.0 |
| Example 9 | $LiPO_2F_2$ | 0.5% | $Co(PF_6)_2$ | 50 | 8.4 | 95.1 |
| Example 10 | $LiPO_2F_2$ | 0.5% | $Co(PF_6)_2$ | 100 | 16.9 | 95.5 |
| Comparative Example 1 | $LiPO_2F_2$ | 0.5% | none | 0 | 0 | 92.2 |
| Comparative Example 2 | none | | $Ni(PF_6)_2$ | 100 | 16.8 | 88.6 |

As apparent from Table 1, the following was found. The nonaqueous-electrolyte secondary batteries of Example 1 to Example 10 of invention 1, which employed nonaqueous electrolytes of invention 1 containing an iron-group element and a "monofluorophosphate and/or difluorophosphate", had better cycle performances (capacity retention after cycling) than the nonaqueous-electrolyte secondary batteries containing a difluorophosphate only (Comparative Example 1 for Invention 1) or containing an iron-group element only (Comparative Example 2 for Invention 1).

Example 1 of Invention 1-1

With Respect to Invention 1-1

A nonaqueous electrolyte was prepared by adding lithium difluorophosphate ($LiPO_2F_2$) and nickel (II) hexafluorophosphate ($Ni(PF_6)_2$) as an iron-group element compound to the same base electrolyte (I) as in Example 1 of Invention 1 in concentrations of 0.5% by mass and 0.1 ppm (corresponding to Ni element concentration of 0.02 ppm), respectively, based on the nonaqueous electrolyte. Using the nonaqueous electrolyte obtained, a nonaqueous-electrolyte secondary battery was produced by the method described in the Examples of Invention 1. This battery was subjected to the capacity evaluation and the evaluation of cycle performances. The results obtained are shown in Table 1-1.

Example 2 of Invention 1-1

A nonaqueous electrolyte was prepared by adding lithium difluorophosphate ($LiPO_2F_2$) and nickel (II) hexafluorophosphate ($Ni(PF_6)_2$) as an iron-group element compound to the base electrolyte (I) in concentrations of 0.5% by mass and 1 ppm (corresponding to Ni element concentration of 0.17 ppm), respectively, based on the nonaqueous electrolyte. Using this nonaqueous electrolyte, a nonaqueous-electrolyte secondary battery was produced by the method described in the Examples of Invention 1. This battery was subjected to the capacity evaluation and the evaluation of cycle performances. The results obtained are shown in Table 1-1.

Example 3 of Invention 1-1

A nonaqueous electrolyte was prepared by adding lithium difluorophosphate ($LiPO_2F_2$) and nickel (II) hexafluorophosphate ($Ni(PF_6)_2$) as an iron-group element compound to the base electrolyte (I) in concentrations of 0.5% by mass and 3 ppm (corresponding to Ni element concentration of 0.51 ppm), respectively, based on the nonaqueous electrolyte. Using this nonaqueous electrolyte, a nonaqueous-electrolyte secondary battery was produced by the method described in the Examples of Invention 1. This battery was subjected to the capacity evaluation and the evaluation of cycle performances. The results obtained are shown in Table 1-1.

Example 4 of Invention 1-1

A nonaqueous electrolyte was prepared by adding lithium difluorophosphate ($LiPO_2F_2$) and nickel (II) hexafluorophosphate ($Ni(PF_6)_2$) as an iron-group element compound to the base electrolyte (I) in concentrations of 0.5% by mass and 5 ppm (corresponding to Ni element concentration of 0.84 ppm), respectively, based on the nonaqueous electrolyte. Using this nonaqueous electrolyte, a nonaqueous-electrolyte secondary battery was produced by the method described in the Examples of Invention 1. This battery was subjected to the capacity evaluation and the evaluation of cycle performances. The results obtained are shown in Table 1-1.

Example 5 of Invention 1-1

A nonaqueous electrolyte was prepared by adding lithium difluorophosphate ($LiPO_2F_2$) and cobalt(II) hexafluorophosphate ($Co(PF_6)_2$) as an iron-group element compound to the base electrolyte (I) in concentrations of 0.5% by mass and 3 ppm (corresponding to Co element concentration of 0.51 ppm), respectively, based on the nonaqueous electrolyte. Using this nonaqueous electrolyte, a nonaqueous-electrolyte secondary battery was produced by the method described in the Examples of Invention 1. This battery was subjected to the capacity evaluation and the evaluation of cycle performances. The results obtained are shown in Table 1-1.

TABLE 1-1

| No. | Monofluorophosphoric acid salt or difluorophosphoric acid salt (mass %) | Iron-group element in nonaqueous electrolyte | | | Capacity retention after cycling (%) |
|---|---|---|---|---|---|
| | | Kind of iron-family-element compound | Concentration of iron-family-element compound (ppm) | Concentration of iron-family element (ppm) | |
| Example 1 | $LiPO_2F_2$: 0.5 | $Ni(PF_6)_2$ | 0.1 | 0.02 | 93.8 |
| Example 2 | $LiPO_2F_2$: 0.5 | $Ni(PF_6)_2$ | 1 | 0.17 | 94.2 |
| Example 3 | $LiPO_2F_2$: 0.5 | $Ni(PF_6)_2$ | 3 | 0.51 | 95.2 |
| Example 4 | $LiPO_2F_2$: 0.5 | $Ni(PF_6)_2$ | 5 | 0.84 | 94.9 |
| Example 5 | $LiPO_2F_2$: 0.5 | $Co(PF_6)_2$ | 3 | 0.51 | 94.5 |
| Comparative Example 1 | $LiPO_2F_2$: 0.5 | none | 0 | 0 | 92.2 |
| Comparative Example 2 | none | $Ni(PF_6)_2$ | 100 | 16.8 | 88.6 |

In Table 1-1, Comparative Examples 1 and 2 are Comparative Examples 1 and 2 for Invention 1.

As apparent from Table 1-1, it was found that the nonaqueous-electrolyte secondary batteries of Example 1 to Example 5, which employed nonaqueous electrolytes of invention 1-1 containing a specific amount of an "iron-group element" and a "monofluorophosphate and/or difluorophosphate", had better cycle performances (capacity retention after cycling) than the nonaqueous-electrolyte secondary batteries employing nonaqueous electrolytes containing a difluorophosphate only (Comparative Example 1 for Invention 1) or containing an iron-group element only (Comparative Example 2 for Invention 1).

With Respect to Invention 2

Example 1 of Invention 2

[Production of Nonaqueous-Electrolyte Secondary Battery]
[Production of Positive-Electrode Active Material]

As a positive-electrode active material was used a lithium-transition metal composite oxide represented by the composition formula $LiMn_{0.33}Ni_{0.33}Co_{0.33}O_2$. This positive-electrode active material was synthesized by the following method. $Mn_3O_4$, NiO, and $Co(OH)_2$ were weighed out as a manganese source, nickel source, and cobalt source, respectively, in such amounts as to result in an Mn:Ni:Co molar ratio of 1:1:1. Pure water was added thereto to prepare a slurry. Using a circulating medium-stirring type wet bead mill, the solid matters in the slurry were wet-pulverized with stirring to a median diameter of 0.2 μm.

The slurry was spray-dried with a spray dryer to obtain nearly spherical granulated particles having a particle diameter of about 5 μm consisting only of the manganese source, nickel source, and cobalt source. An LiOH powder having a median diameter of 3 μm was added to the resultant granulated particles in such an amount that the ratio of the number of moles of the Li to the total number of moles of the Mn, Ni, and Co became 1.05 times. The ingredients were mixed together by means of a high-speed mixer to obtain a powder mixture of the lithium source and the granulated particles of the nickel source, cobalt source, and manganese source. This powder mixture was burned at 950° C. for 12 hours (heating/cooling rate, 5° C./min) in an air stream, subsequently disaggregated, and passed through a sieve having an opening size of 45 μm to obtain a positive-electrode active material.

[Production of Positive Electrode]

Ninety percents by mass the positive-electrode active material was mixed with 5% by mass acetylene black as a conductive material and 5% by mass poly(vinylidene fluoride) (PVdF) as a binder in N-methylpyrrolidone solvent to prepare a slurry. The slurry obtained was applied to one side of an aluminum foil having a thickness of 15 μm and dried. The coated foil was rolled with a pressing machine to a thickness of 80 μm. Disks having a diameter of 12.5 mm were punched out of the coated foil with a punching die to produce positive electrodes. Part of these positive electrodes was used together with a lithium metal sheet as a counter electrode and a porous polyethylene film having a thickness of 25 μm as a separator to fabricate a coin cell. For this cell was used an electrolyte prepared by dissolving $LiPF_6$ in a concentration of 1 mol/L in a solvent composed of EC (ethylene carbonate)/DMC (dimethyl carbonate)/EMC (ethyl methyl carbonate)=3/3/4 (volume ratio).

The coin cell obtained was subjected to constant-current constant-voltage charge at 0.2 $mA/cm^2$, i.e., a reaction in which lithium ions were released from the positive electrode, to an upper limit of 4.2 V. Subsequently, the cell was subjected to constant-current discharge at 0.2 $mA/cm^2$, i.e., a reaction in which lithium ions were occluded in the positive electrode, to a lower limit of 3.0 V. The initial charge capacity and initial discharge capacity per unit weight of the positive-electrode active material which were determined in the charge/discharge are expressed by Qs (C) [mAh/g] and Qs (D) [mAh/g], respectively.

[Production of Negative Electrode]

To 98 parts by weight of artificial-graphite powder KS-44 (trade name; manufactured by Timcal) were added 100 parts by weight of an aqueous dispersion of sodium carboxymethyl cellulose (concentration of sodium carboxymethyl cellulose, 1% by mass) as a thickener and 2 parts by weight of an aqueous dispersion of a styrene/butadiene rubber (concentration of styrene/butadiene rubber, 50% by mass) as a binder. The ingredients were mixed together by means of a disperser to obtain a slurry. The slurry obtained was applied to a side of a copper foil having a thickness of 10 μm and dried. The coated foil was rolled with a pressing machine to a thickness of 75 μm. Disks having a diameter of 12.5 mm were punched out of the coated foil with a punching die to produce negative electrodes.

Part of these negative electrodes was used as a test electrode together with lithium metal as a counter electrode to fabricate a battery cell. This cell was subjected to a test in which lithium ions were occluded in the negative electrode by the constant-current constant-voltage method at 0.2 $mA/cm^2$ and 3 mV (cutoff current, 0.05 mA) to a lower limit of 0 V. The initial occlusion capacity per unit weight of the negative-electrode active material in this test is expressed by Qf [mAh/g].

[Nonaqueous Electrolyte]

In a dry argon atmosphere, sufficiently dried $LiPF_6$ was mixed, in a proportion of 1 mol/L, with a mixture of ethylene carbonate, dimethyl carbonate, and ethyl methyl carbonate (volume ratio, 3:3:4). A target electrolyte was obtained by incorporating heptane, as a compound selected from the compounds of invention 2, into the resultant mixture solution so as to result in a proportion thereof of 2% by mass based on the whole nonaqueous electrolyte and dissolving lithium difluorophosphate in the solution so as to result in a concentration thereof of 0.2% by mass based on the whole nonaqueous electrolyte.

[Battery Assembly]

A battery to be tested was fabricated using a combination of the positive electrode and negative electrode produced above and using a coin cell, and was evaluated for battery performances. Namely, the positive electrode produced was placed on a positive-electrode can for a coin cell, and a porous polyethylene film having a thickness of 25 μm was placed thereon as a separator. This assemblage was pressed with a gasket made of polypropylene. Thereafter, the nonaqueous electrolyte described above was introduced into the can and sufficiently infiltrated into the separator. Subsequently, the negative electrode described above was placed and a negative-electrode can was placed thereon and sealed. Thus, a coin type lithium secondary battery was produced. In this fabrication, the balance between the weight of the positive-electrode active material and the weight of the negative-electrode active material was set so that the following expression was almost satisfied.

$$[(\text{Weight of negative-electrode active material}[g]) \times (Qf [\text{mAh/g}])]/[(\text{weight of positive-electrode active material }[g]) \times (Qs(C)[\text{mAh/g}])] = 1.2$$

<Battery Characteristics Test>

In order to examine the low-temperature load characteristics of the battery thus obtained, the 1-hour-rate current value, i.e., 1 C, of the battery was set as shown by the following equation and the following test was made.

$$1C[\text{mA}] = Qs(D) \times (\text{weight of positive-electrode active material}[g])/h$$

First, at room temperature, the battery was subjected to one cycle of constant-current charge/discharge at 0.2 C and thereafter subjected to two cycles each consisting of constant-current constant-voltage charge at C/3 and subsequent constant-current discharge at C/3. The final charge voltage and final discharge voltage were set at 4.1 V and 3.0 V, respectively.

(Output Test)

Subsequently, the coil cell which had been regulated so as to have a state of charge of 50% by C/3 constant-current charge was subjected to an output measurement test in a 25° C. environment. The cell was discharged for 10 seconds at each of 0.3 C, 1.0 C, 3.0 C, and 10.0 C, and the voltage thereof was measured at 10 seconds after the discharge initiation (after each discharge, the cell was paused for 15 minutes, subsequently charged in a quantity of electricity corresponding to the discharge, and then paused for 15 minutes before being subjected to the next discharge test). The area of the triangle surrounded by the resultant current-voltage straight line and the final discharge voltage (3 V) was taken as initial output (W). The results thereof are shown in Table 2.

(Cycle Test)

A cycle test was conducted in a high-temperature environment of 60° C., which is regarded as the upper-limit temperature for the actual use of lithium secondary batteries. The cell was charged by the constant-current constant-voltage method at 2 C to a final charge voltage of 4.1 V and then discharged at a constant current of 2 C to a final discharge voltage of 3.0 V. This charge/discharge operation as one cycle was repeated to conduct 100 cycles in total. The cell which had undergone the cycle test was subjected to three charge/discharge cycles in a 25° C. environment at C/3, and the output thereof was measured in the same manner as for the initial output. This output is referred to as output after cycling. The results thereof are shown in Table 2.

Example 2 of Invention 2

A nonaqueous-electrolyte secondary battery was produced and subjected to the battery characteristics test in the same manners as in Example 1 of Invention 2, except that in the preparation of a nonaqueous electrolyte, the amount of heptane was changed from 2% by mass to 0.5% by mass. The results thereof are shown in Table 2.

Example 3 of Invention 2

A nonaqueous-electrolyte secondary battery was produced and subjected to the battery characteristics test in the same manners as in Example 1 of Invention 2, except that in the preparation of a nonaqueous electrolyte, 2% by mass cyclohexane was used in place of the 2% by mass heptane. The results thereof are shown in Table 2.

Example 4 of Invention 2

A nonaqueous-electrolyte secondary battery was produced and subjected to the battery characteristics test in the same manners as in Example 3 of Invention 2, except that in the preparation of a nonaqueous electrolyte, the amount of cyclohexane was changed from 2% by mass to 0.5% by mass. The results thereof are shown in Table 2.

Example 5 of Invention 2

A nonaqueous-electrolyte secondary battery was produced and subjected to the battery characteristics test in the same manners as in Example 1 of Invention 2, except that in the preparation of a nonaqueous electrolyte, 2% by mass fluorobenzene was used in place of the 2% by mass heptane. The results thereof are shown in Table 2.

Example 6 of Invention 2

A nonaqueous-electrolyte secondary battery was produced and subjected to the battery characteristics test in the same manners as in Example 5 of Invention 2, except that in the preparation of a nonaqueous electrolyte, the amount of fluorobenzene was changed from 2% by mass to 0.5% by mass. The results thereof are shown in Table 2.

Example 7 of Invention 2

A nonaqueous-electrolyte secondary battery was produced and subjected to the battery characteristics test in the same manners as in Example 1 of Invention 2, except that in the preparation of a nonaqueous electrolyte, 2% by mass nonafluorobutyl ethyl ether was used in place of the 2% by mass heptane. The results thereof are shown in Table 2.

Example 8 of Invention 2

A nonaqueous-electrolyte secondary battery was produced and subjected to the battery characteristics test in the same manners as in Example 7 of Invention 2, except that in the preparation of a nonaqueous electrolyte, the amount of nonafluorobutyl ethyl ether was changed from 2% by mass to 0.5% by mass. The results thereof are shown in Table 2.

Example 9 of Invention 2

A nonaqueous-electrolyte secondary battery was produced and subjected to the battery characteristics test in the same manners as in Example 3 of Invention 2, except that in the preparation of a nonaqueous electrolyte, 0.2% by mass sodium difluorophosphate was used in place of the 0.2% by mass lithium difluorophosphate. The results thereof are shown in Table 2.

Comparative Example 1 for Invention 2

A nonaqueous-electrolyte secondary battery was produced and subjected to the battery characteristics test in the same manners as in Example 1 of invention 2, except that in the preparation of a nonaqueous electrolyte, neither the compound among the compounds of invention 2 nor the lithium difluorophosphate was used. The results thereof are shown in Table 2.

Comparative Example 2 for Invention 2

A nonaqueous-electrolyte secondary battery was produced and subjected to the battery characteristics test in the same manners as in Example 1 of invention 2, except that in the preparation of a nonaqueous electrolyte, the lithium difluorophosphate was not used. The results thereof are shown in Table 2.

Comparative Example 3 for Invention 2

A nonaqueous-electrolyte secondary battery was produced and subjected to the battery characteristics test in the same manners as in Example 3 of invention 2, except that in the preparation of a nonaqueous electrolyte, the lithium difluorophosphate was not used. The results thereof are shown in Table 2.

Comparative Example 4 for Invention 2

A nonaqueous-electrolyte secondary battery was produced and subjected to the battery characteristics test in the same manners as in Example 5 of invention 2, except that in the preparation of a nonaqueous electrolyte, the lithium difluorophosphate was not used. The results thereof are shown in Table 2.

Comparative Example 5 for Invention 2

A nonaqueous-electrolyte secondary battery was produced and subjected to the battery characteristics test in the same manners as in Example 7 of invention 2, except that in the preparation of a nonaqueous electrolyte, the lithium difluorophosphate was not used. The results thereof are shown in Table 2.

Comparative Example 6 for Invention 2

A nonaqueous-electrolyte secondary battery was produced and subjected to the battery characteristics test in the same manners as in Example 7 of invention 2, except that in the preparation of a nonaqueous electrolyte, the compound among the compounds of invention 2 was not used. The results thereof are shown in Table 2.

In Table 2 are shown the proportions of the initial output and output after cycling of each battery to the initial output and output after cycling of the battery of Comparative Example 1 for invention 2 which are taken as 100%.

TABLE 2

| | Compound in the compounds of invention | | Monofluorophosphate and/or difluorophosphate | | Initial output (%) | Output after cycling (%) |
|---|---|---|---|---|---|---|
| Example 1 | Heptane | 2% | lithium difluorophosphate | 0.2% | 128 | 133 |
| Example 2 | Heptane | 0.5% | lithium difluorophosphate | 0.2% | 126 | 131 |
| Example 3 | Cyclohexane | 2% | lithium difluorophosphate | 0.2% | 132 | 138 |
| Example 4 | Cyclohexane | 0.5% | lithium difluorophosphate | 0.2% | 128 | 133 |
| Example 5 | Fluorobenzene | 2% | lithium difluorophosphate | 0.2% | 126 | 132 |
| Example 6 | Fluorobenzene | 0.5% | lithium difluorophosphate | 0.2% | 124 | 130 |
| Example 7 | nonafluorobutyl ethyl ether | 2% | lithium difluorophosphate | 0.2% | 130 | 135 |
| Example 8 | nonafluorobutyl ethyl ether | 0.5% | lithium difluorophosphate | 0.2% | 127 | 132 |
| Example 9 | Cyclohexane | 2% | sodium difluorophosphate | 0.2% | 127 | 133 |
| Comparative Example 1 | none | | none | | 100 | 100 |
| Comparative Example 2 | Heptane | 2% | none | | 100 | 100 |
| Comparative Example 3 | Cyclohexane | 2% | none | | 100 | 101 |
| Comparative Example 4 | Fluorobenzene | 2% | none | | 99 | 100 |
| Comparative Example 5 | nonafluorobutyl ethyl ethe | 2% | none | | 100 | 101 |
| Comparative Example 6 | none | | lithium difluorophosphate | 0.2% | 121 | 124 |

As apparent from Table 2, the following was found. The nonaqueous-electrolyte secondary batteries of Example 1 to Example 9 of invention 2, which employed nonaqueous electrolytes each containing both a compound belonging to the compounds of invention 2 and a difluorophosphate, had higher output characteristics than the nonaqueous-electrolyte secondary battery of Comparative Example 6 for invention 2, which contained lithium difluorophosphate only, not to mention the nonaqueous-electrolyte secondary battery of Comparative Example 1 for invention 2, which contained neither of the two ingredients. Furthermore, a comparison in output after the high-temperature cycling revealed that the batteries of Example 1 to Example 9 of invention 2 each had a large increase in output based on the output in Comparative Example 1 for invention 2.

On the other hand, a comparison between Comparative Example 2 to Comparative Example 5 for invention 2, in which the nonaqueous electrolytes each contained a compound belonging to the compounds of invention 2 but contained no difluorophosphate, and the nonaqueous-electrolyte secondary battery of Comparative Example 1 for invention 2, which contained neither of the two ingredients, revealed that the compounds belonging to the compounds of invention 2 exerted almost no influence on output. Those results clearly show the usefulness of invention 2 which resides in that output characteristics are improved by using a compound belonging to the compounds of invention 2 in combination with lithium difluorophosphate.

With Respect to Invention 3

Example 1 of Invention 3

[Production of Secondary Battery]
[Production of Positive Electrode]

Ninety-four percents by mass lithium cobalt oxide (LiCoO$_2$) as a positive-electrode active material was mixed with 3% by mass acetylene black as a conductive material and 3% by mass poly(vinylidene fluoride) (PVdF) as a binder in N-methylpyrrolidone solvent to prepare a slurry. The slurry obtained was applied to each side of an aluminum foil having a thickness of 14 μm and dried. The coated foil was rolled with a pressing machine to a thickness of 85 μm. A disk having a diameter of 12.5 mm was punched out of the coated foil to obtain a positive electrode.

[Production of Negative Electrode]

An electrolytic copper foil having a thickness of 18 μm was used as a current collector base. This foil was subjected to the deposition of a thin silicon film thereon using a DC sputtering apparatus ("HSM-52", manufactured by Shimadzu Corp.) and silicon as a target material under the conditions of a power density of 4.7 W/cm$^2$ and a deposition rate (film formation rate) of about 1.8 nm/sec. Thus, a silicon-thin-film negative electrode was obtained.

[Nonaqueous Electrolyte]

In a dry argon atmosphere, LiPF$_6$ and a difluorophosphate which each had been sufficiently dried were dissolved, in concentrations of 1 mol/L and 1% by mass, respectively, in a mixture of ethylene carbonate and diethyl carbonate (volume ratio, 3:7) to obtain a desired nonaqueous electrolyte.

[Treatment of Electrode]

The negative electrode obtained above was treated in the following manner. 3-Methacrylopropyltriethoxysilane was dissolved in diethyl carbonate (DEC) so as to result in a concentration thereof of 1% by mass based on the DEC to prepare a negative-electrode treatment liquid. The electrode was immersed in this negative-electrode treatment liquid and then heat-treated at 110° C. for 1 hour. Thereafter, the electrode was vacuum-dried at 60° C. for 11 hours and then used. On the other hand, the positive electrode was vacuum-dried at 80° C. for 11 hours, without being subjected to that treatment, and then used.

[Production of Nonaqueous-Electrolyte Secondary Battery]

The positive electrode was placed in a stainless-steel can serving also as a positive-electrode conductor, and the negative electrode was placed thereon through a separator which was made of polyethylene and had been impregnated with the electrolyte. This can was sealed together with a cover plate serving also as a negative-electrode conductor by caulking through a gasket for insulation. Thus, a coin cell was produced.

<Evaluation of Battery>

The battery was subjected to 5 cycles of charge/discharge at 25° C. and a constant current corresponding to 0.2 C under the conditions of a final charge voltage of 4.2 V and a final discharge voltage of 2.5 V to stabilize battery operation. In the 6th cycle, the battery was subjected to 4.2-V constant-current constant-voltage charge (CCCV charge), in which the battery was charged to a final charge voltage of 4.2 V at a current corresponding to 0.2 C until the charge current reached a value corresponding to 0.02 C (0.02 C cutting), and then subjected to 2.5-V discharge at a constant current value corresponding to 0.5 C. In the 7th cycle, the battery was subjected to 4.2-V constant-current constant-voltage charge (CCCV charge) at a current corresponding to 0.2 C (0.02 C cutting) and then subjected to 2.5-V discharge at a constant current corresponding to 1.0 C. Thereafter, the battery was subjected to 92 cycles under such conditions that the battery was subjected to 4.2-V constant-current constant-voltage charge (CCCV charge) at a current corresponding to 0.5 C (0.05 C cutting) and then subjected to 2.5-V discharge at a constant current value corresponding to 0.5 C. In the 100th cycle, the battery was subjected to 4.2-V constant-current constant-voltage charge (CCCV charge) at a current corresponding to 0.2 C (0.02 C cutting) and then subjected to 2.5-V discharge at a constant current value corresponding to 0.2 C. "1 C" means a current value at which the battery can be fully charged by 1-hour charge.

Example 2 of Invention 3 to Example 4 of Invention 3

A positive electrode, negative electrode, and nonaqueous electrolyte were produced or prepared in the same manners as in Example 1 of invention 3. Subsequently, the electrodes were treated in each Example in the following manners. As shown in Table 3, diethyl carbonate (DEC) or pure water was used in each Example, and 3-methacrylopropyltriethoxysilane or 3-aminopropyltriethoxysilane was dissolved or dispersed therein so as to result in a concentration of 1% by mass based on the DEC or water. Thus, negative-electrode treatment liquids for the respective Examples were prepared. The negative electrode was treated in the same manner as in Example 1 of invention 3. The treatment of the positive electrode was also conducted in the same manner as in Example 1 of invention 3. Nonaqueous-electrolyte secondary batteries were produced in the same manner as in Example 1 of invention 3. Thereafter, battery evaluation was conducted in the same manner as in Example 1 of invention 3. The results thereof are also shown in Table 3.

Comparative Example 1 for Invention 3

A nonaqueous electrolyte was prepared in the same manner as in Example 1 of invention 3, except that lithium difluorophosphate was not used. Furthermore, a positive electrode and a negative electrode were produced in the same manners as in Example 1 of invention 3. Subsequently, the negative electrode was subjected only to 11-hour vacuum drying at 60° C. The treatment of the positive electrode was conducted in the same manner as in Example 1 of invention 3. A nonaqueous-electrolyte secondary battery was produced in the same manner as in Example 1 of invention 3. Thereafter, battery evaluation was conducted in the same manner as in Example 1 of invention 3. The results thereof are also shown in Table 3.

Comparative Example 2 to Comparative Example 5 for Invention

A nonaqueous electrolyte was prepared in the same manner as in Example 1 of invention 3, except that lithium difluorophosphate was not used. Furthermore, a positive electrode and a negative electrode were produced in the same manners as in Example 1 of invention 3. Subsequently, electrode treatments were conducted in the following manner. As shown in Table 3, diethyl carbonate (DEC) or pure water was used in each Comparative Example, and 3-methacrylopropyltriethoxysilane or 3-aminopropyltriethoxysilane was dissolved or dispersed therein so as to result in a concentration of 1% by mass based on the DEC or water. Thus, negative-electrode treatment liquids for the respective Comparative Examples were prepared. The negative electrode was treated in the same manner as in Example 1 of invention 3. The treatment of the positive electrode was also conducted in the same manner as in Example 1 of invention 3. Nonaqueous-electrolyte secondary batteries were produced in the same manner as in Example 1 of invention 3. Thereafter, battery evaluation was conducted in the same manner as in Example 1 of invention 3. The results thereof are also shown in Table 3.

Comparative Example 6 for Invention 3

A positive electrode, negative electrode, and nonaqueous electrolyte were produced or prepared in the same manners as in Example 1 of invention 3. Subsequently, the negative electrode was subjected only to 11-hour vacuum drying at 60° C. The treatment of the positive electrode was conducted in the same manner as in Example 1 of invention 3. A nonaqueous-electrolyte secondary battery was produced in the same manner as in Example 1 of invention 3. Thereafter, battery evaluation was conducted in the same manner as in Example 1 of invention 3. The results thereof are also shown in Table 3.

It was ascertained by gas chromatography that after the production of the nonaqueous-electrolyte secondary batteries of Example 1 of invention 3, Example 2 of invention 3, and Comparative Example 2 and Comparative Example 3 for invention 3, the nonaqueous electrolyte in each battery contained 3-methacrylopropyltriethoxysilane in an amount of 0.06% by mass based on the whole nonaqueous electrolyte. It was further ascertained by gas chromatography that after the production of the nonaqueous-electrolyte secondary batteries of Example 3 of invention 3, Example 4 of invention 3, and Comparative Example 4 and Comparative Example 5 for invention 3, the nonaqueous electrolyte in each battery contained 3-aminopropyltriethoxysilane in an amount of 0.13% by mass based on the whole nonaqueous electrolyte.

With respect to the results, the ratio of the discharge capacity of each battery as measured in the 50th cycle to the discharge capacity as measured in the 50th cycle of the battery of Comparative Example 1 (no negative-electrode treatment; no difluorophosphate) for invention 3 is shown as "50th-cycle discharge capacity ratio" in Table 3. Namely, the "50th-cycle discharge capacity ratio" is expressed by (50th-cycle discharge capacity ratio)=(discharge capacity in 50th cycle)/(discharge capacity in 50th cycle in Comparative Example 1 for invention 3).

TABLE 3

| | Negative-electrode treatment liquid | Difluorophosphate (mass %) | 50th-cycle discharge capacity ratio |
|---|---|---|---|
| Example 1 | 3-methacrylopropyl-triethoxysilane (1% DEC solution) | lithium difluorophosphate (1) | 1.24 |
| Example 2 | 3-methacrylopropyl-triethoxysilane (1% H$_2$O solution) | lithium difluorophosphate (1) | 1.24 |
| Example 3 | 3-aminopropyltri-ethoxysilane (1% DEC solution) | lithium difluorophosphate (1) | 1.22 |
| Example 4 | 3-aminopropyltri-ethoxysilane (1% H$_2$O solution) | lithium difluorophosphate (1) | 1.27 |
| Comparative Example 1 | none | none | 1 |
| Comparative Example 2 | 3-methacrylopropyl-triethoxysilane (1% DEC solution) | none | 1.15 |
| Comparative Example 3 | 3-methacrylopropyl-triethoxysilane (1% H$_2$O solution) | none | 1.06 |
| Comparative Example 4 | 3-aminopropyltri-ethoxysilane (1% DEC solution) | none | 1.17 |
| Comparative Example 5 | 3-aminopropyltri-ethoxysilane (1% H$_2$O solution) | none | 1.08 |
| Comparative Example 6 | none | lithium difluorophosphate (1) | 1.19 |

As apparent from Table 3, the nonaqueous-electrolyte secondary batteries employing a negative electrode treated with a compound represented by general formula (1) or general formula (2) (requirement 1) and produced using a nonaqueous electrolyte of invention 3 which contained lithium difluorophosphate as the "monofluorophosphate and/or difluorophosphate" (requirement 2) showed larger values of discharge capacity after 50 cycles than the non-aqueous-electrolyte secondary batteries which satisfied only either of requirement 1 and requirement 2 or satisfied neither of the requirements. These secondary batteries according to invention 3 were able to be inhibited from deteriorating with charge/discharge and to have a prolonged battery life.

Specifically, the batteries of Example 1 to Example 4 of invention 3, which satisfied both requirement 1 and requirement 2, were inhibited from deteriorating in battery characteristics with charge/discharge. In contrast, the battery of Comparative Example 1 for invention 3, which satisfied neither of the requirements, was found to have a low discharge capacity retention and deteriorate considerably. The batteries of Comparative Example 2 to Comparative Example 6 for invention 3, which satisfied only either of requirement 1 and requirement 2, each showed a high discharge capacity as compared with Comparative Example 1 for invention 3. The effect of inhibiting battery deterioration therein was ascertained. However, this effect was low as compared with that in the nonaqueous-electrolyte secondary batteries of invention 3 (Example 1 to Example 4 of invention 3). Although the expressions "requirement 1" and "requirement 2" were used above, the requirements should not be construed as being limited to the contents of those Examples of invention 3 so long as the contents of the claims are satisfied.

With Respect to Invention 4

[Preparation of Electrolyte]

In a dry argon atmosphere, 151.9 g of sufficiently dried lithium hexafluorophosphate (LiPF$_6$) was dissolved in a solvent prepared by mixing purified ethylene carbonate/purified dimethyl carbonate/purified ethyl methyl carbonate in amounts of 381.6 g/310.0 g/391.5 g (about 290 mL/290 mL/385 mL), respectively. This solution had a specific gravity of 1.22. One or more additives were added to the solution in the amounts shown in Table 4, and dissolved therein.

TABLE 4

| | Compound represented by general formula (3) | | Monofluorophosphate, difluorophosphate, or specific carbonic acid ester | | |
|---|---|---|---|---|---|
| Electrolyte | Kind | Amount (mass %/vol %) | Kind | Amount [mass %] | Invention embodiment |
| 1 | Compound A | 0.50/0.20 | vinylene carbonate | 0.5 | 2 |
| 2 | Compound A | 1.00/0.39 | vinylene carbonate | 0.5 | 2 |
| 3 | Compound A | 0.50/0.20 | vinylene carbonate | 1 | 2 |
| 4 | Compound A | 0.50/0.20 | 4-fluoro-1,3-dioxolan-2-one | 1 | 2 |
| 5 | Compound A | 0.50/0.20 | lithium difluorophosphate | 0.5 | 1 |
| 6 | Compound A | 0.50/0.20 | lithium difluorophosphate | 1 | 1 |
| 7 | Compound A | 1.00/0.39 | lithium difluorophosphate | 0.5 | 1 |
| 8 | Compound A | 1.00/0.39 | lithium difluorophosphate | 1 | 1 |
| 9 | Compound B | 0.50/0.26 | lithium difluorophosphate | 0.5 | 1 |
| 10 | Compound A | 0.50/0.20 | 4-fluoro-1,3-dioxolan-2-one lithium difluorophosphate | 1 1 | 1 |
| 11 | Compound A | 0.50/0.20 | vinylene carbonate | 10 | 2 |
| 12 | Compound A | 5.00/1.95 | vinylene carbonate | 0.5 | 2 |
| A | — | — | — | — | — |
| B | — | — | vinylene carbonate | 10 | — |
| C | — | — | lithium difluorophosphate | 0.5 | — |
| D | — | — | Compound C vinylene carbonate | 0.5 0.5 | — |

In Table 4, "invention embodiment 1" indicates "embodiment 4-1" and "invention embodiment 2" indicates "embodiment 4-2". "Compound represented by general formula (3)" indicates "compound represented by general formula (3) in invention 4".

[Chemical Formula-35]

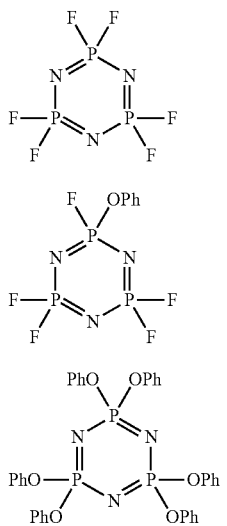

Compound A

Compound B

Compound C

[Production of Secondary Batteries]
<Production of "Secondary Battery 1">
(Production of Positive Electrode)

90% by mass lithium cobalt oxide (LiCoO$_2$) as a positive-electrode active material was mixed with 5% by mass acetylene black as a conductive material and 5% by mass poly(vinylidene fluoride) (hereinafter abbreviated to "PVDF") as a binder in N-methylpyrrolidone solvent to prepare a slurry. The slurry obtained was applied to each side of a 15-µm aluminum foil and dried. The coated foil was rolled with a pressing machine to a thickness of 80 µm. A piece which included an active-material layer size having a width of 100 mm and a length of 100 mm and had an uncoated part having a width of 30 mm was cut out of the coated foil. Thus, a positive electrode was obtained.
(Production of Negative Electrode)

To 98 parts by mass of artificial-graphite powder KS-44 (trade name; manufactured by Timcal) were added 100 parts by mass of an aqueous dispersion of sodium carboxymethyl cellulose (concentration of sodium carboxymethyl cellulose, 1% by mass) as a thickener and 2 parts by mass of an aqueous dispersion of a styrene/butadiene rubber (concentration of styrene/butadiene rubber, 50% by mass) as a binder. The ingredients were mixed together by means of a disperser to obtain a slurry.

The slurry obtained was applied to each side of a 10-µm copper foil and dried. The coated foil was rolled with a pressing machine to a thickness of 75 µm. Apiece which included an active-material layer size having a width of 104 mm and a length of 104 mm and had an uncoated part having a width of 30 mm was cut out of the coated foil. Thus, a negative electrode was obtained.
(Battery Assembly)

The positive electrode and the negative electrode were superposed together with separators made of polyethylene in order to prevent the positive electrode and negative electrode from coming into direct contact with each other. This assemblage was wound to obtain an electrode structure. This electrode structure was placed in a battery can so that the terminals of the positive electrode and negative electrode protruded outside. Subsequently, 5 mL of the electrolyte which will be described later was introduced into the battery can, which was then caulked to produce a cylindrical battery of the 18650 type. This battery is referred to as "secondary batter 1".
<Production of "Secondary Battery 2">

A battery was produced in the same manner as for secondary battery 1, except that a lithium-nickel-manganese-cobalt oxide (LiNi$_{1/3}$Mn$_{1/3}$CO$_{1/3}$O$_2$) was used as a positive-electrode active material in place of the lithium cobalt oxide, and that the charge voltage was changed to 4.25 V. This battery is referred to as "secondary battery 2".
<Production of "Secondary Battery 3">

A battery was produced in the same manner as for secondary battery 1, except that lithium iron oliphinate (LiFePO$_4$) was used as a positive-electrode active material in place of the lithium cobalt oxide, and that the charge voltage was changed to 4.25 V. This battery is referred to as "secondary battery 3".
<Production of "Secondary Battery 4">

As negative-electrode active materials, use was made of 73.2 parts by mass of silicon and 8.1 parts by mass of copper, which are non-carbon materials, and 12.2 parts by mass of an artificial-graphite powder (trade name "KS-6", manufactured by Timcal). Thereto were added 54.2 parts by mass of an N-methylpyrrolidone solution containing 12% by mass PVDF and 50 parts by mass of N-methylpyrrolidone. These ingredients were mixed together by means of a disperser to obtain slurry.

The slurry obtained was evenly applied to a copper foil having a thickness of 18 µm as a negative-electrode current collector. The coating was first allowed to dry naturally and finally vacuum-dried at 85° C. for a whole day and night. Thereafter, the coated foil was pressed so as to result in an electrode density of about 1.5 g·cm$^{-3}$. A disk having a diameter of 12.5 mm was punched out of the coated foil to obtain a negative electrode (silicon-alloy negative electrode). Except for the procedure described above, a battery was produced in the same manner as for secondary battery 1. This battery is referred to as "secondary battery 4".
<Production of "Secondary Battery 5">

Ninety percents by mass negative-electrode active material (Li$_{4/3}$Ti$_{5/3}$O$_4$) was mixed with 5% by mass acetylene black as a conductive material and 5% by mass poly(vinylidene fluoride) (PVdF) as a binder in N-methylpyrrolidone solvent to obtain a slurry.

The slurry obtained was applied to one side of a 10-µm rolled copper foil and dried. The coated foil was rolled with a pressing machine to 90 µm. A piece which included an active-material layer size having a width of 104 mm and a length of 104 mm and had an uncoated part having a width of 30 mm was cut out of the coated foil to obtain a negative electrode. Except for the procedure described above, a battery was produced in the same manner as for secondary battery 1. This battery is referred to as "secondary battery 5".

Examples 1 to 14 of Invention 4 and Comparative Examples 1 to 8 for Invention 4

In Examples 1 to 14 of invention 4 and Comparative Examples 1 to 8 for invention 4, experiments were made respectively for the Examples of invention 4 and Comparative Examples for invention 4 using the combinations of experimental conditions (kinds of electrolyte and secondary battery) given in the following Table 5 and Table 6. Results were obtained with respect to the evaluation items described below. These results also are shown in Table 5 and Table 6.

[Evaluation of Secondary Batteries]

The secondary batteries were evaluated respectively under the following conditions.

<Evaluation of Secondary Battery 1>

(Initial Capacity)

At 25° C., the battery was charged to 4.2 V by the constant-current constant-voltage charging method at 0.2 C and then discharged to 3.0 V at a constant current of 0.2 C. This operation as one cycle was repeated to conduct 5 cycles and thereby stabilize the battery. The discharge capacity as measured in the fifth cycle is referred to as "initial capacity". Incidentally, the current value at which rated capacity is discharged over 1 hour is referred to as 1 C.

(Capacity Retention through Cycling)

At 60° C., the battery which had undergone the initial charge/discharge was subjected to 500 cycles of charge/discharge in each of which the battery was charged to 4.2 V by the constant-current constant-voltage method at 10 and then discharged to 3.0 V at a constant current of 1 C. The proportion of the 500th-cycle discharge capacity to the 1st-cycle discharge capacity both measured in this operation is referred to as "capacity retention through cycling".

(Initial Low-Temperature Discharge Rate)

The battery which had undergone the initial charge/discharge was charged to 4.2 V at 25° C. by the constant-current constant-voltage charging method at 0.2 C and then subjected at −30° C. to constant-current discharge at 0.2 C. The discharge capacity as measured in this discharge is referred to as initial low-temperature capacity, and the proportion of the initial low-temperature capacity to the initial capacity is referred to as "initial low-temperature discharge rate".

(Low-Temperature Discharge Rate after Cycling)

At 25° C., the battery which had undergone the cycle test was charged to 4.2 V by the constant-current constant-voltage method at 0.2 C and then discharged to 3.0 V at a constant current of 0.2 C. This operation as one cycle was repeated to conduct three cycles. The discharge capacity as measured in the 3rd cycle is referred to as capacity after cycling. Thereafter, the same battery was charged to 4.2 V at 25° C. by the constant-current constant-voltage charging method at 0.2 C and then subjected at −30° C. to constant-current discharge at 0.2 C. The discharge capacity as measured in this discharge is referred to as low-temperature capacity after cycling, and the proportion of the low-temperature capacity after cycling to the capacity after cycling is referred to as "low-temperature discharge rate after cycling."

<Evaluation of Secondary Battery 2>

The battery was evaluated for the same items as in the evaluation of secondary battery 1 in the same manners as in the evaluation, except that the charge voltage in each test was changed from 4.2 V to 4.25 V.

<Evaluation of Secondary Battery 3>

The battery was evaluated for the same items as in the evaluation of secondary battery 1 in the same manners as in the evaluation, except that the charge voltage in each test was changed from 4.2 V to 3.8 V and the discharge voltage in each test was changed from 3.0 V to 2.5 V.

<Evaluation of Secondary Battery 4>

The battery was evaluated for the same items as in the evaluation of secondary battery 1 in the same manners as in the evaluation, except that the discharge voltage in each test was changed from 3.0 V to 2.5 V.

<Evaluation of Secondary Battery 5>

The battery was evaluated for the same items as in the evaluation of secondary battery 1 in the same manners as in the evaluation, except that the charge voltage in each test was changed from 4.2 V to 2.7 V and the discharge voltage in each test was changed from 3.0 V to 1.9 V.

In Examples 1 to 16 of invention 4, in which electrolytes 1 to 12 were employed, the batteries were excellent in all of initial capacity, capacity retention through cycling, initial low-temperature discharge rate, and low-temperature discharge rate after cycling. In contrast, in Comparative Examples 1 to 8 for invention 4, in which electrolytes A to D were employed, the batteries were inferior in at least one of those items.

TABLE 5

| No. | Electrolyte | Battery | Initial capacity [mA] | Capacity retention through cycling [%] | Initial low-temperature discharge rate [%] | Low-temperature discharge rate after cycling [%] |
| --- | --- | --- | --- | --- | --- | --- |
| Example 1 | 1 | secondary battery 1 | 700 | 74 | 65 | 63 |
| Example 2 | 2 | secondary battery 1 | 700 | 75 | 66 | 65 |
| Example 3 | 3 | secondary battery 1 | 703 | 78 | 63 | 63 |
| Example 4 | 4 | secondary battery 1 | 701 | 76 | 68 | 66 |
| Example 5 | 5 | secondary battery 1 | 700 | 68 | 71 | 69 |
| Example 6 | 6 | secondary battery 1 | 700 | 70 | 73 | 72 |
| Example 7 | 7 | secondary battery 1 | 700 | 70 | 72 | 71 |
| Example 8 | 8 | secondary battery 1 | 700 | 71 | 75 | 73 |
| Example 9 | 9 | secondary battery 1 | 700 | 68 | 68 | 67 |
| Example 10 | 10 | secondary battery 1 | 700 | 77 | 75 | 74 |
| Example 11 | 11 | secondary battery 1 | 700 | 78 | 56 | 54 |

TABLE 5-continued

| No. | Electrolyte | Battery | Initial capacity [mA] | Capacity retention through cycling [%] | Initial low-temperature discharge rate [%] | Low-temperature discharge rate after cycling [%] |
|---|---|---|---|---|---|---|
| Example 12 | 12 | secondary battery 1 | 680 | 78 | 65 | 63 |
| Comparative Example 1 | A | secondary battery 1 | 700 | 64 | 61 | 54 |
| Comparative Example 2 | B | secondary battery 1 | 701 | 74 | 59 | 56 |
| Comparative Example 3 | C | secondary battery 1 | 700 | 66 | 68 | 65 |
| Comparative Example 4 | D | secondary battery 1 | 690 | 60 | 50 | 48 |

TABLE 6

| No. | Electrolyte | Battery | Initial capacity [mA] | Capacity retention through cycling [%] | Initial low-temperature discharge rate [%] | Low-temperature discharge rate after cycling [%] |
|---|---|---|---|---|---|---|
| Example 13 | 1 | secondary battery 2 | 755 | 70 | 65 | 64 |
| Comparative Example 5 | A | secondary battery 2 | 750 | 60 | 62 | 56 |
| Example 14 | 1 | secondary battery 3 | 727 | 65 | 60 | 55 |
| Comparative Example 6 | A | secondary battery 3 | 725 | 57 | 55 | 49 |
| Example 15 | 1 | secondary battery 4 | 701 | 58 | 70 | 65 |
| Comparative Example 7 | A | secondary battery 4 | 700 | 50 | 65 | 58 |
| Example 16 | 1 | secondary battery 5 | 725 | 89 | 96 | 92 |
| Comparative Example 8 | A | secondary battery 5 | 725 | 85 | 92 | 88 |

With Respect to Invention 5

The batteries obtained in the following Examples and Comparative Examples each were evaluated by the method shown below.

[Evaluation of Discharge Capacity]

At 60° C., the nonaqueous-electrolyte battery was charged to 4.2 V at a constant current corresponding to 0.1 C and then discharged to 3 V at a constant current of 0.1 C. This operation as one cycle was repeated to conduct 20 cycles. The proportion of the discharge capacity after the 20 cycles (%) to the initial discharge capacity which was taken as 100 was determined. This proportion is referred to as "discharge capacity after cycling (%)" "10" means the current value at which the reference capacity of a battery is discharged over 1 hour; "0.1 C" means the current value which is ¹/₁₀ that current value.

Example 1 of Invention 5

Production of Nonaqueous Electrolyte

In a dry argon atmosphere, sufficiently dried lithium bis(trifluoromethanesulfonyl)imide (hereinafter abbreviated to "LiTFSI") was dissolved in N-butyl-N-methylpyrrolidinium bis(trifluoromethanesulfonyl)imide (hereinafter abbreviated to "BMPTFSI") so as to result in a proportion thereof of 0.4 mol/L. Furthermore, sufficiently dried lithium difluorophosphate (hereinafter sometimes referred to as "LiPO$_2$F$_2$") was dissolved therein in an amount of 2 parts by weight per 98 parts by weight of the mixture of BMPTFSI and LiTFSI. Thus, a nonaqueous electrolyte was obtained.

[Production of Nonaqueous-Electrolyte Battery]

Ninety percents by mass lithium cobalt oxide (LiCoO$_2$) as a positive-electrode active material was mixed with 5% by mass acetylene black as a conductive material and 5% by mass poly(vinylidene fluoride) (PVdF) as a binder in N-methylpyrrolidone solvent to obtain a slurry. The slurry obtained was applied to one side of an aluminum foil having a thickness of 15 μm and dried. The coated foil was rolled with a pressing machine to a thickness of 80 μm. A disk having a diameter of 12.5 mm in terms of active-material layer size was punched out of the coated foil to produce an electrode. This electrode as a working electrode was used together with a lithium foil as a counter electrode and a separator impregnated with the nonaqueous electrolyte and interposed between the electrodes. Thus, a nonaqueous-electrolyte battery which was a coin type lithium secondary battery was produced. This battery was evaluated. The components of the nonaqueous electrolyte are shown in Table 7, and the results of the evaluation are shown in Table 8.

Example 2 of Invention 5

A coin type lithium secondary battery was produced and evaluated in the same manners as in Example 1 of invention 5, except that N-butyl-N,N,N-trimethylammonium bis(trifluoromethanesulfonyl)imide (hereinafter abbreviated to "BTMATFSI") was used in place of the BMPTFSI used in the nonaqueous electrolyte of Example 1 of invention 5. The components of the nonaqueous electrolyte are shown in Table 7, and the results of the evaluation are shown in Table 8.

Example 3 of Invention 5

A coin type lithium secondary battery was produced and evaluated in the same manners as in Example 1 of invention 5, except that N,N-dimethyl-N-methyl-N-methoxyethylammonium bis(trifluoromethanesulfonyl)imide (hereinafter abbreviated to "DEMETFSI") was used in place of the BMPTFSI used in the nonaqueous electrolyte of Example 1 of invention 5. The components of the nonaqueous electrolyte are shown in Table 7, and the results of the evaluation are shown in Table 8.

Comparative Example 1 for Invention 5

A coin type lithium secondary battery was produced and evaluated in the same manners as in Example 1 of invention 5, except that use was made of a nonaqueous electrolyte produced by dissolving sufficiently dried LiTFSI in BMPTFSI so as to result in a proportion thereof of 0.4 mol/L. The components of the nonaqueous electrolyte are shown in Table 7, and the results of the evaluation are shown in Table 8.

Comparative Example 2 for Invention 5

A coin type lithium secondary battery was produced and evaluated in the same manners as in Example 1 of invention 5, except that use was made of a nonaqueous electrolyte produced by dissolving sufficiently dried LiTFSI in BTMATFSI so as to result in a proportion thereof of 0.4 mol/L. The components of the nonaqueous electrolyte are shown in Table 7, and the results of the evaluation are shown in Table 8.

Comparative Example 3 for Invention 5

A coin type lithium secondary battery was produced and evaluated in the same manners as in Example 1 of invention 5, except that use was made of a nonaqueous electrolyte produced by dissolving sufficiently dried LiTFSI in DEMETFSI so as to result in a proportion thereof of 0.4 mol/L. The components of the nonaqueous electrolyte are shown in Table 7, and the results of the evaluation are shown in Table 8.

TABLE 7

| No. | Lithium salt | Ambient-temperature-molten salt | $LiPO_2F_2$ |
|---|---|---|---|
| Example 1 | LiTFSI | BMPTFSI | 2 mass % |
| Example 2 | LiTFSI | BTMATFSI | 2 mass % |
| Example 3 | LiTFSI | DEMETFSI | 2 mass % |
| Comparative Example 1 | LiTFSI | BMPTFSI | — |
| Comparative Example 2 | LiTFSI | BTMATFSI | — |
| Comparative Example 3 | LiTFSI | DEMETFSI | — |

TABLE 8

| No. | Discharge capacity after cycling (%) |
|---|---|
| Example 1 | 91.2 |
| Example 2 | 90.8 |
| Example 3 | 92.5 |
| Comparative Example 1 | 32.4 |
| Comparative Example 2 | 65.9 |
| Comparative Example 3 | 69.5 |

As apparent from the results given in Table 8, the batteries employing nonaqueous electrolytes according to invention 5 (Examples 1 to 3 of invention 5) had high charge/discharge characteristics. In contrast, the batteries employing nonaqueous electrolytes which were outside the range of invention 5 (Comparative Examples 1 to 3 for invention 5) had poor charge/discharge characteristics.

INDUSTRIAL APPLICABILITY

According to the nonaqueous electrolyte of invention 1, a nonaqueous-electrolyte secondary battery having high capacity and excellent cycle performances can be produced. The electrolyte and the battery are hence suitable for use in all fields where nonaqueous-electrolyte secondary batteries are used, e.g., in the field of electronic appliances.

Applications of the nonaqueous electrolyte and nonaqueous-electrolyte secondary battery of invention 1 are not particularly limited, and the electrolyte and battery can be used in various known applications. Examples thereof include notebook personal computers, pen-input personal computers, mobile personal computers, electronic-book players, portable telephones, portable facsimile telegraphs, portable copiers, portable printers, headphone stereos, video movie cameras, liquid-crystal TVs, handy cleaners, portable CD players, mini-disk players, transceivers, electronic pocketbooks, electronic calculators, memory cards, portable tape recorders, radios, backup power sources, motors, motor vehicles, motorbikes, bicycles fitted with a motor, bicycles, illuminators, toys, game machines, clocks and watches, power tools, stroboscopes, and cameras.

According to the nonaqueous electrolyte of invention 2, a nonaqueous-electrolyte secondary battery excellent not only in output characteristics but in high-temperature storability and cycle performances can be produced. The electrolyte and the battery are hence suitable for use in all fields where nonaqueous-electrolyte secondary batteries are used, e.g., in the field of electronic appliances.

Applications of the nonaqueous electrolyte and nonaqueous-electrolyte secondary battery of invention 2 are not particularly limited, and the electrolyte and battery can be used in various known applications. Examples of the applications include those enumerated above with regard to invention 1.

According to the nonaqueous electrolyte of invention 3, a nonaqueous electrolyte and a nonaqueous-electrolyte secondary battery can be provided which have excellent cycle performances. The electrolyte and the battery are hence suitable for use in various fields where nonaqueous-electrolyte secondary batteries are used, e.g., in the field of electronic appliances.

Applications of the nonaqueous electrolyte for secondary batteries and the nonaqueous-electrolyte secondary battery of invention 3 are not particularly limited, and the electrolyte and battery can be used in various known applications.

Examples of the applications include those enumerated above with regard to invention 1.

The lithium secondary battery employing the nonaqueous electrolyte of invention 4 is excellent in low-temperature discharge characteristics and heavy-current discharge characteristics and also in high-temperature storability and cycle performances. The electrolyte and the battery are hence suitable for use in all fields where secondary batteries are used, e.g., in the field of electronic appliances. Examples of applications include those enumerated above with regard to invention 1.

The nonaqueous-electrolyte battery employing the nonaqueous electrolyte of invention 5 retains high capacity and is excellent in safety, etc. The electrolyte and the battery can hence be used in various known fields. Examples of applications include those enumerated above with regard to invention 1.

This application is based on the following Japanese patent applications, the entire contents thereof being herein incorporated as a disclosure of the description of the invention.
Invention 1: Application No. 2007-111918 (filing date: Apr. 20, 2007)
Invention 1-1: Application No. 2008-267700 (filing date: Oct. 16, 2008)
Invention 2: Application No. 2007-111976 (filing date: Apr. 20, 2007)
Invention 3: Application No. 2007-116448 (filing date: Apr. 26, 2007)
Invention 4: Application No. 2007-272163 (filing date: Oct. 19, 2007)
Invention 5: Application No. 2007-116444 (filing date: Apr. 26, 2007)

The invention claimed is:

1. A nonaqueous electrolyte mainly comprising a nonaqueous solvent and an electrolyte dissolved therein, wherein the nonaqueous electrolyte comprises at least one compound selected from the group consisting of saturated chain hydrocarbons, saturated cyclic hydrocarbons and ethers having a fluorine atom, and further comprises at least one metal salt of at least one of a monofluorophosphate and a difluorophosphate,
wherein the at least one compound selected from the group consisting of saturated chain hydrocarbons, saturated cyclic hydrocarbons and ethers having a fluorine atom is contained in a total amount of 0.01-15% by mass based on the total mass of the nonaqueous electrolyte,
wherein the metal salt of the monofluorophosphate and/or difluorophosphate is contained in a total amount of from 0.001% by mass to 5% by mass based on the total mass of the nonaqueous electrolyte, and
wherein the saturated chain hydrocarbons have 5-20 carbon atoms, the saturated cyclic hydrocarbons have 3-20 carbon atoms, and the ethers having a fluorine atom are expressed by a general formula $R^5$—O—$R^6$, in which the $R^5$ is an alkyl group having 1-20 carbon atoms substituted with 1-30 fluorine atoms, and $R^6$ is an alkyl group which has 1-20 carbon atoms and may have be substituted with substituents.

2. The nonaqueous electrolyte according to claim 1, wherein the at least one compound selected from the group consisting of saturated chain hydrocarbons, saturated cyclic hydrocarbons, aromatic compounds having a halogen atom, and ethers having a fluorine atom is at least one saturated cyclic hydrocarbon.

3. The nonaqueous electrolyte according to claim 1, wherein the at least one compound selected from the group consisting of saturated chain hydrocarbons, saturated cyclic hydrocarbons, and ethers having a fluorine atom is ethers having a fluorine atom.

4. A nonaqueous-electrolyte secondary battery, comprising the nonaqueous electrolyte according to claim 1, wherein the nonaqueous-electrolyte secondary battery including a negative electrode employing an active material comprising a carbonaceous material.

5. The nonaqueous electrolyte according to claim 1, which is for use in a nonaqueous-electrolyte secondary battery including a negative electrode employing an active material having at least one kind of atom selected from the group consisting of aluminum atom, silicon atom, tin atom, lead atom, and titanium atom.

6. A nonaqueous-electrolyte secondary battery employing the nonaqueous electrolyte according to claim 1.

7. The nonaqueous-electrolyte secondary battery according to claim 6, wherein the battery comprises a positive electrode and/or a negative electrode which contains a metal salt of at least one of the monofluorophosphate and/or the difluorophosphate in the structure thereof.

8. A nonaqueous-electrolyte secondary battery comprising a negative electrode and a positive electrode which are capable of occluding/releasing lithium ions and a nonaqueous electrolyte, wherein the nonaqueous electrolyte is the nonaqueous electrolyte according to claim 1.

9. The nonaqueous-electrolyte secondary battery according to claim 8, wherein the negative electrode comprises a carbonaceous material.

10. The nonaqueous-electrolyte secondary battery according to claim 8, wherein the negative electrode comprises a negative-electrode active material having at least one kind of atom selected from the group consisting of aluminum atom, silicon atom, tin atom, lead atom, and titanium atom.

11. The nonaqueous electrolyte according to claim 1, wherein the metal salt of the monofluorophosphate and/or the difluorophosphate is a lithium salt.

12. The nonaqueous electrolyte according to claim 1, wherein the monofluorophosphate and/or difluorophosphate is difluorophosphate.

13. The nonaqueous electrolyte according to claim 1, which comprises at least one selected from the group consisting of heptane, cyclohexane and nonafluorobutyl ethyl ether in an amount of 0.3 to 10% by mass.

14. A nonaqueous-electrolyte secondary battery, comprising:
a negative electrode, a positive electrode and the nonaqueous electrolyte of claim 1,
wherein the negative electrode and the positive electrode are each capable of occluding/releasing lithium ions.

15. The battery of claim 14, wherein the positive electrode comprises a mixture of a lithium-transition metal composite oxide, a binder and an organic conductive material.

16. The battery of claim 15, wherein the negative electrode comprises a graphite powder.

17. A nonaqueous electrolyte, comprising:
a nonaqueous solvent, and
an electrolyte dissolved in the nonaqueous solvent;
wherein the nonaqueous electrolyte comprises at least one selected from the group consisting of a saturated chain hydrocarbon, a saturated cyclic hydrocarbon and an ether having a fluorine atom, and at least one metal salt of at least one selected from the group consisting of a monofluorophosphate and a difluorophosphate,
wherein the at least one compound selected from the group consisting of a saturated chain hydrocarbon, a saturated cyclic hydrocarbon and an ether having a fluorine atom is contained in a total amount of 0.01-15% by mass based on the total mass of the nonaqueous electrolyte, wherein the metal salt of the monofluorophosphate and/or difluorophosphate is contained in a total amount of from 0.001% by mass to 5% by mass based on the total mass of the nonaqueous electrolyte, and wherein the saturated chain hydrocarbons have 5-20 carbon atoms, the saturated cyclic hydrocarbons have 3-20 carbon atoms, and the ethers having a fluorine atom are expressed by a general formula $R^5$—O—$R^6$, in which the $R^5$ is an alkyl group having 1-20 carbon atoms substituted with 1-30 fluorine atoms, and $R^6$ is an alkyl group which has 1-20 carbon atoms and may have be substituted with substituents.

18. The nonaqueous electrolyte according to claim 17, wherein the metal salt of the monofluorophosphate and/or the difluorophosphate is a lithium salt.

19. The nonaqueous electrolyte according to claim 17, wherein the monofluorophosphate and/or difluorophosphate is difluorophosphate.

* * * * *